(12) United States Patent
Morsy

(10) Patent No.: US 11,564,186 B2
(45) Date of Patent: Jan. 24, 2023

(54) METHODS AND DEVICES FOR COMMUNICATIONS IN DEVICE-TO-DEVICE NETWORKS

(71) Applicant: INTEL CORPORATION, Santa Clara, CA (US)

(72) Inventor: Karim Morsy, Nuremberg (DE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/254,324

(22) PCT Filed: Aug. 22, 2019

(86) PCT No.: PCT/EP2019/072483
§ 371 (c)(1),
(2) Date: Dec. 21, 2020

(87) PCT Pub. No.: WO2020/064231
PCT Pub. Date: Apr. 2, 2020

(65) Prior Publication Data
US 2021/0243713 A1 Aug. 5, 2021

(30) Foreign Application Priority Data

Sep. 28, 2018 (EP) .................................. 18197515

(51) Int. Cl.
*H04W 56/00* (2009.01)
(52) U.S. Cl.
CPC ..... *H04W 56/0015* (2013.01); *H04W 56/002* (2013.01); *H04W 56/006* (2013.01)

(58) Field of Classification Search
CPC .......... H04W 56/0015; H04W 56/002; H04W 56/006; H04W 56/00; H04W 56/001;
(Continued)

(56) References Cited

U.S. PATENT DOCUMENTS

2013/0183906 A1 7/2013 Tavildar et al.
2014/0112194 A1* 4/2014 Novlan ................. H04W 48/16
370/254
(Continued)

FOREIGN PATENT DOCUMENTS

| EP | 3190843 A1 | 7/2017 |
|---|---|---|
| WO | 2015111851 A1 | 7/2015 |
| WO | 2015113589 A1 | 8/2015 |

OTHER PUBLICATIONS

Mumtaz, Shahid, Kazi Mohammed Saidul Huq, and Jonathan Rodriguez. "Direct mobile-to-mobile communication: Paradigm for 5G." IEEE Wireless Communications 21.5 (2014): 14-23. (Year: 2014).*

(Continued)

*Primary Examiner* — Sharad Rampuria
(74) *Attorney, Agent, or Firm* — Viering, Jentschura & Partner mbB

(57) ABSTRACT

A wireless device may include a selection processor configured to process selection information to set a duration of a selection period and to start the selection period, a receiver configured to receive a synchronization initiation signal, and a transmitter configured to transmit a synchronization initiation signal after the selection period has expired if the receiver has not received a synchronization initiation signal during the selection period.

14 Claims, 67 Drawing Sheets

(58) Field of Classification Search
CPC ............. H04W 56/0025; H04B 7/2668; H04B 7/2671; H04B 7/2675; H04B 7/2678; H04B 7/2681; H04B 7/2684; H04J 3/0632; H04J 3/0635; H04J 3/0638; H04J 3/0685; H04N 21/242; H04N 21/4302; H04N 21/4305
See application file for complete search history.

(56) References Cited

U.S. PATENT DOCUMENTS

| | | |
|---|---|---|
| 2017/0034799 A1 | 2/2017 | Kim et al. |
| 2017/0127369 A1 | 5/2017 | Liu et al. |
| 2018/0070252 A1 | 3/2018 | Gupta et al. |
| 2019/0082411 A1* | 3/2019 | Feng ................. H04W 56/0025 |
| 2019/0200313 A1* | 6/2019 | Cai ......................... H04W 4/70 |

OTHER PUBLICATIONS

Dawson, Francis P., and Linus Klaffke. "Variable-sample-rate delay-less frequency-adaptive digital filter for synchronized signal acquisition and sampling." IEEE Transactions on Industrial Electronics 46.5 (1999): 889-896. (Year: 1999).*

Extended European Search Report issued for the priority application EP18197515.2, dated May 22, 2019, 13 pages (for reference purpose).

International Search Report issued in the international stage for PCT/EP2019/072483, dated Feb. 12, 2020, 22 pages (for reference purpose).

* cited by examiner

1418b:
| ZC1 | ZC1 | ZC1 | ZC1 | ZC1 | ZC1 | ZC1 | ZC1 | ZC1 | ZC1 | ZC1 | ZC1 |
|---|---|---|---|---|---|---|---|---|---|---|---|
| ZC2 | ZC2 | ZC2 | ZC2 | ZC2 | ZC2 | ZC2 | ZC2 | ZC2 | ZC2 | ZC2 | ZC2 |
| ZC3 | ZC3 | ZC3 | ZC3 | ZC3 | ZC3 | ZC3 | ZC3 | ZC3 | ZC3 | ZC3 | ZC3 |
| ZC4 | ZC4 | ZC4 | ZC4 | ZC4 | ZC4 | ZC4 | ZC4 | ZC4 | ZC4 | ZC4 | ZC4 |
| ZC5 | ZC5 | ZC5 | ZC5 | ZC5 | ZC5 | ZC5 | ZC5 | ZC5 | ZC5 | ZC5 | ZC5 |
| ZC6 | ZC6 | ZC6 | ZC6 | ZC6 | ZC6 | ZC6 | ZC6 | ZC6 | ZC6 | ZC6 | ZC6 |
| ZC7 | ZC7 | ZC7 | ZC7 | ZC7 | ZC7 | ZC7 | ZC7 | ZC7 | ZC7 | ZC7 | ZC7 |
| ZC8 | ZC8 | ZC8 | ZC8 | ZC8 | ZC8 | ZC8 | ZC8 | ZC8 | ZC8 | ZC8 | ZC8 |
| ZC9 | ZC9 | ZC9 | ZC9 | ZC9 | ZC9 | ZC9 | ZC9 | ZC9 | ZC9 | ZC9 | ZC9 |
| ZC10 | ZC10 | ZC10 | ZC10 | ZC10 | ZC10 | ZC10 | ZC10 | ZC10 | ZC10 | ZC10 | ZC10 |
| ZC11 | ZC11 | ZC11 | ZC11 | ZC11 | ZC11 | ZC11 | ZC11 | ZC11 | ZC11 | ZC11 | ZC11 | ion signal according to some aspects;
METHODS AND DEVICES FOR COMMUNICATIONS IN DEVICE-TO-DEVICE NETWORKS

CROSS-REFERENCE TO RELATED APPLICATIONS

This is a national phase application of International Application PCT/EP2019/072483, which claims priority to EP Patent Application Serial No. 18 197 515.2, which was filed Sep. 28, 2018, and is incorporated herein by reference in its entirety.

TECHNICAL FIELD

Various embodiments relate generally to methods and device for communications in device-to-device (D2D) networks.

BACKGROUND

Various communication networks use device-to-device (D2D) communications to enable devices to communicate directly with each other. The devices may therefore establish direct communication links with each other and use these links to transfer data between each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIGS. 14A-14C show an exemplary slot-specific synchronization signal according to some aspects;

DESCRIPTION

Figure 1:
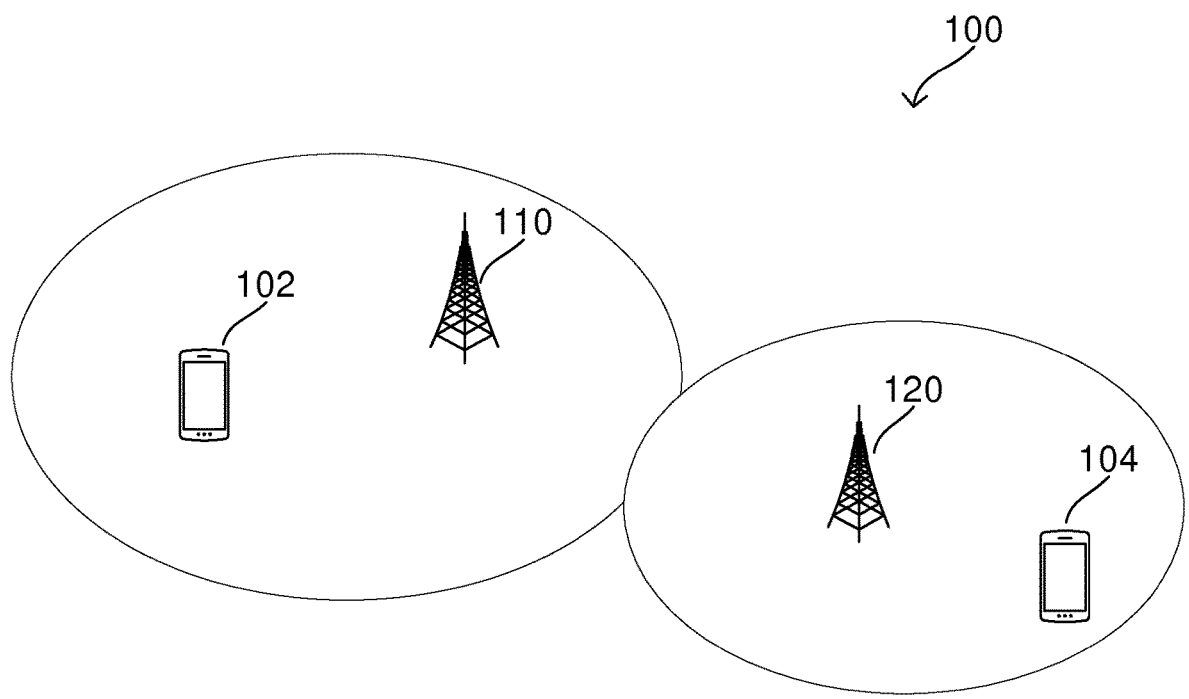
FIG. 1 shows an exemplary communication network according to some aspects.

The following detailed description refers to the accompanying drawings that show, by way of illustration, specific details and aspects of embodiments in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
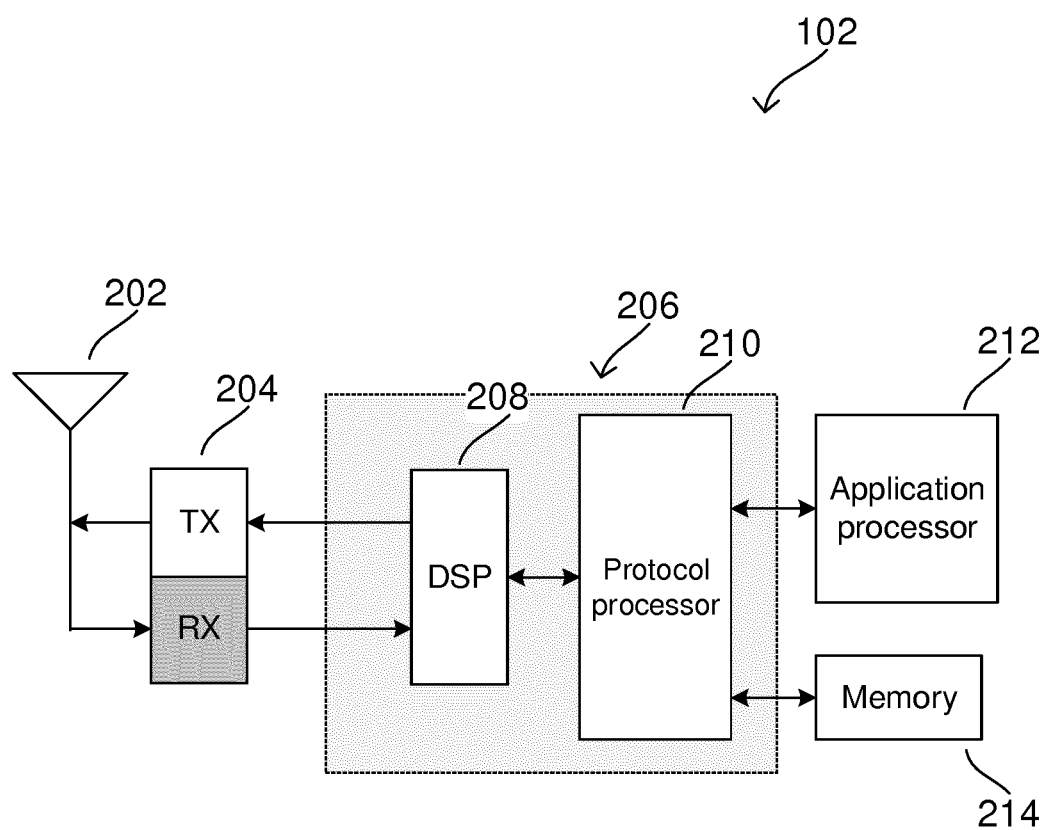
FIG. 2 shows an exemplary configuration of a terminal device according to some aspects.

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Many wireless networks may use time and frequency synchronization to support communications between wireless devices. Slotted communication systems are particularly common, which generally divide a communication schedule into frames that are individually composed of multiple slots. Wireless devices following the communication schedule may then arrange their transmission and reception operations around the slots and frames. Wireless devices may align their operations with the communication schedule through a synchronization process, which may vary in operation depending on the particular radio access technology. In cellular networks, the synchronization is generally provided by the cellular infrastructure, such as where cells broadcast synchronization signals that terminal devices can use to acquire time and frequency synchronization with the cellular network.

Various aspects of this disclosure relate to device-to-device (D2D) networks that are decentralized. Accordingly, wireless devices operating in these D2D networks may not have centralized network infrastructure to assist with synchronization. Wireless devices may instead use external synchronization sources, such as satellite-based synchronization sources (e.g., Global Navigation Satellite System (GNSS)), internal synchronization sources, such as internal device clocks (e.g., based on Coordinated Universal Time (UTC)), or peer-based synchronization sources (e.g., another D2D device broadcasting its own synchronization signal, which may be in turn based on an internal synchronization source of this device).

Figure 3:
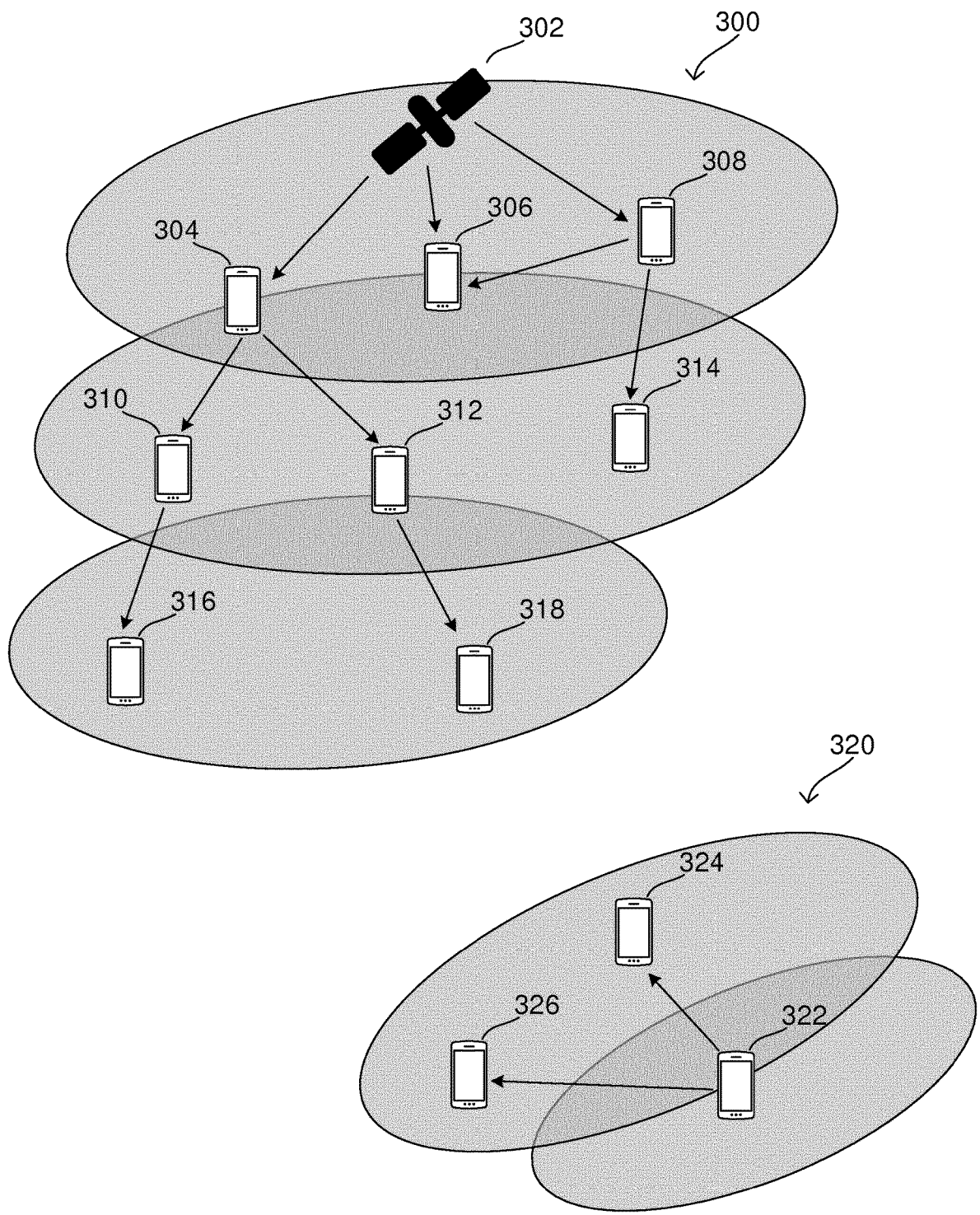
FIG. 3 shows exemplary synchronization clusters for device-to-device (D2D) communications according to some aspects.

Various aspects of this disclosure may use a tiered system of synchronization, where certain synchronization tiers of devices may act as synchronization masters, synchronization relays, and synchronization slaves. FIG. 3 shows an exemplary synchronization arrangement of wireless devices according to some aspects. As shown in FIG. 3, there may be satellite-based synchronization cluster 300 and peer-based synchronization cluster 320. Satellite-based synchronization cluster 300 may be synchronized with satellite-based synchronization source 302, such as with a synchronization signal broadcasted by satellite-based synchronization source 302 (e.g., a GNSS synchronization signal). This includes both wireless devices that are synchronized directly with satellite-based synchronization source 302 and wireless devices that are synchronized via relay with satellite-based synchronization source 302. By contrast, peer-based synchronization cluster 320 may be synchronized with wireless device 322. Wireless device 322 may use an internal synchronization source, such as its internal device clock (e.g., based on UTC), to generate synchronization signals to which the other wireless devices in peer-based synchronization cluster 320 can synchronize.

The wireless devices of satellite-based synchronization cluster 300 and peer-based synchronization cluster 320 may assume either master, relay, or slave roles. Synchronization masters may broadcast synchronization signals that synchronization relays and synchronization slaves can use to synchronize with the synchronization master. The synchronization masters may in turn be synchronized with a satellite-based or internal synchronization source, where the synchronization relays and slaves can also synchronize with the same synchronization source using the synchronization signals broadcasted by the synchronization masters. In the example of FIG. 3, wireless devices 304 and 308 may be synchronization masters that are synchronized with satellite-based synchronization source 302. The synchronization masters may form a zeroth synchronization tier of synchronization arrangement. Wireless devices 304 and 308 may therefore broadcast synchronization signals that are synchronized with satellite-based synchronization source 302. As shown in FIG. 3, wireless devices 306, 310, 312, and 314 may receive these synchronization signals from the synchronization masters.

Wireless device 306 may receive both a synchronization signal from satellite-based synchronization source 302 and a synchronization signal from wireless device 308. Wireless device 306 may not broadcast a synchronization signal, and may therefore be a synchronization slave (e.g., synchronized to both satellite-based synchronization source 302 and wireless device 308). Wireless device 314 may also receive a synchronization signal from wireless device 308 but may not receive a synchronization signal from satellite-based synchronization source 302. Wireless device 314 may not broadcast a synchronization signal, and may therefore be a synchronization slave to wireless device 308. As wireless device 314 receives a synchronization signal that is once-removed from the synchronization master, wireless device 314 may form part of the first synchronization tier of satellite-based synchronization cluster 300.

Similar to wireless device 314, wireless devices 310 and 312 may also receive synchronization signals from a synchronization master. Wireless devices 310 and 312 may therefore also be part of the first synchronization tier of satellite-based synchronization cluster 300. As shown in FIG. 3, wireless devices 310 and 312 may then broadcast their own synchronization signals, or in other words, may relay the synchronization signals from the synchronization master. Wireless devices 310 and 312 may therefore assume the role of synchronization relays.

Wireless devices 316 and 318 may then receive these synchronization signals from the synchronization relays. As these synchronization signals are two levels removed (e.g., forwarded twice) from the synchronization source, wireless devices 316 and 318 may be part of the second synchronization tier of satellite-based synchronization cluster 300. Wireless devices 316 and 318 may not transmit their own synchronization signals, and may therefore assume a synchronization slave role.

While satellite-based synchronization cluster 300 includes three synchronization tiers (zeroth, first, and second), additional synchronization tiers can also be used. However, as each additional synchronization tier includes an additional relay of the synchronization signal, the synchronization reliability will progressively decrease in each synchronization tier (e.g., with relay hop of the synchronization signal). For example, the probability that an nth synchronization tier synchronization relay becomes unsynchronized increases with n, leading to a time drift between the different synchronization tiers within the synchronization cluster. Furthermore, the designation of synchronization masters may change over time, such as through a contention or handover process where synchronization masters switch places with synchronization relays or slaves and the synchronization relays or slaves become synchronization masters. As synchronization masters can consume large levels of power, this can avoid scenarios where some devices share a disproportionate amount of the power usage burden.

In contrast to the satellite-based synchronization source of satellite-based synchronization cluster 300, peer-based synchronization cluster 320 may be synchronized with an internal clock of wireless device 322. In one example, the wireless devices of peer-based synchronization cluster 320 may be indoors, or in another location where satellite-based synchronization signals are unavailable or unreliable. Accordingly, wireless device 322 may begin broadcasting synchronization signals that are synchronized with its own internal synchronization source (e.g., its internal UTC clock). Wireless device 322 may therefore be a synchronization master. Wireless devices 324 and 326 may receive this synchronization signal and thus synchronize themselves with wireless device 322. In the example of FIG. 3, wireless devices 324 and 326 may not transmit their own synchronization signals, and may therefore be synchronization slaves in the first synchronization tier of peer-based synchronization cluster 320. In other scenarios, wireless devices 324 and 326 may be synchronization relays and therefore may relay the synchronization signal from wireless device 322.

In aspects, synchronization clusters may attempt to align themselves with a universal reference time. For example, synchronization cluster 300 may align itself with Global Positioning System (GPS) time, which is provided by the synchronization signals broadcasted by satellite-based synchronization source 302. Each wireless device may have its own local reference time, which it may periodically update based on synchronization signals to be aligned with the universal reference time. Similarly, synchronization cluster 320 may align itself with UTC time, which is provided by the synchronization signal broadcasted by wireless device 322. In some aspects, synchronization clusters may align their frame timings with certain timing positions in the universal reference time, such as where frame boundaries are located at certain points in time relative to the universal reference time. As further described below, this alignment with a universal reference time may help wireless devices when they are searching for synchronization signals. While wireless devices may not be able to perfectly align their local reference times with the universal reference time in proactive, it may help provide approximate frame timings to unsynchronized wireless devices. For example, even though the local reference time of a wireless device may not be precisely aligned with the communication schedule and universal reference time, it may still provide a baseline for wireless devices to approximately identify frame timings in the communication schedule.

Figure 4:
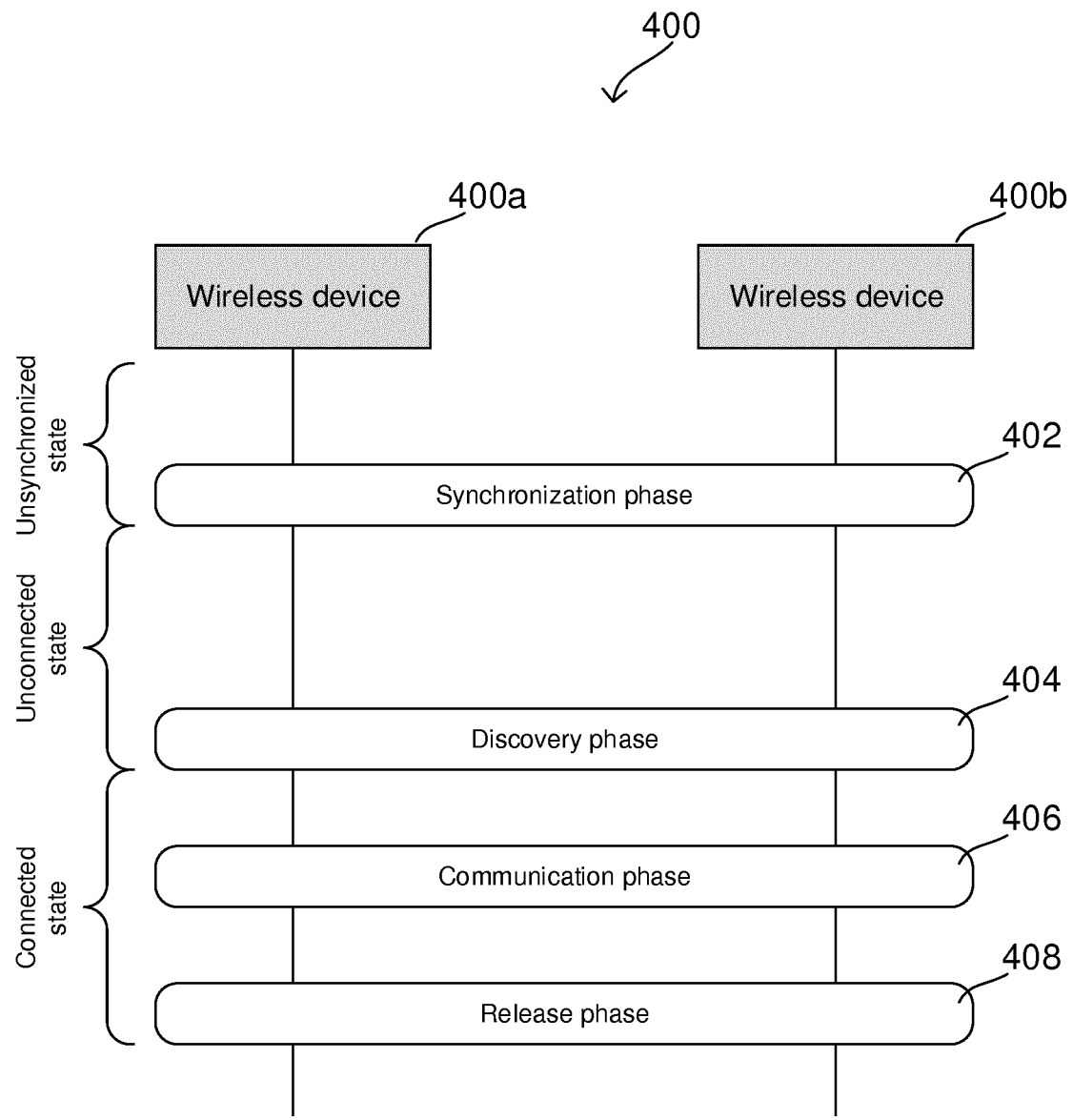
FIG. 4 shows an exemplary flow chart of D2D communications between wireless devices according to some aspects.

The respective wireless devices in satellite-based synchronization cluster 300 and peer-based synchronization cluster 320 may use the synchronization with each other to establish communication links. FIG. 4 shows exemplary message sequence chart 400 illustrating use of synchronization according to some aspects. As shown in FIG. 400, wireless devices 400a and 400b may initially be in an unsynchronized state with each other, or in other words, may not have a reliable synchronization reference between them. Wireless devices 400a and 400b may then perform a synchronization phase in stage 402. For example, wireless devices 400a and 400b may receive synchronization signals that are synchronized with the same synchronization source, and may therefore obtain common time references that are synchronized with each other. Wireless devices 400a and 400b may also align their tuning frequencies to a common frequency reference and thus obtain frequency synchronization.

Figure 5:
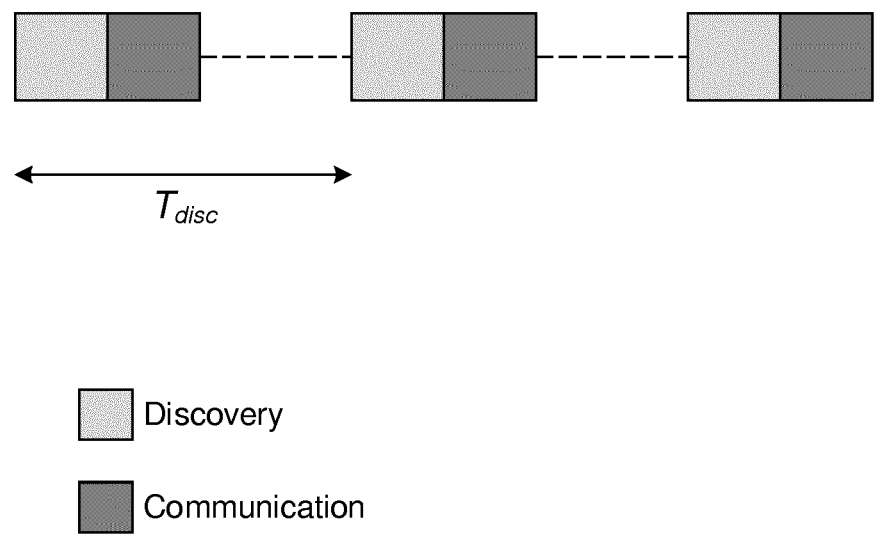
FIG. 5 shows an exemplary slotted communication schedule according to some aspects.

Following stage 402, wireless devices 400a and 400b may be in a synchronized but unconnected state. Wireless devices 400a and 400b may then execute a discovery phase in stage 404. In particular, wireless devices 400a and 400b may use the time and frequency synchronization to align their respective discovery operations in time and frequency. For example, wireless devices 400a and 400b may operate on a slotted communication schedule that allocates certain time slots and frequencies for discovery during each frame (or sequence of frames). These time slots and frequencies allocated for discovery are referred to herein as discovery resources. FIG. 5 shows an example where discovery resources are allocated with a periodicity of $T_{disc}$. The frames may also include communication and other resources, between which the discovery resources are interleaved. Wireless devices 400a and 400b may therefore use the time and frequency synchronization (e.g., the common time and frequency references) to align their discovery operations, such as by identifying the timing of the discovery resources using the common time reference. This can include exchanging discovery messages (e.g., a discovery initiation message and a discovery confirmation message) on the discovery resources. Without time and frequency synchronization, wireless devices 400a and 400b may not be able to effectively perform discovery. For example, if misaligned in time, wireless devices 400a and 400b may transmit and receive the discovery messages at different times and experience irreversible decode errors (e.g., if the misalignment is larger than a guard interval). Similarly, if misaligned in frequency wireless devices 400a and 400b may use different modulation and demodulation frequencies that may likewise result in irreversible decode errors.

After discovering each other, wireless devices 400a and 400b may enter a connected state and perform a communication phase in stage 406, such as where wireless devices 400a and 400b exchange data. This may likewise rely on the time and frequency synchronization obtained in the synchronization phase of stage 402. For example, wireless devices 400a and 400b may use this time and frequency synchronization to align their transmission and reception on the same communication resources (as shown in FIG. 5). In some aspects, wireless devices 400a and 400b may use the synchronization from the synchronization phase for initial coarse synchronization and may apply time and frequency tracking on exchanged communication signal for fine synchronization. After communication is finished, wireless devices 400a and 400b execute a release phase in stage 408 to end the communication link. Without proper synchronization between them, wireless devices 400a and 400b may not be able to perform stages 404-408.

With reference again to FIG. 3, the wireless devices in the same synchronization cluster may be synchronized to the same synchronization source, and may therefore be able to discover and communicate with each other (assuming synchronization drift remains within tolerable limits, e.g., within guard intervals). However, synchronization clusters may be constrained to a certain geographic area. In particular, as each successive relay hop (between synchronization tiers) decreases the synchronization reliability, there may be a limit to geographic area that a given synchronization cluster can cover. Wireless devices at the edge of a synchronization cluster may therefore have difficulty communicating with out-of-cluster wireless devices, e.g., wireless devices that are not synchronized to the same synchronization cluster.

Figure 6:
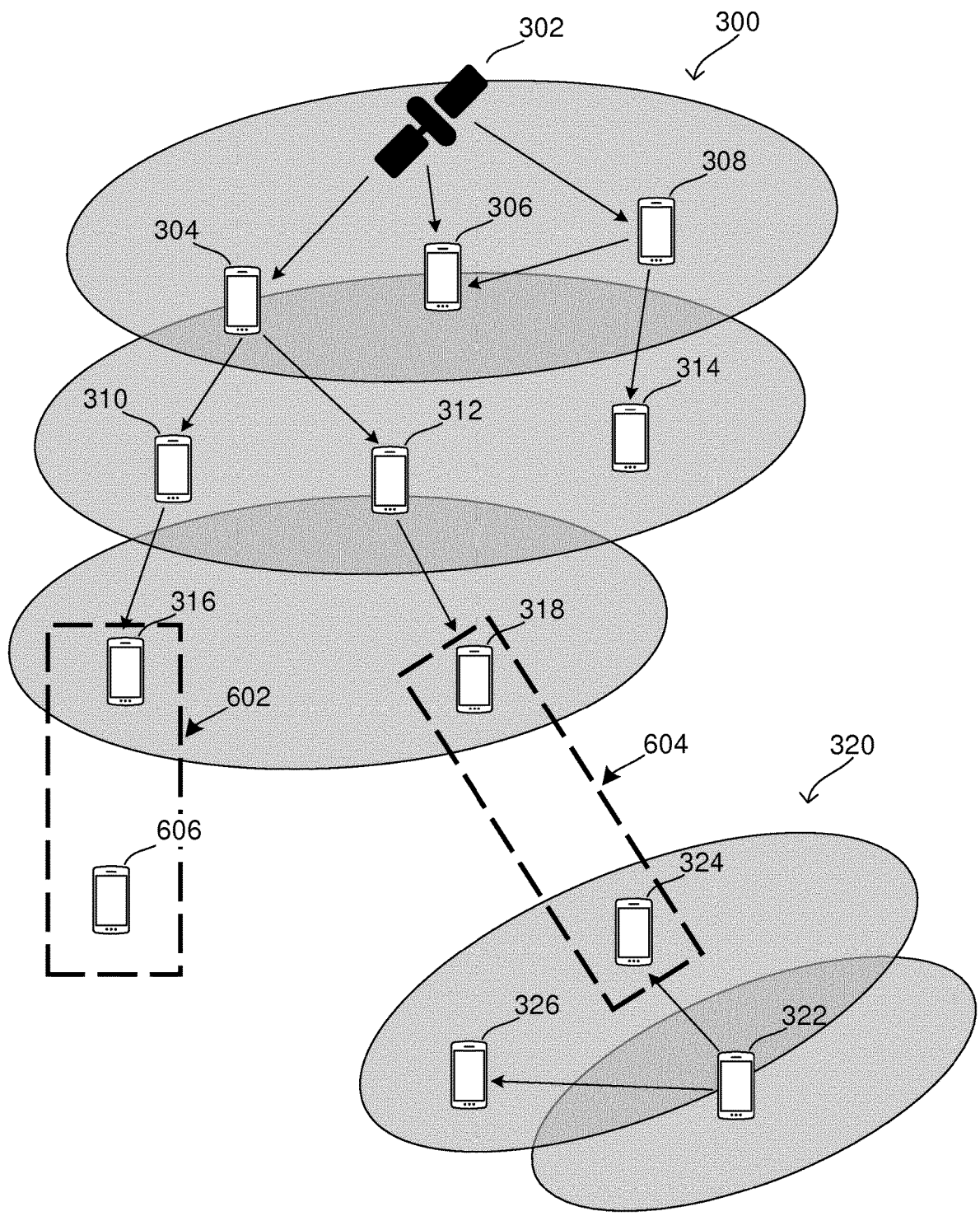
FIG. 6 shows exemplary problematic scenarios for synchronization clusters according to some aspects.

These synchronization issues may take at least two forms: different synchronization sources and absence of synchronization source. FIG. 6 shows examples of these synchronization issues using the synchronization clusters from FIG. 3. As shown at identifier 602 of FIG. 6, wireless device 606 may not be part of a synchronization cluster. For example, wireless device 606 may outside the range of any nearby synchronization masters and synchronization relays. While wireless device 606 may be outside the range of the synchronization masters and relays of satellite-based synchronization cluster 302, wireless device 606 may be within the range of wireless device 316. However, as wireless device 316 is a synchronization slave, wireless device 606 may not have access to a synchronization signal that could be used to synchronize with wireless device 316. Accordingly, although wireless devices 316 and 606 are within range of each other, they may not be able to synchronize and consequently may not be able to discover and communicate with each other (as they do not have a common time alignment for discovery resources). From the perspective of wireless devices 316 and 606, they may appear be hidden from each other. This is a synchronization issue stemming from an absence of synchronization source.

As shown at identifier 604, wireless devices 381 and 324 may experience a different but related issue, namely due to different synchronization sources. In particular, wireless device 318 may be synchronized with satellite-based synchronization cluster 302 while wireless device 324 is synchronized with peer-based synchronization cluster 322. The difference in synchronization between satellite-based synchronization cluster 302 and peer-based synchronization cluster 322 may be too large for wireless devices 318 and 324 to discover each other. Consequently, even if wireless devices 318 and 324 are within range, wireless devices 318 and 324 may not be able to discover and communicate with each other.

Various aspects of this disclosure thus relate to synchronization techniques that can alleviate these synchronization issues. As further described herein, various aspects may use a supporting synchronization signal to help cluster-edge wireless devices detect out-of-cluster wireless devices. These supporting synchronization signals may be separate from the synchronization signals transmitted by synchronization masters and synchronization relays, and may be transmitted by synchronization slaves that detect that they are near the cluster edge (or, alternatively, based on other triggering conditions).

Figure 7:
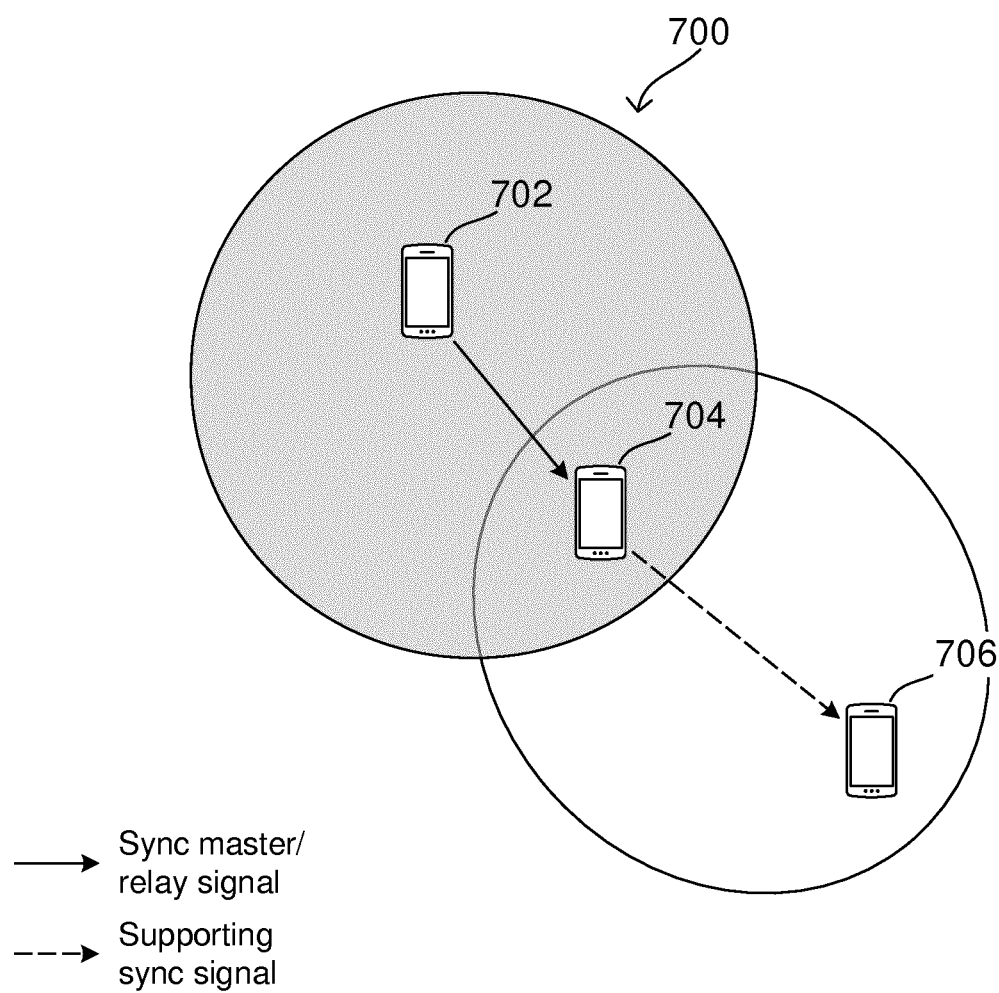
FIG. 7 shows an exemplary scenario involving out-of-cluster wireless devices according to some aspects.

FIG. 7 shows an introductory example of this supporting synchronization signal. As shown in FIG. 7, wireless devices 702 and 704 may be part of synchronization cluster 700. Wireless device 702 may be either a synchronization master or synchronization relay, while wireless device 704 may be a synchronization slave. As shown in FIG. 7, wireless device 702 may transmit a synchronization signal, which wireless device 704 may receive and use to synchronize with synchronization cluster 700. This synchronization signal may be referred to as a main synchronization signal, as it is transmitted by synchronization masters and slaves in synchronization cluster 700 for purposes of synchronizing wireless devices with the entire synchronization cluster. As wireless device 704 is a synchronization slave, wireless device 704 may not transmit a main synchronization signal. However, as shown in FIG. 7 wireless device 704 may transmit a supporting synchronization signal. As wireless device 704 is near the edge of synchronization cluster 700 (e.g., the edge of the geographic area covered by synchronization cluster 700), this supporting synchronization signal may be receivable by wireless devices that are proximate to but outside of synchronization cluster 700.

As shown in FIG. 7, wireless device 706 may be outside of synchronization cluster 700 and therefore may not be able to reliably receive its main synchronization signals (e.g., synchronization signals transmitted by synchronization masters and relays). However, wireless device 706 may be within range of the supporting synchronization signal transmitted by wireless device 704. Wireless device 706 may therefore receive the supporting synchronization signal and use it to synchronize with wireless device 704. As wireless devices 704 and 706 may therefore be synchronized, wireless devices 704 and 706 may be able to discover and communicate with each other.

Figure 8:
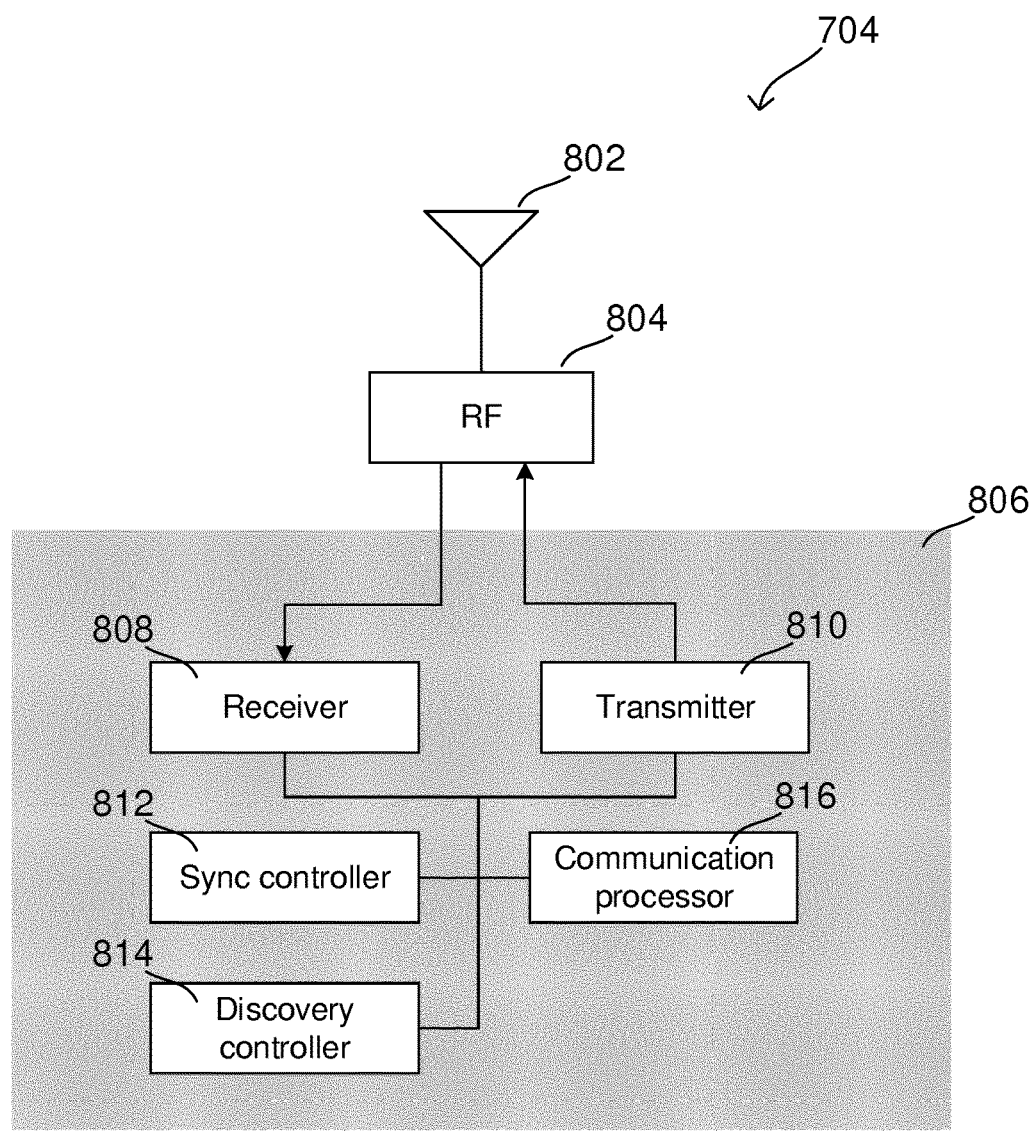
FIG. 8 shows an exemplary internal configuration of a wireless device according to some aspects.
Figure 9:
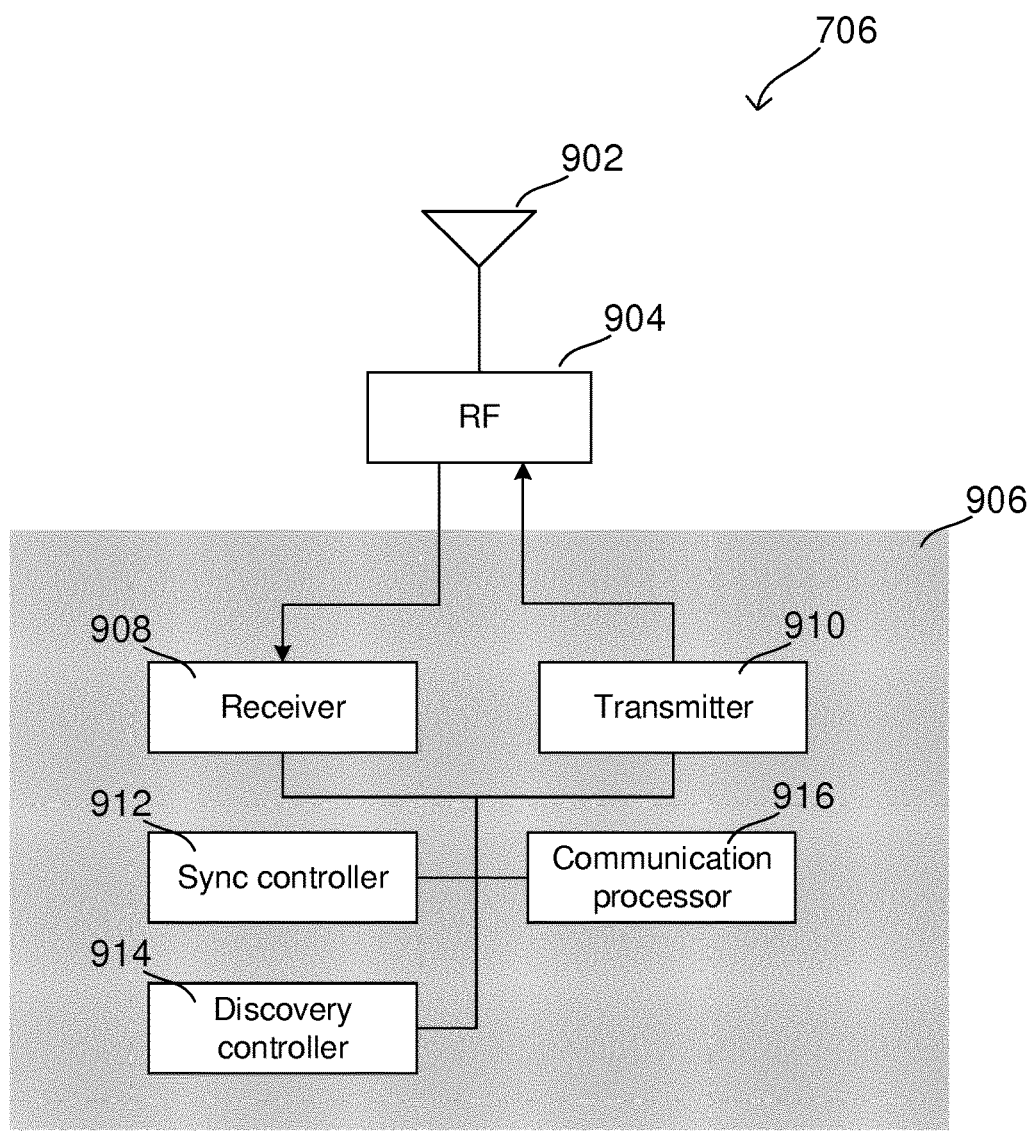
FIG. 9 shows an exemplary internal configuration of a wireless device according to some aspects.

In various aspects, wireless devices 704 and 706 may be structurally configured to transmit and receive the supporting synchronization signal. The structural configurations of wireless devices 704 and 706 will first be introduced, followed by a detailed description of the supporting synchronization signal scheme. FIGS. 8 and 9 show exemplary structural configurations of wireless devices 704 and 706, respectively. The structural configurations shown in FIGS. 8 and 9 are focused on the supporting synchronization signal features of wireless devices 704 and 706 and therefore may not expressly depict other components that are less directly related to these features. Furthermore, while the following description may focus on wireless device 704 in a transmitting role (e.g., transmitting the supporting synchronization signal) and wireless device 706 in a receiving role (e.g., receiving the supporting synchronization signal), in some aspects wireless device 704 may also be configured with the structure and functionality of wireless device 706 and/or wireless device 706 may be configured with the structure and functionality of wireless device 704.

Starting first with FIG. 8, wireless device 704 may include antenna system 802, RF transceiver 804, and baseband modem 806. In some aspects, antenna system 802, RF transceiver 804, and baseband modem 806 may be configured as described above for antenna system 202, RF transceiver 204, and baseband modem 206 of terminal device 102. Accordingly, wireless device 704 may be configured to transmit and receive wireless signals via antenna system 802 and RF transceiver 804. In the transmit direction, RF transceiver 804 may therefore modulate and transmit baseband samples (provided by baseband modem 806) via antenna system 802. In the receive direction, RF transceiver 804 may also receive and demodulate radio signals via antenna system 802 and provide the resulting baseband samples to baseband modem 806.

FIG. 8 also depicts several internal components of baseband modem 806, including receiver 808, transmitter 810, sync controller 812, discovery controller 814, and communication processor 816. In some aspects, baseband modem 806 may include a digital signal processor and a protocol controller. Receiver 808, transmitter 810, sync controller 812, discovery controller 814, and communication processor 816 may therefore be subcomponents of the digital signal processor (e.g., physical layer components) and/or subcomponents of the protocol controller (e.g., protocol stack components). In some aspects, receiver 808 may be the physical layer receive path, transmitter 810 may be the physical layer transmit path, and sync controller 812, discovery controller 814, and communication processor 816 may be processors that form the protocol stack layers of wireless device 704. For example, receiver 808 may include a demodulator, demapper (e.g., constellation demapper), de-interleaver, decoder, and/or descrambler. Receiver 808 may receive wireless signals in the form of baseband samples via antenna system 802 and RF transceiver 804. Receiver 808 may then sequentially process these baseband samples with the demodulator, demapper (e.g., constellation demapper), de-interleaver, decoder, and/or descrambler to produce a bitstream, which receiver 808 may provide to sync controller 812, discovery controller 814, and/or communication processor 816 (e.g., to the protocol stack layers). Transmitter 810 may include a scrambler, encoder, interleaver, mapper (e.g., constellation mapper), and/or a modulator, which may sequentially process a bitstream (e.g., provided by protocol stack layers of sync controller 812, discovery controller 814, and communication processor 816) to produce baseband samples (e.g., complex IQ symbols). Transmitter 810 may then transmit these baseband samples as wireless signals via RF transceiver 804 and antenna system 802. Sync controller 812 may be a processor configured to execute instructions that define the synchronization operations of wireless device 704, including the transmission and reception of synchronization signal as well as obtaining and maintaining synchronization over time. Sync controller 812 may provide control signals to receiver 808, transmitter 810, and RF transceiver 804 that control receiver 808, transmitter 810, and RF transceiver 804 to transmit and receive with the correct time and frequency references. In some aspects, sync controller 812 may also include physical layer components, such as detection circuits or processors configured to detect synchronization signals in sample streams provided by receiver 808. Discovery controller 814 may be a processor configured to execute instructions that define the discovery operations of wireless device 704, including transmission, reception, and processing of discovery messages. Communication processor 816 may be a processor configured to execute other control- and user-plane operations of the protocol stack layers. This may include generating messages for transmitter 810 to transmit (e.g., messages including user or control data) and/or recovering messages from bitstreams provided by receiver 808. While sync controller 812, discovery controller 814, and communication processor 816 are shown separately in FIG. 8, in some aspects sync controller 812, discovery controller 814, and communication processor 816 may structurally be a single processor configured to perform the respective operations of sync controller 812, discovery controller 814, and communication processor 816. The detailed functionality of receiver 808, transmitter 810, sync controller 812, discovery controller 814, and communication processor 816 is further described below in FIGS. 10-12.

As shown in FIG. 9, wireless device 706 may include antenna system 902, RF transceiver 904, and baseband modem 906. In some aspects, antenna system 902, RF transceiver 904, and baseband modem 906 may be configured as described above for antenna system 202, RF transceiver 204, and baseband modem 206 of terminal device 102. Accordingly, wireless device 706 may be configured to transmit and receive wireless signals via antenna system 902 and RF transceiver 904. In the transmit direction, RF transceiver 904 may therefore modulate and transmit baseband samples (provided by baseband modem 906) via antenna system 902. In the receive direction, RF transceiver 904 may also receive and demodulate radio signals via antenna system 902 and provide the resulting baseband samples to baseband modem 906.

FIG. 9 also depicts several internal components of baseband modem 906, including receiver 908, transmitter 910, sync controller 912, discovery controller 914, and communication processor 916. In some aspects, baseband modem 906 may include a digital signal processor and a protocol controller. Receiver 908, transmitter 910, sync controller 912, discovery controller 914, and communication processor 916 may therefore be subcomponents of the digital signal processor (e.g., physical layer components) and/or subcomponents of the protocol controller (e.g., protocol stack components). In some aspects, receiver 908 may be the physical layer receive path, transmitter 910 may be the physical layer transmit path, and sync controller 912, discovery controller 914, and communication processor 916 may be processors that form the protocol stack layers of wireless device 706. For example, receiver 908 may include a demodulator, demapper (e.g., constellation demapper), de-interleaver, decoder, and/or descrambler. Receiver 908 may receive wireless signals in the form of baseband samples via antenna system 902 and RF transceiver 904. Receiver 908 may then sequentially process these baseband samples with the demodulator, demapper (e.g., constellation demapper), de-interleaver, decoder, and/or descrambler to produce a bitstream, which receiver 908 may provide to sync controller 912, discovery controller 914, and/or communication processor 916 (e.g., to the protocol stack layers). Transmitter 910 may include a scrambler, encoder, interleaver, mapper (e.g., constellation mapper), and/or a modulator, which may sequentially process a bitstream (e.g., provided by protocol stack layers of sync controller 912, discovery controller 914, and communication processor 916) to produce baseband samples (e.g., complex IQ symbols). Transmitter 910 may then transmit these baseband samples as wireless signals via RF transceiver 904 and antenna system 902. Sync controller 912 may be a processor configured to execute instructions that define the synchronization operations of wireless device 706, including the transmission and reception of synchronization signal as well as obtaining and maintaining synchronization over time. Sync controller 912 may provide control signals to receiver 908, transmitter 910, and RF transceiver 904 that control receiver 908, transmitter 910, and RF transceiver 904 to transmit and receive with the correct time and frequency references. In some aspects, sync controller 912 may also include physical layer components, such as detection circuits or processors configured to detect synchronization signals in sample streams provided by receiver 908. Discovery controller 914 may be a processor configured to execute instructions that define the discovery operations of wireless device 706, including transmission, reception, and processing of discovery messages. Communication processor 916 may be a processor configured to execute other control- and user-plane operations of the protocol stack layers. This may include generating messages for transmitter 910 to transmit (e.g., messages including user or control data) and/or recovering messages from bitstreams provided by receiver 908. While sync controller 912, discovery controller 914, and communication processor 916 are shown separately in FIG. 9, in some aspects sync controller 912, discovery controller 914, and communication processor 916 may structurally be a single processor configured to perform the respective operations of sync controller 912, discovery controller 914, and communication processor 916. The detailed functionality of receiver 908, transmitter 910, sync controller 912, discovery controller 914, and communication processor 916 is further described below in FIGS. 10-12.

Figure 10:
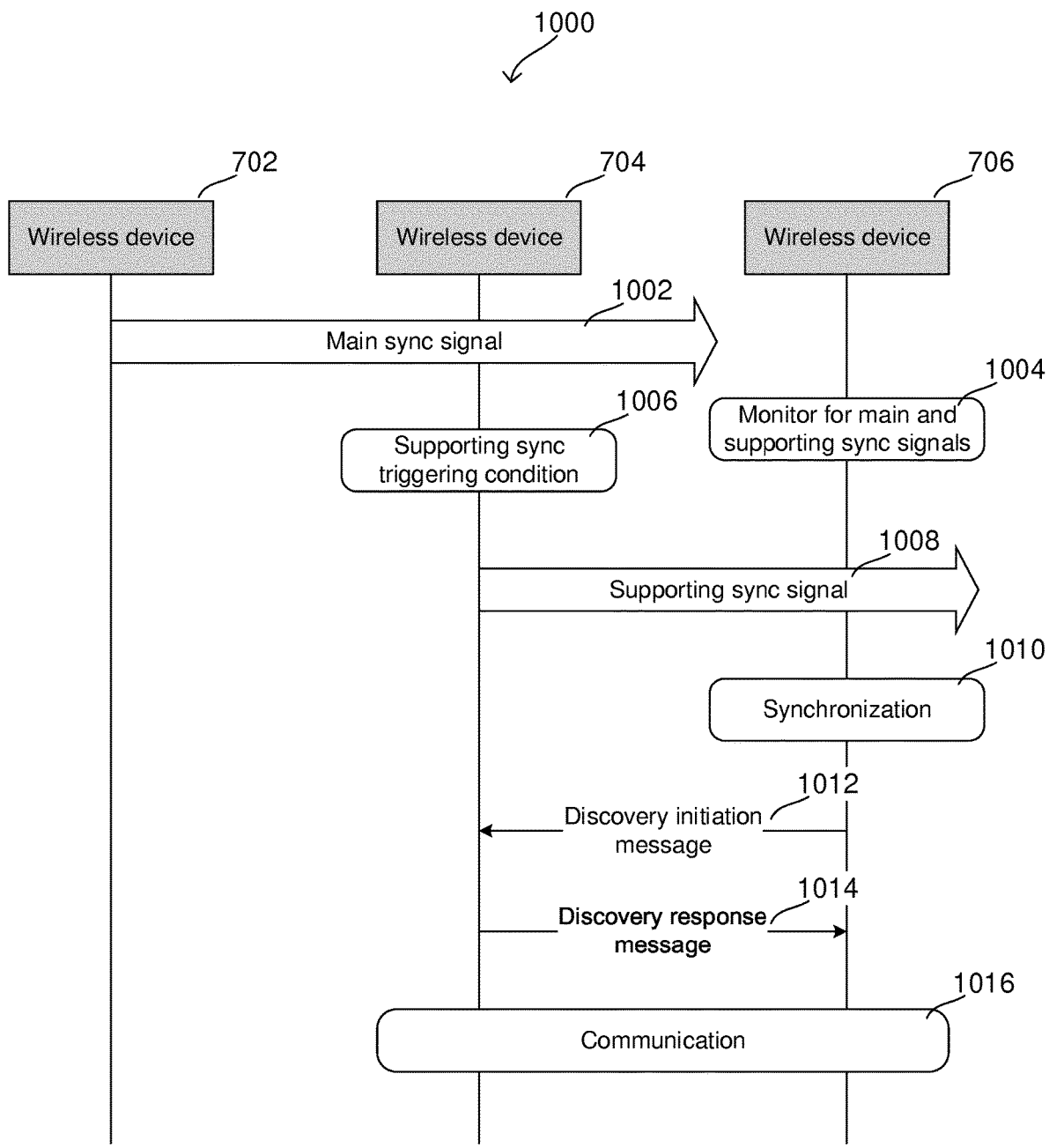
FIG. 10 shows an exemplary message sequence chart for triggering broadcast of supporting synchronization signals according to some aspects.

FIG. 10 shows exemplary message sequence chart 1000 according to some aspects. As shown in FIG. 10, message sequence chart 1000 may involve wireless devices 702, 704, and 706 from FIG. 7. Wireless device 702 may first broadcast a main synchronization signal in stage 1002. As previously described for FIG. 7, wireless device 702 may be a synchronization master or a synchronization relay for synchronization cluster 700, and may therefore periodically broadcast main synchronization signals. In some aspects, wireless device 702 may be configured to broadcast the main synchronization signals according to a predefined broadcast configuration, such as where the main synchronization signals are preallocated to certain resources in time and frequency. For example, synchronization cluster 700 may arrange its communication schedule around a universal reference time, where frame boundaries are approximately aligned at certain times relative to the universal reference time. While each wireless device may have its own local reference time, the wireless devices may attempt to align their local reference times with the universal reference time using synchronization signals. As introduced above, examples of the universal reference time are GPS time or UTC time. Other synchronization clusters may similarly arrange their communication schedules around the same universal reference time, and may have frame boundaries that are approximately aligned with the same times (with some inherent misalignment). The synchronization masters and relays may then be configured to broadcast the main synchronization signals at certain times and frequencies that are preallocated for main synchronization signals.

In one example, synchronization masters and relays may be configured to broadcast the main synchronization signals periodically. For example, certain frames in the communication schedule may be periodically allocated for main synchronization signals. Synchronization masters and relays may therefore broadcast the main synchronization signals during these frames. In some aspects, the communication schedule may allocate a single frequency for main synchronization signals, such as where the synchronization masters and relays periodically broadcast the main synchronization signals on the same frequency. In other aspects, the communication schedule may use a frequency hopping scheme, where transmitters and receivers follow a frequency hopping scheme to perform their respective transmission and reception. In one example using frequency hopping, synchronization masters and relays may periodically broadcast the main synchronization signals on specific hopping frequencies of the frequency hopping scheme. In another example using frequency hopping, synchronization masters and relays may continuously broadcast the main synchronization signals, where the broadcast switches to a new hopping frequency each frame. Accordingly, the time and frequency resources allocated for main synchronization signals may be predefined and may be approximately aligned with a universal reference time (where the synchronization within a given synchronization cluster may be slightly misaligned from the actual universal reference time).

Wireless device 702 may therefore be configured to broadcast the main synchronization signal in stage 1002 according to the predefined resources for the main synchronization signal. As wireless device 704 is a synchronization slave, wireless device 704 may receive the main synchronization signal and use it to remain aligned in time and frequency with synchronization cluster 700. For example, receiver 808 may receive the main synchronization signal via antenna system 802 and RF transceiver 804 and may provide a sample stream to sync controller 812. Sync controller 812 may detect the main synchronization signal in the sample stream and use the main synchronization signal to obtain a time and frequency reference. Receiver 808 and transmitter 810 may then use the time and frequency reference to synchronize reception and transmission with synchronization cluster 700. This may be a continuous procedure over time, where sync controller 812 repeatedly receives the main synchronization signal and uses it to remain synchronized with synchronization cluster 700.

As shown in FIG. 10, wireless device 704 may detect a triggering condition for the supporting synchronization signal in stage 1006. In other words, wireless devices may not continuously transmit the supporting synchronization signal, but may instead selectively trigger its broadcast upon detecting a specific triggering condition. Sync controller 812 may be configured to perform this functionality of wireless device 704. These triggering conditions may be designed to target scenarios where the supporting synchronization signal will be useful and where its broadcast will not hinder synchronization performance of other wireless devices in the synchronization cluster. Various aspects of this disclosure may use different triggering conditions. In some aspects, the triggering condition may be that the main synchronization signal is received at wireless device 704 with less than a predefined signal power threshold. For example, sync controller 812 may be configured to monitor the received signal power of the main synchronization signal and to determine if the received signal power falls below a predefined signal power threshold. If so, sync controller 812 may determine that the triggering condition is satisfied, and that the supporting synchronization signal should be transmitted. In some aspects, sync controller 812 may determine that the triggering condition is satisfied if the main synchronization signal is a relay synchronization signal (and, for example, master synchronization signals of synchronization cluster 700 are out of range).

This triggering condition may target scenarios where wireless device 704 is at the edge of synchronization cluster 700. For example, if wireless device 704 is only receiving relay synchronization signals and master synchronization signals are out of range, wireless device 704 may not be proximate to the synchronization masters. Furthermore, if the main synchronization signal is a received signal power less than the predefined signal power threshold, wireless device 704 may be considerably far from the synchronization relay. This may mean that wireless device 704 is near the edge of synchronization cluster 700. As the supporting synchronization signal is designed to allow out-of-cluster wireless devices to synchronize with wireless devices near the cluster edge, it may be useful to trigger broadcast of the supporting synchronization signal in this scenario. Furthermore, as wireless device 704 is not within range of master synchronization signals, broadcasting the supporting synchronization signal may not be significantly harmful to other nearby devices (as they are likely also out of range of the master synchronization signals). In some aspects, there may be an offset of K dB between master synchronization signals versus supporting synchronization signals. This may mean that a higher SNR is needed to detect supporting synchronization signals compared to master synchronization signals, or in other words, that there is a K dB performance difference. Synchronization slaves may therefore only benefit if they receive the supporting synchronization signal with K dB higher SNR compared to the master synchronization signals (or else there may not be any improvements in synchronization performance).

In some aspects, the triggering condition may be based on user input. For example, wireless device 704 may include an application layer (e.g., running on an application processor of wireless device 704; not expressly depicted in FIG. 9) that is configured to receive user input via a graphical user interface. A user can therefore initiate the triggering condition by providing user input that triggers broadcast of the supporting synchronization signal. For example, the user of wireless device 704 may be aware that another wireless device (e.g., wireless device 706 is nearby) but may not be able to discover the wireless device. The user may therefore provide user input to the application layer that indicates a desire to broadcast the supporting synchronization signal. The application layer may receive this user input and notify sync controller 912, which may use this user input notification as the triggering condition in stage 1006.

In some aspects, the triggering condition may be detection of synchronization slave idle behavior. For example, synchronization slaves may be configured to broadcast the supporting synchronization signal when they are not otherwise busy (e.g., are not actively engage in a communication session with other wireless devices). Accordingly, sync controller 912 may monitor whether wireless device 704 is acting as a synchronization slave (e.g., not transmitting a main synchronization signal), and if so, may determine whether wireless device 704 is engaged in any communication sessions (e.g., handled by communication processor 916). If sync controller 912 determines that wireless device 704 is a synchronization slave and is idle, sync controller 912 may determine that the triggering condition is satisfied in stage 1006.

In some aspects, the triggering condition may be based on network load and synchronization status. For example, sync controller 912 may be configured to monitor network load (e.g., monitor channel occupation) and, if the channel has high traffic (e.g., occupancy greater than a predefined percentage threshold), may determine whether wireless device 704 is synchronized to any synchronization sources. If the channel has high traffic and wireless device 704 is not synchronized to any synchronization sources, sync controller 912 may determine that the triggering condition is met in stage 1006. In some aspects, sync controller 912 may evaluate both the discovery and data channels to determine channel occupancy, while in other aspects sync controller 912 may evaluate only the discovery channel. In some cases, sync controller 912 may not be able to distinguish between the discovery and data channels and may therefore monitor the energy of the radio channel to determine the channel occupancy.

In some aspects, the triggering condition may be based on geographic location. For example, if wireless device 704 is located in a remote location, such as a rural area or desert, wireless device 704 may be configured to assume a synchronization master role (as it is more likely that there are no other wireless devices nearby). However, if wireless device 704 is in a more densely populated location, such as on a cruise ship or other busy area, it likely that there are other wireless devices may be more effective to broadcast the supporting synchronization signal. Sync controller 912 may therefore obtain a geographic location of wireless device 704 (e.g., provided by an application layer of wireless device 704) and determine whether the geographic location is in an area associated with the triggering condition (e.g., a cruise ship). If so, sync controller 912 may determine that the triggering condition is met in stage 1006.

Various aspects may therefore use different triggering conditions in stage 1006. After detecting the triggering condition, wireless device 704 may transmit the supporting synchronization signal in stage 1008. For example, the supporting synchronization signal may be a predefined signal sequence, which sync controller 912 may store in a local memory. Sync controller 912 may retrieve the predefined signal sequence for the supporting synchronization signal and provide it to transmitter 910. Transmitter 910 may then transmit the supporting synchronization signal via RF transceiver 904 and antenna system 902.

Similar to as explained for the main synchronization signal in stage 1002, certain time and frequency resources may be preallocated for the supporting synchronization signal. These time and frequency resources may also be based on a universal reference time. For example, certain frames may be allocated for broadcast of the supporting synchronization signal, where the locations of these frames are approximately aligned with time locations of the universal reference time. In some aspects, wireless device 704 may be configured to periodically broadcast the supporting synchronization signal with a frame periodicity, or in other words, wireless device 704 may be configured to broadcast the supporting synchronization signal every $T_{supp}$ frames, where $T_{supp}$ is the supporting synchronization signal broadcast period. In some aspects, the supporting synchronization signal broadcast period may be larger than the main synchronization signal broadcast period, or in other words, the supporting synchronization signal may be broadcast less frequently than the main synchronization signal. For example, if the main synchronization signal is broadcasted continuously (e.g., on a different hopping frequency each frame), the resources allocated for the supporting synchronization signal may be periodic. If the main synchronization signal is broadcasted periodically with a main synchronization signal broadcast period $T_{main}$, the supporting synchronization signal broadcast period $T_{supp}$ may be greater than the main synchronization signal broadcast period $T_{main}$. The specific frames allocated for the supporting synchronization signal may be at predefined frame locations of the universal reference time. Accordingly, wireless devices searching for the supporting synchronization signal may be able to approximately identify when the supporting synchronization signal is scheduled to be broadcasted based on their local reference times, which may be approximately aligned with the universal reference time (with some inherent misalignment in practice). In one example where the main synchronization signal is broadcasted continuously, the supporting synchronization signal may have a broadcast period of 30 frames. In other words, the resources allocated for the supporting synchronization signal may occur every 30 frames. In some cases, a lower broadcast period may reduce the effective range of the supporting synchronization signals. For example, because the supporting synchronization signals are broadcasted less often, wireless devices may not be able to effectively accumulate detection results over multiple broadcast periods (e.g., due to changing channel conditions), and therefore may not be able to effectively detect the supporting synchronization signals when the propagation distance is large.

Wireless device 704 may therefore identify the resources allocated for the supporting synchronization signal as part of broadcasting the synchronization signal in stage 1008. For example, if the supporting synchronization signal is allocated to specific frames (occurring every $T_{supp}$ frames), sync controller 912 may identify the timing of these frames (e.g., using the time reference obtained from synchronization to synchronization cluster 700) and transmit the supporting synchronization signal in the allocated frames using the identified timing. In some aspects where the supporting synchronization signal is allocated to certain frequencies (e.g., a certain hopping frequencies), sync controller 912 may identify the correct frequencies and instruct transmitter 910 to transmit the supporting synchronization signal on these correct frequencies.

In some aspects, wireless device 704 may broadcast the supporting synchronization signal in a repeated manner in stage 1008. For example, if resources allocated for the supporting synchronization signal occur periodically with period $T_{supp}$, sync controller 912 may broadcast the supporting synchronization signal in stage 1008 by broadcasting the supporting synchronization signal every $T_{supp}$ frames (in the correct frame). As the resources allocated for the supporting synchronization signal are predefined, other wireless devices may know in advance which frames and frequencies the supporting synchronization signal will be broadcasted on. Because both wireless device 704 and the other wireless devices will not be completely aligned to the same universal reference time, the other wireless devices may only know the approximate locations of the supporting synchronization signal in time (based on their respective local reference times). However, this may still be sufficient for the other wireless devices to detect the supporting synchronization signal.

As shown in FIG. 10, wireless device 706 may be configured to monitor for main and supporting synchronization signals in stage 1004. As previously indicated, in some aspects the main and supporting synchronization signals may be allocated predefined resources in time and frequency, such as certain frames (relative to a universal reference time) and frequencies (e.g., constant or hopping frequencies) on which the main and supporting synchronization signal are broadcasted. Wireless device 706 may therefore have advance knowledge of the resources on which the main and supporting synchronization signals will appear.

In some cases, wireless device 706 may be synchronized with another synchronization cluster (e.g., in the manner of wireless device 324 in the example of FIG. 6). Sync controller 912 may therefore maintain synchronization by repeatedly receiving main synchronization signals from the synchronization cluster over time. As wireless device 706 will therefore have a synchronization time reference, it can monitor for main synchronization signals with precise search windows (as time drift may be minimal). Accordingly, sync controller 912 may obtain a sample stream from receiver 908 and then monitor for main synchronization signals with precise search windows placed around the preallocated time and frequency resources for the main synchronization signals.

In other cases, wireless device 706 may not be synchronized with another synchronization cluster. As the resources for the main synchronization signals are preallocated, wireless device 706 may have some advance knowledge of which resources to monitor for the main synchronization signals (e.g., which frames and frequencies main synchronization signals will be broadcasted on). In some cases, wireless device 706 may be able to receive a synchronization signal with a satellite-based synchronization source, while in other cases wireless device 706 may have to use an internal synchronization source, such as its internal device clock. In the satellite-based synchronization source case, sync controller 912 may be able to precisely define the search windows to search for main synchronization signals (as satellite-based synchronization sources such as GNSS signals are considered accurate). In the internal synchronization source case, sync controller 912 may use wider search windows (as internal device clocks are less reliable). In either case, sync controller 912 may receive a sample stream from receiver 908 and monitor for main synchronization signals in the defined search windows of the sample stream.

Sync controller 912 may monitor for supporting synchronization signals in a similar manner to main synchronization signals. As the certain resources are preallocated for supporting synchronization signals (as described above regarding stage 1008), sync controller 912 may similarly be able to define search windows around the preallocated time and frequency resources. Sync controller 912 may then search for the supporting synchronization signals in a sample stream (provided by receiver 908) using these search windows.

Figure 11A:
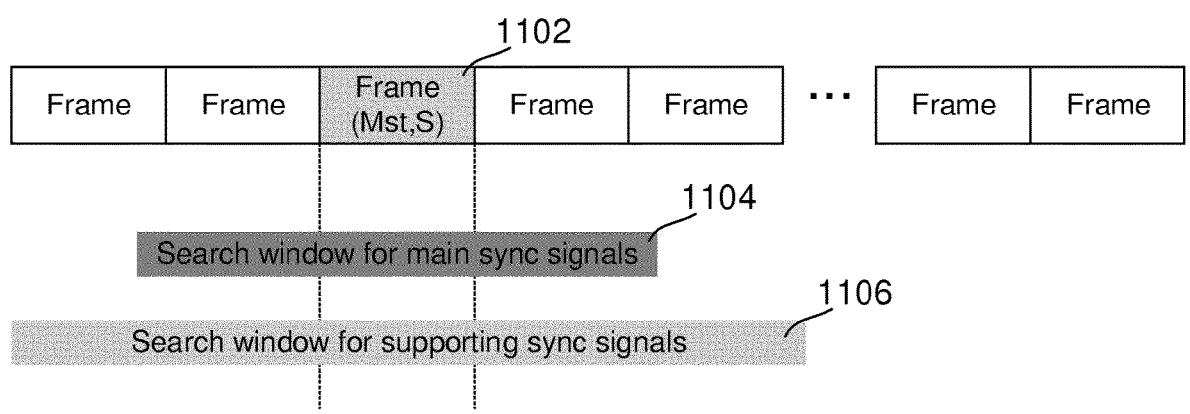
FIGS. 11A and 11B show exemplary timing schedules of main synchronization signals and supporting synchronization signals according to some aspects.

In some aspects, the supporting synchronization signals may be allocated on the same resources as the main synchronization signals. For example, because in many cases wireless device 704 may trigger broadcast of the supporting synchronization signal when it is far from synchronization masters, it may be effective to allocate the same resources to both main and supporting synchronization signals. This can also reduce receiver power usage, as wireless device 706 may be able to perform reception and search processing simultaneously for both main and supporting synchronization signals (instead of separately). In one example where the main synchronization signal is periodically broadcasted in certain frames (e.g., with broadcast period $T_{main}$) on specific frequencies, the supporting synchronization signal may be scheduled for some of these same frames (but with longer broadcast period $T_{supp}$) and on the same frequencies. In another example where the main synchronization signal is continuously broadcast on a different hopping frequency in each frame, the supporting synchronization signal may be periodically allocated to certain of these frames (e.g., with broadcast period $T_{supp}$) on the same frequencies. FIG. 11A shows an example of this case, where both the main and supporting synchronization signals may be allocated for broadcast in the same frame 1102 (and the same frequencies). As shown in FIG. 11A, sync controller 912 may be configured to define search window 1104 for main synchronization signals and search window 1106 for supporting synchronization signals. In some aspects, sync controller 912 may use search windows that are the same length in time (e.g., if the drift uncertainty of the main and supporting synchronization signals are approximately the same). In other aspects, sync controller 912 may use search windows of different lengths, such as where the search window for the supporting synchronization signals is longer than the search window for the main synchronization signals (e.g., if the drift uncertainty for the supporting synchronization signals is greater than the drift uncertainty for the main synchronization signals). FIG. 11A shows an example of this. In some aspects, the supporting synchronization signal may be allocated for the same resources as the master synchronization signals but different resources from the relay synchronization signals (or, conversely, the same resources as the relay synchronization signals but different resources from the master synchronization signals). For example, the master and relay synchronization signals may be allocated for different slots in the same frame, or may be allocated for the same slots in the same frame but on different frequencies. The supporting synchronization signal may then be allocated for the same resources as either the master synchronization signal or the relay synchronization signal.

Figure 11B:
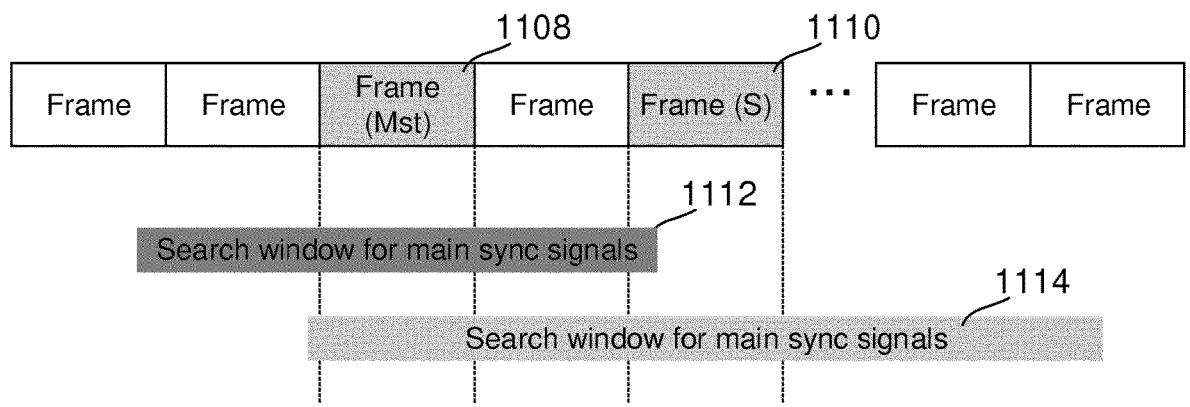

In other aspects, the main and supporting synchronization signals may be allocated different resources. Sync controller 912 may therefore monitor for the main and supporting synchronization signals in different resources (e.g., different frames and/or different frequencies), or in other words, may define different search windows for the main and supporting synchronization signals. FIG. 11B shows an example of this according to some aspects, namely where frame 1108 is allocated for main synchronization signals and frame 1110 is allocated for supporting synchronization signals. Sync controller 912 may therefore identify frame 1108 (for monitoring main synchronization signals) and frame 1110 (for monitoring supporting synchronization signals), and may then define search window 1112 positioned around frame 1108 and search window 1114 positioned around frame 1110. Sync controller 912 may then search the sample stream (from receiver 908) in search window 1112 to monitor for main synchronization signals and may search the sample stream in search window 1114 to monitor for supporting synchronization signals.

Like described above, the main synchronization signals and the supporting synchronization signals may be predefined signal sequences. The predefined signal sequence of the supporting synchronization signal is explained in further detail below regarding FIGS. 13-18. In either case, sync controller 912 may store copies of the respective predefined signal sequences in a local memory. When searching for the main synchronization signal in a given search window, sync controller 912 may retrieve a copy of the predefined signal sequence for the main synchronization signal and compare it to the search window of the sample stream (e.g., using a cross-correlation). Sync controller 912 may therefore detect the main synchronization signal when there is a match between the predefined signal sequence and the search window. Similarly, when searching for the supporting synchronization signal in a given search window, sync controller 912 may retrieve a copy of the predefined signal sequence for the supporting synchronization signal and compare it to the search window of the sample stream (e.g., using a cross-correlation). Sync controller 912 may therefore detect the supporting synchronization signal when there is a match between the predefined signal sequence and the search window.

In the example of FIG. 11, wireless device 706 may therefore detect the supporting synchronization signal after it is broadcasted by wireless device 704 in stage 1008. For example, sync controller 912 may identify a match between the predefined signal sequence for the supporting synchronization signal and the search window of the sample stream. Sync controller 912 may therefore identify a particular sample of the sample stream that produces the match, where the timing of this sample represents the starting time of the supporting synchronization signal. Sync controller 912 may therefore use the timing of this sample as a time reference for synchronization with wireless device 704. For example, if the supporting synchronization signal is transmitted in certain frames, the timing of this sample indicates the frame timing of wireless device 704. By detecting the starting sample of the supporting synchronization signal, sync controller 912 may therefore identify a time reference that can be used to establish synchronization with wireless device 704. In some aspects, sync controller 912 may provide the time reference to receiver 908 and transmitter 910, which may use the time reference to calibrate transmission and reception timing with wireless device 704 (e.g., for subsequent discovery and communication operations). Wireless device 706 may therefore establish synchronization with wireless device 706 in stage 1010 by obtaining a time reference that is synchronized with wireless device 704.

As wireless device 704 is also synchronized with synchronization cluster 700, wireless device 706 may therefore be able to discover and communicate with wireless devices in synchronization cluster 700. Wireless device 706 may therefore transmit a response signal to wireless device 704, which can be any signal to wireless device 704 that indicates the presence of wireless device 706. In the example of FIG. 10, wireless device 706 may perform a discovery procedure with wireless device 704, and the response signal may be a discovery initiation message. For example, discovery controller 914 of wireless device 706 may generate a discovery initiation message for transmitter 910 to transmit in stage 1012. Transmitter 910 may align transmission of the discovery initiation message to specific discovery resources using the time reference with wireless device 704. This transmission may be a broadcast transmission, where any wireless device of synchronization cluster 700 may be able to receive the discovery initiation message.

Wireless device 704 may be configured to monitor for discovery initiation messages during the scheduled discovery resources (e.g., the frequencies and frames allocated for discovery procedures). For example, receiver 808 may receive wireless signals via antenna system 802 and RF transceiver 804 and provide a decoded bitstream to discovery controller 814. Discovery controller 814 may then process the bitstream to determine whether there are any discovery initiation messages. In the example of FIG. 10, discovery controller 814 may detect the discovery initiation message and identify that wireless device 706 transmitted the discovery initiation message. Discovery controller 814 may then generate a discovery response message for transmitter 810 to transmit in stage 1014.

Wireless device 706 may then receive and detect the discovery response message. For example, receiver 908 may receive signals during the discovery resources (e.g., a discovery resource scheduled after the discovery resource during which wireless device 706 transmitted the discovery initiation message) and provide a decoded bitstream to discovery controller 914. Discovery controller 914 may then detect the discovery response message in the bitstream and determine that wireless device 704 responded to the discovery initiation message.

By exchanging these discovery messages, wireless device 706 may discover wireless device 704. Wireless devices 704 and 706 may therefore establish a communication session and communicate with each other. As shown in FIG. 11, wireless devices 704 and 706 may establish this communication session in stage 1016. For example, communication processor 816 of wireless device 704 and communication processor 916 of wireless device 706 may exchange control signaling (via transmission and reception with their respective transmitters and receivers) to set up the communication session, and may then exchange further signaling including communication data (e.g., user or control data). Furthermore, because wireless device 706 is also synchronized with the other wireless devices of synchronization cluster 700, wireless device 706 may similarly be able to discover and communicate with other wireless devices of synchronization cluster 700 in the same manner.

In some aspects, wireless device 706 may be able to continue to use the supporting synchronization signals broadcasted by wireless device 704 to maintain synchronization with wireless device 704 (and with the other wireless devices in synchronization cluster 700). For example, wireless device 704 may continue to broadcast the supporting synchronization signals with broadcast period $T_{supp}$ (e.g., throughout the discovery procedure and communication session with wireless device 706). Accordingly, sync controller 912 of wireless device 706 may continue to receive the supporting synchronization signals during the allocated resources (e.g., using a tighter search window due to the existing synchronization between wireless devices 704 and 706) and may update the time reference with each reception. Sync controller 912 may therefore be able to maintain synchronization with wireless device 704 over time.

Because the supporting synchronization signal is broadcasted periodically, there may be time and/or frequency drift between broadcasts. Accordingly, the time and/or frequency reference determined by sync controller 912 may gradually lose accuracy. This can be a result of imperfections in the local oscillator used for internal timing in wireless device 706, which may experience drift due to temperature changes and other sources. In some aspects, the time and/or frequency drift between supporting synchronization signal broadcasts may be within tolerable limits (e.g., time drift that remains within a guard period or cyclic prefix and frequency drift within a tolerable range of the receiver). Accordingly, wireless device 706 may be able to remain synchronized with wireless device 704 from the periodic supporting synchronization signal broadcasts. In some aspects, wireless device 706 may use techniques such as lifetime learning to correct temperature-dependent oscillator frequency offsets (and thus avoid excessive time and frequency drift). In other cases, wireless device 706 may not be subject to excessive temperature changes (e.g., excessive heating or cooling) between supporting synchronization broadcasts and may therefore not experience excessive time or frequency drift.

However, in some scenarios the time and/or frequency drift may be too substantial for wireless device 706 to remain synchronized from only the supporting synchronization signal broadcasts. Wireless devices 704 and 706 may be able to resolve this in different ways in various aspects. In one example, wireless device 706 may transmit the discovery initiation message in stage 1012 before the time and/or frequency drift becomes too large. If wireless device 706 discovers another wireless device that it wants to communicate with, such as wireless device 704, wireless device 706 may establish a communication session as soon as possible (e.g., also before the time and/or frequency drift becomes too large). In some cases, wireless device 706 (at communication processor 916) may be able to finish the communication session before the time and/or frequency drift becomes too large. In other cases, wireless device 706 may use time and frequency tracking during the communication session to maintain tight synchronization with the other wireless device. For example, once signals are being exchanged as part of the communication session, receiver 908 may use signals received from wireless device 704 to update the time and frequency references, and then use these time and frequency references to stay synchronized with wireless device 704.

In other aspects, wireless device 706 may use additional mechanisms to maintain synchronization with wireless device 704. In one example, after establishing synchronization wireless device 706 may transmit a handover beacon to request that synchronization slaves within its range become synchronization masters or synchronization relays. For example, communication processor 916 of wireless device 706 may generate a handover beacon for transmitter 910 to transmit. The handover beacon may indicate a request for any synchronization slave that receives the handover beacon to become a synchronization master or synchronization relay. A synchronization slave, such as wireless device 704, may then receive the handover beacon. For example, receiver 808 may receive the handover beacon and provide it to communication processor 816. Communication processor 916 may identify the handover beacon and then attempt to assume a synchronization master or synchronization relay. In some cases, this may involve requesting that a current synchronization master or synchronization relay hand over its synchronization duties to wireless device 704. If the handover is successful, sync controller 812 of wireless device 704 may begin broadcasting main synchronization signals (e.g., master synchronization signals if assuming a synchronization master role or relay synchronization signals if assuming a relay synchronization role). As these main synchronization signals are broadcasted more frequently than the supporting synchronization signals, sync controller 912 of wireless device 912 may be able to maintain synchronization with wireless device 704 (and the rest of synchronization cluster 700) via receipt of these main synchronization signals.

In another example, wireless device 706 may request for wireless device 704 to provide additional synchronization support. This request can occur during a discovery procedure or during a communication session. In an example using discovery, discovery controller 914 may include a request (e.g., in the discovery initiation message) that wireless device 704 provide additional synchronization support. Discovery controller 814 of wireless device 704 may identify this request and instruct sync controller 812 to provide additional synchronization support. In an example using communication sessions, communication processor 916 of wireless device 706 may include the request in signaling that is part of the communication exchange. Communication processor 816 of wireless device 704 may identify this request and instruct sync controller 812 to provide additional synchronization support. After receiving the instruction from discovery controller 814 or communication processor 816, sync controller 812 may begin transmitting additional synchronization signals. In some aspects, sync controller 812 may begin transmitting the supporting synchronization signals more frequently (e.g., with a lower broadcast period). In other aspects, sync controller 812 may begin transmitting another type of synchronization signal. In either case, the synchronization signals may have a broadcast period that is low enough to prevent the time and frequency drift at wireless device 706 from becoming too large. Sync controller 912 of wireless device 706 may then monitor for these synchronization signals and use them to maintain synchronization with wireless device 704.

Figure 12:
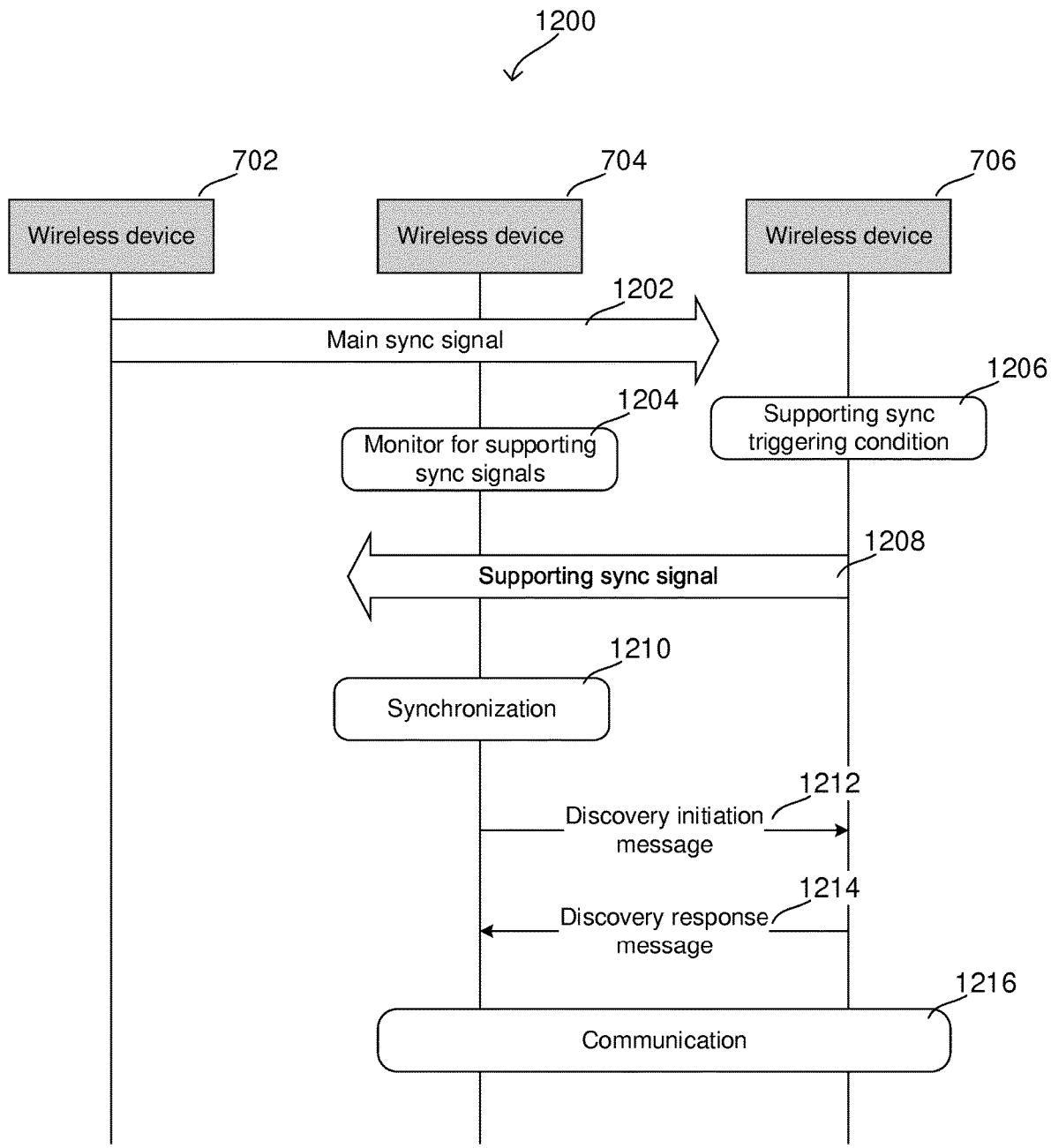
FIG. 12 shows an exemplary message sequence chart for broadcasting supporting synchronization signals from out-of-cluster wireless devices according to some aspects.

In some aspects, wireless devices 704 and 706 may assume reversed roles of broadcasting the supporting synchronization signal. For example, wireless device 706 (the out-of-cluster wireless device) may broadcast the supporting synchronization signal while wireless device 704 (the in-cluster wireless device) may monitor for and detect the supporting synchronization signal. FIG. 12 shows exemplary message sequence chart 1200, which describes this case according to some aspects. Message sequence chart 1200 is directed towards the exemplary scenario of FIG. 7. As shown in FIG. 12, wireless device 702 may broadcast the main synchronization signal in stage 1202, which wireless device 704 may receive and use to maintain synchronization with synchronization cluster 700. As out-of-cluster wireless devices are configured to broadcast the supporting synchronization signals, wireless device 704 may monitor for supporting synchronization signals in stage 1204. For example, wireless device 704 may perform the same procedure as wireless device 706 in stage 1004 of FIG. 10. In some aspects, wireless device 704 may begin monitoring for the supporting synchronization signals after detecting a triggering condition that indicates that wireless device 704 is at the cluster edge. Wireless device 704 may use any triggering condition as described above in stage 1006 of FIG. 10. This can help conserve power, as, this may mean that wireless device 704 only monitors for the supporting synchronization signal when a triggering condition is detected.

Wireless device 706 may then detect a triggering condition for broadcasting the supporting synchronization signal in stage 1206. For example, wireless device 706 may be configured to trigger broadcast of the supporting synchronization signal when wireless device 706 is not synchronized with any synchronization cluster. Sync controller 912 may then begin broadcasting the supporting synchronization signal in the resources allocated for the supporting synchronization signal in stage 1208. In some aspects, sync controller 912 may be configured to use different time offsets for different broadcast repetitions. For example, sync controller 912 may use different time offsets relative to the frame timing of the allocated resources to broadcast the supporting synchronization signal. This may help to compensate for misalignments between the local reference time (e.g., internal device clock or satellite-based time) of wireless device 706 and other wireless devices monitoring for the supporting synchronization signal.

Wireless device 704 may then detect the supporting synchronization signal and establish synchronization with wireless device 706. For example, sync controller 812 of wireless device 704 may obtain a time reference based on the sample in which the supporting synchronization signal is detected, and then use the time reference to establish synchronization. As wireless device 704 is now synchronized with wireless device 706, wireless device 704 may transmit a response signal to wireless device 706. For example, wireless device 704 may transmit a discovery initiation message in stage 1212. Wireless device 706 may respond to the discovery initiation message in stage 1214. Wireless devices 704 and 706 may then establish a communication session in stage 1216.

In various other aspects, wireless devices 704 and 706 may use the same techniques described above to maintain synchronization and/or integrate wireless device 706 into synchronization cluster 700. For example, wireless device 704 may attempt to complete discovery and begin the communication session with wireless device 706 before time drift in the synchronization between wireless devices 704 and 706 becomes too large. Once the communication session is established, wireless devices 704 and 706 may either attempt to complete the communication session before the time drift becomes too large and/or may use time and frequency tracking to maintain synchronization. In another example, wireless device 704 may attempt to become a synchronization master or synchronization relay after receiving the supporting synchronization signal from wireless device 706, such as during a synchronization master or synchronization relay handover procedure. In another example, wireless device 704 may begin providing additional synchronization support after receiving the supporting synchronization signal from wireless device 706, such as by transmitting its own supporting synchronization signals (e.g., with a broadcast period $T_{supp}$ that is short enough to avoid excessive time drift) or transmitting other synchronization signals that wireless device 706 can use to maintain synchronization. In another example, wireless device 704 may transmit additional signaling to wireless device 706 (using the time reference from the supporting synchronization signal) that includes further instructions of how to adjust the time reference to establish synchronization with synchronization cluster 700.

In some cases, using the out-of-cluster wireless devices to broadcast the supporting synchronization signals may help to reduce power usage. For example, instead of many wireless devices at the cluster edge broadcasting the supporting synchronization signals, only a limited number of out-of-cluster (e.g., unsynchronized) wireless devices may broadcast the supporting synchronization signals. The power penalty may therefore mainly occur at the unsynchronized devices instead of at all cluster-edge wireless devices. While wireless device 704 may use some power to monitor for the supporting synchronization signals, the power penalty may be less than that for broadcasting the supporting synchronization signals.

As introduced above, the main and supporting synchronization signals may be predefined signal sequences that the wireless devices have advance knowledge of. Accordingly, transmitting devices may be able to retrieve the appropriate predefined signal sequence from a memory and then transmit the predefined signal sequence in the resources allocated for the corresponding synchronization signal. Receiving wireless devices may then obtain a sample stream based on a received wireless signal and use the predefined signal sequence to search for the synchronization signal in the sample stream, such as with a cross-correlation comparison.

While various aspects can use any type of predefined signal sequence for the synchronization signals, some aspects may use a slot-specific synchronization signal that can be used to determine frame timing. Accordingly, a wireless device that receives such a synchronization signal may be able to determine both the slot timing and the frame timing (e.g. the slot and frame boundaries) by detecting the synchronization signal. This may offer distinct advantages over certain other types of signal sequences. For example, many radio access technologies may use synchronization signals that are aligned with the slot boundaries of a slotted communication system. When a wireless device detects a synchronization signal, the wireless device can use the starting sample (the time sample at which the synchronization signal is detected) as the slot timing (e.g., the starting time of a slot in which the synchronization signal is broadcasted). However, in many cases the wireless device may not be able to determine the frame boundaries exclusively from detecting the synchronization signal. For example, the wireless device may need to use the slot timing to detect a Master Information Block (MIB) and then use the MIB to determine the frame timing (e.g., where the frame starts in time). Once the frame timing is determined, the wireless device may be able to synchronize with the frames of the communication schedule. The ability to determine both the slot and frame timing from detecting the synchronization signal may therefore avoid the need to detect the MIB. This may conserve power, reduce the synchronization time, and reduce the radio resource usage (as MIBs can potentially be eliminated altogether). As further described below, this type of signal sequence can be used for one or both of the main and supporting synchronization signals.

Figure 13:
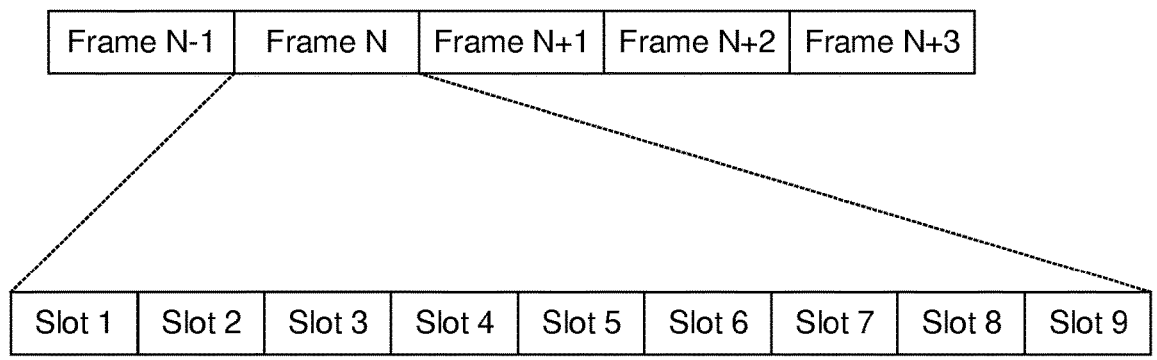
FIG. 13 shows an exemplary slotted communication schedule according to some aspects.

FIG. 13 shows an exemplary slotted communication schedule according to some aspects. As shown in FIG. 13, the communication schedule may include a sequence of frames ("Frame N−1" to "Frame N+3"). As previously described, the frame timings may be aligned according to a universal reference time, where the synchronization masters in a synchronization cluster attempt to align their master synchronization signals to certain time points (e.g., slot starting times) in the universal reference time (e.g., UTC time or GPS time). Other wireless devices may then use these master synchronization signals to align their local reference times with the universal reference time. Each frame may be composed of multiple time slots, such as nine time slots in the example of FIG. 13. The number of time slots per frame can be scaled to any other number.

In various aspects of this disclosure, synchronization signals (e.g., main and/or supporting synchronization signals) may be transmitted across the duration of a given frame, e.g., as bursts in each of multiple slots of a given frame (where the bursts take up a short interval in a given slot). In some aspects, a synchronization signal can be broadcasted in each frame (e.g., on the same frequencies or on different hopping frequencies), or can be periodically broadcasted in certain frames. As previously indicated, various aspects of this disclosure may use a slot-specific synchronization signal for synchronization signals. Accordingly, instead of using the same predefined signal sequence in each slot of the frame, the slot-specific synchronization signal may be different in various slots of a given frame. Accordingly, when a wireless device detects the slot-specific synchronization signal in a received signal, it can identify the frame timing based on the starting point of the slot-specific synchronization signal in the received signal. This therefore offers advantages over other cases, where detecting a non-slot-specific synchronization signal only provides the slot timing (and not the frame timing).

In some aspects, the synchronization signal may use the same base signal subsequence in each slot, which is then modified according to a different cover code in each slot (e.g., a slot-specific code). When concatenated together, the modified base signal subsequences form a slot-specific synchronization signal having a total duration equal to one frame. FIGS. 14A-14C show an exemplary slot-specific synchronization signal according to some aspects. Using the example introduced above with nine slots per frame, signal subsequences 1402-1418 may each be the signal subsequence in a respective one of the nine slots. When concatenated together, signal subsequences 1402-1418 form a slot-specific synchronization signal that is different in each of the slots of the frame. In some aspects, signal subsequences 1402-1418 may be transmitted as synchronization bursts that take up only part of a slot, such as a 1 ms synchronization burst in a 38 ms slot. The rest of the slot may be occupied by discovery messages, control information, and other data. In other aspects, the synchronization signal may use different base signal subsequences in each slot, such as a Zadoff-Chu sequence with a different root for each slot.

As shown in FIGS. 14A-14B, signal subsequences 1402-1418 may have the same base signal subsequences 1402b-1418b. In this example, the base signal subsequence is a Zadoff-Chu sequence of 11 elements, where the elements are spread over 11 subcarriers. This is then repeated over 12 symbol periods that compose a single slot. This is one example, and other examples may use elements from a different sequence (e.g., other than Zadoff Chu) that are spread over one or more multiple subcarriers and repeated over one or multiple symbols periods. The resulting base signal subsequence has a duration of one slot in time.

Each of base signal subsequences 1402b-1418b may then be modified by respective cover codes 1402a-1418a, which are different from each other. The resulting signal subsequences 1402-1418 will therefore differ from each other based on their respective cover codes 1402a-1418a. Accordingly, the slot-specific synchronization signal (the concatenated version of signal subsequences 1402-1418) may be unique in each slot, where each slot is modified according to a respective cover code.

In the example of FIGS. 14A-14C, the respective cover codes are given as $$C = \begin{pmatrix} -1 & 1 & -1 & 1 & -1 & -1 & 1 & 1 & 1 & -1 & 1 & 1 \\ 1 & 1 & -1 & 1 & 1 & 1 & -1 & -1 & 1 & -1 & 1 & -1 \\ 1 & 1 & -1 & 1 & 1 & -1 & -1 & 1 & -1 & 1 & -1 & 1 \\ 1 & 1 & -1 & -1 & -1 & 1 & 1 & -1 & 1 & 1 & -1 & 1 \\ 1 & 1 & 1 & -1 & -1 & 1 & -1 & 1 & -1 & -1 & 1 & 1 \\ 1 & -1 & 1 & 1 & -1 & -1 & -1 & -1 & 1 & 1 & 1 & 1 \\ -1 & -1 & -1 & -1 & 1 & 1 & -1 & 1 & 1 & 1 & 1 & 1 \\ 1 & -1 & -1 & 1 & -1 & 1 & 1 & 1 & -1 & 1 & 1 & -1 \\ -1 & 1 & 1 & 1 & 1 & 1 & 1 & -1 & -1 & 1 & 1 & 1 \end{pmatrix}$$

where each row of the matrix C gives a respective cover code (e.g., the respective weights to be applied to respective symbols of the base signal subsequence). For example, each of the elements (of one of the base signal subsequences) in the first symbol period (e.g., Zadoff-Chu elements ZC1-ZC11) will be multiplied by the first weight of the corresponding cover code, each of the elements in the second symbol period (e.g. Zadoff Chu elements ZC1-ZC11) will be multiplied by the second weight of the corresponding cover code, each of the elements in the third symbol period (e.g., Zadoff Chu elements ZC1-ZC11) will be multiplied by the third weight of the corresponding cover code, and so forth. These weighted elements are then respectively placed on each of a plurality of subcarriers (e.g., 11 in total) over the symbol periods of the slot. Because the weights of each of cover codes $1402a$-$1418a$ are different, signal subsequences $1402$-$1418$ will be different. While this example uses multiple subcarriers, namely where elements of a Zadoff-Chu sequence are spread across the multiple subcarriers, other aspects may only use a single subcarrier. In the exemplary configuration of C shown above, the cover codes per slot (each row) are mutually orthogonal, or in other words, $CC^T = 12\ I_{9 \times 9}$.

This slot-specific synchronization signal may be predefined, and may therefore be calculated offline (e.g., as described above, via multiplication and concatenation based on respective cover codes $1402a$-$1418a$). Wireless devices may then be preconfigured with the slot-specific synchronization signal, such as by preprogramming during manufacture or by post-manufacture download. For example, wireless devices may store the slot-specific synchronization signal in a memory and retrieve the slot-specific synchronization signal from the memory when using it for synchronization signal transmission or detection. In some aspects, wireless devices may alternatively be configured to calculate the slot-specific synchronization signal during runtime.

Figure 15:
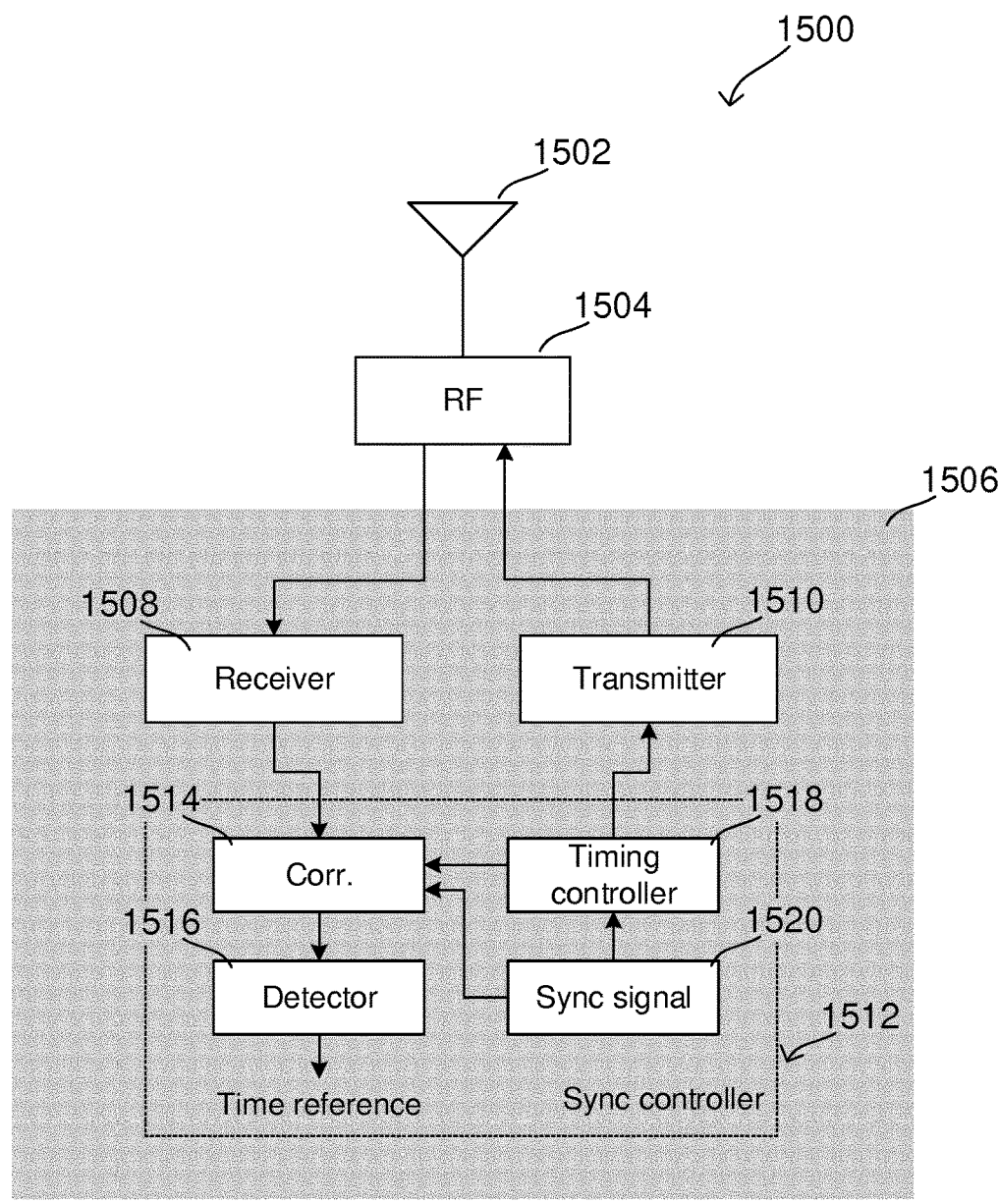
FIG. 15 shows an exemplary structural configuration of a wireless device for detecting and transmitting slot-specific synchronization signals according to some aspects.

FIG. 15 shows an exemplary structural configuration of wireless device 1500, which will be used to describe transmission and detection of slot-specific synchronization signals according to some aspects. The structural configuration shown in FIG. 15 is focused on the synchronization signal transmission and detection features of wireless device 1500 and therefore may not expressly depict other components of wireless device 1500 that are less directly related to synchronization signal transmission and detection. Accordingly, in various aspects wireless device 1500 may include various other components.

As shown in FIG. 15, wireless device 1500 may include antenna system 1502, RF transceiver 1504, and baseband modem 1506. In some aspects, antenna system 1502, RF transceiver 1504, and baseband modem 1506 may be configured as described above for antenna system 202, RF transceiver 204, and baseband modem 206 of terminal device 102 in FIG. 2. Accordingly, wireless device 1500 may be configured to transmit and receive wireless signals via antenna system 1502 and RF transceiver 1504. In the transmit direction, RF transceiver 1504 may therefore modulate and transmit baseband samples (provided by baseband modem 1506) via antenna system 1502. In the receive direction, RF transceiver 1504 may also receive and demodulate radio signals via antenna system 1502 and provide the resulting baseband samples to baseband modem 1506.

FIG. 15 also depicts several internal components of baseband modem 1506, including receiver 3808, transmitter 3810, and sync controller 1512. In some aspects, baseband modem 1506 may include a digital signal processor and a protocol controller. Receiver 1508, transmitter 1510, and sync controller 1512 may therefore be subcomponents of the digital signal processor (e.g., physical layer components) and/or subcomponents of the protocol controller (e.g., protocol stack components). In some aspects, receiver 1508 may be the physical layer receive path while transmitter 1510 may be the physical layer transmit path. For example, receiver 1508 may include a demodulator, demapper (e.g., constellation demapper), de-interleaver, decoder, and/or descrambler. Receiver 1508 may receive wireless signals in the form of baseband samples via antenna system 1502 and RF transceiver 1504. Receiver 1508 may then sequentially process these baseband samples with the demodulator, demapper (e.g., constellation demapper), de-interleaver, decoder, and/or descrambler to produce a bitstream, which receiver 1508 may provide to controller 1512 (e.g., to protocol stack layers of baseband modem 1506). Transmitter 1510 may include a scrambler, encoder, interleaver, mapper (e.g., constellation mapper), and/or a modulator, which may sequentially process a bitstream (e.g., provided by protocol stack layers of baseband modem 1506) to produce baseband samples (e.g., complex IQ symbols). Transmitter 1510 may then transmit these baseband samples as wireless signals via RF transceiver 1504 and antenna system 1502.

As shown in FIG. 15, sync controller 1512 may include correlator 1514, detector 1516, timing controller 1518, and synchronization signal memory 1520. In some aspects, correlator 1514, detector 1516, timing controller 1518, and synchronization signal memory 1520 may be physical layer components. In some aspects, correlator 1514 and/or detector 1516 may be hardware components, such as digital circuitry configured with the logical and arithmetic operations described in detail below. In some aspects, correlator 1514 and/or detector 1516 may be software components, such as one or more processors configured to execute instructions that define the logical and arithmetic operations described in detail below. In some aspects timing controller 1518 may be a processor configured to execute instructions that control the transmission timing of synchronization signals.

In various aspects, wireless device 1500 may be configured to transmit slot-specific synchronization signals, which can be any of the slot-specific synchronization signals described above. Accordingly, timing controller 1518 may be configured to retrieve the slot-specific synchronization signal from synchronization signal memory 1520. As previously described, the slot-specific synchronization signal may be predefined and may include multiple slots (e.g., a sequence of symbols having a duration equal to one slot) that are each modified by a respective slot-specific code (e.g., a cover code). Timing controller 1518 may then identify a frame in which the synchronization signal is scheduled to be broadcasted. For example, wireless device 1500 may be operating according to a communication schedule that allocates specific time and frequency resources for broadcast of synchronization signals. Timing controller 1518 may therefore identify certain time resources, e.g., a frame, in which the slot-specific synchronization signal is scheduled for transmission. Timing controller 1518 may then provide the slot-specific synchronization signal to transmitter 1510 for transmission during the frame.

Transmitter 1510 may then perform physical layer processing on the slot-specific synchronization signal and subsequently transmit the slot-specific transmission signal (via RF transceiver 1504 and antenna system 1502) during the slot. In some aspects, this may be a repetitive procedure, such as where the slot-specific synchronization signal is scheduled for periodic broadcast (e.g., every frame or every sequence of frames). For example, timing controller 1518 may therefore periodically provide the slot-specific synchronization signal to transmitter 1510 every frame or every sequence of frames for periodic transmission.

In some aspects, wireless device 1500 may be configured to monitor for and detect slot-specific synchronization signals. Accordingly, receiver 1508 may receive signals via antenna system 1502 and RF transceiver 1504 and provide a resulting sample stream to correlator 1514. In aspects where the slot-specific synchronization signal is transmitted as bursts (e.g., occupying a short duration in each slot), receiver 1508 may generate the sample stream to include the burst positions in the received signal. Correlator 1514 and detector 1516 may then search for slot-specific synchronization signals in the sample stream using the local copy of the slot-specific synchronization signal stored in synchronization signal memory 1520.

Figure 16:
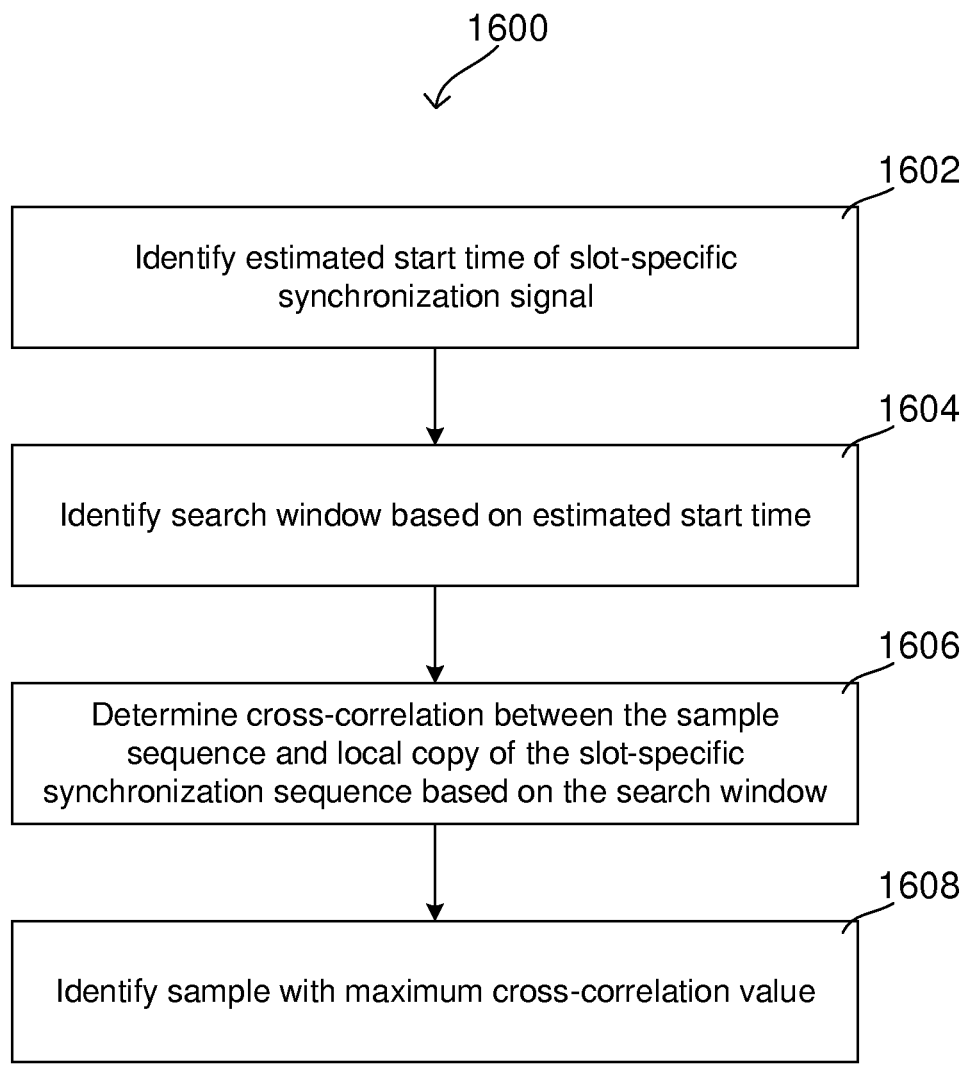
FIG. 16 shows an exemplary method for detecting slot-specific synchronization signals according to some aspects.

FIG. 16 shows exemplary method 1600, which details slot-specific synchronization signal detection according to some aspects. As shown in FIG. 16, timing controller 1518 may first identify an estimated start time of the slot-specific synchronization signal in the sample stream provided by receiver 1508. For example, timing controller 1518 may identify the starting time of a frame using a local reference time of wireless device 1500. As previously indicated, synchronization clusters may attempt to align the frames of their communication schedules with a universal reference time. Timing controller 1518 may therefore attempt to align its local reference time with the universal reference time. For example, timing controller 1518 may use GPS time (or another time reference provided by GNSS signals) to align the local reference time, where timing controller 1518 may use periodically received GPS signals to re-align the local reference time with the GPS time (which may accurately track the universal reference time). Timing controller 1518 may then use the internal device clock as the local reference time between GPS signal receptions. If wireless device 1500 cannot receive GPS signal, timing controller 1518 may use the internal device clock as the local reference time, which may be based on UTC time. As the local oscillator that sources the internal device clock may be inaccurate, the local reference time at timing controller 1518 may be less accurate. As soon as GPS signals are available, timing controller 1518 may use the GPS time from the GPS signals to re-align the local reference time.

Accordingly, timing controller 1518 may select the estimated start time of the slot-specific synchronization signal by identifying, based on the local reference time, the start time of a frame in which the slot-specific synchronization signal is scheduled to be broadcasted in. Because the local reference time is assumed to be misaligned from the wireless device transmitting the slot-specific synchronization signal, this estimated start time is an approximation having some inherent uncertainty. Consequently, timing controller 1518 may identify a search window based on the estimated start time in stage 1604, where the length of the search window is based on the drift uncertainty. For example, wireless devices that have received a GPS signal within the last 12 hours may exhibit an uncertainty of +/−75 ms, meaning that the estimated start time is within +/−75 ms of the actual start time of the slot-specific synchronization signal in the sample stream.

Figure 17:
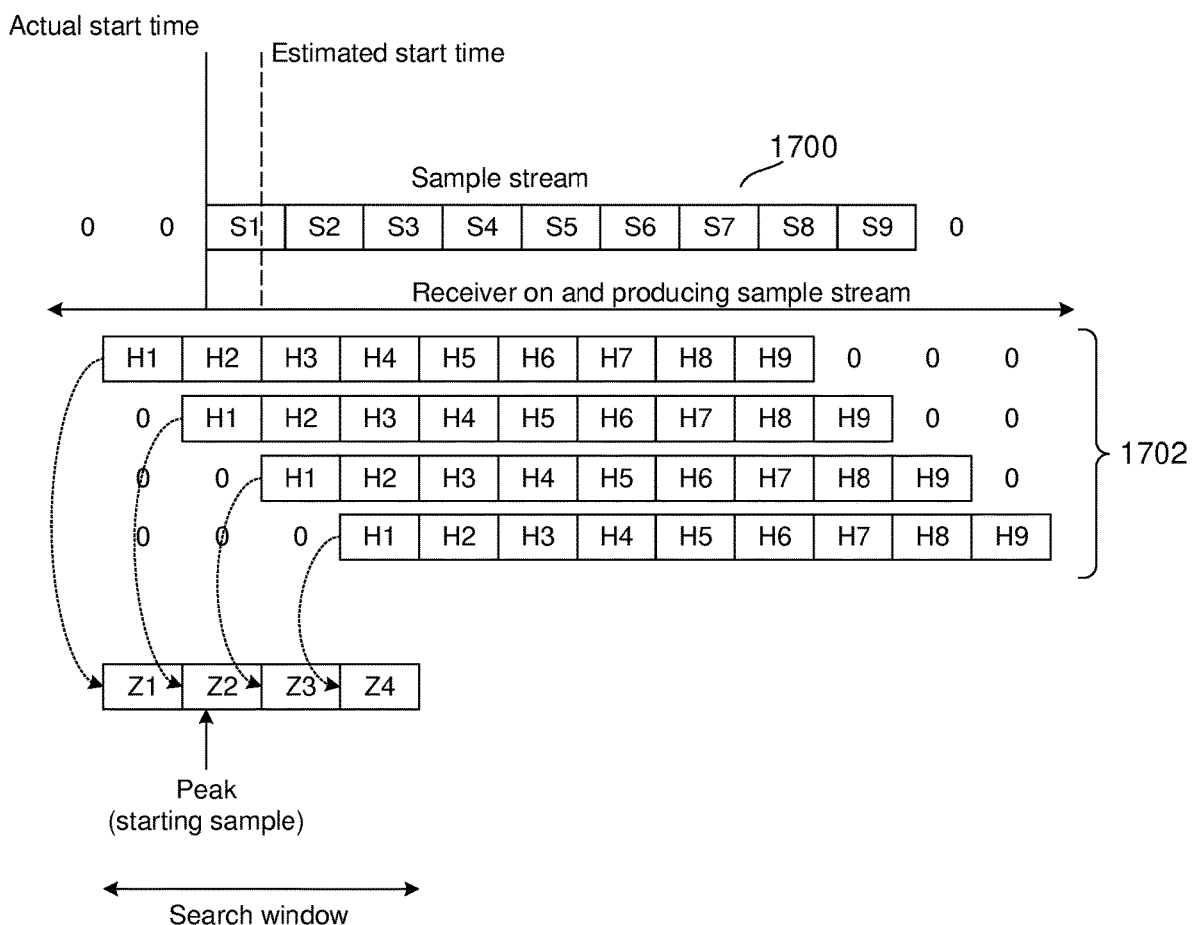
FIG. 17 shows a first example of detecting slot-specific synchronization signals according to some aspects.

FIG. 17 shows examples of the actual start time, estimated start time, and search window with respect to the sample stream provided by receiver 1508. As shown in FIG. 17, the actual start time may be positioned at the starting sample of the slot-specific synchronization signal within the sample stream. Due to the inherent misalignment, the estimated start time selected by timing controller 1518 in stage 1602 may be offset from the actual start time. Accordingly, timing controller 1518 may identify a search window that is positioned around the estimated start time. This search window may define a range of samples (in the sample stream) through which sync controller 1512 searches for the starting sample of the slot-specific synchronization signal.

Timing controller 1518 may provide the estimated start time and the search window to correlator 1514. Continuing with method 1600, correlator 1514 may then in stage 1606 determine the cross-correlation between the sample stream and the local copy of the slot-specific synchronization signal provided by synchronization signal memory 1518. In the example of FIG. 17, the sample stream may have a length equal to at least the length of the slot-specific synchronization signal (e.g., 9 slots) plus the search window. The cross-correlation vector produced by correlator 1514 may therefore have a length equal to the search window, where the value at each sample $n=0, \ldots, N-1$ of the cross-correlation vector Z gives the correlation between the sample stream and the local copy of the slot-specific synchronization signal shifted by n samples. In other cases, such as where signal conditions are very strong, correlator 1514 may use a sample stream shorter in length than the slot-specific synchronization signal (e.g., as long as the time offset is within the search window).

In some aspects, correlator 1514 may determine the cross-correlation by taking the sample stream and the local copy of the slot-specific synchronization signal (represented by slots H1-H9 in FIG. 17) and perform a cross-correlation over the search window (e.g., considering each sample in the search window as a possible starting sample of the synchronization signal in the sample stream). In other words, correlator 1514 may start with sample offset $n=0$ (at the absolute left edge of the search window) and determine the dot product between the local copy of the slot-specific synchronization signal and an equivalent interval of the sample stream starting at $n=0$ (e.g., the same number of as there are in the local copy of the slot-specific synchronization signal). The result of this dot product (with shift $n=0$) will therefore be the correlation metric value at position $n=0$ in the results vector. Correlator 1514 may then continue this procedure for all sample positions $n=0, \ldots, N-1$ (e.g., by shifting the local copy of the slot-specific synchronization signal by n samples relative to the sample stream when taking the dot product for each sample position of n) and storing the resulting correlation metric values in the cross-correlation vector (also represented with notation Z). In some aspects, correlator 1514 may perform the cross-correlation over the entire sample stream at once (e.g., by buffering the entire sample stream and then determining the respective dot products to obtain the cross-correlation vector). However, as this may involve buffering the entire sample stream before starting processing, in other aspects correlator 1514 may instead determine the cross-correlation vector in sample-wise, symbol-wise (e.g., using the samples that make up each symbol), or slot-wise manner (e.g., using the samples that make up each slot). For example, because the search window spans multiple slots, a given sample in the sample stream may contribute to multiple sample positions of the cross-correlation vector. Accordingly, correlator 1514 may be configured to update the samples in the cross-correlation vector (e.g., by accumulating) as samples in the sample stream are received in realtime. In other words, the resulting cross-correlation vector may be the same but correlator 1514 may determine it in a sample-wise, symbol-wise, or slot-wise manner (as opposed to with a single full-length dot product for each sample position of the cross-correlation vector). In some aspects, such as shown in FIG. 17, correlator 1514 may store the cross-correlation vector in multiple buffers, e.g., as Z1-Z4 in four respective buffers where Z1 includes the cross-correlation result from the first slot of the sample stream, Z2 includes the cross-correlation result from the second slot of the sample stream, and so forth. This is exemplary, and correlator 1514 may alternatively store the cross-correlation vector in any number of buffers (e.g., one, two, four, etc.).

Correlator 1514 may provide this cross-correlation vector to detector 1516. Detector 1516 may then identify the sample of the sample stream that produces the maximum cross-correlation value in the cross-correlation vector in stage 1608. This sample is the starting sample that defines the actual start time of the slot-specific synchronization signal in the sample stream, and may therefore be the time reference that wireless device 1500 can use to synchronize with the wireless device that transmitted the slot-specific synchronization signal. In some aspects, detector 1516 may provide the time reference to timing controller 1518, which may then control receiver 1508 and transmitter 1510 to align receive and transmit operations of wireless device 1500 with the time reference (e.g., using the time reference to define slot and frame boundaries). Wireless device 1500 may therefore be synchronized with the wireless device that transmitted the slot-specific synchronization signal (e.g., synchronized with the frame boundaries), and may in turn be synchronized with a synchronization cluster that the wireless device is a part of.

As previously indicated, wireless device 1500 may use this time reference for both the slot and frame boundaries. In particular, because the slot-specific synchronization signal is unique in each slot, detecting the starting sample of the slot-specific synchronization signal gives the starting sample of the first slot in the frame. This is therefore also the frame boundary. Timing controller 1518 can therefore use this time reference for both the slot and frame boundaries, and does not need to receive further signaling (e.g., MIBs or other system information) to determine the frame boundaries.

As previously indicated, correlator 1514 may be configured to determine the cross-correlation between the sample stream and the local copy of the slot-specific synchronization signal in stage 1606, such as by performing a dot product-based cross-correlation over the entire duration of the sample stream or by performing sample-wise, symbol-wise, or slot-wise updates to the cross-correlation vector as new samples or slots of the sample stream are received in realtime. In either case, the output may be a cross-correlation vector. For example, in a symbol-wise approach correlator 1514 may break the sample stream and the local copy of the slot-specific synchronization signal into sections each having an equal number of Y samples (e.g., where each modulation symbol corresponds to Y samples). When calculating the cross-correlation metric value for a given sample position, e.g., n=0, correlator 1514 may compute the dot product of the first Y samples in H1 (the first symbol of the first slot local copy) with the first Y samples of S1 (the first symbol of the first slot of the sample stream). Correlator 1514 may then store the output as an intermediate result for n=0 (e.g., in Z1 if using four different buffers to store Z1-Z4). Correlator 1514 may then process the next Y samples of the sample stream in the same manner as they become available (e.g., the second symbol of the slot, which is composed of the next Y samples), such as by taking the dot product of the next Y samples of the sample stream and the next Y samples of the local copy of the slot-specific reference signal. Correlator 1514 may then add this output to the intermediate result at n=0 and continue this procedure for each subsequent Y samples (e.g., each subsequent symbol) of the sample stream as they become available from receiver 1508. Correlator 1514 may continue this procedure until all samples of the sample stream have been processed and used to update the intermediate result of n=0. Correlator 1514 may perform this procedure for all sample positions n of cross-correlation vector Z, where the final result of Z gives the cross-correlation between the sample stream and the local copy of the slot-specific synchronizations signal (and where the search window defines the range of possible starting samples of the slot-specific synchronizations signal in the sample stream).

In some aspects, correlator 1514 may re-use intermediate results from early sample positions in Z to compute the intermediate results for later sample positions. This may be possible because the various slots of the slot-specific synchronization signal use the same base signal subsequence (e.g., ZC1-ZC11) that are then modified by different cover codes. For example, the signal subsequences 1402-1418 of FIG. 14 that constitute the slot-specific synchronization signal may each differ by their respective cover codes 1402a-1418a (and have the same base signal subsequence). Because of their underlying similarity, correlator 1514 may re-use their intermediate results across the different slots of the search window. Using the example of FIG. 17 with four buffers respectively storing Z1-Z4 (e.g., one buffer per time slot of the search window), correlator 514 may take the first intermediate result for n=0 (the dot product of the first Y samples, stored at the first sample position of Z1) and add it to the first sample position in Z2 (e.g., the first sample position for the second slot of the search window), which may be the same result except for the sign (cover code applied to each symbol, which may be composed of Y samples). Accordingly, because the local copy of the slot-specific synchronization signal has the same base signal subsequence in each symbol of each slot, each symbol may only differ by the sign (plus or minus) according to the cover code. When correlator 1514 computes the dot product for Y samples (one symbol), correlator 1514 may therefore be able to re-use this dot product to update the cross-correlation product at four different sample positions of Z (e.g., the same sample positions at each of the four buffers, with one buffer per slot of the search window) by flipping the sign of the dot products according to the cover codes of the respective symbols. For example, if the first symbol of the first slot has a cover code weight of 1 and the first symbol of the second slot has a cover code weight of −1, correlator 1514 may negate cross-correlation results for the first symbol of the first slot to obtain the cross-correlation results for the first symbol of the second slot (as the local copy of the slot-specific reference signal will be same in these slots except for the sign flipping). Correlator 1514 may therefore re-use intermediate results for one slot of the search window when calculating the cross-correlation for later slots of the search window. This re-use of results in buffers Z1-Z4 is also depicted by timing hypotheses 1702 in FIG. 17, where each timing hypothesis is shifted from the estimated start time by a certain number of slots and each timing hypothesis corresponds to one of the buffers Z1-Z4. The first timing hypothesis may therefore consider the first slot of the search window (e.g., actual start times occurring the first slot) and correspond to the cross-correlation results in Z1. The second timing hypothesis may therefore consider the second slot of the search window (e.g., actual start times occurring the second slot) and correspond to the cross-correlation results in Z2, and so forth for the third and fourth timing hypotheses. As shown in the example of FIG. 17, the cross-correlation peak identifying the starting sample may occur in the second timing hypothesis.

As previously indicated, in some aspects synchronization signals may be periodically broadcasted on a specific, fixed frequency, while in other aspects the synchronization signals may be periodically or continuously broadcasted on different hopping frequencies. In some aspects where the synchronization signal is periodically broadcasted on the same frequency, receiver 1508 may be configured to tune to the frequency several slots before the estimated start time and begin producing the sample stream at this time. This is shown in the example of FIG. 17, where receiver 1508 may be configured to tune to the frequency two slots in advance of the estimated start time (as the search window spans two slots before the estimated start time; the number of slots in advance is thus based on the duration of the search windows) and begin producing sample stream 1700 from this point on. In other words, receiver 1508 may tune to the frequency in advance of the estimated frame start. Receiver 1508 may then remain tuned to the frequency several slots past the estimated end time of the slot-specific synchronization signal (the estimated frame end), which may similarly be based on the length of the search window (e.g., one frame past the estimated end time in the example of FIG. 17).

As shown by the "0s" in FIG. 17, correlator 1514 may use zero-valued slots for the time hypotheses that assume a later frame start. These slots will therefore produce no contribution to the cross-correlation calculations. In this example, the entire receiver on-duration for 38 ms slots would be 342 ms (for the 9 slots of the frame) plus 3*38 ms for the extra slots from the advanced start time and extended end time. The total on-duration of 456 ms in this example would be longer than the 400 ms dwell time imposed by the Federal Communications Commission (FCC) in the US. For use cases where this regulation applies, the detection technique may be modified to search for fewer time hypotheses or to use less than 9 slots in the frame for transmission of the slot-specific synchronization signal.

Figure 18:
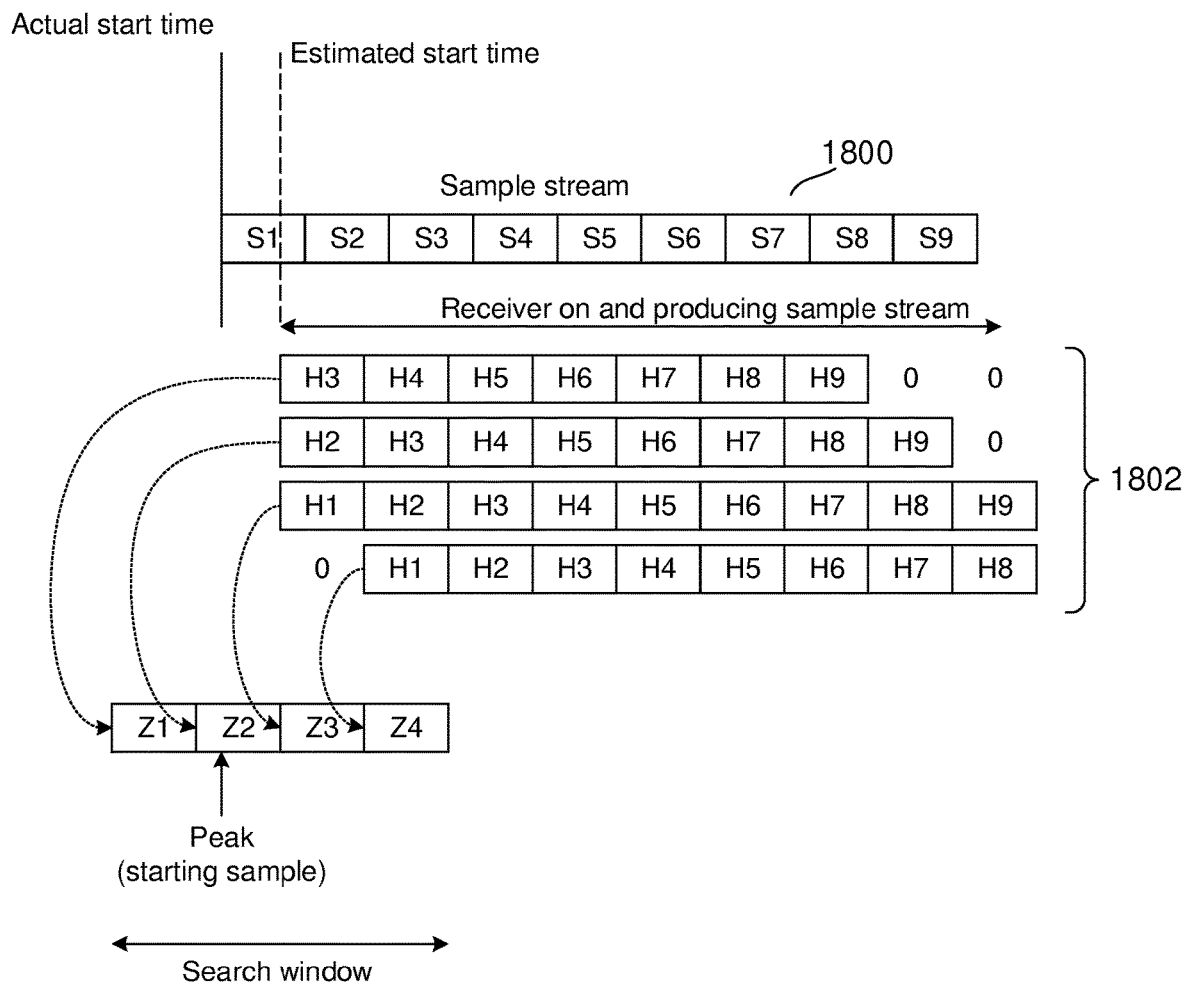
FIG. 18 shows a second example of detecting slot-specific synchronization signals according to some aspects.

In aspects where the slot-specific synchronization signal is broadcasted periodically or continuously using a frequency hopping scheme, sync controller 1512 may use a different detection technique that follows the same general concept outlined above. FIG. 18 shows an example of this procedure according to some aspects. Similar to the example of FIG. 17, correlator 1514 may compare the sample stream to the local copy of the slot-specific synchronization signal and obtain a cross-correlation vector. However, instead of producing the sample stream in advance of the estimated start time and after the estimated end time, receiver 1508 may tune to the frequency (e.g., the correct hopping frequency on which the slot-specific synchronization signal is scheduled for broadcast) at the estimated start time and produce sample stream 1800 over the duration of the slot-specific synchronization signal (e.g., over the slots of the frame). Because receiver 1508 produces sample stream 1800 over the duration of one frame, receiver 1508 may be able to track the hopping scheme over time, such as where the slot-specific synchronization signal is transmitted in subsequent frames on different hopping frequencies. Receiver 1508 may therefore be able to monitor for the slot-specific synchronization signal in a continuous manner, such as each frame.

Because the search window starts before the estimated start time and receiver 1508 tunes to the frequency at the estimated start time, correlator 1514 may insert one or more slots of "0"s before the samples of the sample stream that were actually generated from the received signal (e.g., two slots in the example of FIG. 18) and one or more slots of "0"s after the received sample stream. The sample stream used for the cross-correlation may therefore have a length equal to the length of the slot-specific synchronization signal plus the length of the search window, where one or more beginning and ending slots of the sample stream are filled with "0"s. Correlator 1514 may then determine the cross-correlation between this sample stream and the local-copy of the slot-specific synchronization signal, where any samples set to "0" may not produce any contribution to the cross-correlation vector. Similar to the case of FIG. 17, in some aspects correlator 1514 may determine this cross-correlation using a dot product across the entire sample stream, by determining the cross-correlation in a sample-wise, symbol-wise, or slot-wise manner (e.g., by updating the sample positions of the cross-correlation vector Z as new samples are provided by receiver 1508), and/or by re-using cross-correlation results from one of timing hypotheses (e.g., one of the slots of the search window) to update the cross-correlation results of another timing hypotheses (e.g., based on the +/−1 weight applied to the symbols according to the different cover codes). FIG. 18 also shows timing hypotheses 1802, which correspond to the different slots of the search window in the same manner as timing hypotheses 1702. Because the first timing hypothesis assumes the estimated start time is two slots late, the cross-correlation results from this slot (e.g., using shifts falling within the first slot of the search window) will only have non-negative contributions from slots H3-H9 of the local copy of the slot-specific synchronization signal (as these positions in the sample stream are set to "0"). The second timing hypothesis will similarly have non-negative contributions only from slots H2-H9. The third timing hypothesis may have non-negative contributions from all of slots H1-H9, while the fourth timing hypothesis may have non-negative contributions from slots H1-H8.

After determining the cross-correlation vector, correlator 1514 may provide it to detector 1516. Detector 1516 may then identify the sample of the cross-correlation vector that corresponds to the highest cross-correlation value. This may be the starting sample of the slot-specific synchronization signal in sample stream 1800, and may therefore give the slot and frame boundaries. Detector 1516 may provide this starting sample to timing controller 1518 as a time reference for synchronization with the wireless device that transmitted the slot-specific synchronization signal. Timing controller 1518 may then instruct receiver 1508 and transmitter 1510 to align their reception and transmission operations according to the time reference.

Continuing with the example introduced above with nine slots of 38 ms in duration, receiver 1508 may use an on-duration of 342 ms. In cases where the slot-specific synchronization signal is broadcasted with frame-wise frequency hopping, sync controller 1512 may be able to accumulate the cross-correlation vectors over multiple frames. For example, after obtaining the cross-correlation vector for an initial frame, receiver 1508 may tune to the hopping frequency for the next frame and produce a sample stream for this next frame. Correlator 1514 may then produce a cross-correlation vector for this next frame, which correlator 1514 may accumulate on top of the cross-correlation vector for the initial frame. Receiver 1508 and correlator 1514 may continue this procedure over multiple subsequent frames (on different hopping frequencies) and continue to update the cross-correlation vector. Once sufficient accumulations have occurred (e.g., a certain predefined number), correlator 1514 may provide the final cross-correlation vector to detector 1516. Detector 1516 may then identify the sample with the maximum-valued cross-correlation value as the starting sample of the slot-specific synchronization signal, which also gives the slot and frame boundary.

In various aspects, this type of slot-specific synchronization signal may be used for the main synchronization signals or the supporting synchronization signals described above in FIGS. 3-12. In one example using the slot-specific synchronization signal as a supporting synchronization signal, synchronization slave devices (e.g., that are at the edge of the synchronization cluster and/or have detected a triggering condition) may periodically broadcast the slot-specific synchronization signal (with broadcast period $T_{supp}$, e.g., $T_{supp}$=30 frames). An out-of-cluster wireless device within radio range can then detect the slot-specific synchronization signal (e.g., using the detection procedures outlined above) and use the resulting time reference to synchronize with the transmitting device. If the relative time and frequency drifts remain manageable (e.g., the local oscillators have accuracy within a tolerable range), the two wireless devices may still be able to communicate with each other between broadcasts of the slot-specific synchronization signal. If the time and frequency drifts become too large, the wireless devices may maintain synchronization using any of the techniques described above, such as time and frequency tracking during a communication session, providing further synchronization support, or having the transmitting device start broadcasting main synchronization signals for the synchronization cluster. Furthermore, because the slot-specific synchronization signal is slot-specific, the receiving wireless device may be able to use the time reference for both slot and frame boundaries, and may therefore determine the frame boundary solely from detection of the slot-specific synchronization signal (e.g., may not need to receive further information from the synchronization cluster to identify the frame boundary).

In an example using the slot-specific synchronization signal as a main synchronization signal, synchronization masters and relays may continuously or periodically broadcast the slot-specific synchronization signal. The slot-specific synchronization signal may therefore serve as the primary mechanism for synchronization within a synchronization cluster. Wireless devices within range of synchronization masters and relays may therefore be able to identify the slot and frame boundaries by detecting the slot-specific synchronization signal. In some aspects, different wireless devices may broadcast different versions of the slot-specific synchronization signal depending on whether they are a synchronization master or relay and/or depending on whether they are synchronized with a satellite-based synchronization source (e.g., GPS time) or an internal synchronization source (e.g., their internal device clock). For example, there may be multiple sets of cover codes (e.g., additional matrices C), where each set of cover codes uniquely corresponds to a particular synchronization status (e.g., synchronization master or relay and specific type of synchronization source). This may in turn mean that there are multiple unique slot-specific synchronization signals, each identifying a particular synchronization status. Depending on their memory and millions of instructions per second (MIPS) capabilities, wireless devices could search for all of the multiple slot-specific synchronization signals in parallel or could search for each slot-specific synchronization signal in sequence (e.g., starting with a preferred synchronization status). In some aspects, the sets of cover codes may also be mutually orthogonal. Additionally, the underlying sequence (e.g., Zadoff Chu) for the sets of cover codes could use different sequence roots, such as to produce other base signal subsequences of having the same length (e.g., 11 symbols). In some aspects, the different slot-specific synchronization signals can also be mapped to different frequencies, where wireless devices could tune to a particular frequency when searching for a particular slot-specific synchronization signal.

Figure 19:
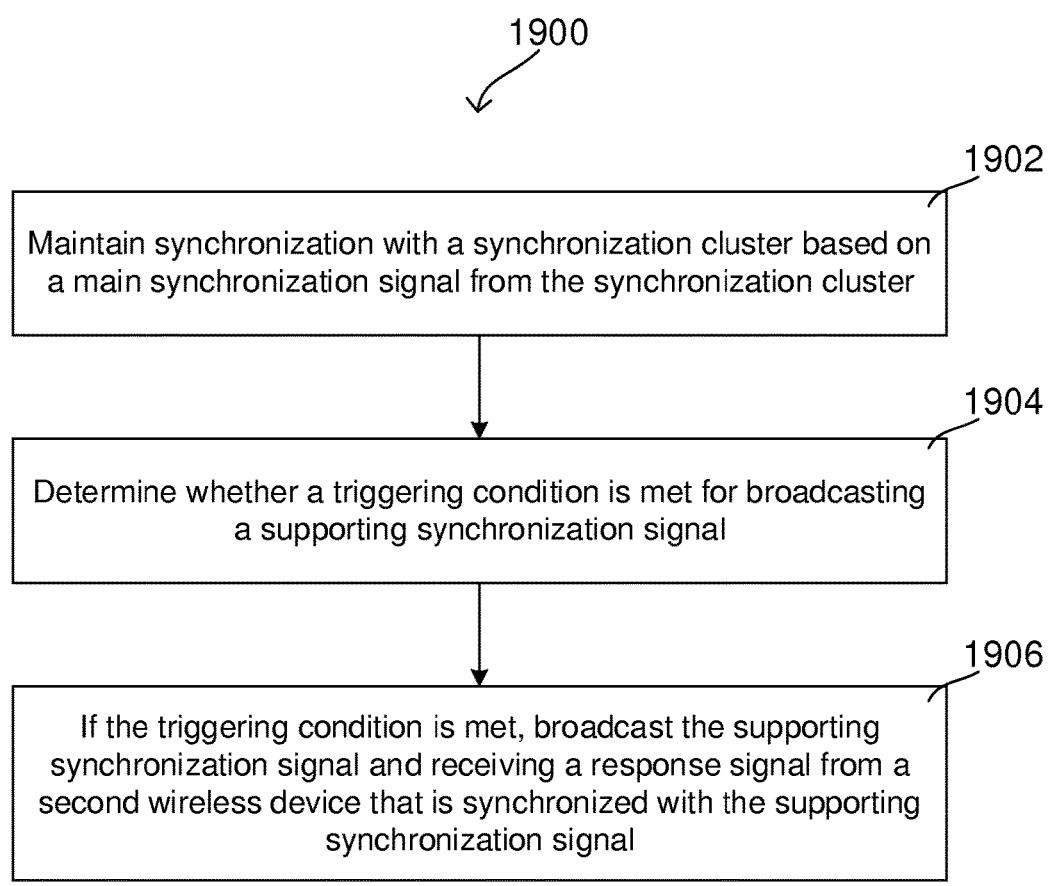
FIGS. 19-24 shows exemplary methods of performing wireless communications according to some aspects.

FIG. 19 shows exemplary method 1900 of performing wireless communications at a wireless device according to some aspects. As shown in FIG. 19, method 1900 includes maintaining synchronization with a synchronization cluster based on a main synchronization signal from the synchronization cluster (1902), determining whether a triggering condition is met for broadcasting a supporting synchronization signal (1904), and if the triggering condition is met, broadcasting the supporting synchronization signal and receiving a response signal from a second wireless device that is synchronized with the supporting synchronization signal (1906).

Figure 20:
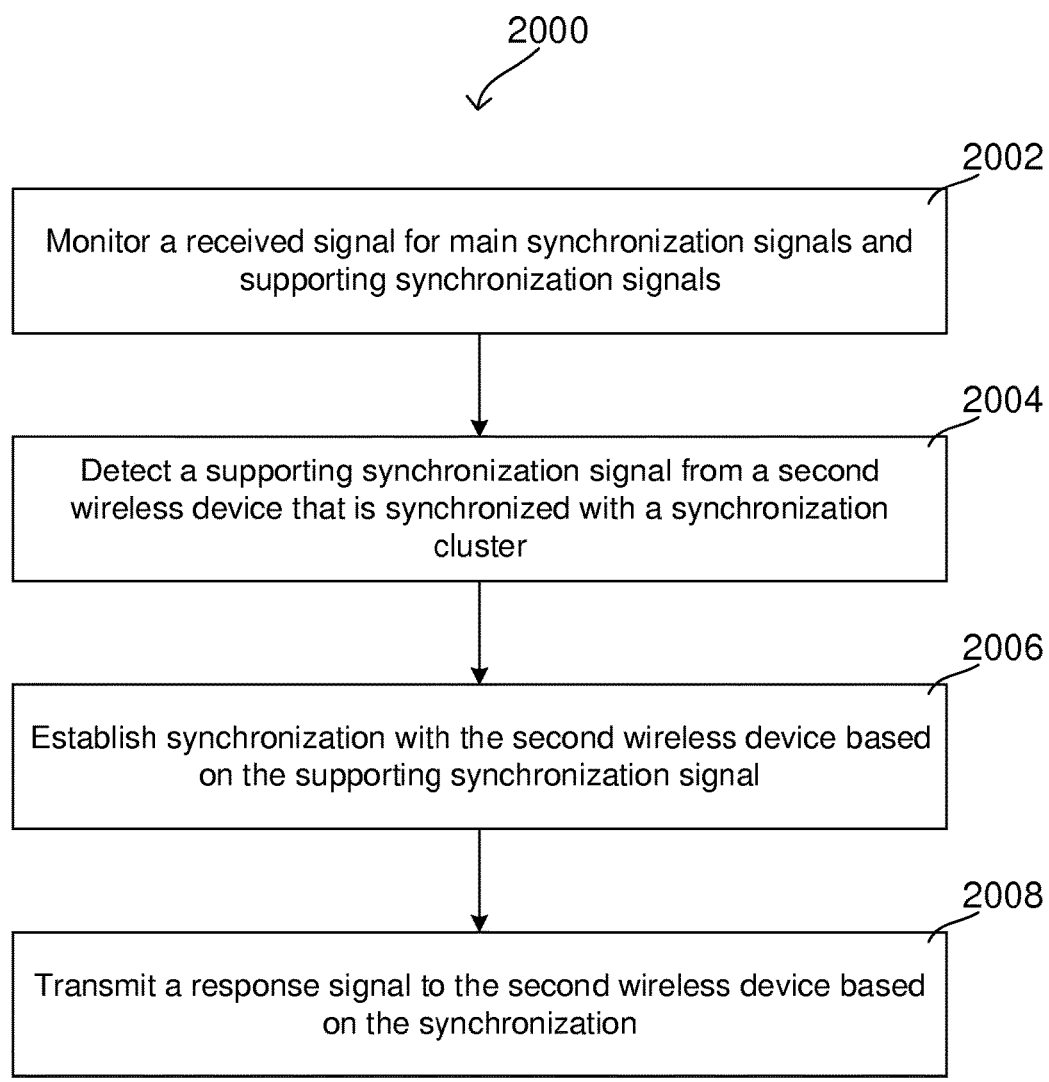

FIG. 20 shows exemplary method 2000 of performing wireless communications at a wireless device according to some aspects. As shown in FIG. 20, method 2000 includes monitoring a received signal for main synchronization signals and supporting synchronization signals (2002), detecting a supporting synchronization signal from a second wireless device that is synchronized with a synchronization cluster (2004), establishing synchronization with the second wireless device based on the supporting synchronization signal (2006), and transmitting a response signal to the second wireless device based on the synchronization (2008).

Figure 21:
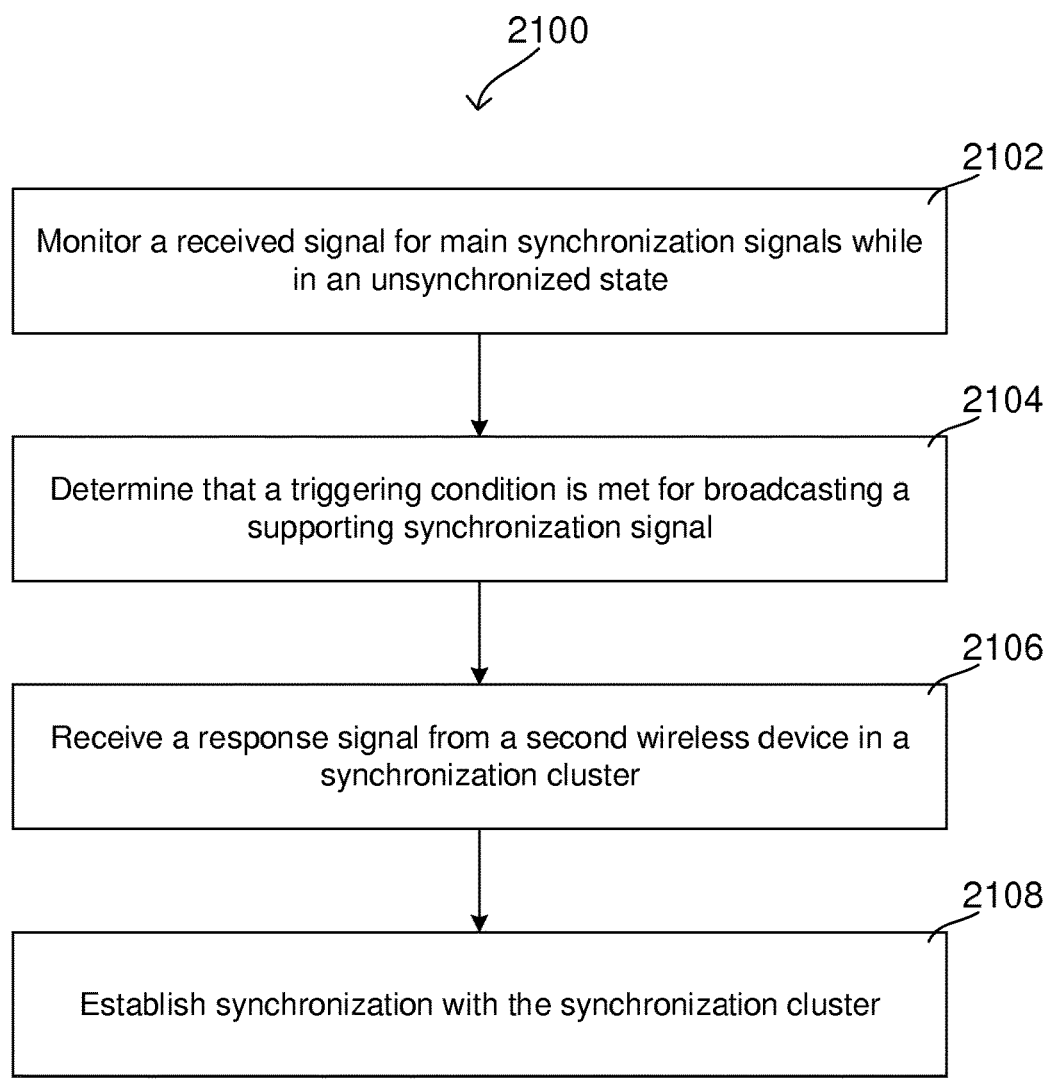

FIG. 21 shows exemplary method 2100 of performing wireless communications at a wireless device according to some aspects. As shown in FIG. 21, method 2100 includes monitoring a received signal for main synchronization signals while in an unsynchronized state (2102), determining that a triggering condition is met for broadcasting a supporting synchronization signal (2104), receiving a response signal from a second wireless device in a synchronization cluster (2106), and establishing synchronization with the synchronization cluster (2108).

Figure 22:
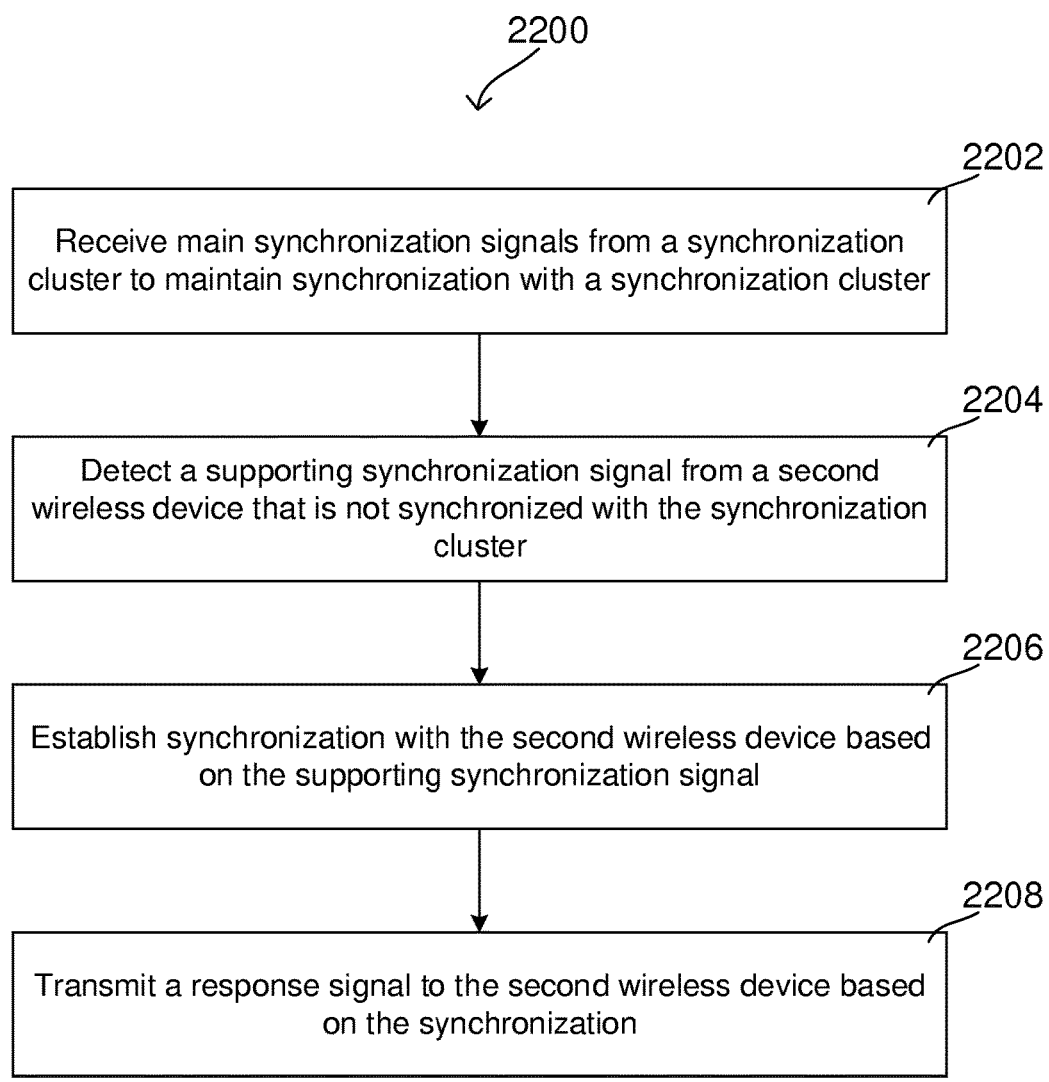

FIG. 22 shows exemplary method 2200 of performing wireless communications at a wireless device according to some aspects. As shown in FIG. 22, method 2200 includes receiving main synchronization signals from a synchronization cluster to maintain synchronization with a synchronization cluster (2202), detecting a supporting synchronization signal from a second wireless device that is not synchronized with the synchronization cluster (2204), establishing synchronization with the second wireless device based on the supporting synchronization signal (2206), and transmitting a response signal to the second wireless device based on the synchronization (2208).

Figure 23:
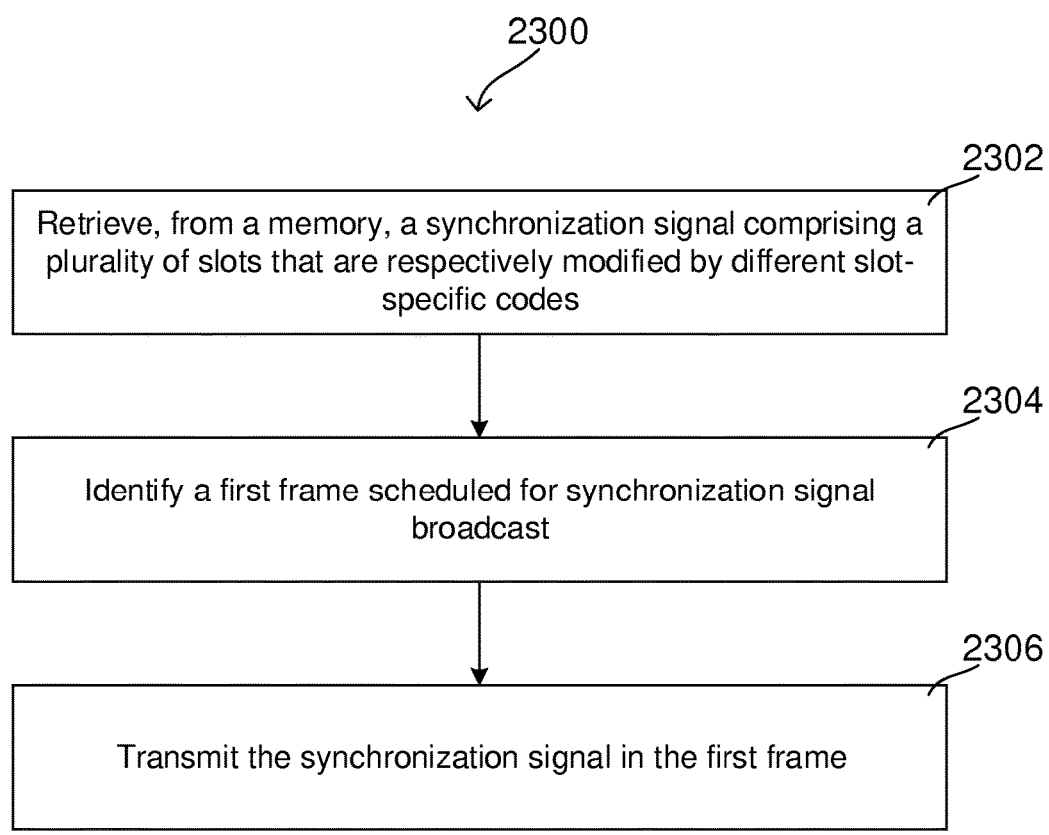

FIG. 23 shows exemplary method 2300 of performing wireless communications at a wireless device according to some aspects. As shown in FIG. 23, method 2300 includes retrieving, from a memory, a synchronization signal including a plurality of slots that are respectively modified by different slot-specific codes (2302), identifying a first frame scheduled for synchronization signal broadcast (2304), and transmitting the synchronization signal in the first frame (2306).

Figure 24:
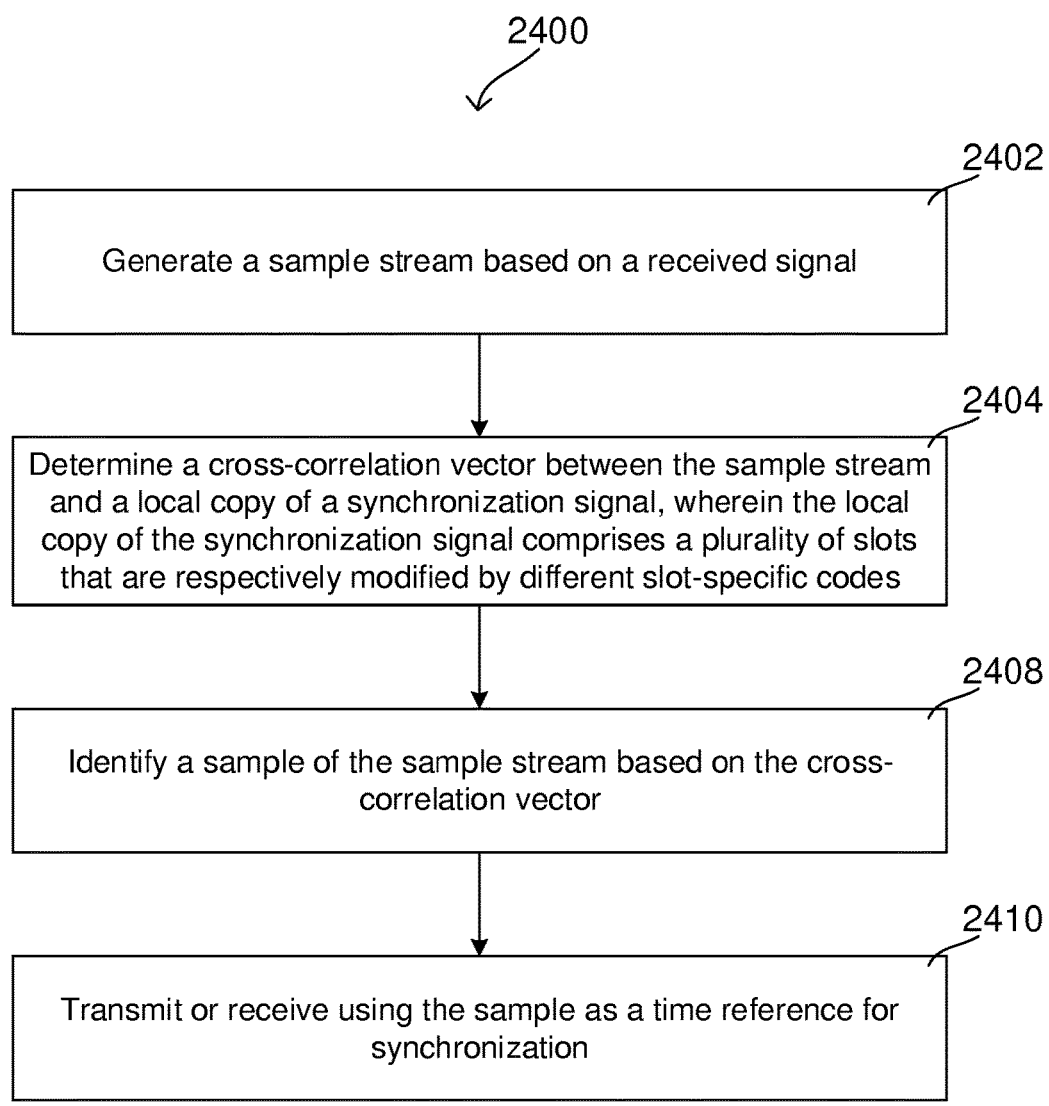

FIG. 24 shows exemplary method 2400 of performing wireless communications at a wireless device according to some aspects. As shown in FIG. 24, method 2400 includes generating a sample stream based on a received signal (2402), determining a cross-correlation vector between the sample stream and a local copy of a synchronization signal (2404), wherein the local copy of the synchronization signal includes a plurality of slots that are respectively modified by different slot-specific codes, identifying a sample of the sample stream based on the cross-correlation vector (2406), and transmitting or receiving using the sample as a time reference for synchronization (2408).

As described above, wireless devices may arrange themselves into synchronization clusters that are synchronized in time and frequency, and may use this synchronization to discover and communicate with each other. Tight time synchronization can be particularly important in slotted communication schedules, such as those described above having frames composed of a sequence of slots. As described regarding FIG. 3, wireless devices may use tiered synchronization clusters that are arranged into different synchronization tiers depending on how many relay hops there are between them and the synchronization source of the synchronization cluster. Some synchronization clusters may use satellite-based synchronization sources, such as synchronization cluster 300 (e.g., synchronized with GNSS time, such as GPS time). Other synchronization clusters may use peer-based synchronization sources, such as synchronization cluster 320 (e.g., synchronized with an internal deice clock of wireless device 322). In either case, certain wireless devices may assume a synchronization master role, meaning that they broadcast synchronization signals for the other wireless devices to use to synchronize with the rest of the synchronization cluster. Other devices may assume a synchronization relay role, and may accordingly re-broadcast the synchronization signals from the synchronization masters to other wireless devices in the synchronization cluster. There may be multiple synchronization levels of such synchronization relays (e.g., multiple synchronization tiers of relays that progressively have more relay hops between them and the synchronization source), which may propagate the synchronization signals throughout the synchronization cluster. Synchronization masters, synchronization relays, and synchronization sources (e.g., satellite-based synchronization sources that broadcast satellite-based synchronization signals) are collectively referred to herein as synchronization providers, which generally refers to any wireless device in a synchronization cluster that broadcasts a synchronization signal for the synchronization cluster. The remaining devices may assume a synchronization slave role, which may only receive synchronization signals and not broadcast any synchronization signals of their own. Synchronization slaves may receive the synchronization signals directly from the synchronization source (e.g., directly receive GNSS signals from a GNSS synchronization source), from a synchronization master, or from a synchronization relay. Synchronization slaves that receive a synchronization signal directly from the synchronization source (e.g., from a satellite-based synchronization source or from a peer-based synchronization source) are referred to herein as direct synchronization slaves, while other synchronization slaves that receive synchronization signals from a synchronization master (that is not a peer-based synchronization source) or from a synchronization relay are referred to herein as indirect synchronization slaves. Furthermore, synchronization masters, relays, and slaves that are synchronized with a satellite-based synchronization source are respectively referred to as satellite masters, satellite relays, and satellite slaves. Synchronization masters, relays, and slaves that are synchronized with a peer-based synchronization source are respectively referred to as peer masters (which is also the peer-based synchronization source), peer relays, and peer slaves.

Synchronization slaves and relays may use the synchronization signals from the synchronization masters to obtain time alignment with the synchronization cluster. While each device may have its own local reference time, they may attempt to align their local reference times with the slotted communication schedule of the synchronization cluster using the synchronization signals (where the synchronization cluster may attempt to align its own timing with a universal reference time, e.g., GPS time or UTC time). For example, detection of a synchronization signal may give the slot and/or frame boundary that a wireless device can align its transmissions and receptions with. This synchronization directly from synchronization signals may be a relatively coarse level of synchronization, and wireless devices may perform fine time and frequency tracking during peer-to-peer communication sessions between each other (e.g., between any pair of synchronization masters, relays, and slaves).

While this tiered synchronization scheme may provide adequate synchronization in many cases, the geographic range is generally limited to a finite coverage area around the synchronization master or masters. For example, at a certain point the number of relay hops from the synchronization master may become too large for wireless devices to use the relayed synchronization signals (e.g., the misalignment may be greater than the guard interval used by the wireless devices). It may therefore be difficult for wireless devices at the edge of a synchronization cluster to discover and communicate with wireless devices outside of the coverage area. As described above regarding FIG. 6, this can include two similar scenarios: different synchronization sources (where two proximate wireless devices are synchronized with different synchronization clusters and therefore cannot discover each other) and absence of synchronization source (where a wireless device may be unsynchronized and thus undiscoverable by wireless devices in a synchronization cluster). While various aspects described above regarding FIGS. 3-12 provided solutions for these issues after they occur, other aspects of this disclosure may preemptively attempt to avoid these scenarios from occurring.

In particular, various aspects of this disclosure may use selectively-triggered beacons to avoid segmentation of synchronization clusters, such as where one or more wireless devices lose their synchronization link with their synchronization masters and break off from the synchronization cluster. When this cluster segmentation occurs, the separated wireless devices may either form their own synchronization cluster or enter an unsynchronized state. Accordingly, they may not be able to interact with their previous synchronization cluster, and may run into the issues with different synchronization sources and/or absence of synchronization sources described above.

In various aspects, these beacons may be triggered by synchronization masters or relays that decide to drop their synchronization master or relay roles and/or by synchronization relays or slaves that loses its synchronization link (e.g., with a synchronization master or relay). The beacon may therefore broadcast information that indicates pending synchronization cluster changes. Other wireless devices may detect the beacon and then act to replace the missing synchronization master or relay, such as by performing a master or relay handover or by becoming a synchronization master. These techniques can therefore achieve controlled changes in the synchronization cluster, which leads to stable distribution of synchronization signals with higher priority (e.g., GNSS) and avoid cluster segmentation (e.g., where separated wireless devices form their own separate synchronization clusters). In various cases, these beacon techniques can help to maximize the probability that all wireless devices are synchronized with the same synchronization source (where, in an ideal scenario, all wireless devices in the entire network would be synchronized with the same synchronization source) and maximize the coverage of synchronization signals to cover all wireless devices in the same type of device-to-device network.

Beacon signaling by synchronization masters and relays will be discussed first, followed by discussion of beacon signaling by synchronization relays and slaves. Various aspects may use either or both of these techniques. As introduced above, a synchronization provider may broadcast the beacon when they decide to drop their role as a synchronization provider. Other wireless devices may receive the beacon and determine whether they are capable of replacing the synchronization provider in the synchronization cluster. If another wireless device can replace the synchronization provider, the synchronization provider may perform a handover procedure and the other wireless device may take over the role of the synchronization provider role, such as by broadcasting synchronization signals in the synchronization cluster.

Figure 25:
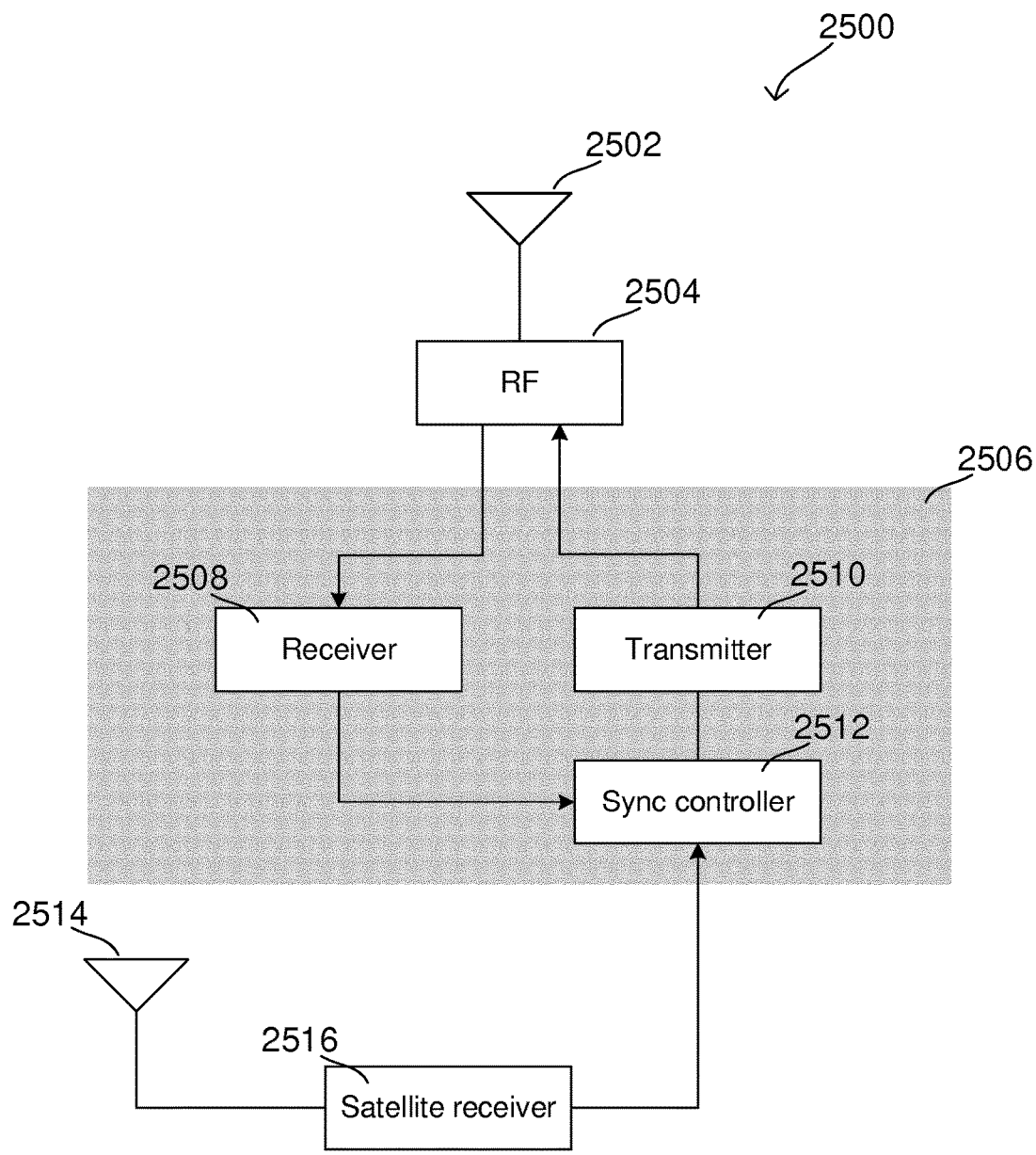
FIG. 25 shows an exemplary structural configuration of a wireless device for beacon transmission and detection according to some aspects.

FIG. 25 shows an exemplary internal configuration of wireless device 2500 according to some aspects. The configuration shown in FIG. 25 is focused on the beacon transmission and detection features of wireless device 2500 and therefore may not expressly depict other components of wireless device 2500 that are less directly related to beacon transmission and detection. Accordingly, in various aspects wireless device 2500 may include various other components.

As shown in FIG. 25, wireless device 2500 may include antenna system 2502, RF transceiver 2504, and baseband modem 2506. In some aspects, antenna system 2502, RF transceiver 2504, and baseband modem 2506 may be configured as described above for antenna system 202, RF transceiver 204, and baseband modem 206 of terminal device 102. Accordingly, wireless device 2500 may be configured to transmit and receive wireless signals via antenna system 2502 and RF transceiver 2504. In the transmit direction, RF transceiver 2504 may therefore modulate and transmit baseband samples (provided by baseband modem 2506) via antenna system 2502. In the receive direction, RF transceiver 2504 may also receive and demodulate radio signals via antenna system 2502 and provide the resulting baseband samples to baseband modem 2506.

FIG. 25 also depicts several internal components of baseband modem 2506, including receiver 2508, transmitter 2510, and sync controller 2512. In some aspects, baseband modem 2506 may include a digital signal processor and a protocol controller. Receiver 2508, transmitter 2510, and sync controller 2512 may therefore be subcomponents of the digital signal processor (e.g., physical layer components) and/or subcomponents of the protocol controller (e.g., protocol stack components). In some aspects, receiver 2508 may be the physical layer receive path while transmitter 2510 may be the physical layer transmit path. For example, receiver 2508 may include a demodulator, demapper (e.g., constellation demapper), de-interleaver, decoder, and/or descrambler. Receiver 2508 may receive wireless signals in the form of baseband samples via antenna system 2502 and RF transceiver 2504. Receiver 2508 may then sequentially process these baseband samples with the demodulator, demapper (e.g., constellation demapper), de-interleaver, decoder, and/or descrambler to produce a bitstream, which receiver 2508 may provide to the protocol stack of baseband modem 2506 (e.g., to protocol stack layers of baseband modem 2506). Transmitter 2510 may include a scrambler, encoder, interleaver, mapper (e.g., constellation mapper), and/or a modulator, which may sequentially process a bitstream (e.g., provided by protocol stack layers of baseband modem 2506) to produce baseband samples (e.g., complex IQ symbols). Transmitter 2510 may then transmit these baseband samples as wireless signals via RF transceiver 2504 and antenna system 2502. Sync controller 2512 may be a processor configured to execute instructions that define the synchronization operations of wireless device 2500, including the transmission and reception of synchronization signal as well as obtaining and maintaining synchronization over time. Sync controller 2512 may also be configured to provide synchronization signals to transmitter 2510 for broadcast to other wireless devices of the synchronization cluster, where sync controller 2512 may align the timing of these broadcasts with a universal reference time of the synchronization cluster. Sync controller 2512 may provide control signals to receiver 2508, transmitter 2510, and RF transceiver 2504 that control receiver 2508, transmitter 2510, and RF transceiver 2504 to transmit and receive with the correct time and frequency references. In some aspects, sync controller 2512 may also include physical layer components, such as detection circuits or processors configured to detect synchronization signals in sample streams provided by receiver 2508.

As shown in FIG. 25, wireless device 2500 may also include satellite antenna system 2514 (including one or more antennas) and satellite receiver 2516. Satellite receiver 2516 may be configured to receive satellite signals, such as from GNSS satellites, via satellite antenna system 2514. Satellite receiver 2516 may be configured to process the receives satellite signals to determine a satellite time (e.g., GPS time) and/or a geographic location of wireless device 2500. Satellite receiver 2516 may provide the satellite time to sync controller 2512, which may use the satellite signals as a satellite-based synchronization source. Accordingly, sync controller 2512 may use the satellite signals to align the local reference time of wireless device 2500 (e.g., its internal device clock) with the satellite time, where the satellite time may act as the universal reference time. Sync controller 2512 may then align transmission of synchronization signals with the satellite-aligned local reference time, and may therefore align the synchronization of the entire synchronization cluster with the satellite-based synchronization source.

In some scenarios, wireless device 2500 may act as a satellite master, or in other words, a synchronization master that is directly synchronized with a satellite-based synchronization source. In these scenarios, wireless device 2500 may broadcast synchronization signals that are synchronized in time with the satellite-based synchronization source. In other scenarios, wireless device 2500 may act as a satellite relay, or in other words, a synchronization relay that relays synchronization signals (that originate with a satellite master) that are aligned with a satellite-based synchronization source. In these scenarios, sync controller 2512 may align the timing of its transmission of synchronization signals with the synchronization signals it receives from synchronization providers in a higher sync tier (e.g., that are closer to the synchronization master in terms of relay hops). For example, receiver 2508 may receive a synchronization signal from a higher-tiered synchronization provider and provide the synchronization signal to sync controller 2512. Sync controller 2512 may detect the timing of the received synchronization signal and then trigger transmission of its own synchronization signal (e.g., a relayed synchronization signal) aligned with this timing.

In other scenarios, wireless device 2500 may act as a peer master, or in other words, a synchronization master that is synchronized with its own internal synchronization source (e.g., its own internal device clock, such as based on UTC). Sync controller 2512 may therefore use its internal synchronization source to time transmissions of synchronization signals, which transmitter 2510 may transmit. In other scenarios, wireless device 2500 may act as a peer relay, or in other words, a synchronization relay that is synchronized with synchronization signals provided by a peer master. Accordingly, receiver 2508 may receive these synchronization signals from the peer master and provide them to sync controller 2512, which may use the timing of the synchronization signals to align transmission of its own synchronization signals.

While not discussed in detail here, wireless device 2500 may also be configured to operate as a satellite slave or peer slave. If operating as a satellite slave, sync controller 2512 may receive synchronization signals directly from a satellite-based synchronization source (with satellite receiver 2516), from a satellite master (with receiver 2508), and/or a satellite relay (with receiver 2508), and may synchronize its own local reference time with these synchronization signals. In some aspects where wireless device 2500 is receiving synchronization signals directly from a satellite-based synchronization source (e.g., is a direct satellite slave), wireless device 2500 may also receive synchronization signals from a satellite master, and may use both the satellite-based synchronization signals and the synchronization signals from the satellite master for synchronization. If operating as a peer slave, sync controller 2512 may receive synchronization signals from a peer master (with receiver 2508) or a peer relay (with receiver 2508), and may synchronize its own local reference time with these synchronization signals.

In some aspects, satellite-based synchronization sources may be given higher priority than internal synchronization sources, and direct synchronization sources may be given higher priority than relays. Accordingly, wireless device 2500 may be configured to synchronize with satellite-based synchronization sources (directly or via relay) whenever possible. If wireless device 2500 has direct satellite-based synchronization source coverage (e.g., if satellite receiver 2516 can reliably receive satellite-based synchronization signals from a satellite-based synchronization source), sync controller 2512 may synchronize with the satellite-based synchronization source. If wireless device 2500 does not have satellite-based synchronization source coverage (e.g., if satellite receiver 2516 cannot reliably receive satellite-based synchronization signals from a satellite-based synchronization source), sync controller 2512 may attempt to synchronize with a satellite master. If sync controller 2512 cannot detect synchronization signals from a satellite master, sync controller 2512 may attempt to synchronize with a satellite relay. If no satellite relay is available either, sync controller 2512 may attempt to synchronize with a peer master, and if no peer master is available may attempt to synchronize with a peer relay. If none of these synchronization sources is available, sync controller 2512 may assume a peer master role using its internal device clock as an internal synchronization source. Wireless device 2500 may therefore use a prioritized hierarchy to determine which synchronization source to follow.

Figure 26:
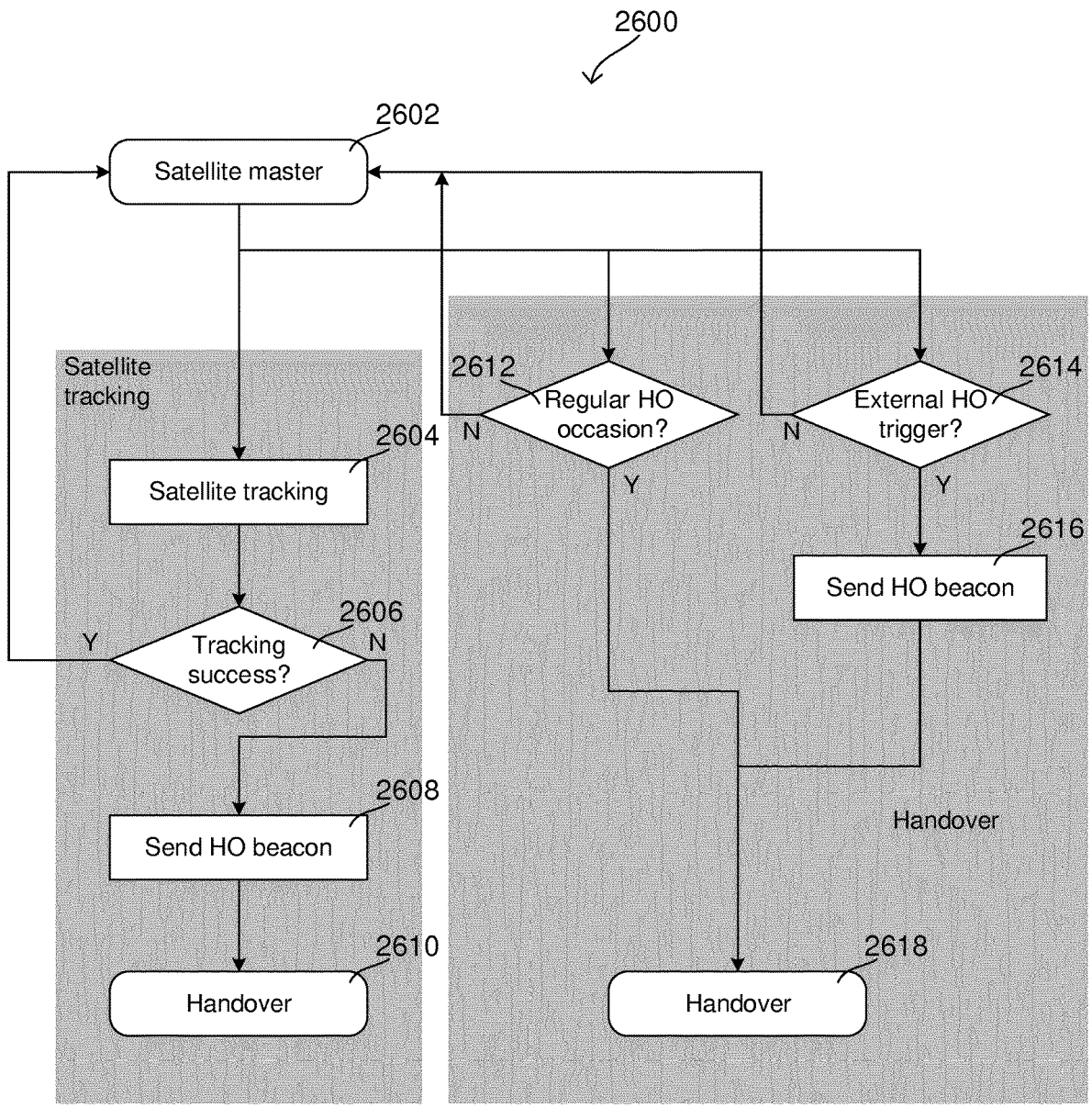
FIG. 26 shows an exemplary flow chart for beacon transmission by a satellite master according to some aspects.

FIG. 26 shows exemplary flow chart 2600 describing beacon transmission procedures for satellite master (i.e., a synchronization master that is directly synchronized with a satellite-based synchronization source) according to some aspects. Wireless device 2500 may be configured to execute this procedure when it is acting as a satellite master. As shown in FIG. 26, wireless device 2500 may start as a satellite master in stage 2602. For example, satellite receiver 2516 may be actively receiving satellite-based synchronization signals from a satellite-based synchronization source, and sync controller 2512 may be using the timing of these synchronization signals to time the transmissions of its own synchronization signals with transmitter 2510. For instance, sync controller 2512 may use the satellite-based synchronization signals to identify a frame boundary of a universal reference time, and may control transmitter 2510 to transmit a synchronization signal that is aligned in time with the frame boundary.

As shown in FIG. 26, wireless device 2500 may perform a satellite tracking loop (stages 2604-2610) and a handover loop (stages 2612-2618). wireless device 2500 may perform these loops simultaneously or by alternating between them. Starting first with the satellite tracking loop, wireless device 2500 may perform satellite tracking in stage 2604. For example, satellite receiver 2516 may use the detection time of a previously received satellite-based synchronization signal to estimate the detection time of the next satellite-based synchronization signal (e.g., according to a transmission period of the satellite-based synchronization signals). Satellite receiver 2516 may therefore track the satellite-based synchronization source over time.

Sync controller 2512 may check whether the satellite tracking is successful in stage 2606. If so, sync controller 2512 may continue operating as a satellite master for the synchronization cluster. Synchronization users within range of wireless device 2500 may continue to receive the synchronization signals and may therefore remain synchronized with the synchronization cluster.

However, in some scenarios wireless device 2500 may lose satellite-based synchronization source coverage, and satellite receiver 2516 may no longer be able to receive and detect the satellite-based synchronization signals. This can include where satellite receiver 2516 is no longer to detect the satellite-based synchronization signals, or where a received power of the satellite-based synchronization signals falls below a threshold. Wireless device 2500 may therefore not be able to remain synchronized with the satellite-based synchronization source, and may consequently not be able to transmit synchronization signals for the cluster that are aligned with the satellite-based synchronization source. In other words, detecting as loss or drop in signals strength of the satellite-based synchronization signals may indicate a condition that transmission of the synchronization signals for the cluster will be interrupted.

Accordingly, if satellite receiver 2516 loses satellite-based synchronization source coverage, wireless device 2500 may no longer be able to continue its role as a satellite master. Satellite receiver 2516 may therefore notify sync controller 2512, which may determine that satellite-based synchronization has been lost in stage 2606. Sync controller 2512 may therefore trigger transmission of a beacon in stage 2608. This beacon may be a provider handover beacon, which requests that another wireless device take over the satellite master role from wireless device 2500.

In some aspects, the beacon may be scheduled for specific slots in the slotted communication schedule used by the synchronization cluster. In various aspects, the beacon may be scheduled for a specific slot in every frame, or for a specific slot every several frames. The wireless devices in the synchronization cluster may have advance knowledge of the scheduling of the beacon in the communication schedule, and may therefore be configured to monitor for the beacon in the allocated slots.

In some aspects, the format of the beacon may be predefined. For example, the beacon may be a message including several fields, which can include various information about the requested handover. In one example, the beacon may include a field that specifies that wireless device 2500 is a satellite master that has lost direct satellite-based synchronization coverage. As is further described, other wireless devices in the synchronization cluster that still have direct satellite-based synchronization source coverage may therefore determine that they are eligible to take over the satellite master role from wireless device 2500. In various other examples, the beacon may include a field that specifies the synchronization tier of wireless device 2500 (e.g., zeroth synchronization tier) and a field that specifies the synchronization source of wireless device 2500 (e.g., a satellite-based synchronization source).

Once sync controller 2512 determines that transmission of synchronization signals will be interrupted and that the beacon should be sent, sync controller 2512 may identify a scheduled slot for the beacon. Sync controller 2512 may generate the message for the beacon using the appropriate format and information, and may then provide the beacon to transmitter 2510. Transmitter 2510 may then transmit the beacon in the scheduled slot via RF transceiver 2504 and antenna system 2502.

Other wireless devices in the synchronization cluster may be monitoring for beacons in the scheduled slot, and may detect the beacon. Based on the information in the beacon, a wireless device may determine that it is eligible to take over the satellite master role for wireless device 2500. For example, the wireless device may currently have satellite-based synchronization source coverage (e.g., may be a direct satellite slave), and may therefore be capable of transmitting its own synchronization signals that are synchronized with the satellite-based synchronization signals that it directly receives from the satellite-based synchronization source. The wireless device may then perform its own handover procedure to potentially take over the synchronization provider role of wireless device 2500. While various handover procedures are possible, in some aspects the wireless devices may be configured to use a pseudo-random backoff to control which wireless device takes over the synchronization provider role. For example, multiple wireless devices may receive the beacon and determine that they are eligible to perform a handover with wireless device 2500. Each of these participating wireless devices may select a backoff timer in a pseudo-random manner, and may begin transmitting synchronization signals (aligned in time with the synchronization signals broadcasted by wireless device 2500) after their respective backoff timers have expired. Whichever participating device selected the shortest backoff timer will begin broadcasting first, and will therefore be the wireless device that takes over the synchronization provider role. The other participating devices may identify that another wireless device began broadcasting first, and may determine that they will not take over the synchronization provider role (for this handover instance). This type of handover procedure using pseudo-random backoff timer selection is referred to herein as a random competition handover procedure.

In some aspects, after performing the handover sync controller 2512 may be configured to control receiver 2508 to begin receiving synchronization signals from the new synchronization provider (e.g., may become an indirect satellite slave or a satellite relay). Sync controller 2512 may therefore remain synchronized with the synchronization cluster using the new synchronization provider. If sync controller 2512 cannot detect any synchronization signals from the synchronization cluster, wireless device 2500 may enter an unsynchronized state, and may search for synchronization signals for other synchronization clusters, search for satellite-based synchronization signals (e.g., GNSS signals), begin its own synchronization cluster (e.g., by becoming a peer master), or enter a sleep state until a later time.

As introduced above, wireless device 2500 may also perform a handover loop in stages 2612-2618. As shown in FIG. 26, wireless device 2500 may determine whether a regular handover occasion occurs in stage 2612. For example, synchronization providers (synchronization masters and relays) may be configured to periodically perform handovers, e.g., at a predefined handover period. This can help to distribute the power penalty across multiple devices, and can help avoid scenarios where a single wireless device consumes an inordinate amount of power by transmitting synchronization signals for an extended period of time. Accordingly, once a synchronization provider has operated for a duration equal to the handover period, it may attempt to trigger a handover to hand off its synchronization provider role to another wireless device (that is eligible to perform the synchronization provider role, or in other words, that is capable of receiving the same synchronization signals that the current synchronization provider is using for synchronization).

Accordingly, in stage 2612 sync controller 2512 may determine whether wireless device 2500 has operated as a synchronization provider for at least a handover period. If not, sync controller 2512 may continue to act as a satellite master in stage 2602. Conversely, if yes sync controller 2512 may trigger a handover in stage 2618. In some aspects, sync controller 2512 may first transmit a provider handover beacon, while in other aspects sync controller 2512 may not transmit a provider handover beacon. For example, as the handover period may be predefined, other wireless devices may know in advance when wireless device 2500 will hand off its synchronization provider role. As this is advance knowledge, no provider handover beacon may be necessary, and sync controller 2512 may perform the handover in stage 2618 without first transmitting provider handover beacon. As described above, other wireless devices may receive the provider handover beacon or determine that it is time for a provider handover. Participating wireless devices may then execute a random competition handover procedure, such as using pseudo-random backoff timers, to determine which participating wireless device will take over the synchronization provider role. From the perspective of wireless device 2500, sync controller 2512 may perform a handover by transmitting the handover beacon and suspending transmission of the synchronization signals at a specific slot (e.g., at a first-occurring time slot of a frame).

Furthermore, sync controller 2512 may also determine whether an external handover trigger occurs in stage 2614. The external handover trigger may be based on factors unrelated to the presence or reliability of the satellite-based synchronization signal, and may indicate a condition that broadcast of synchronization signals will be interrupted. In one example, the external handover trigger may be that the battery power of synchronization provider drops below a battery power threshold. For instance, an application processor of wireless device 2500 may notify sync controller 2512 that the battery power has fallen below the battery power threshold. As transmitting synchronization signals consumes battery power, this may act as an external handover trigger that prompts sync controller 2512 to pursue handover of the synchronization provider role. In another example, the external handover trigger may be that another higher priority communication system, such as a cellular (e.g., 3GPP) or short-range (e.g., WiFi) communication system, needs communication resources (e.g., signal processing or RF resources) of wireless device 2500 that are being used to perform synchronization provider options. In one specific example, a cellular subsystem of wireless device 2500 may have an incoming phone call, where the incoming phone call may be the external handover trigger. An application processor of wireless device 2500 may notify sync controller 2512 of the external handover trigger (e.g., the incoming phone call), which may then determine that the external handover trigger has occurred. Sync controller 2512 may then provide the beacon to transmitter 2510, which may transmit the beacon during a slot scheduled for the beacon in stage 2616. Sync controller 2512 may then perform a handover with another wireless device in stage 2618. In some aspects, after performing the handover sync controller 2512 may be configured to control receiver 2508 to begin receiving synchronization signals from the new synchronization provider. Sync controller 2512 may therefore remain synchronized with the synchronization cluster using the new synchronization provider.

Transmission of the provider handover beacon may therefore indicate to other wireless devices that there is an upcoming change in the synchronization hierarchy, namely that a synchronization provider will be vacating its role. As this would otherwise leave a hole in the synchronization cluster, transmitting these beacons may enable other eligible wireless devices to take over the role of the former synchronization provider. This can help prevent cluster segmentation, as synchronization users that were relying on the former synchronization provider can use the synchronization signals from the new synchronization provider to remain synchronized with the synchronization cluster.

In some aspects, wireless device 2500 may be configured to perform a similar procedure when acting as a synchronization relay, such as a satellite relay or peer relay. However, instead of performing satellite tracking in stages 2604-2610, wireless device 2500 may be configured to perform peer tracking. For example, receiver 2508 may periodically receive synchronization signals from the higher-tiered synchronization provider (the synchronization master or relay to which wireless device 2500 is synchronized with), and may provide the synchronization signal to sync controller 2512. Sync controller 2512 may then use the timing of these synchronization signals to remain synchronized to the higher-tiered synchronization provider, and may control transmitter 2510 to transmit synchronization signals that are aligned with the higher-tiered synchronization provider.

However, in some scenarios receiver 2508 may lose coverage of the higher-tiered synchronization provider, and may either not be able to detect its synchronization signals or may only receive the synchronization signals with very low power. This may indicate a condition that transmission of the relay synchronization signals will be interrupted. As wireless device 2500 may not be able to continue to reliably operate as a synchronization relay for its synchronization users, sync controller 2512 may be configured to handover its role as a synchronization relay to another eligible wireless device. Accordingly, sync controller 2512 may send out a provider handover beacon requesting another eligible wireless device take over the synchronization relay role (e.g., another wireless device in the synchronization cluster that can still receive the synchronization signals from the higher-tiered synchronization provider or another synchronization provider). Sync controller 2512 may then perform a handover to transfer the synchronization relay role to another such wireless device. wireless device 2500 may also perform the same procedure of the handover loop in stages 2612-2618 when acting as a synchronization relay.

Figure 27:
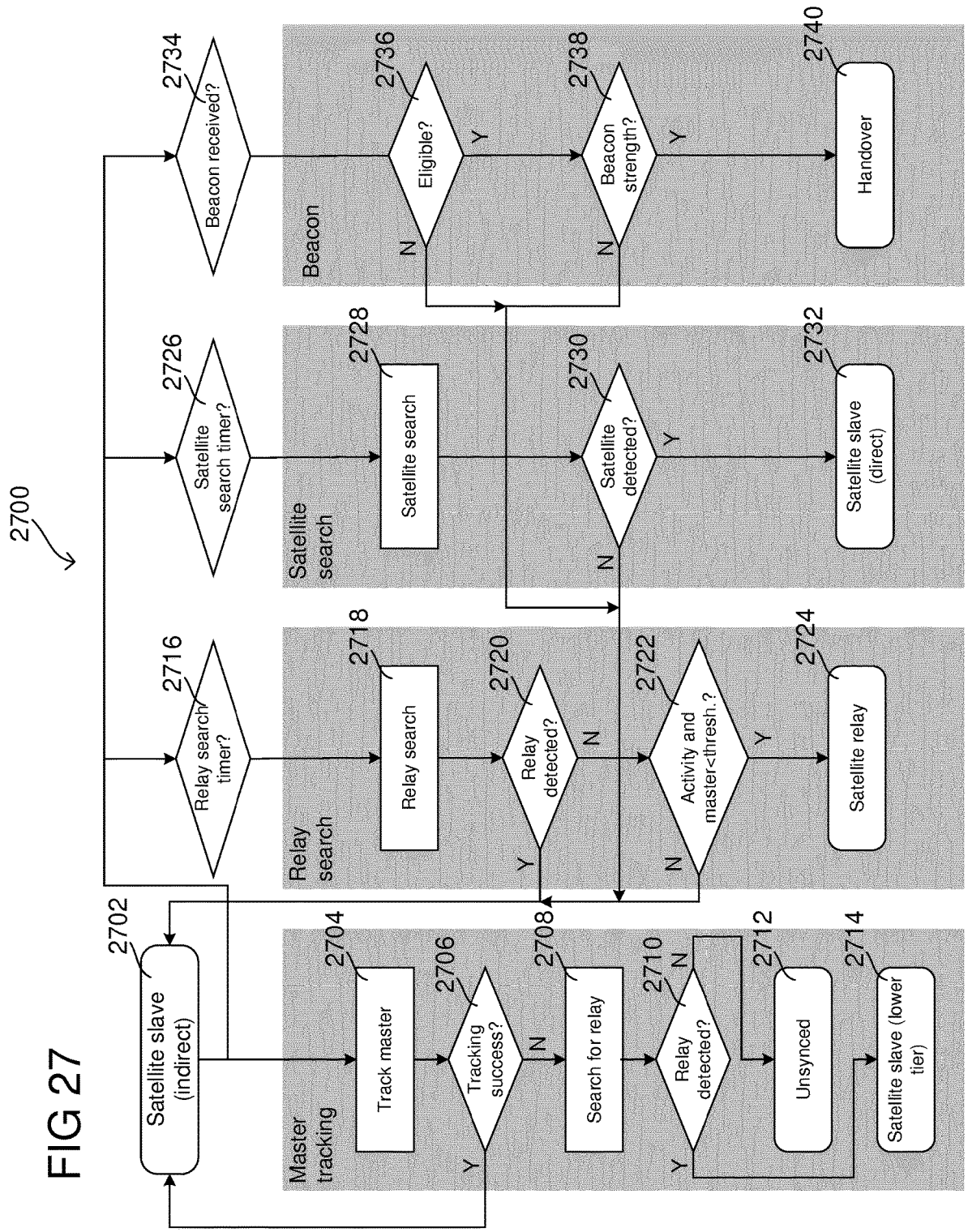
FIG. 27 shows an exemplary flow chart for beacon detection by a satellite slave according to some aspects.

Wireless device 2500 may also be configured to monitor for and respond to beacons. For example, if wireless device 2500 is operating as a satellite slave that synchronized with a satellite master, wireless device 2500 may be eligible to take over for a satellite relay that attempts to hand over its satellite relay role. FIG. 27 shows exemplary flow chart 2700, which describes the operation of wireless device 2500 in a satellite slave role according to some aspects. As shown in FIG. 27, wireless device 2500 may execute several loops, including a master tracking loop (stages 2704-2714), a relay search loop (stages 2718-2724), a satellite search loop (stages 2728-2732), and a beacon detection loop (stages 2736-2740). Wireless device 2500 may start as a satellite slave in stage 2702, and may therefore perform tracking of the satellite master in stage 2704. For example, receiver 2508 may receive synchronization signals from the synchronization master and provide the synchronization signals to sync controller 2512. Sync controller 2512 may then use the timing of the synchronization signals as a time reference for synchronizing transmit and receive operations of wireless device 2500 with the synchronization cluster. This may include controlling receiver 2508 and transmitter 2510 to receive and transmit using the time reference as a frame or slot boundary.

Sync controller 2512 may determine whether tracking the satellite master was successful or not in stage 2706. If sync controller 2512 was able to track the satellite master, sync controller 2512 may continue to operate as a satellite slave. Conversely, if sync controller 2512 is not able to track the master, sync controller 2512 may trigger a search for a satellite relay in stage 2708. In other words, because a satellite master is not available, sync controller 2512 may attempt to find a satellite relay, which may have lower priority than a satellite master but higher priority than peer masters and relays.

Sync controller 2512 may therefore search for relay synchronization signals in stage 2708. In some aspects, the synchronization signals transmitted by different synchronization providers may differ based on their synchronization status. For example, satellite masters may transmit a first type of synchronization signal (e.g., a satellite master synchronization signal, generated from a first signal sequence), satellite relays may transmit a second type of synchronization signal (e.g., a satellite relay synchronization signal, generated from a second signal sequence), peer masters may transmit a third type of synchronization signal (e.g., a peer master synchronization signal, generated from a third signal sequence), and peer relays may transmit a fourth type of synchronization signal (e.g., a peer relay synchronization signal, generated from a fourth signal sequence). The various types of synchronization signals may be predefined, and sync controller 2512 may be configured to determine which specific type of synchronization signal is received by receiver 2508 based on the predefined synchronization signals. Sync controller 2512 may therefore search for a satellite relay by evaluating the sample stream (representing the received signal) provided by receiver 2508 to determine whether sample stream contains satellite relay synchronization signal.

If sync controller 2512 determines that a satellite relay is detected in stage 2710, sync controller 2512 may continue the satellite slave role in stage 2714, but may receive its synchronization signals from a satellite relay (e.g., may be in the third synchronization tier). Sync controller 2512 may therefore track the satellite relay by continuing to receive satellite relay synchronization signals from the satellite relay. Conversely, if sync controller 2512 determines that no satellite relay is detected in stage 2710, sync controller 2512 may enter an unsynchronized state in stage 2712. In other words, as there are no synchronization signals available that are synchronized with the satellite-based synchronization source, sync controller 2512 may not be able to remain synchronized with the synchronization cluster. Wireless device 2500 may therefore no longer be part of the synchronization cluster.

Wireless device 2500 may also be configured to perform a relay search loop in stages 2716-2724. By performing this relay search loop, wireless device 2500 may monitor whether there are any satellite relays in proximity to wireless device 2500, and may potentially assume a satellite relay role if there are none around. As shown in FIG. 27, sync controller 2512 may trigger the relay search loop based on a relay search timer in stage 2716, which may be periodic. Wireless device 2500 may then perform a relay search in stage 2720. For example, sync controller 2512 may search the sample stream provided by receiver 2508 to determine whether there are any satellite relay synchronization signals in the sample stream (e.g., are detectable in the sample stream). If sync controller 2512 determines that there are detectable satellite relay synchronization signals in the sample stream in stage 2720, wireless device 2500 may continue to operate as an indirect satellite slave. Conversely, if sync controller 2512 determines that there are no detectable satellite relay synchronization signals, wireless device may proceed to stage 2722.

In stage 2722, sync controller 2512 may determine whether there is recent activity around wireless device 2500 and whether the satellite master synchronization signal has signal strength above a signal strength threshold. Starting with the activity criteria, sync controller 2512 may be configured to monitor over time when wireless device 2500 performs discovery with another wireless device. In stage 2722, sync controller 2512 may determine whether the last discovery procedure occurred within a predefined time window of the current time. If so, sync controller 2512 may determine that there is recent activity around wireless device 2500 for purposes of the decision in stage 2722.

Regarding the satellite master synchronization signal strength criteria, sync controller 2512 may be configured to perform a signal strength measurement on the satellite master synchronization signal (e.g., as part of the master tracking loop). In stage 2722, sync controller 2512 may compare the signal strength measurement to a signal strength threshold.

If sync controller 2512 determines that there is no recent activity around wireless device 2500 or that the signal strength measurement is greater than the signal strength threshold, sync controller 2512 may continue in its indirect satellite slave role. Conversely, if sync controller 2512 determines that there is recent activity around wireless device 2500 and that the signal strength measurement is less than the signal strength threshold, sync controller 2512 may decide to assume a satellite relay role in stage 2724. Accordingly, sync controller 2512 may begin broadcasting its own satellite relay synchronization signals (with transmitter 2510), where the timing of these transmissions is synchronized with the satellite master synchronization signals received from the satellite master. Because there is recent activity around wireless device 2500 but the satellite master is unable to provide strong coverage to this area, wireless device 2500 may therefore fill a gap in the synchronization cluster by operating as a satellite relay.

As previously indicated, in some cases wireless device 2500 may prioritize satellite-based synchronization signals (e.g., from a GNSS satellite) over satellite master synchronization signals. Accordingly, wireless device 2500 may also perform a satellite search loop to periodically search to determine wireless device 2500 is within coverage of a satellite-based synchronization source. For example, satellite receiver 2516 may periodically trigger the satellite search loop in stage 2726, and may perform a satellite search in stage 2728. For instance, satellite receiver 2516 may search through the signal received by satellite antenna system 2514 to determine whether there are any detectable satellite-based synchronization signals. Satellite receiver 2516 may notify sync controller 2512 whether any satellite-based synchronization signals are detected.

If sync controller 2512 determines that no satellite-based synchronization signal was detected in stage 2730, sync controller 2512 may keep wireless device 2500 in the indirect satellite slave role. However, if sync controller 2512 determines that a satellite-based synchronization signal was detected, sync controller 2512 may switch wireless device 2500 in to a direct satellite slave role. Accordingly, satellite receiver 2516 may continue to receive the detected satellite-based synchronization signal and provide information about the timing to sync controller 2512. Sync controller 2512 may then use this timing (optionally in addition to the satellite master synchronization signals) to align the timing of wireless device 2500 with the synchronization cluster.

Wireless device 2500 may also be configured to perform a beacon detection loop. For example, sync controller 2512 may be configured to monitor for beacons, such as by monitoring the sample stream provided by receiver 2508 during the time slots where beacons are scheduled. If sync controller 2512 detects a beacon in stage 2734, sync controller 2512 may trigger the beacon detection loop. Sync controller 2512 may then determine whether wireless device 2500 is eligible to respond to the beacon in stage 2736. For example, the beacon may be a provider handover beacon or a provider loss beacon. If the beacon is a provider handover beacon that indicates that a satellite relay is dropping its role, wireless device 2500 may be eligible to respond to the provider handover beacon and take over the satellite relay role. However, if the provider handover beacon indicates that a satellite master is dropping its role, wireless device 2500 may not be eligible to assume the satellite master role because it does not have direct satellite-based synchronization source coverage (e.g., is only an indirect satellite slave). In some aspects, eligibility may be based on the synchronization tier that the beacon transmitting device is in (which may be indicated as a field in the beacon). After detecting the beacon, sync controller 2512 may determine (as part of stage 2736) whether wireless device 2500 is in the same or higher synchronization tier (with the zeroth tier being the highest). If wireless device 2500 is in the same or higher synchronization tier as the beacon transmitting device, wireless device 2500 may be eligible to take over for the beacon transmitting device.

If the beacon is a provider loss beacon, the beacon transmitting device may be a synchronization user that has lost coverage from its former synchronization provider. If the provider loss beacon has a field indicating the synchronization tier of the former synchronization provider, sync controller 2512 may determine that wireless device 2500 is eligible if the synchronization tier of wireless device 2500 is the same or higher than the synchronization tier of the former synchronization provider. If the provider loss beacon has a field indicating the synchronization tier of the beacon transmitting device, sync controller 2512 may determine that wireless device 2500 is eligible if the synchronization tier of wireless device 2500 is higher than the synchronization tier of the beacon transmitting device.

If sync controller 2512 determines that wireless device 2500 is not eligible to respond to the beacon, sync controller 2512 may keep wireless device 2500 in the indirect satellite slave role. Conversely, if sync controller 2512 determines that wireless device 2500 is eligible to respond to the beacon, sync controller 2512 may proceed to stage 2738 to determine whether the beacon signal strength is greater than a signal strength threshold. This comparison may serve to show whether wireless device 2500 is proximate to the beacon transmitting device (which will result in a high signal strength measurement). If the beacon signal strength is less than the signal strength threshold, sync controller 2512 may decide not to respond to the beacon and may keep wireless device 2500 in the indirect satellite slave role. Conversely, if the beacon signal strength is greater than the signal strength threshold, sync controller 2512 may decide to respond to the beacon. Sync controller 2512 may therefore respond to the beacon and perform a handover in stage 2740. If the beacon is a provider handover beacon, sync controller 2512 may exchange signaling with the beacon transmitting device to arrange for wireless device 2512 to take over the synchronization provider role of the beacon transmitting device. If the beacon is a provider loss beacon, sync controller 2512 may not exchange signaling with the former synchronization provider as part of the handover, and may instead begin transmitting synchronization signals (with transmitter 2510) that the beacon transmitting device and other synchronization users can use for synchronization. In some aspects, sync controller 2512 may use the timing of the beacon (e.g., the timing of when it was received) to synchronize transmission of these synchronization signals.

Wireless device 2500 may also perform the same procedure when operating as a peer slave (e.g., in a synchronization cluster that is synchronized to a peer-based synchronization source). Wireless device 2500 may therefore similarly respond to handovers and help to fill gaps in the synchronization cluster in these scenarios.

Similarly, while the above example of FIG. 27 describes wireless device 2500 starting in an indirect satellite slave role, wireless device 2500 may perform a similar procedure when acting as a direct satellite slave. In particular, satellite receiver 2516 may continue to track the satellite-based synchronization source over time. If sync controller 2512 receives a provider handover beacon from a satellite master, sync controller 2512 may be eligible to respond and take over the satellite master role. Sync controller 2512 may therefore perform a handover with the beacon transmitting device and assume the satellite master role, such as by transmitting master synchronization signals that are aligned with the satellite-based synchronization source. Similarly, if sync controller 2512 receives a provider loss beacon, sync controller 2512 may be eligible to take over the synchronization provider role (e.g., as a satellite master). Sync controller 2512 may therefore assume the satellite master role, such as by transmitting master synchronization signals that are aligned with the satellite-based synchronization source. In some aspects, sync controller 2512 may be configured to perform a random competition handover procedure using a pseudo-random backoff time before assuming the synchronization provider role (e.g., by performing the handover procedure and being the first participating wireless device to begin transmitting the synchronization signals). Sync controller 2512 may therefore be configured to pseudo-randomly select a backoff timer and wait until the backoff timer expires. If no other wireless device has started transmitting synchronization signals before the backoff timer expires, sync controller 2512 may assume the synchronization provider role from the previous synchronization provider, thus completing the handover procedure.

Furthermore, in some aspects wireless device 2500 may be configured to transmit provider loss beacons when it is operating as a synchronization user. For example, with reference back to FIG. 27, sync controller 2512 may be configured to generate a provider loss beacon if the master tracking is not successful in stage 2706. As described above, sync controller 2512 may include the synchronization tier of wireless device 2500 or the synchronization tier of the previous synchronization provider as a field in the provider loss beacon. Sync controller 2512 may then provide the provider loss beacon to transmitter 2510, which may transmit the provider loss beacon in a slot scheduled for beacons. If another eligible device receives the provider loss beacon, it may assume the synchronization provider role (e.g., as a satellite master) and begin transmitting synchronization signals. Sync controller 2512 may receive these synchronization signals and use their timing maintain synchronization with the synchronization cluster. In some aspects, sync controller 2512 may transmit the provider loss beacon before searching for a synchronization relay in stage 2710, while in other aspects sync controller 2512 may be configured to transmit the provider loss beacon if it is not able to detect a synchronization relay.

Figure 28A:
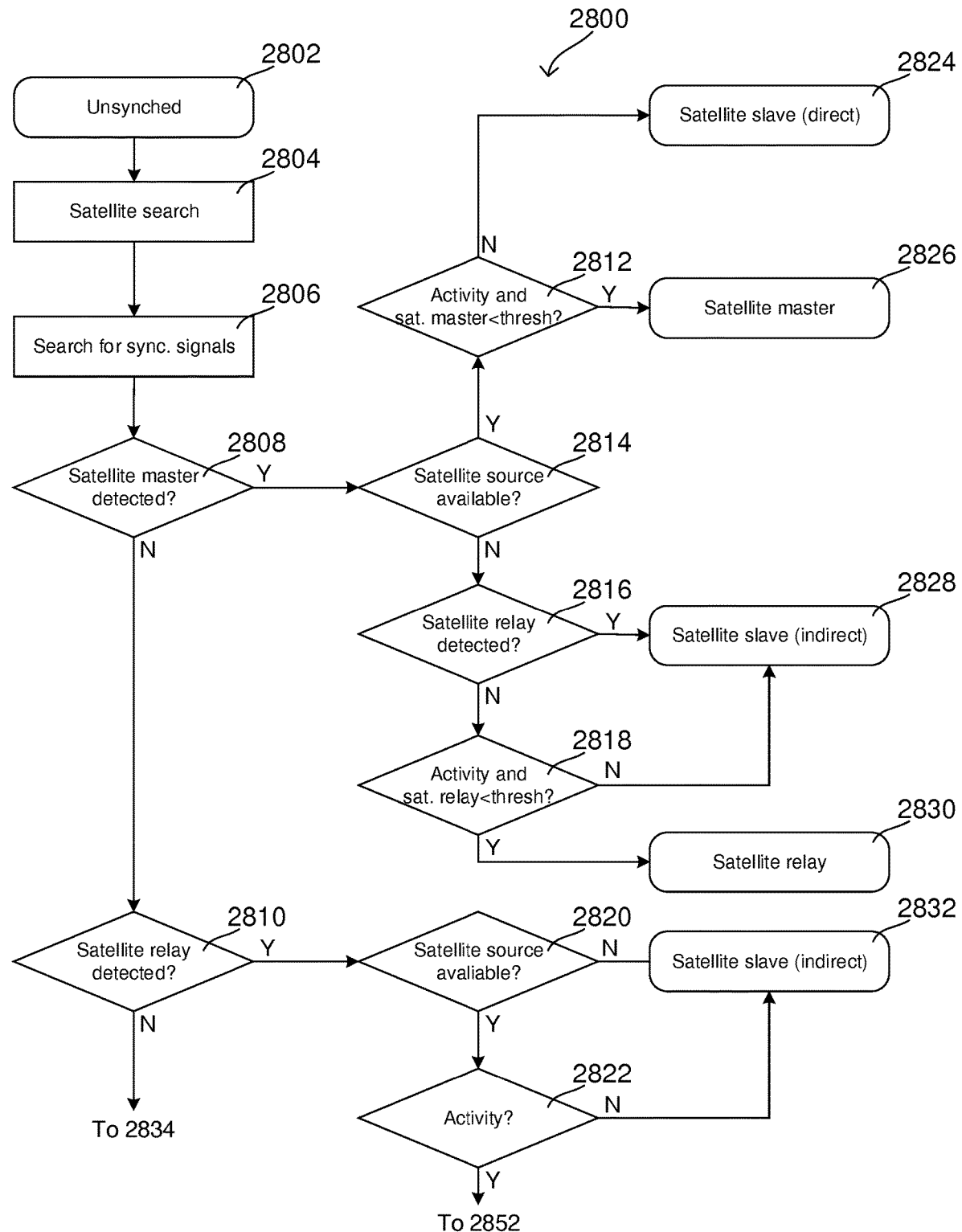
FIGS. 28A and 28B show an exemplary flow chart for a wireless device in a slave role according to some aspects.
Figure 28B:
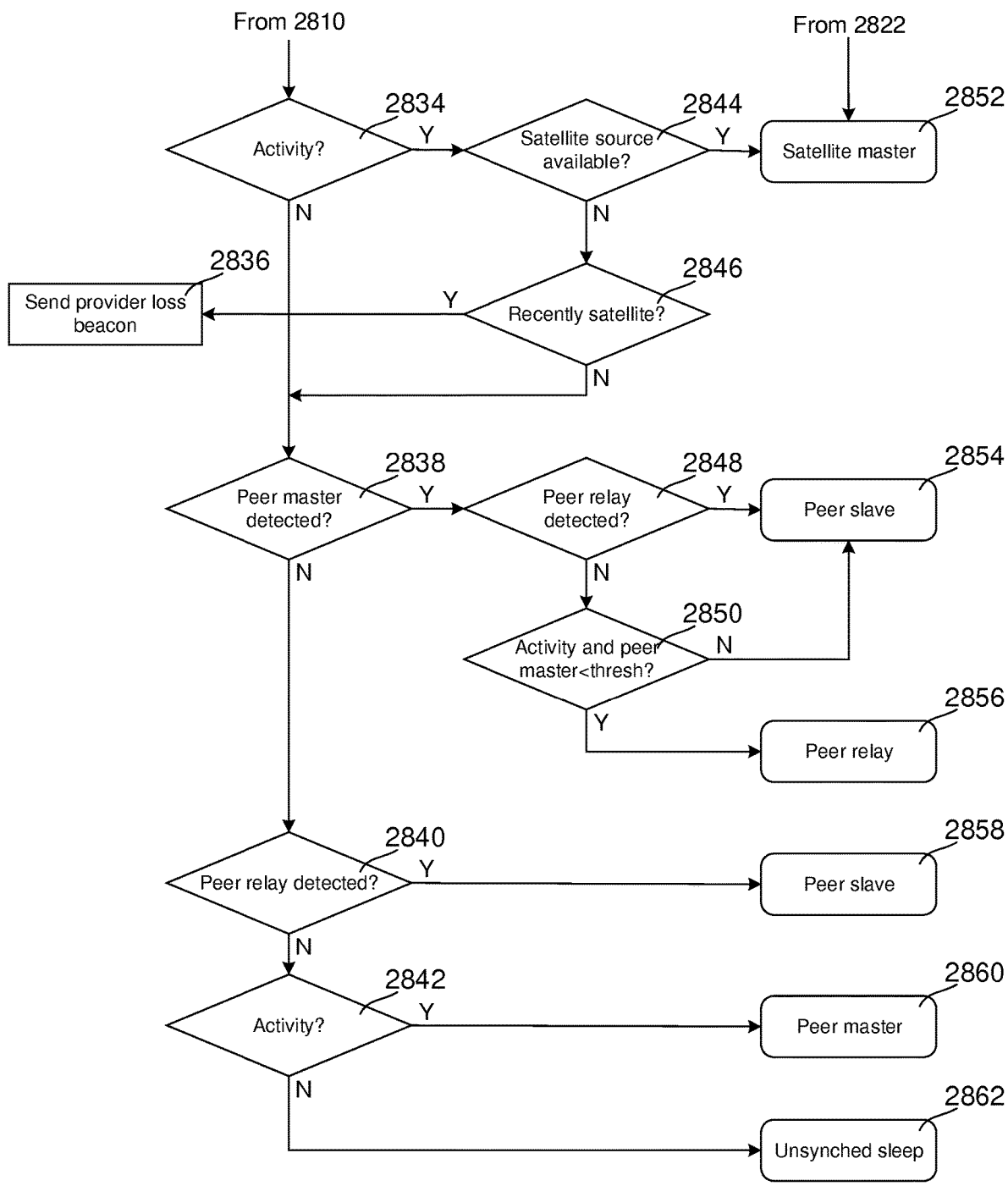

FIGS. 28A and 28B show exemplary flow chart 2800, which describes operations of wireless device 2500 in a slave role according to some aspects. This includes triggering of a provider loss beacon when wireless device 2500 loses coverage from its synchronization provider. As shown in FIG. 28A, wireless device 2500 may start in an unsynchronized state in stage 2802. Satellite receiver 2516 may then search for satellite-based synchronization signals in stage 2804, and may notify sync controller 2512 if any satellite-based synchronization signals are detected. Sync controller 2512 may also search for other synchronization signals in stage 2806. As previously indicated, in some aspects there may be different synchronization signals depending on what synchronization tier the transmitting device is in and what synchronization source the transmitting device is synchronized with. In one example of this, satellite masters may transmit a satellite master synchronization signal, satellite relays may transmit a satellite relay synchronization signal, peer masters may transmit a peer master synchronization signal, and peer relays may transmit a peer relay synchronization signal. Sync controller 2512 may therefore be able to determine what type of synchronization provider is detected based on the type of synchronization signal it transmits (where sync controller 2512 may identify the various types of synchronization signals based on local copies of each).

Sync controller 2512 may then determine whether a synchronization master was detected in stage 2808. If so, sync controller 2512 may determine whether a satellite-based synchronization source is available in stage 2814, or in other words, whether satellite receiver 2516 is able to directly received satellite-based synchronization signals from a satellite-based synchronization source. If so, sync controller 2512 may proceed to stage 2812. In stage 2812, sync controller 2512 may determine whether there is recent activity around wireless device 2500 (e.g., whether the most recent discovery procedure was within a predefined time window of the current time) and whether the signal strength of the satellite master synchronization signal is less than a signal strength threshold. If sync controller 2512 determines that there is recent activity around wireless device 2500 and that the signal strength of the satellite master synchronization signal is less than the signal strength threshold, sync controller 2512 may switch wireless device 2500 into a satellite master role in stage 2826 and therefore begin transmitting satellite master synchronization signals. If not, sync controller 2512 may assume a direct satellite slave role in stage 2824, and may receive satellite-based synchronization signals as well as satellite master synchronization signals.

If no satellite-based synchronization source is available, sync controller 2512 may proceed to stage 2816. In stage 2816, sync controller 2512 may determine whether any satellite relays were detected. If so, sync controller 2512 may enter wireless device 2500 into an indirect satellite slave role, and may therefore use satellite relay synchronization signals to synchronize with the synchronization cluster. If not, sync controller 2512 may proceed to stage 2818, and may determine whether there is recent activity around wireless device 2500 and whether the signal strength of the satellite relay synchronization signal is less than a signal strength threshold. If there is recent activity around wireless device 2500 and the signal strength of the satellite relay synchronization signal is less than the signal strength threshold, sync controller 2512 may enter wireless device 2500 into a satellite relay role in stage 2830, and may use the satellite master synchronization signals to time transmission of its own satellite relay synchronization signals. Conversely, if there is not recent activity around wireless device 2500 or the signal strength of the satellite relay synchronization signal is greater than the signal strength threshold, sync controller 2512 may enter wireless device 2500 into an indirect satellite slave role in stage 2828.

If sync controller 2512 determines that no satellite master was detected in stage 2808, sync controller 2512 may proceed to stage 2810. In stage 2810, sync controller 2512 may determine whether a satellite relay was detected. If yes, sync controller 2512 may proceed to stage 2820. In stage 2820, sync controller 2512 may determine whether a satellite-based synchronization source is available, or in other words, whether satellite receiver 2516 can directly receive satellite-based synchronization signals from a satellite-based synchronization source. If not, sync controller 2512 may enter wireless device 2500 into an indirect satellite slave role, where sync controller 2512 uses the satellite relay synchronization signals to synchronize operation with the synchronization cluster. If there is a satellite-based synchronization source available, sync controller 2512 may determine whether there is recent activity around wireless device 2500. If not, sync controller 2512 may enter wireless device 2500 into an indirect satellite slave role. If there is recent activity around wireless device 2500, sync controller 2512 may proceed to stage 2852 (in FIG. 28B), where sync controller 2512 may enter wireless device 2500 into a satellite master role. Sync controller 2512 may therefore trigger transmission of satellite master synchronization signals (with transmitter 2510) that are aligned in time with the satellite-based synchronization source.

If sync controller 2512 determines that no satellite relay was detected in stage 2810, sync controller 2512 may proceed to stage 2834 (in FIG. 28B). In stage 2834, sync controller 2512 may determine whether there is recent activity around wireless device 2500. If so, sync controller 2512 may proceed to stage 2844 to determine whether there is a satellite-based synchronization source available. If so, sync controller 2512 may enter wireless device 2500 into a satellite master role in stage 2852. If sync controller 2512 determines that there is not a satellite-based synchronization source available in stage 2844, sync controller 2512 may proceed to stage 2846. In stage 2846, sync controller 2512 may determine whether sync controller 2512 recently was synchronized with a satellite master or satellite relay, such as by determining if sync controller 2512 was previously synchronized with a satellite master or satellite relay within a predefined window of the current time. If not, sync controller 2512 may proceed to stage 2836. Conversely, if sync controller 2512 was recently synchronized with a satellite master or satellite relay, this may mean that wireless device 2500 has recently lost coverage of a satellite synchronization provider (e.g., that receipt of synchronization signals was interrupted). Accordingly, sync controller 2512 may trigger transmission of a provider loss beacon in stage 2836. For example, sync controller 2512 may generate a provider loss beacon that specifies either the synchronization tier of wireless device 2500 (the most recent synchronization tier prior to losing coverage of the satellite synchronization provider) or the synchronization tier of the most recent satellite synchronization provider. The provider loss beacon may also specify that wireless device 2500 lost synchronization with a satellite-based synchronization source. Sync controller 2512 may then provide the provider loss beacon to transmitter 2510, which may transmit the provider loss beacon via RF transceiver 2504 and antenna system 2502. Accordingly, if other wireless devices are nearby that are satellite slaves (direct or indirect), one of these wireless devices may receive the provider loss beacon and decide that it is eligible. This wireless device may then assume a satellite master role (if it was a direct satellite slave) or a satellite relay role (if it was an indirect satellite slave), and may provide satellite master or relay synchronization signals for sync controller 2512 to use for synchronization with the synchronization cluster. This may consequently help to avoid cluster segmentation, as wireless device 2500 may remain part of the synchronization cluster instead of being separated from it. Furthermore, after sending the provider loss beacon in stage 2836, wireless device 2500 may return to stage 2806 to repeat the search for synchronization signals. If another wireless device received the beacon and assumed a synchronization provider role, sync controller 2512 may detect the synchronization signals and use these synchronization signals to maintain synchronization with the synchronization cluster.

If sync controller 2512 determines that there is not recent activity around wireless device 2500 in stage 2834, sync controller 2512 may proceed to stage 2838. If sync controller 2512 reaches stage 2838, this may mean that sync controller 2512 was unable to detect any satellite masters or satellite relays. As neither of these higher-priority synchronization sources are available, sync controller 2512 may begin considering peer synchronization providers (peer masters and peer relays). As shown in FIG. 28B, sync controller 2512 may determine whether any peer masters were detected in stage 2838. If so, sync controller 2512 may determine in stage 2848 whether any peer relays were detected. If sync controller 2512 determines that peer relays were detected, sync controller 2512 may enter a peer slave role in stage 2854 and may use the peer master synchronization signals to maintain synchronization with the synchronization cluster. If not, sync controller 2512 may proceed to stage 2850, and may determine whether there is recent activity around wireless device 2500 and whether the signal strength of the peer master synchronization signal is less than a signal strength threshold. If there is recent activity around wireless device 2500 and the signal strength of the peer master synchronization signal is less than a signal strength threshold, sync controller 2512 may enter wireless device 2500 into a peer relay role in stage 2856. Sync controller 2512 may then transmit peer relay synchronization signals that are synchronized with the peer master synchronization signals. Conversely, if sync controller 2512 determines that there is not recent activity around wireless device 2500 or that the signal strength of the peer master synchronization signal is greater than the signal strength threshold, sync controller 2512 may entire wireless device 2500 into a peer slave role in stage 2854.

If sync controller 2512 determined that no peer masters were detected in stage 2838, sync controller 2512 may proceed to stage 2840 and determine whether any peer relays were detected. If peer relays were detected, sync controller 2512 may enter wireless device 2500 into a peer slave role, where sync controller 2512 maintains synchronization with the synchronization cluster with the peer relay synchronization signals.

If no peer relays were detected, sync controller 2512 may proceed to stage 2842 and may determine whether there is recent activity around wireless device 2500. If sync controller 2512 determines that there was recent activity around wireless device 2500, sync controller 2512 may enter wireless device 2500 into a peer master role in stage 2860. Accordingly, sync controller 2512 may trigger transmission of peer master synchronization signals (with transmitter 2510), which sync controller 2512 may synchronize with its own internal device clock (used as the local reference time). This may mean that wireless device 2500 forms its own synchronization cluster. Other wireless devices may then receive these peer master synchronization signals and synchronize themselves with the synchronization cluster.

If sync controller 2512 determines that there was no recent activity around wireless device 2500 in stage 2842, sync controller 2512 may enter wireless device 2500 into an unsynched sleep state in stage 2862. In other words, if there has not been any recent activity around wireless device 2500, there may not be reason for wireless device 2500 to begin broadcasting peer master synchronization signals. Sync controller 2512 may therefore allow the communication system of wireless device 2500 to sleep for a predefined window of time, and may subsequently wake up the communication system to repeat the procedure of flow chart 2800, starting from stage 2802.

As described above regarding stage 2836, transmission of the provider loss beacon may help to prevent cluster segmentation, as other wireless devices may be able to transition into synchronization provider roles and consequently help to keep wireless device 2500 in the cluster. This may help avoid gaps in the synchronization cluster and keep wireless devices as part of the synchronization cluster where they otherwise would have been separated.

Figure 29:
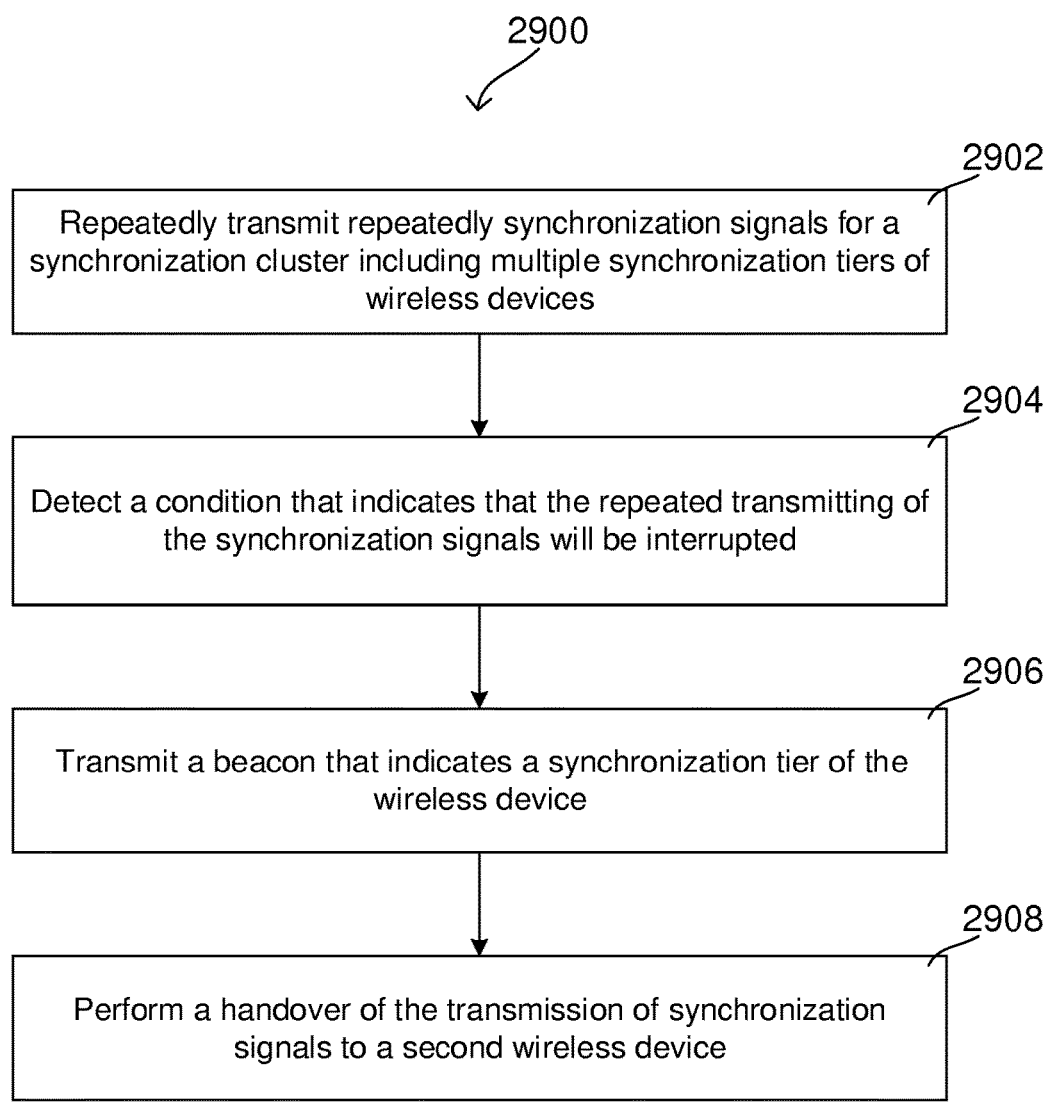
FIGS. 29-31 show exemplary methods of performing wireless communications according to some aspects.

FIG. 29 shows exemplary method 2900 of performing communications at a wireless device according to some aspects. As shown in FIG. 29, method 2900 includes repeatedly transmitting synchronization signals for a synchronization cluster including multiple synchronization tiers of wireless devices (2902), detecting a condition that indicates that the repeated transmitting of the synchronization signals will be interrupted (2904), transmitting a beacon that indicates a synchronization tier of the wireless device (2906), and performing a handover of the transmission of synchronization signals to a second wireless device (2908).

Figure 30:
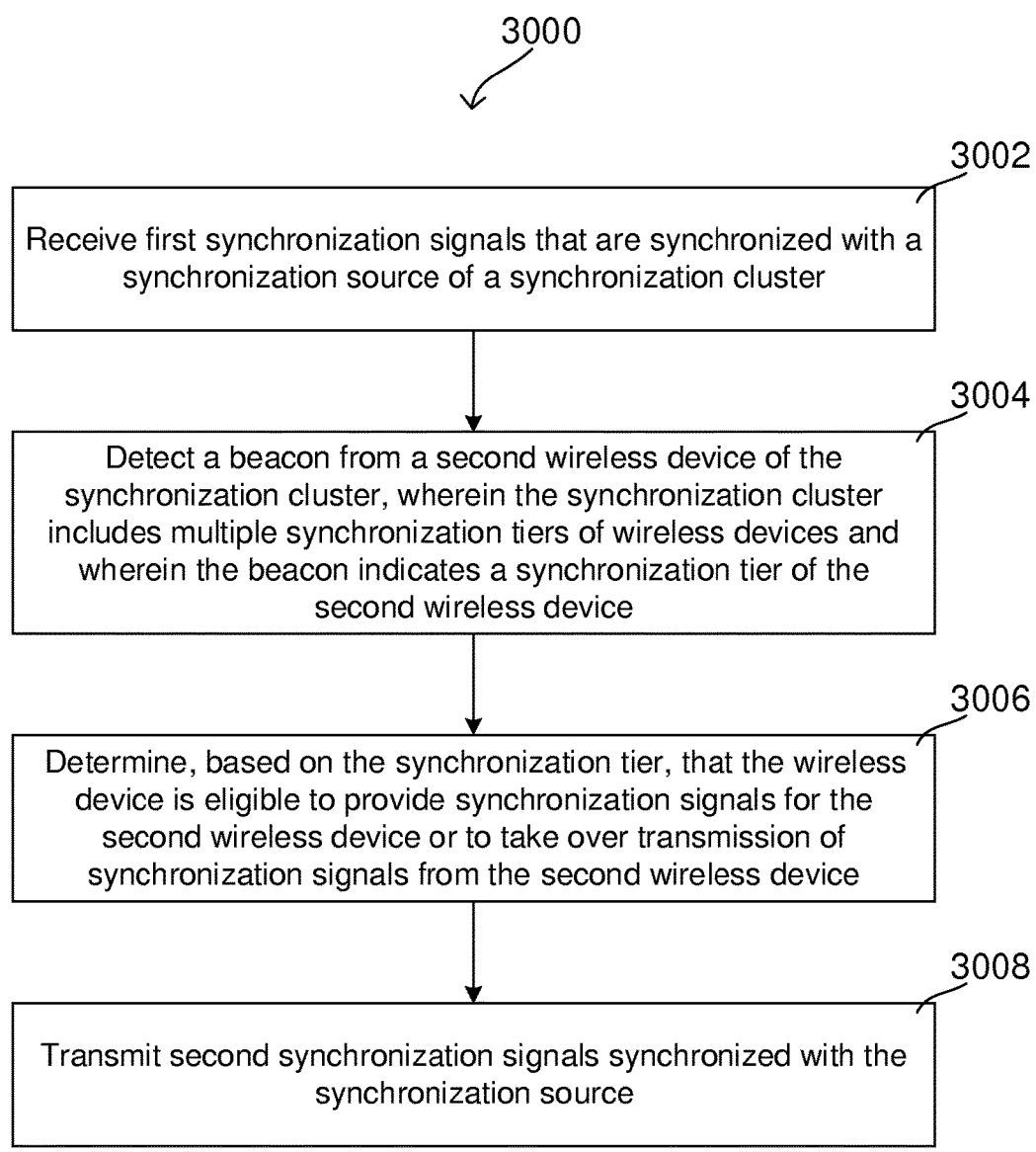

FIG. 30 shows exemplary method 3000 of performing communications at a wireless device according to some aspects. As shown in FIG. 30, method 3000 includes receiving first synchronization signals that are synchronized with a synchronization source of a synchronization cluster (3002), detecting a beacon from a second wireless device of the synchronization cluster (3004), wherein the synchronization cluster includes multiple synchronization tiers of wireless devices and wherein the beacon indicates a synchronization tier of the second wireless device, determining, based on the synchronization tier, that the wireless device is eligible to provide synchronization signals for the second wireless device or to take over transmission of synchronization signals from the second wireless device (3006), and transmitting second synchronization signals synchronized with the synchronization source (3008).

Figure 31:
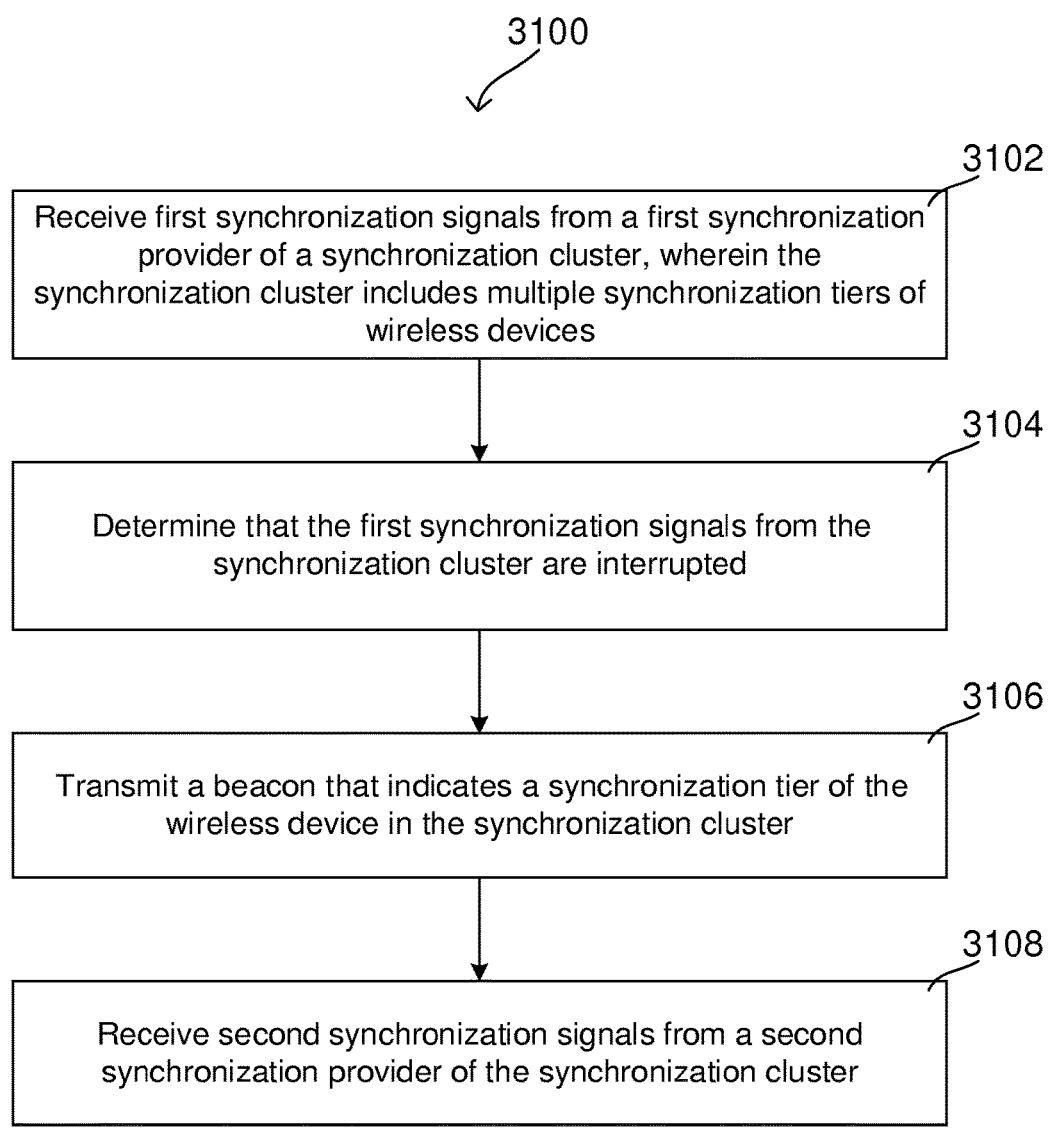

FIG. 31 shows exemplary method 3100 of performing communications at a wireless device according to some aspects. As shown in FIG. 31, method 3100 includes receiving first synchronization signals from a first synchronization provider of a synchronization cluster (3102), wherein the synchronization cluster includes multiple synchronization tiers of wireless devices, determining that the first synchronization signals from the synchronization cluster are interrupted (3104), transmitting a beacon that indicates a synchronization tier of the wireless device in the synchronization cluster (3106), and receiving second synchronization signals from a second synchronization provider of the synchronization cluster (3108).

In some aspects, wireless device 2500 can be characterized as including a transmitter (e.g., transmitter 2510) configured to transmit synchronization signals for a synchronization cluster including multiple synchronization tiers of wireless devices, and a sync controller (e.g., sync controller 2512) configured to detect a condition that indicates that the transmitting of the synchronization signals will be interrupted, the transmitter further configured to transmit a beacon that indicates a synchronization tier of the wireless device, and the sync controller configured to perform a handover of the transmitting of synchronization signals to a second wireless device.

In some aspects, wireless device 2500 can be characterized as including a receiver (e.g., receiver 2508 or satellite receiver 2516) configured to receive synchronization signals that are synchronized with a synchronization source of a synchronization cluster, a sync controller (e.g., sync controller 2512) configured to detect a beacon from a second wireless device of the synchronization cluster, wherein the synchronization cluster includes multiple synchronization tiers of wireless devices and wherein the beacon indicates a synchronization tier of the second wireless device, and to determine, based on the synchronization tier, that the wireless device is eligible to provide synchronization signals for the second wireless device or to take over transmission of synchronization signals from the second wireless device, and a transmitter (e.g., transmitter 2510) configured to transmit second synchronization signals synchronized with the synchronization source.

In some aspects, wireless device 2500 can be characterized as a wireless device including a receiver (e.g., receiver 2508) configured to receive first synchronization signals from a first synchronization provider of a synchronization cluster, wherein the synchronization cluster includes multiple synchronization tiers of wireless devices, a sync controller (e.g., sync controller 2512) configured to determine that the first synchronization signals from the synchronization cluster are interrupted, and a transmitter (e.g., transmitter 2510) configured to transmit a beacon that indicates a synchronization tier of the wireless device in the synchronization cluster, the receiver further configured to receive second synchronization signals from a second synchronization provider of the synchronization cluster.

As described in various aspects above, synchronization may be an important feature of decentralized or ad-hoc networks, such as D2D networks. In the example introduced in FIG. 3, synchronization providers (synchronization masters and relays) may broadcast synchronization signals for a synchronization cluster, and synchronization users (synchronization relays and slaves) may receive and use these synchronization signals to maintain synchronization with the synchronization cluster. FIGS. 25-31 also described aspects where synchronization providers and users may transmit beacons to trigger handovers when a synchronization provider is lost or needs to suspend broadcast of synchronization signals.

In some aspects, wireless devices in a synchronization cluster may additionally or alternatively be configured to trigger handovers based on synchronization quality information. For example, synchronization providers and users may be configured to exchange synchronization quality information that indicates the reliability or accuracy of the synchronization, and may decide to trigger handovers based on the synchronization quality information. Similar to aspects described above in FIGS. 25-31, wireless devices may use beacons to trigger these handovers.

Figure 32:
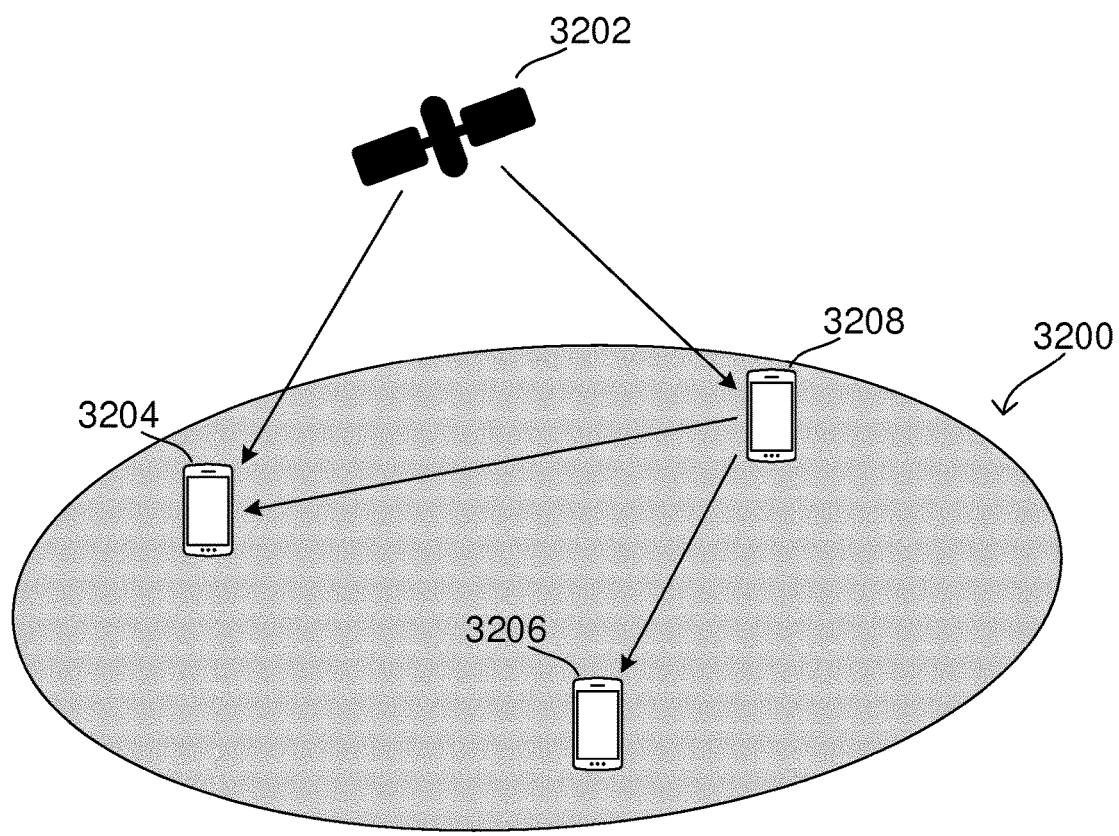

FIG. 32 shows an exemplary scenario used below to describe such handover beacons according to some aspects. As shown in FIG. 32, satellite-based synchronization source 3202 may broadcast satellite-based synchronization signals (e.g., GNSS signals) synchronized with a universal reference time (e.g., GPS time or UTC time extracted from constellation timing information, where each constellation has its own time base). Wireless devices 3204 and 3208 may receive these satellite-based synchronization signals and use them to align their own local reference times (e.g., tracked with their respective internal device clocks) with the universal reference time.

As shown in FIG. 32, wireless devices 3204-3208 may form synchronization cluster 3200. For example, wireless device 3208 may assume a synchronization master role and broadcast master synchronization signals for synchronization cluster 3200. Wireless devices 3204 and 3206 may receive these synchronization signals and use them to maintain synchronization with synchronization cluster 3200. Wireless device 3204 may also receive the satellite-based synchronization signals directly from satellite-based synchronization source 3202, and may therefore be a direct satellite slave that also receives master synchronization signals from wireless device 3208. Wireless device 3206 may not be able to receive the satellite-based synchronization signals directly from satellite-based synchronization source 3202 but may receive the master synchronization signals from wireless device 3208. Wireless device 3206 may therefore be an indirect satellite slave. Although not explicitly shown in FIG. 32, additional wireless devices may operate as part of synchronization cluster 3200 and may rely on the synchronization signals from wireless device 3208 (either directly or via synchronization relays) for synchronization with synchronization cluster 3200.

Wireless device 3208 may therefore act as a synchronization provider for synchronization cluster 3200. However, as time progresses and the positioning, environment (e.g., channel conditions, interference and other obstacles that can obstruct reception of satellite signals), and availability of the wireless devices dynamically change, the synchronization provided by wireless device 3208 may become less reliable. For example, the satellite link between satellite-based synchronization source 3202 and wireless device 3208 may degrade, and wireless device 3208 may not be able to accurately maintain its synchronization with satellite-based synchronization source 3202. In another example, environmental changes such as temperature shifts may negatively impact the accuracy of the internal device clock (e.g., the local oscillator) of wireless device 3208, which can impede its ability to maintain accurate time between satellite-based synchronization signal receptions. In a further example, the positioning of wireless device 3208 relative to the other wireless devices in synchronization cluster 3200 may change and prevent wireless device 3208 from reliably delivering synchronization signals to the other peer wireless devices (e.g., may have unacceptably low received signal strength). In an additional example, the battery power of wireless device 3208 may become depleted and prevent wireless device 3208 from broadcasting synchronization signals for an extended period of time.

Accordingly, in various aspects the wireless devices of a synchronization cluster may exchange synchronization quality information with each other that indicates whether any of these factors could impact the ability of a synchronization provider to deliver synchronization signals to the synchronization users. If so, a wireless device may transmit a handover beacon that requests for the synchronization provider to transfer its synchronization provider role to another wireless device. This can help improve the accuracy and reliability of synchronization and prevent cluster segmentation.

Figure 33:
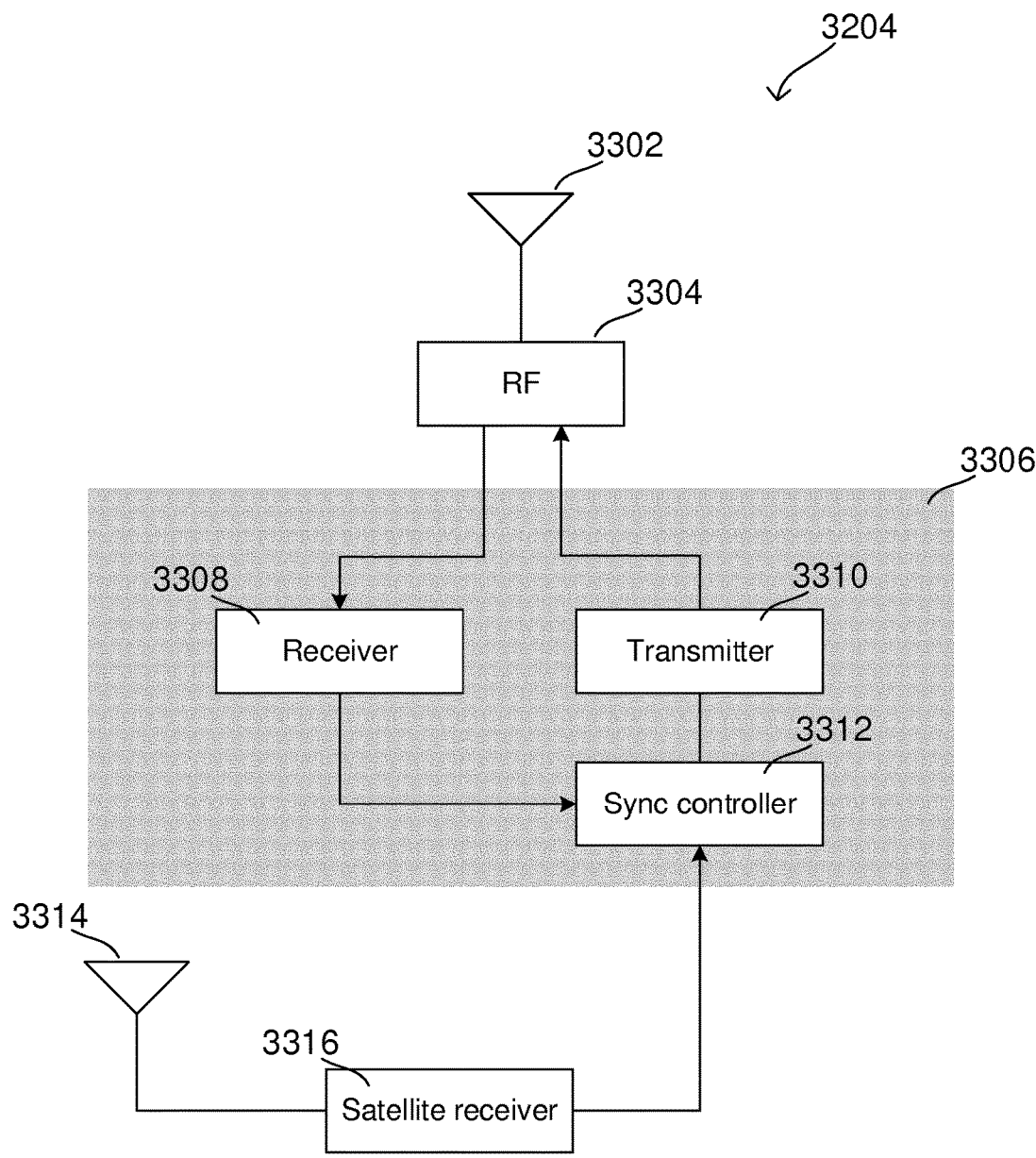
FIGS. 33 and 34 show exemplary internal configurations of wireless devices for handover beacon transmission and reception according to some aspects.
Figure 34:
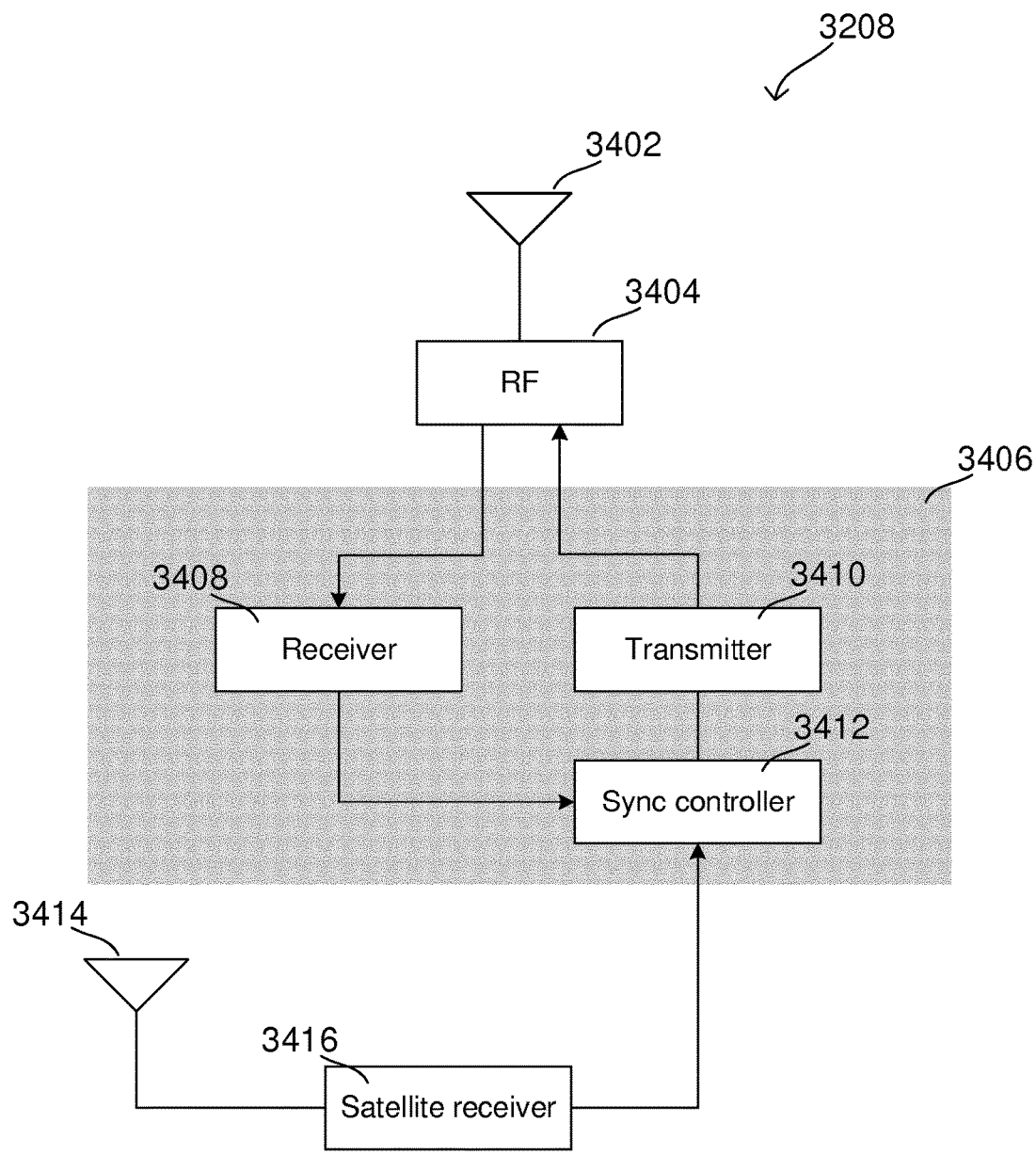

FIGS. 33 and 34 show exemplary internal configurations of wireless devices 3204 and 3208 according to some aspects. The configurations shown in FIGS. 33 and 34 are focused on the handover beacon features of wireless devices 3204 and 3208 and therefore may not expressly depict other components of wireless devices 3204 and 3208 that are less directly related to handover beacons. Accordingly, in various aspects wireless device 3204 and/or wireless device 3208 may include various other components. Furthermore, while the following description may focus on wireless device 3204 in a synchronization user role and wireless device 3208 in a synchronization provider role, in some aspects wireless device 3204 may also be configured with the structure and functionality of wireless device 3208 and/or wireless device 3208 may be configured with the structure and functionality of wireless device 3204.

Starting with FIG. 33, wireless device 3204 may include antenna system 3302, RF transceiver 3304, and baseband modem 3306. In some aspects, antenna system 3302, RF transceiver 3304, and baseband modem 3306 may be configured as described above for antenna system 202, RF transceiver 204, and baseband modem 206 of terminal device 102. Accordingly, wireless device 3204 may be configured to transmit and receive wireless signals via antenna system 3302 and RF transceiver 3304. In the transmit direction, RF transceiver 3304 may therefore modulate and transmit baseband samples (provided by baseband modem 3306) via antenna system 3302. In the receive direction, RF transceiver 3304 may also receive and demodulate radio signals via antenna system 3302 and provide the resulting baseband samples to baseband modem 3306.

FIG. 33 also depicts several internal components of baseband modem 3306, including receiver 3308, transmitter 3310, and sync controller 3312. In some aspects, baseband modem 3306 may include a digital signal processor and a protocol controller. Receiver 3308, transmitter 3310, and sync controller 3312 may therefore be subcomponents of the digital signal processor (e.g., physical layer components) and/or subcomponents of the protocol controller (e.g., protocol stack components). In some aspects, receiver 3308 may be the physical layer receive path while transmitter 3310 may be the physical layer transmit path. For example, receiver 3308 may include a demodulator, demapper (e.g., constellation demapper), de-interleaver, decoder, and/or descrambler. Receiver 3308 may receive wireless signals in the form of baseband samples via antenna system 3302 and RF transceiver 3304. Receiver 3308 may then sequentially process these baseband samples with the demodulator, demapper (e.g., constellation demapper), de-interleaver, decoder, and/or descrambler to produce a bitstream, which receiver 3308 may provide to the protocol stack of wireless device 3300 (e.g., to protocol stack layers of baseband modem 3306). Transmitter 3310 may include a scrambler, encoder, interleaver, mapper (e.g., constellation mapper), and/or a modulator, which may sequentially process a bitstream (e.g., provided by protocol stack layers of baseband modem 2506) to produce baseband samples (e.g., complex IQ symbols).

Transmitter 3310 may then transmit these baseband samples as wireless signals via RF transceiver 3304 and antenna system 3302. Sync controller 3312 may be a processor configured to execute instructions that define the synchronization operations of wireless device 3300, including the transmission and reception of synchronization signal as well as obtaining and maintaining synchronization over time. Sync controller 3312 may also be configured to provide synchronization signals to transmitter 3310 for broadcast to other wireless devices of the synchronization cluster, where sync controller 3312 may align the timing of these broadcasts with a universal reference time of the synchronization cluster. Sync controller 3312 may provide control signals to receiver 3308, transmitter 3310, and RF transceiver 3304 that control receiver 3308, transmitter 3310, and RF transceiver 3304 to transmit and receive with the correct time and frequency references. In some aspects, sync controller 3312 may also include physical layer components, such as detection circuits or processors configured to detect synchronization signals in sample streams provided by receiver 3308.

As shown in FIG. 33, wireless device 3300 may also include satellite antenna system 3314 (including one or more antennas) and satellite receiver 3316. Satellite receiver 3316 may be configured to receive satellite signals, such as from GNSS satellites, via satellite antenna system 3314. Satellite receiver 3316 may be configured to process the receives satellite signals to determine a satellite time (e.g., GPS time) and/or a geographic location of wireless device 3300. Satellite receiver 3316 may provide the satellite time to sync controller 3312, which may use the satellite signals as a satellite-based synchronization source. Accordingly, sync controller 3312 may use the satellite signals to align the local reference time of wireless device 3300 (e.g., its internal device clock) with the satellite time, where the satellite time may act as the universal reference time. Sync controller 3312 may then align transmission of synchronization signals with the satellite-aligned local reference time, and may therefore align the synchronization of the entire synchronization cluster with the satellite-based synchronization source.

As shown in FIG. 34, wireless device 3208 may be configured in a similar manner to wireless device 3204. In particular, wireless device 3208 may include antenna system 3302, RF transceiver 3304, and baseband modem 3306. In some aspects, antenna system 3302, RF transceiver 3304, and baseband modem 3306 may be configured as described above for antenna system 202, RF transceiver 204, and baseband modem 206 of terminal device 102. Accordingly, wireless device 3208 may be configured to transmit and receive wireless signals via antenna system 3302 and RF transceiver 3304. In the transmit direction, RF transceiver 3304 may therefore modulate and transmit baseband samples (provided by baseband modem 3306) via antenna system 3302. In the receive direction, RF transceiver 3304 may also receive and demodulate radio signals via antenna system 3302 and provide the resulting baseband samples to baseband modem 3306.

FIG. 33 also depicts several internal components of baseband modem 3306, including receiver 3308, transmitter 3310, and sync controller 3312. In some aspects, baseband modem 3306 may include a digital signal processor and a protocol controller. Receiver 3308, transmitter 3310, and sync controller 3312 may therefore be subcomponents of the digital signal processor (e.g., physical layer components) and/or subcomponents of the protocol controller (e.g., protocol stack components). In some aspects, receiver 3308 may be the physical layer receive path while transmitter 3310 may be the physical layer transmit path. For example, receiver 3308 may include a demodulator, demapper (e.g., constellation demapper), de-interleaver, decoder, and/or descrambler. Receiver 3308 may receive wireless signals in the form of baseband samples via antenna system 3302 and RF transceiver 3304. Receiver 3308 may then sequentially process these baseband samples with the demodulator, demapper (e.g., constellation demapper), de-interleaver, decoder, and/or descrambler to produce a bitstream, which receiver 3308 may provide to the protocol stack of wireless device 3300 (e.g., to protocol stack layers of baseband modem 3306). Transmitter 3310 may include a scrambler, encoder, interleaver, mapper (e.g., constellation mapper), and/or a modulator, which may sequentially process a bitstream (e.g., provided by protocol stack layers of baseband modem 2506) to produce baseband samples (e.g., complex IQ symbols).

Transmitter 3310 may then transmit these baseband samples as wireless signals via RF transceiver 3304 and antenna system 3302. Sync controller 3312 may be a processor configured to execute instructions that define the synchronization operations of wireless device 3300, including the transmission and reception of synchronization signal as well as obtaining and maintaining synchronization over time. Sync controller 3312 may also be configured to provide synchronization signals to transmitter 3310 for broadcast to other wireless devices of the synchronization cluster, where sync controller 3312 may align the timing of these broadcasts with a universal reference time of the synchronization cluster. Sync controller 3312 may provide control signals to receiver 3308, transmitter 3310, and RF transceiver 3304 that control receiver 3308, transmitter 3310, and RF transceiver 3304 to transmit and receive with the correct time and frequency references. In some aspects, sync controller 3312 may also include physical layer components, such as detection circuits or processors configured to detect synchronization signals in sample streams provided by receiver 3308.

As shown in FIG. 33, wireless device 3300 may also include satellite antenna system 3314 (including one or more antennas) and satellite receiver 3316. Satellite receiver 3316 may be configured to receive satellite signals, such as from GNSS satellites, via satellite antenna system 3314. Satellite receiver 3316 may be configured to process the received satellite signals to determine a satellite time (e.g., GPS time) and/or a geographic location of wireless device 3300. Satellite receiver 3316 may provide the satellite time to sync controller 3312, which may use the satellite signals as a satellite-based synchronization source. Accordingly, sync controller 3312 may use the satellite signals to align the local reference time of wireless device 3300 (e.g., its internal device clock) with the satellite time, where the satellite time may act as the universal reference time. Sync controller 3312 may then align transmission of synchronization signals with the satellite-aligned local reference time, and may therefore align the synchronization of the entire synchronization cluster with the satellite-based synchronization source.

Figure 35:
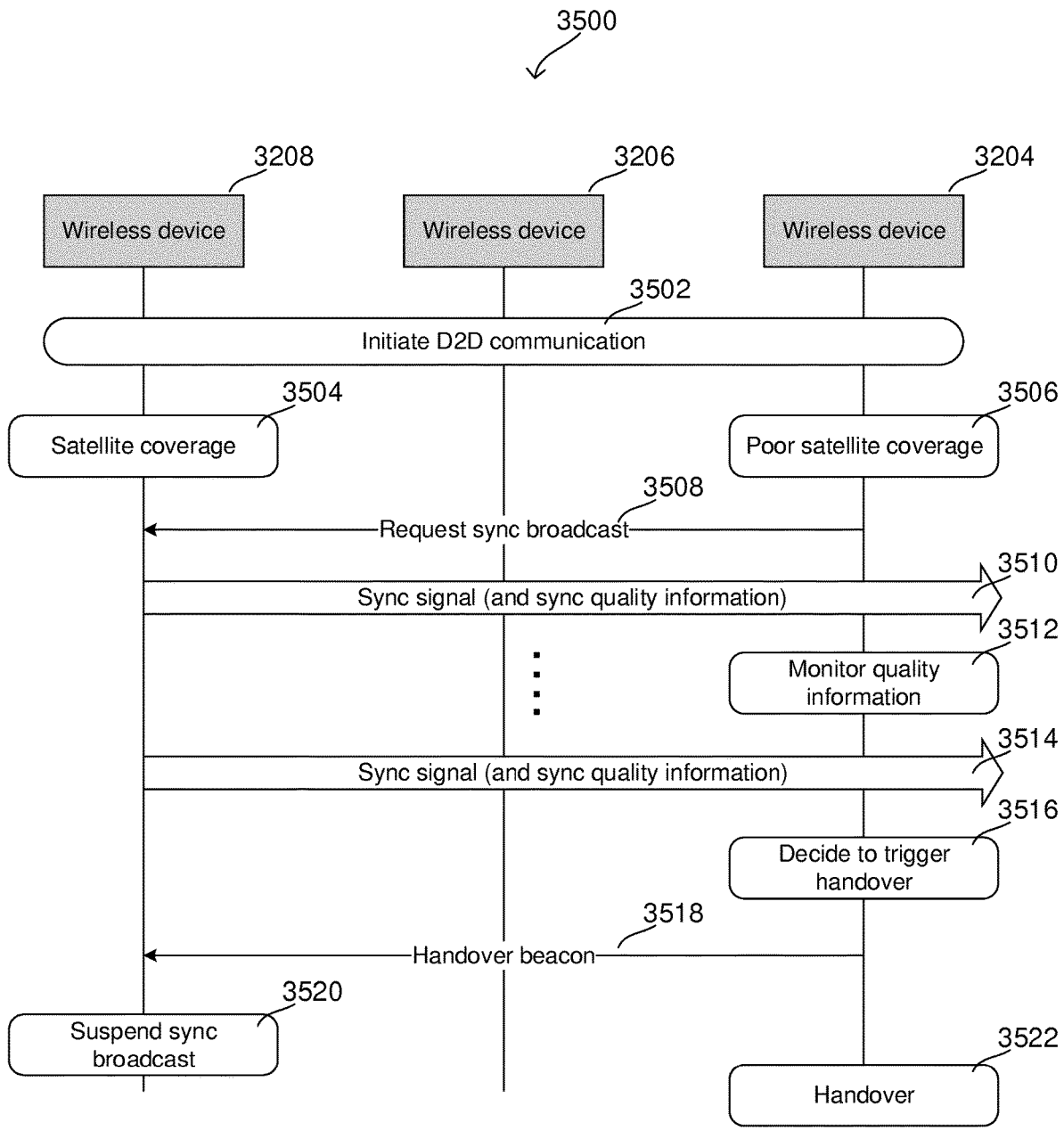
FIG. 35 shows an exemplary message sequence chart for handover beacons triggered by synchronization users according to some aspects.

FIGS. 35-38 will now be used to describe the handover beacon features of wireless devices 3204 and 3208 according to some aspects. Starting first with FIG. 35, FIG. 35 shows exemplary message sequence chart 3500 describing synchronization user-triggered handover beacons according to some aspects. As shown in FIG. 35, wireless devices 3204-3208 may first initiate D2D communications in stage 3502. This can include a synchronization and discovery procedure during which wireless devices 3204-3208 initiate synchronization cluster 3200. In some aspects, wireless devices 3204-3208 may also perform data communications with each other, such as by transmitting and receiving user-plane data with their respective transmitters and receivers.

As shown in FIG. 35, wireless device 3208 may initially have strong satellite coverage in stage 3504. For example, satellite receiver 3416 may be able to receive the satellite-based synchronization signals from satellite-based synchronization source 3202 (via satellite antenna system 3414) with sufficient signal strength to track the satellite-based synchronization signals. Conversely, wireless device 3204 may have poor satellite coverage in stage 3506, such as where satellite receiver 3316 is unable to receive the satellite-based synchronization signals from satellite-based synchronization source 3202 (via satellite antenna system 3314) with sufficient signal strength to track the satellite-based synchronization signals. In other words, wireless device 3208 may be able to reliably use the direct satellite-based synchronization signals for synchronization while wireless device 3204 may not be able to.

In some aspects, satellite receiver 3316 of wireless device 3204 may notify sync controller 3312 that direct satellite-based synchronization is not available. Sync controller 3312 may then determine that wireless device 3204 is ineligible to operate as a satellite master. Similarly, satellite receiver 3416 of wireless device 3208 may notify sync controller 3312 that direct satellite-based synchronization is not available. Sync controller 3312 may then determine that wireless device 3204 is ineligible to operate as a satellite master.

In some aspects, wireless device 3204 may then request a synchronization signal broadcast in stage 3508. For example, sync controller 3312 may generate a sync broadcast request message that requests for another wireless device to assume a synchronization master role. Sync controller 3312 may then provide the sync broadcast request message to transmitter 3510, which may transmit the sync broadcast request message in a scheduled time slot. Receiver 3408 of wireless device 3208 may then receive the sync broadcast request message and provide it to sync controller 3412. Sync controller 3412 may then assume a synchronization master role (e.g., a satellite master role) and begin broadcasting synchronization signals in stage 3510.

In other aspects, wireless device 3204 may not transmit a sync broadcast request message, and wireless device 3208 may instead perform a synchronization master handover procedure before assuming the synchronization master role. This synchronization master handover procedure may apply both when there is no existing synchronization master (e.g., during cluster initialization) or when the previous synchronization master leaves its synchronization master role. For example, sync controller 3412 may determine that wireless device 3208 is eligible to become a synchronization master (e.g., due to satellite receiver 3416 receiving the satellite-based synchronization signals with sufficient signal strength). Sync controller 3412 may then perform a random competition handover procedure, such as by pseudo-randomly selecting a backoff timer and initiating the backoff timer. Sync controller 3412 may monitor for other synchronization signals (in a sample stream provided by receiver 3408) during the backoff timer. If sync controller 3412 detects another synchronization signal before the backoff timer expires, this may mean that another eligible wireless device selected a shorter backoff timer, and therefore has assumed the synchronization master role. If sync controller 3412 does not detect another synchronization signal during the backoff timer, sync controller 3412 may assume the synchronization master role and instruct transmitter 3410 to begin transmitting synchronization signals (e.g., in time slots scheduled for synchronization signal broadcast).

In either case, in the example of FIG. 35 wireless device 3208 may assume the synchronization master role and begin broadcasting synchronization signals in stage 3510. As previously described, sync controller 3412 may control the transmission timing of the synchronization signals to align with certain timings of a slotted communication schedule, such as by controlling transmitter 3410 to transmit the synchronization signals in certain time slots.

The other wireless devices in synchronization cluster 3200 may be synchronization users, and may directly or indirectly receive these synchronization signals and use their timing to align their local reference times with wireless device 3208. For example, sync controller 3312 of wireless device 3204 may detect the synchronization signals in the sample stream provided by receiver 3308 and instruct transmitter 3310 and receiver 3308 to align their time slots with the timing. As all wireless devices in synchronization cluster 3200 may align their time slots with wireless device 3208, the wireless devices may be able to transmit and receive with each other in a synchronized manner.

In the case of FIG. 35, synchronization users may be configured to monitor the synchronization quality information provided by wireless device 3208 and to determine whether to request a handover. As indicated in FIG. 35, in some aspects wireless device 3208 may broadcast synchronization quality information to the synchronization users, including wireless device 3204, which the synchronization users may use to determine whether to request a handover.

This synchronization quality information can be any type of information that indicates the accuracy or reliability of the synchronization provided by wireless device 3208. As previously introduced, factors such as poor satellite link, internal oscillator accuracy, poor peer link, or low battery power may impact the ability of wireless device 3208 to deliver accurate synchronization to the synchronization users. In some aspects, sync controller 3412 of wireless device 3208 may be configured to obtain synchronization quality information for transmission to the synchronization users. For example, satellite receiver 3416 may be configured to perform a signal strength measurement (or other wireless satellite measurement) on the satellite-based synchronization signals received from satellite-based synchronization source 3202. Satellite receiver 3416 may provide this signal strength measurement to sync controller 3412, where the signal strength measurement may synchronization quality information about the satellite link. In another example, satellite receiver 3416 may determine other information that approximates the accuracy of the satellite-based synchronization signals and provide this information to sync controller 3412 as synchronization quality information. For example, satellite receiver 3416 may approximate the accuracy based on the motion of wireless device 3208 relative to satellite-based synchronization source 3202, which may contribute to Doppler effect and lead to inaccuracy.

In another example, sync controller 3412 may be configured to approximate the internal oscillator accuracy and use this as synchronization quality information. For instance, environmental changes like temperature shifts may affect the local oscillator of the internal device clock of wireless device 3208. Sync controller 3412 may therefore use a predefined temperature vs. oscillator drift curve to approximate the local oscillator accuracy (e.g., in terms of frequency drift) and use this as synchronization quality information.

In another example, receiver 3408 may be configured to perform a signal strength measurement (or other radio measurement) on wireless signals received from other wireless devices in synchronization cluster 3200. Receiver 3408 may provide these signal strength measurements to sync controller 3412, which may use them as synchronization quality information.

In another example, an application layer of wireless device 3208 (e.g, running on an application processor that interfaces with baseband modem 3406) may be configured to provide sync controller 3412 with a remaining battery power level of wireless device 3208. Sync controller 3412 may then use this remaining battery power level as synchronization quality information.

In various aspects, sync controller 3412 may use some or all of these factors as synchronization quality information. Sync controller 3412 may then control transmitter 3410 to transmit the synchronization quality information to the synchronization users of synchronization cluster 3200. In some aspects, sync controller 3412 may include the synchronization quality information as a payload of the synchronization signals that are transmitted by transmitter 3410. For example, sync controller 3412 may generate a synchronization signal (for a given time slot) that includes a first section with the synchronization signal sequence (e.g., a predefined signal sequence of a plurality of symbols spread across one or more subcarriers) and a second section with the synchronization quality information. The second section may be a payload that includes one or more fields that each include one parameter of the synchronization quality information (e.g., any of a field for satellite link signal strength, a field for local oscillator accuracy, a field for a peer link signal strength, a field for remaining battery power level, and so forth). The arrangement of fields in the second section may be predefined in a manner that is known a priori to synchronization users, and synchronization users may therefore be able to decode the second section and identify the individual parameters of the synchronization quality information. After generating the synchronization signal, sync controller 3412 may provide the synchronization signal to transmitter 3410 for transmission. Transmitter 3410 may then transmit the synchronization signal (including the synchronization quality information), such as in stage 3510. In some aspects, sync controller 3412 may periodically transmit synchronization signals that include the synchronization quality information while periodically transmitting synchronization signals that do not include synchronization quality information at other times.

In another example, wireless device 3208 may transmit the synchronization quality information separate from the synchronization signal. For example, sync controller 3412 may generate and provide the synchronization signal to transmitter 3410 for transmission. Sync controller 3412 may then generate a synchronization quality message that include the synchronization quality information, such as a message with a payload that includes one or more fields that each include one parameter of the synchronization quality information (e.g., any of a field for satellite link signal strength, a field for local oscillator accuracy, a field for a peer link signal strength, a field for remaining battery power level, and so forth). The arrangement of fields in the synchronization quality message may be predefined in a manner that is known a priori to synchronization users, and synchronization users may therefore be able to decode the payload and identify the individual parameters of the synchronization quality information. Sync controller 3412 may then provide the synchronization quality message to transmitter 3410, which may transmit the synchronization quality message in a scheduled slot or slots. Synchronization users may know a priori when the synchronization quality message is scheduled for transmission, and may therefore be able to detect and evaluate the synchronization quality message.

In another example, a plurality of synchronization signals may be predefined, where the synchronization signals correspond to a different synchronization quality level. In other words, the format of a given synchronization signal (e.g., which of the predefined plurality of synchronization signals it is) may represent a specific synchronization quality level. For example, a first synchronization signal (e.g., a synchronization signal having a first format, such as being based on a first signal sequence) may correspond to synchronization quality level $QSS_1$, a second synchronization signal (e.g., a synchronization signal having a second format, such as being based on a second signal sequence) may correspond to synchronization quality level $QSS_2$, a third synchronization signal (e.g., a synchronization signal having a third format, such as being based on a third signal sequence) may correspond to synchronization quality level $QSS_3$, and so forth for each of synchronization quality levels $QSS_x$ (x=1, . . . , N, where N is the total number of synchronization quality levels). The synchronization quality levels $QSS_x$ may then represent a range of different synchronization quality levels, such as where $QSS_1$ is the highest synchronization quality level, $QSS_2$ is the second-highest synchronization quality level, $QSS_3$ is the third-highest synchronization quality level, and so forth.

Wireless device 3208 may then transmit the synchronization quality information by transmitting one of the synchronization signals based on the synchronization quality information of wireless device 3208. For example, after obtaining the synchronization quality information, sync controller 3412 may determine the synchronization quality level based on the synchronization quality information. Sync controller 3412 may then select the synchronization signal (from the plurality of synchronization signals) corresponding to the synchronization quality level and provide this synchronization signal to transmitter 3410 for transmission. Transmitter 3412 may then transmit the synchronization signal in stage 3510. Because the synchronization signal represents a particular synchronization quality level (via its format), wireless device 3208 may transmit a synchronization signal and synchronization quality information in stage 3510.

In some aspects using synchronization quality levels, sync controller 3412 may be configured to select the synchronization quality level based on various thresholds. For example, sync controller 3412 may be configured to compare the synchronization quality information to one or more thresholds, and may select the synchronization quality level based on which of the one or more thresholds the synchronization quality information is greater than. The thresholds paired with the highest synchronization quality levels may be more restrictive (e.g., represent better synchronization quality) than thresholds paired with other synchronization quality levels. In other cases, sync controller 3412 may be configured to use a weighting scheme to weight each of its reference synchronization quality parameters and obtain a weighted output as the sum of the weighted parameters. The weight applied to each synchronization quality parameter may depend on the priority of that parameter, such as where satellite signal strength and local oscillator accuracy are given higher priority and thus higher weights. In some aspects, the weights for each respective synchronization quality parameter can be assigned statically (e.g., by a characterization process) or dynamically (e.g., by minimizing a cost function such as the drift uncertainty). The weighted output for each wireless device may therefore provide an overall characterization of its synchronization quality. After obtaining the weighted output, sync controller 3412 may compare the weighted output to a plurality of thresholds, each paired to a respective synchronization quality level. Sync controller 3412 may then identify the highest threshold that the weighted output is greater than, and may select the synchronization quality level matched with this threshold. Sync controller 3412 may then select the synchronization signal matched with this synchronization quality level. Accordingly, when the weighted output is higher, the synchronization quality level provided by wireless device 3208 is also higher. Wireless device 3208 may then transmit a synchronization signal that indicates a higher synchronization quality level. While wireless device 3208 may not explicitly transmit the synchronization quality information, wireless device 3208 may still transmit the synchronization quality information by way of transmitting a synchronization signal that indicates the synchronization quality information (e.g., that represents the synchronization quality level with its format). As shown in stages 3510 and 3514, wireless device 3208 may repeatedly transmit the synchronization signal and synchronization quality information (e.g., as a payload, separately, or with a synchronization signal that indicates the synchronization quality information). Wireless device 3204 (and other synchronization users) may be configured to monitor for the synchronization signals and synchronization quality information in stage 3512. For example, sync controller 3312 of wireless device 3204 may monitor the sample stream provided by receiver 3308 to detect synchronization signals and/or synchronization quality messages. Sync controller 3312 may use the timing of the synchronization signals to align transmission and reception of wireless device 3204 with wireless device 3208. Sync controller 3312 may also identify the synchronization quality information. For example, in some aspects sync controller 3312 may identify the second section of the synchronization signals, which may include the synchronization quality information as a payload. Sync controller 3312 may then read the synchronization quality information from the second section. In another example, sync controller 3312 may identify a synchronization quality message and read the synchronization quality information from the synchronization quality message. In another example, sync controller 3312 may identify which of the predefined synchronization signals matches with the detected synchronization signal, such as by comparing the received synchronization signal to the predefined plurality of synchronization signals (that correspond to different synchronization quality levels) and identifying which of the predefined plurality of synchronization signals matches the received synchronization signal. Sync controller 3312 may then determine which synchronization quality level $QSS_x$ is matched with the detected synchronization signal. This synchronization quality level may therefore indicate the synchronization quality information. For example, if the synchronization quality level is $QSS_1$, sync controller 3312 may determine that the synchronization quality information for wireless device 3208 is high; conversely, if the synchronization quality level is $QSS_3$, sync controller 3312 may determine that the synchronization quality information for wireless device 3208 is lower.

In some aspects, synchronization relays may be configured to relay the synchronization quality information. For example, if the synchronization quality information is included in the payload of the synchronization signal, sync controller 3312 of wireless device 3204 may relay the synchronization signal including the synchronization quality information. If the synchronization quality information is in a separate synchronization quality message, sync controller 3312 may relay the synchronization quality message. If the synchronization quality information is represented by the synchronization signal itself (e.g., by the format of the received synchronization signal, which maps to a synchronization quality level), sync controller 3312 may relay the synchronization quality information by transmitting the same synchronization signal to its synchronization users. Any synchronization users of wireless device 3204 may therefore also receive the synchronization quality information and similarly trigger handovers based thereon.

Sync controller 3312 may monitor the synchronization quality information over time in stage 3512 and decide whether to trigger a handover. For example, sync controller 3312 may be configured to monitor its own synchronization quality information—referred to here as reference synchronization quality information—and then compare the reference synchronization quality information to the synchronization quality information from wireless device 3208. For example, sync controller 3312 may obtain a reference satellite signal strength, a reference local oscillator accuracy, a reference peer signal strength, a reference remaining battery power level, and so forth. In some aspects, sync controller 3312 may obtain this reference synchronization quality information in the same manner described above for sync controller 3412 of wireless device 3208. Because this reference synchronization quality information is the synchronization quality information of a wireless device that is not currently acting as the synchronization provider, this reference synchronization quality information may indicate the potential synchronization quality information of wireless device 3312 (e.g., the synchronization quality if wireless device 3312 were to assume a synchronization provider role).

Sync controller 3312 may then compare the reference synchronization quality information to the synchronization quality information from wireless device 3208, and decide whether to trigger a handover based on this comparison. In one example, sync controller 3312 may compare the reference satellite signal strength with the satellite link signal strength, compare the reference local oscillator accuracy with local oscillator accuracy, compare the reference peer link signal strength to the peer link signal strength, compare the reference remaining battery power level to the remaining battery power level, and so forth.

Sync controller 3312 may then decide whether or not to trigger a handover based on the comparison. For example, sync controller 3312 may trigger a handover if the satellite link signal strength is less than the reference satellite link signal strength by a predefined amount, if the local oscillator accuracy is less than the reference local oscillator accuracy by a predefined amount, if the peer link signal strength is less than the reference peer link signal strength by a predefined amount, and/or if the remaining battery power level is less than the reference remaining battery power level by a predefined amount. The different predefined amounts can be set to different values depending on a desired hysteresis, which may prevent unnecessary handovers (e.g., if one of the reference values is only slightly less than or greater than the respective synchronization quality information). In some aspects, sync controller 3312 may be configured to trigger a handover if at least one reference parameter satisfies their respective criteria relative to the synchronization quality information, if a certain number of parameters satisfy their respective criteria relative to the synchronization quality information, or if all parameters satisfy their respective criteria relative to the synchronization quality information.

In some aspects, wireless device 3204 may use a weighting scheme to determine whether or not to trigger a handover. For example, sync controller 3312 may weight each of its reference synchronization quality parameters and obtain a weighted output as the sum of the weighted parameters. Sync controller 3312 may then apply the same weighting scheme to the synchronization quality parameters (e.g., using the same respective weights for the parameters) of wireless device 3208 to obtain a weighted output for wireless device 3208. The weight applied to each synchronization quality parameter may depend on the priority of that parameter, such as where satellite signal strength and local oscillator accuracy are given higher priority and thus higher weights. In some aspects, the weights for each respective synchronization quality parameter can be assigned statically (e.g., by a characterization process) or dynamically (e.g., by minimizing a cost function such as the drift uncertainty). The weighted output for each wireless device may therefore provide an overall characterization of its synchronization quality. Sync controller 3412 may then compare its weighted output with the weighted output for wireless device 3208. If the weighted output for wireless device 3204 is greater than the weighted output for wireless device 3208, sync controller 3412 may decide to trigger a handover. In some aspects, sync controller 3412 may only trigger a handover if its weighted output for the synchronization users is greater than the weighted output for wireless device 3208 by a predefined value (e.g., to provide for hysteresis and avoid unnecessarily frequent handovers).

In some aspects where the synchronization quality information for wireless device 3208 is represented by the synchronization signal, sync controller 3412 may use its reference synchronization quality information to determine a reference synchronization quality level for wireless device 3204. Sync controller 3412 may use the same procedure originally used by sync controller 3312 of wireless device 3208; in other words, the reference synchronization quality level and the synchronization quality level may be calculated in the same manner. This can include using various thresholds and/or a weighting scheme to identify a reference synchronization quality level $QSS_x$ for wireless device 3204. Sync controller 3412 may then compare the reference synchronization quality level to the synchronization quality level (indicated by the detected synchronization signal). Sync controller 3412 may then decide to trigger a handover if the reference synchronization quality level is greater than the synchronization quality level, and may not trigger a handover if the reference synchronization quality level is less than the synchronization quality level.

In the example of FIG. 35, sync controller 3312 may decide to trigger a handover based on the synchronization quality information in stage 3516. Accordingly, sync controller 3312 may generate a handover beacon for transmission by transmitter 3510 in stage 3518. In some aspects, the handover beacon may indicate the device ID of wireless device 3208, e.g., as a field of the handover beacon. The handover beacon may therefore request for wireless device 3208 to suspend its operation as a synchronization master or to request for wireless device 3208 to transfer its synchronization master role to wireless device 3204. After sync controller 3312 generates the handover beacon, transmitter 3310 may transmit the handover beacon to wireless device 3208 in stage 3518 (e.g., in a time slot scheduled for transmission of handover beacons).

Wireless device 3208 may then receive the handover beacon, such as where receiver 3408 receives the handover beacon and provides it to sync controller 3412. Sync controller 3412 may then determine that the handover beacon is instructing wireless device 3208 to suspend its operation as a synchronization master for synchronization cluster 3200. Sync controller 3208 may then suspend broadcast of the synchronization signals in stage 3520.

Wireless device 3204 may then perform a handover in stage 3522. In some aspects, this handover may involve a signaling exchange between wireless devices 3204 and 3208, while in other aspects the handover may be a separate procedure executed by wireless device 3204 in which wireless device 3208 does not participate further. For example, in the former case sync controller 3412 of wireless device 3208 may transmit a response message to sync controller 3312 of wireless device 3208 after receiving the handover beacon. Sync controller 3312 may then determine that wireless device 3208 is transferring the synchronization master role to wireless device 3204. Sync controller 3312 may then assume the synchronization master role and begin transmitting synchronization signals with transmitter 3310, such as in the next time slot scheduled for broadcast of synchronization signals. Sync controller 3312 may synchronize these synchronization signals with the timing of the satellite-based synchronization signals received by satellite receiver 3316.

In an example of the latter case, wireless devices 3204 and 3208 may not exchange further signaling (other than the handover beacon) to facilitate the handover. Instead, wireless device 3204 may execute a random competition handover procedure with other wireless devices (excluding wireless device 3208) to determine which wireless device will assume the synchronization master role. For example, sync controller 3312 may pseudo-randomly select a backoff timer and start monitoring for synchronization signals from other wireless devices while the backoff time runs. If sync controller 3312 detects synchronization signals from another wireless device, sync controller 3312 may determine that the other wireless device will assume the synchronization master role. Conversely, if sync controller 3312 does not detect any synchronization signals from other wireless devices during the duration of the backoff timer, sync controller 3312 may determine that wireless device 3204 can assume the synchronization master role. Sync controller 3312 may then begin transmitting synchronization signals with transmitter 3310.

In some aspects, wireless device 3204 may include its reference synchronization quality information as fields of the handover beacon in stage 3518. Other wireless devices, such as wireless device 3206, may then be able to determine whether or not their own reference synchronization information is better than the reference synchronization quality information of wireless device 3204 (e.g., using the same weighting scheme and comparing weighted outputs). If not, wireless device 3206 may determine that is not eligible to participate in the random competition handover procedure, as this may mean that wireless device 3204 is a better candidate for synchronization master than wireless device 3204. If wireless device 3206 determines its own reference synchronization information is better than the reference synchronization quality information of wireless device 3204, wireless device 3206 may participate in the random competition handover procedure. Alternatively, in some aspects wireless device 3204 may transmit the handover beacon in a specific format, where the format indicates the synchronization quality level $QSS_x$ of wireless device 3204. Other wireless devices may then be able to determine whether their own synchronization quality levels are higher than the wireless device 3204 by identifying the specific format of the handover beacon, identifying the synchronization quality level matched to the specific format, and comparing their own synchronization quality levels to this synchronization quality level.

In some aspects, wireless device 3208 may assume a synchronization user role (synchronization relay or slave) after wireless device 3204 begins transmitting synchronization signals. Sync controller 3412 may therefore detect synchronization signals in the sample stream provided by receiver 3408 and use the timing to align its own transmission and reception with synchronization cluster 3200.

Furthermore, while FIG. 35 described wireless device 3208 transferring a synchronization master role to wireless device 3204, this same procedure may also apply for wireless device 3208 transferring a synchronization relay role to wireless device 3204. In this case, the synchronization quality information may indicate the synchronization quality provided by wireless device 3208 as a synchronization relay. Synchronization quality parameters such as remaining battery power level and peer link signal strength may remain the same. Synchronization quality parameters such as satellite link signal strength and local oscillator accuracy may also depend on the satellite link signal strength and local oscillator accuracy of the synchronization master that wireless device 3208 is synchronized with. In some aspects, sync controller 3412 of wireless device 3208 may include synchronization quality information about its synchronization provider in the synchronization quality information broadcasted to wireless device 3204. The synchronization quality information may therefore provide information to wireless device 3204 about the entire synchronization link (e.g., both synchronization masters and relays). Sync controller 3312 may therefore be able to make decisions about whether to request handovers based on the synchronization quality provided by the entire synchronization link. If sync controller 3312 determines that its reference synchronization quality information is better than that of wireless device 3208, it may transmit a handover beacon and take the synchronization relay role from wireless device 3208. This procedure may therefore follow the same procedure as described above for FIG. 35.

Furthermore, wireless devices 3204 and 3208 may perform the same procedure when wireless device 3204 is a peer master or peer relay (e.g., synchronized to its own or a peer's internal device clock instead of satellite-based synchronization signals). In this case, the synchronization quality information may not include parameters related to the satellite link signal strength but may still include parameters related to the peer link signal strength, local oscillator accuracy, and remaining battery power level. The handover beacon triggering may follow the same procedure described in FIG. 35.

Figure 36:
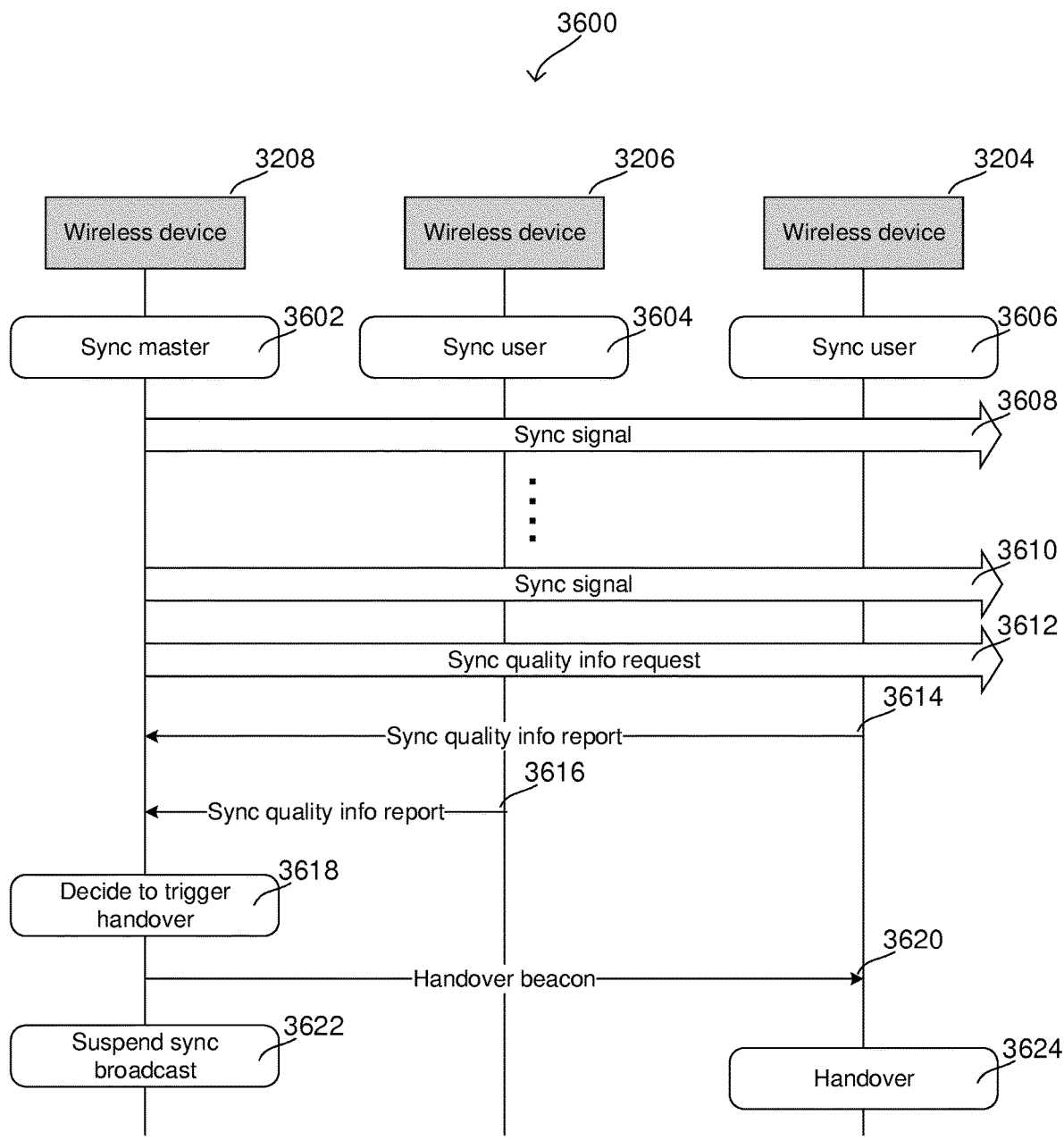
FIG. 36 shows an exemplary message sequence chart for handover beacons triggered by synchronization providers according to some aspects.

The examples for FIG. 35 described above related to synchronization user-triggered handover beacons, such as where a synchronization user determines that its reference synchronization quality information is superior to the synchronization quality information of its synchronization provider and consequently triggers a handover. FIG. 36 shows exemplary message sequence chart 3600, which describes synchronization provider-triggered handover beacons according to some aspects. As shown in FIG. 36, wireless device 3208 may initially be a synchronization master in stage 3602 while wireless devices 3206 and 3204 may be synchronization users in stages 3604 and 3606. This example assumes that wireless devices 3204-3208 have already formed synchronization cluster 3200 and wireless device 3208 has assumed a synchronization master role. While the below example refers to wireless device 3208 as being a satellite master, the same procedure may also apply when wireless device 3208 is a peer master (with applicable changes to the synchronization quality information). Similarly, the same procedure may also apply when wireless device 3208 is a synchronization relay (with applicable changes to the synchronization quality information).

As shown in FIG. 36, wireless device 3208 may repeatedly transmit synchronization signals in stage 3608-3610. Wireless devices 3204 and 3206 may then use these synchronization signals to maintain synchronization with synchronization cluster 3200. In some aspects, wireless device 3208 may also transmit synchronization quality information, such as with the synchronization signals (e.g., as a payload), separately from the synchronization signals (e.g., in a synchronization quality message), or indicated by the synchronization signal itself (e.g., represented by a synchronization quality level matched to the synchronization signal). In these cases, wireless devices 3206 and 3208 may also be configured to perform synchronization user-triggered handover beacons in the manner described above for FIG. 35.

With reference to the synchronization provider-triggered handover beacon features, wireless device 3208 may transmit a synchronization quality information request in stage 3612. This synchronization quality information request may be a message that requests synchronization quality information from the synchronization users of wireless device 3208. Sync controller 3412 of wireless device 3208 may generate the synchronization quality information request and provide it to transmitter 3410 for transmission. In various aspects, sync controller 3412 may include the synchronization quality information request as a payload of a synchronization signal, while in other aspects sync controller 3412 may include the synchronization quality information request as a separate message. Furthermore, in some aspects wireless device 3208 may trigger transmission of the sync quality info request based on detecting that the synchronization quality information of wireless device 3208 fails to meet a predefined criteria. For example, sync controller 3412 may be configured to obtain synchronization quality information for wireless device 3208, such as by using the same procedure as described in stage 3512 of FIG. 35. Sync controller 3412 may then compare the synchronization quality information to the predefined criteria.

In some aspects, the predefined criteria may be a set of thresholds that sync controller 3412 may respectively compare the synchronization quality information to. For example, sync controller 3412 may compare the satellite link signal strength to a satellite link threshold, the peer link signal strength to a peer link threshold, the local oscillator accuracy to an accuracy threshold, the remaining battery power level to a battery threshold, and so forth. Sync controller 3412 may then be configured to trigger transmission of the synchronization quality information request if one of the synchronization quality parameters is less than its respective threshold, if a certain number of the synchronization quality parameters is less than their respective thresholds, or if all of the synchronization quality parameters are less than their respective thresholds. Conversely, if the synchronization quality parameters meet the predefined criteria (e.g., are greater than their respective thresholds), sync controller 3412 may not trigger transmission of the synchronization quality information and may wait a period of time before checking again whether the updated synchronization quality parameters satisfy the predefined criteria.

In some aspects, the predefined criteria may be a weighted output threshold. For example, as described for stage 3516 in FIG. 35, sync controller 3412 may be configured to use a weighting scheme to weight each synchronization quality parameter by a respective weight, where the weights are preassigned and are based on the relative priorities of the synchronization quality parameters. Sync controller 3412 may then sum the weighted parameters to obtain a weighted output. Sync controller 3412 may then compare the weighted output to a weighted output threshold, and determine to trigger transmission of a synchronization quality information request if the weighted output is less than the weighted output threshold. If the weighted output is not less than the weighted output threshold, sync controller 3412 may not trigger transmission of the synchronization quality information request, and may wait a period of time before checking again whether the updated synchronization quality parameters satisfy the predefined criteria.

Synchronization users of wireless device 3208, including wireless devices 3204 and 3206, may then receive the synchronization quality information request from wireless device 3208. Using wireless device 3204 as an example, sync controller 3312 may identify the synchronization quality information request in the sample stream provided by receiver 3308, and may determine that wireless device 3208 is requesting synchronization quality information from wireless device 3204. Sync controller 3312 may either have previously obtained the reference synchronization quality information for wireless device 3240 (e.g., in the manner described above for stage 3512 in FIG. 35) or may obtain the reference synchronization quality information after receiving the synchronization quality information request. Sync controller 3312 may then generate a synchronization quality information report including the reference synchronization quality information. Transmitter 3310 may then transmit the synchronization quality information report to wireless device 3208 in stage 3614. Wireless device 3206 may similarly generate a synchronization quality information report using its own reference synchronization quality information and transmit the synchronization quality information report to wireless device 3208 in stage 3616.

Sync controller 3412 of wireless device 3208 may then receive the synchronization quality information reports from wireless devices 3204 and 3206. Sync controller 3412 may either have previously obtained synchronization quality information for wireless device 3208 or may obtain the synchronization quality information after receiving the synchronization quality information reports. Sync controller 3412 may then compare the synchronization quality information for wireless device 3208 to the reference synchronization quality information provided by the synchronization users (including wireless devices 3204 and 3206). In some aspects, sync controller 3412 may then identify which wireless device (including itself) has the highest synchronization quality parameters. As there are multiple synchronization quality parameters, in some aspects sync controller 3412 may use a weighting scheme to, for each wireless device, weight each of its synchronization quality parameters and obtain a weighted output as the sum of the weighted parameters. The weight applied to each synchronization quality parameter may depend on the priority of that parameter, such as where satellite signal strength and local oscillator accuracy are given higher priority and thus higher weights. The weighted output for each wireless device may therefore provide an overall characterization of its synchronization quality. Sync controller 3412 may then compare the weighted outputs and determine whether the weighted output for any of the synchronization users is greater than the weighted output for wireless device 3208. If so, sync controller 3412 may decide to trigger a handover to the synchronization user with the highest weighted output. In some aspects, sync controller 3412 may only trigger a handover if the highest weighted output for the synchronization users is greater than the weighted output for wireless device 3208 by a predefined value (e.g., to provide for hysteresis and avoid unnecessarily frequent handovers).

In the example of FIG. 36, sync controller 3412 of wireless device 3208 may determine that the reference synchronization quality information of wireless device 3204 produce the highest weighted output out of the wireless devices (including wireless device 3208). Sync controller 3412 may then decide to trigger a handover to wireless device 3204 in stage 3618. As shown in FIG. 36, sync controller 3412 may generate a handover beacon (e.g., that identifies wireless device 3204 as the new synchronization master) and transmitter 3410 may transmit the handover beacon to wireless device 3204 in stage 3620. Sync controller 3412 of wireless device 3204 may then suspend broadcast of the synchronization signals in stage 3622 while wireless device 3204 may perform a handover in stage 3624.

As previously described regarding stage 3522 in FIG. 35, wireless device 3204 may exchange further signaling with wireless device 3208 to facilitate the handover or may perform a random competition handover procedure with other wireless devices that detect the handover beacon. Assuming wireless device 3204 takes the synchronization master role, wireless device 3204 may then begin broadcasting synchronization signals for synchronization cluster 3200. In some cases, wireless device 3208 may become a synchronization user of wireless device 3204 and may begin using these synchronization signals to maintain synchronization with wireless device 3208.

Accordingly, while FIG. 35 describes a synchronization user-triggered handover beacon, FIG. 36 describes a synchronization provider-triggered handover beacon. Either option may enable the wireless devices to monitor the quality of synchronization provided by the synchronization provider and to trigger handovers if another wireless device can potentially provide a higher quality of synchronization. Furthermore, in some aspects sync controller 3412 of wireless device 3208 may not transmit a handover beacon but may instead stop transmitting synchronization signals. Other wireless devices may detect that the synchronization provider is gone, and may then select a new synchronization provider. For example, the wireless devices may perform a random competition handover procedure to select a wireless device to take over the synchronization provider role.

Figure 37:
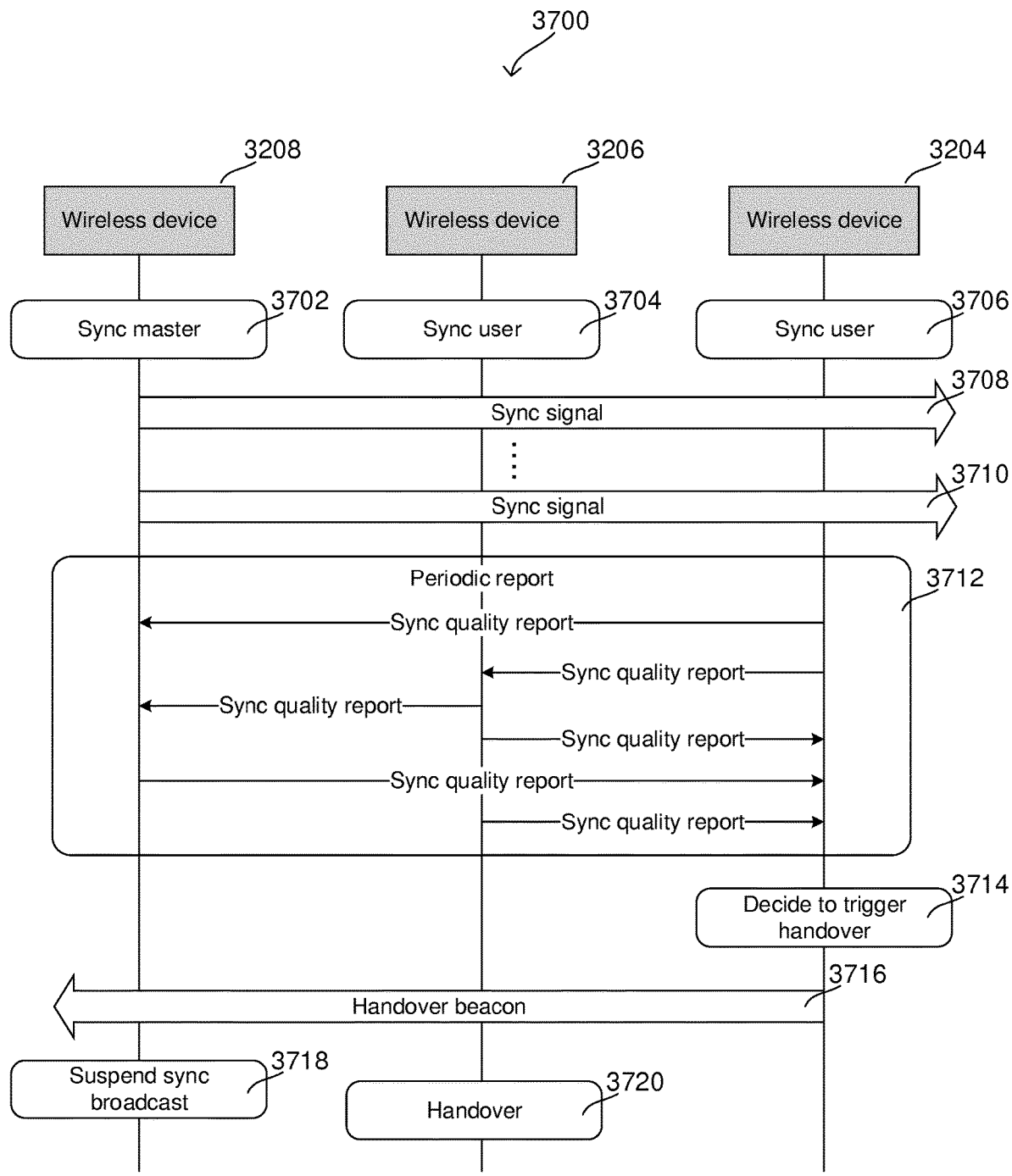
FIG. 37 shows an exemplary message sequence chart for handover beacons triggered by periodic synchronization quality reports according to some aspects.

In addition to synchronization user-triggered handover beacons and synchronization provider-triggered handover beacons, some aspects may provide for handover beacons triggered by periodic reporting. FIG. 37 shows exemplary message sequence chart 3700, which describes handover beacons triggered by periodic reporting according to some aspects. As shown in FIG. 37, wireless device 3208 may start as a synchronization master in stage 3702 while wireless devices 3204 and 3206 may be synchronization users in stages 3704 and 3706. This example assumes that wireless devices 3204-3208 have already formed synchronization cluster 3200 and wireless device 3208 has assumed a synchronization master role. While the below example refers to wireless device 3208 as being a satellite master, the same procedure may also apply when wireless device 3208 is a peer master (with applicable changes to the synchronization quality information). Similarly, the same procedure may also apply when wireless device 3208 is a synchronization relay (with applicable changes to the synchronization quality information).

As wireless device 3208 is the synchronization provider, wireless device 3208 may broadcast synchronization signals in stages 3708-3710. Wireless devices 3204 and 3206 may then receive these synchronization signals and use their timing to maintain synchronization with wireless device 3208.

Wireless devices 3204-3208 may then perform a periodic synchronization quality report in stage 3712. While FIG. 37 shows only one periodic synchronization quality report, wireless devices 3204-3208 may be configured to perform stage 3712 periodically (e.g., repeated over a certain period). As shown in FIG. 37, wireless devices 3204-3208 may exchange their respective synchronization quality information with each other. Using wireless device 3204 as an example, sync controller 3312 may obtain its synchronization quality information and generate a synchronization quality report (a message including the synchronization quality information). Transmitter 3310 may then transmit the synchronization quality report to wireless devices 3206 and 3208. In some aspects, sync controller 3312 may transmit the synchronization quality information to one or more wireless devices that wireless device 3204 has previously discovered, or may broadcast the synchronization quality information to all nearby devices. Sync controller 3312 may also receive the synchronization quality reports from wireless devices 3206 and 3208, which include the reference synchronization quality information of wireless devices 3206 and 3208. Sync controller 3312 may then compare the reference synchronization quality information of wireless devices 3206 and 3208 to the synchronization quality information of wireless device 3204 to decide whether to trigger a handover. As previously described above for FIGS. 35 and 36, in some aspects sync controller 3312 may be configured to use a weighting scheme to weight the reference synchronization quality parameters for wireless devices 3206 and 3208 to obtain respective weighted outputs for wireless devices 3206 and 3208. Sync controller 3312 may then identify which wireless device has the highest weighted output. If the wireless device with the highest weighted output is not the current synchronization provider, sync controller 3312 may decide to trigger a handover to the wireless device with the highest weighted output. In some aspects, sync controller 3312 may only trigger a handover if the highest weighted output is greater than the weighted output of the current synchronization provider by a predefined amount.

In the example of FIG. 37, wireless device 3204 may decide to trigger a handover to wireless device 3206. Accordingly, sync controller 3312 may generate a handover beacon, such as a handover beacon that requests for wireless device 3208 to suspend operating as a synchronization master and requests for wireless device 3206 to assume the synchronization master role. Transmitter 3310 may then transmit the handover beacon in stage 3716. Wireless devices 3206 and 3208 may receive the handover beacon and determine that the handover beacon requests for wireless device 3208 to suspend operating as a synchronization master and requests for wireless device 3206 to assume the synchronization master role. For example, sync controller 3412 of wireless device 3208 may read the handover beacon and determine that the handover beacon identifies wireless device 3208 (e.g., by its device ID) to stop broadcasting synchronization signals. The sync controller of wireless device 3206 may read the handover beacon and determine that the handover beacon identifies wireless device 3206 (e.g., by its device ID) as the requested synchronization master.

As shown in FIG. 37, wireless device 3208 may suspend broadcast of synchronization signals in stage 3718, and may therefore suspend operation as synchronization master. Wireless device 3206 may then perform a handover procedure in stage 3720 to take over the synchronization master role. Wireless devices 3204 and 3208 may then use wireless device 3206 as a synchronization master.

Accordingly, FIG. 37 provides a procedure where any wireless device (synchronization provider or user) may trigger a handover beacon based on the periodic synchronization quality reports. Wireless devices may therefore be able to monitor the synchronization provider and other synchronization users and selectively trigger handover beacons when a given wireless device can potentially provide a higher quality of synchronization to the synchronization cluster.

Figure 38:
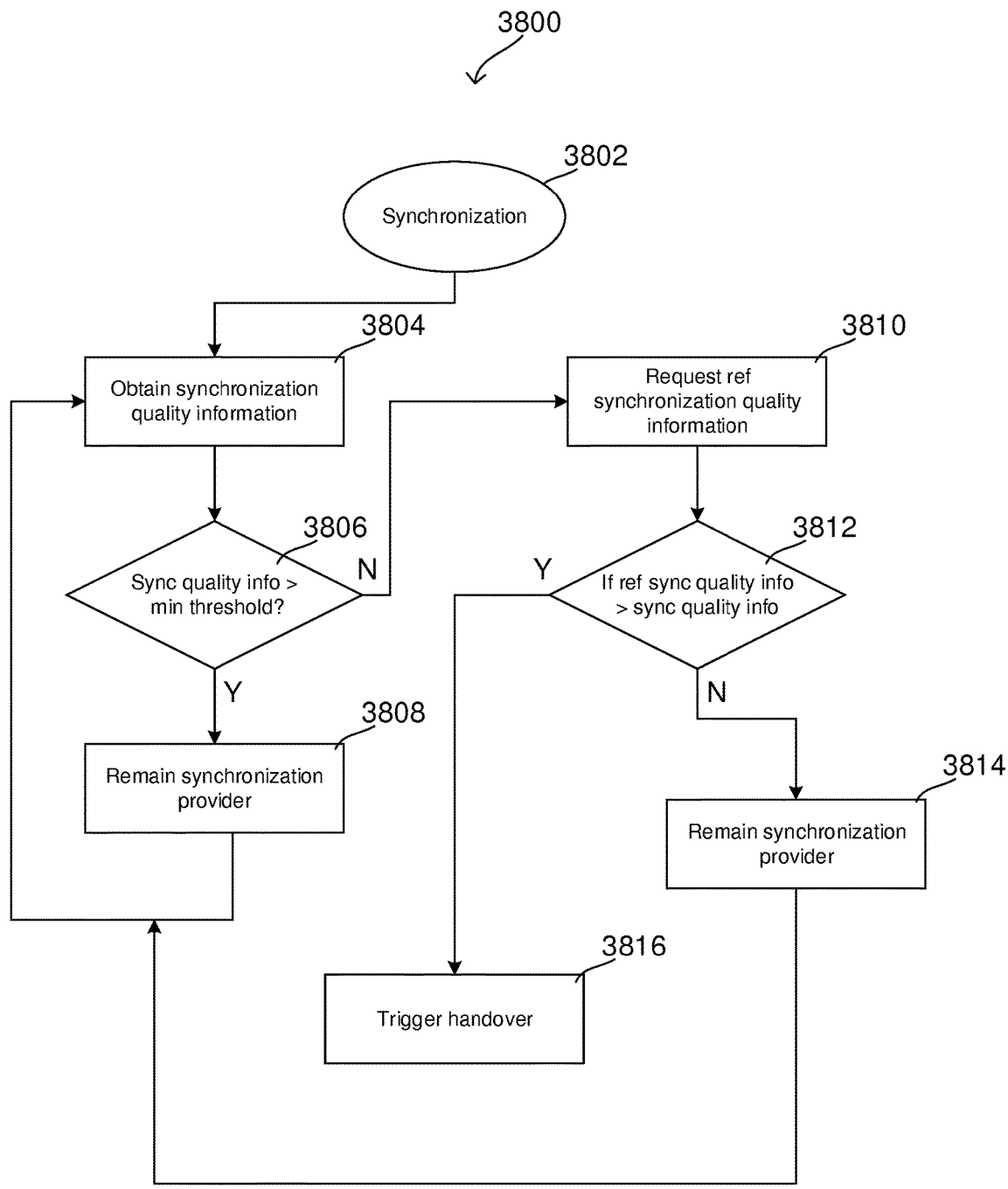
FIG. 38 shows an exemplary flow chart for handover beacons by synchronization providers according to some aspects.

FIG. 38 shows exemplary flow chart 3800, which describes the handover beacon features of synchronization providers according to some aspects. For example, wireless device 3208 may execute some or all of flow chart 3800 when performing synchronization provider-triggered handover beacons. As shown in FIG. 38, wireless device 3208 may initially be synchronized with a synchronization source in stage 3802, such as a satellite-based synchronization source. Wireless device 3208 may also broadcast synchronization signals per its role as a synchronization provider.

Wireless device 3208 may then obtain synchronization quality information in stage 3804. For example, as previously described for stage 3510 in FIG. 35, sync controller 3412 may obtain various synchronization quality parameters that indicate the quality of synchronization provided by wireless device 3208. This can include a satellite link signal strength, a local oscillator accuracy, a peer link signal strength, and/or a remaining battery power level. Sync controller 3412 may then determine whether the synchronization quality information is greater than a minimum threshold. In some aspects, the minimum threshold may be a weighted output threshold, such as where sync controller 3412 determines a weighted output based on the synchronization quality parameters and compares the weighted output to a weighted output threshold.

If sync controller 3412 determines that the synchronization quality information is greater than the minimum threshold, sync controller 3412 may decide to remain a synchronization provider in stage 3808. As shown in FIG. 38, sync controller 3412 may then return to stage 3804. Sync controller 3412 may then obtain updated values of the synchronization quality information (e.g., after waiting for an interval, such as where sync controller 3412 is configured to periodically evaluate the synchronization quality information with a period set by the interval).

Conversely, if sync controller 3412 determines that the synchronization quality information is less than the minimum threshold, sync controller 3412 may request reference synchronization quality information in stage 3810. For example, sync controller 3412 may generate a synchronization quality information request, which transmitter 3410 may transmit to the synchronization users of wireless device 3208. Sync controller 3412 may receive the synchronization quality information reports from the synchronization users and compare the reference synchronization quality parameters (from the synchronization users) to the synchronization quality information of wireless device 3208 in stage 3812. In some aspects, sync controller 3412 may determine a weighted output for each synchronization user based on the reference synchronization quality parameters in their synchronization quality information reports, and may determine in stage 3812 whether any of the weighted outputs is greater than the weighted output for wireless device 3208. If not, sync controller 3412 may decide to remain as a synchronization provider in stage 3814, and may return to stage 3804. Conversely, if sync controller 3412 determines that the weighted output for a synchronization user is greater than the weighted output for wireless device 3208, sync controller 3412 may trigger a handover to this synchronization user in stage 3816. For example, sync controller 3412 may generate a handover beacon that identifies the synchronization user, and transmitter 3410 may then transmit the handover beacon. Sync controller 3412 may suspend transmission of the synchronization signals from wireless device 3208, and may become a synchronization user of the new synchronization master.

Accordingly, various aspects described herein may provide a mechanism for synchronization providers and users to monitor synchronization quality and trigger handovers as applicable. Because dynamic network conditions can change synchronization quality over time, this can help the synchronization cluster to switch synchronization providers to wireless devices that can provide a high level of synchronization.

Figure 39:
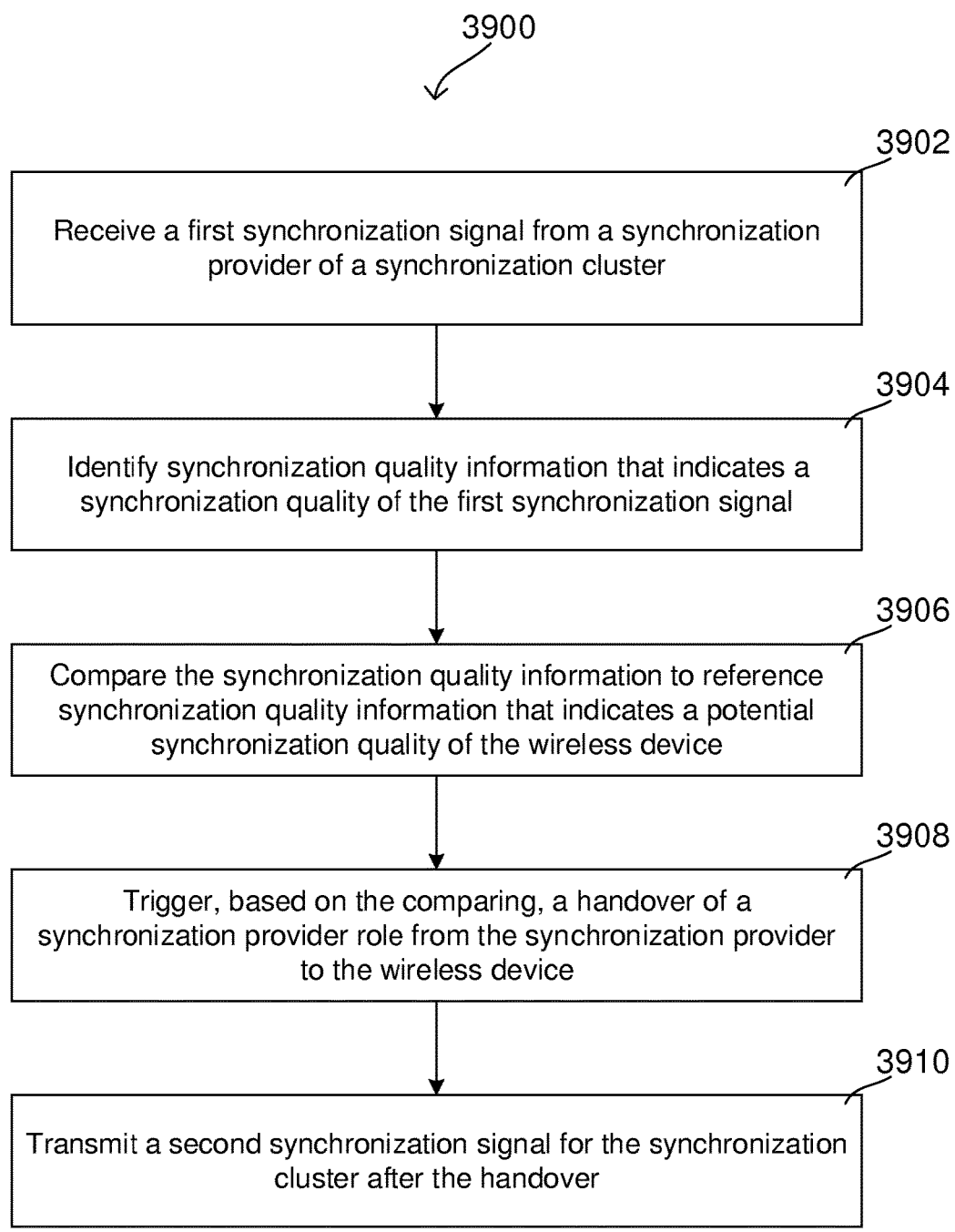
FIGS. 39-43 show exemplary methods for wireless communications involving handover beacons according to some aspects.

FIG. 39 shows exemplary method 3900 of performing wireless communications at a wireless device according to some aspects. As shown in FIG. 39, method 3900 includes receiving a first synchronization signal from a synchronization provider of a synchronization cluster (3902), identifying synchronization quality information that indicates a synchronization quality of the first synchronization signal (3904), comparing the synchronization quality information to reference synchronization quality information that indicates a potential synchronization quality of the wireless device (3906), triggering, based on the comparing, a handover of a synchronization provider role from the synchronization provider to the wireless device (3908), and transmitting a second synchronization signal for the synchronization cluster after the handover (3910).

Figure 40:
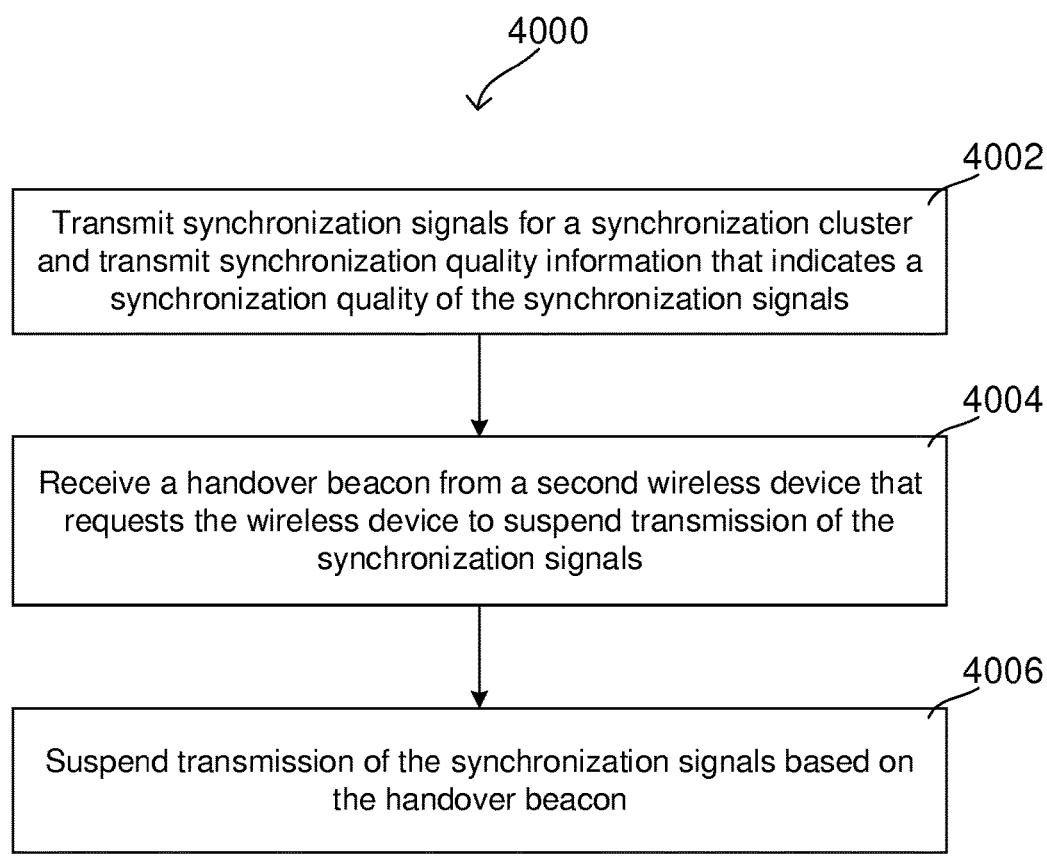

FIG. 40 shows exemplary method 4000 of performing wireless communications at a wireless device according to some aspects. As shown in FIG. 40, method 4000 includes transmitting synchronization signals for a synchronization cluster and transmitting synchronization quality information that indicates a synchronization quality of the synchronization signals (4002), receiving a handover beacon from a second wireless device that requests the wireless device to suspend transmission of the synchronization signals (4004), and suspending transmission of the synchronization signals based on the handover beacon (4006).

Figure 41:
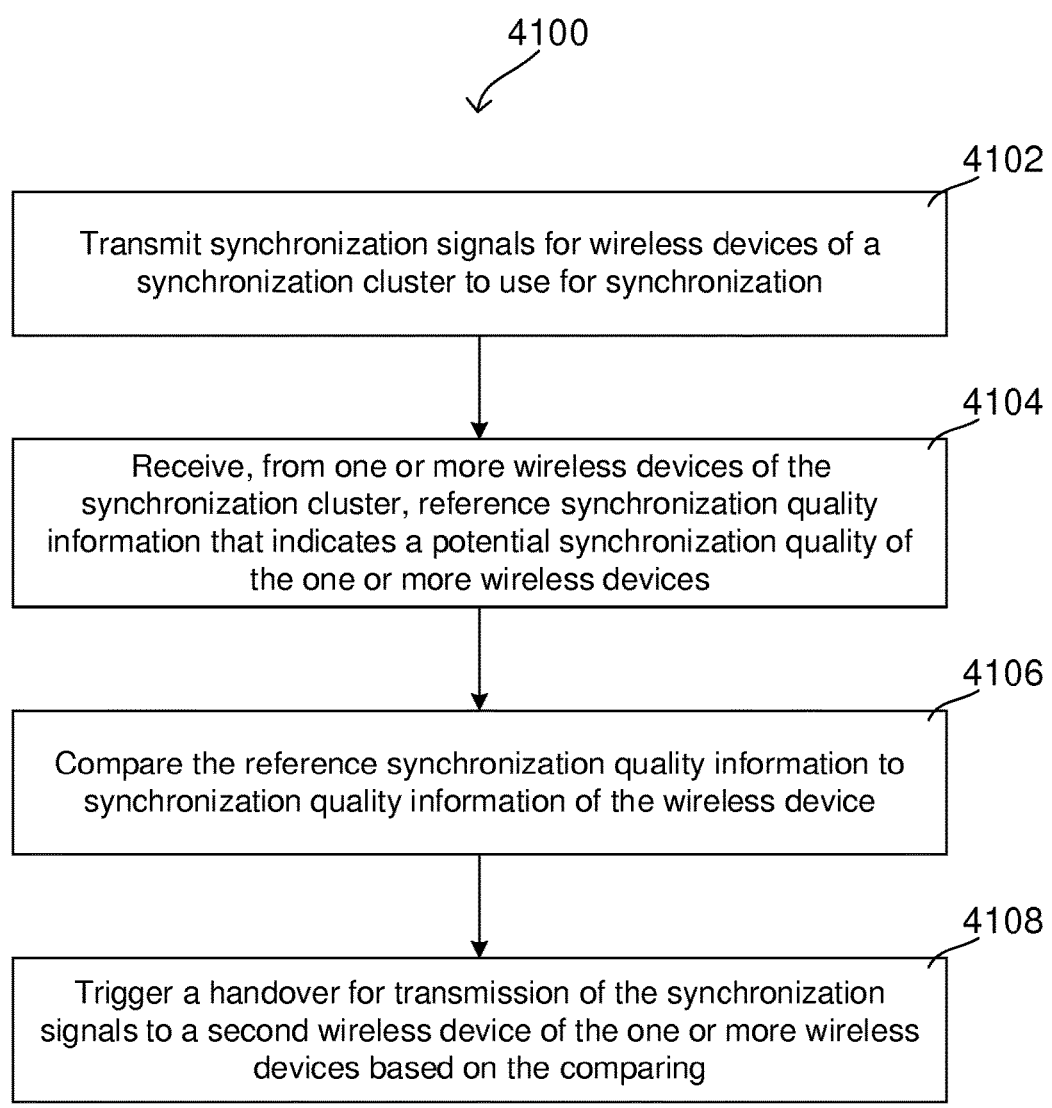

FIG. 41 shows exemplary method 4100 of performing wireless communications at a wireless device according to some aspects. As shown in FIG. 41, method 4100 includes transmitting synchronization signals for wireless devices of a synchronization cluster to use for synchronization (4102), receiving, from one or more wireless devices of the synchronization cluster, reference synchronization quality information that indicates a potential synchronization quality of the one or more wireless devices (4104), comparing the reference synchronization quality information to synchronization quality information of the wireless device (4106), and triggering a handover for transmission of the synchronization signals to a second wireless device of the one or more wireless devices based on the comparing (4108).

Figure 42:
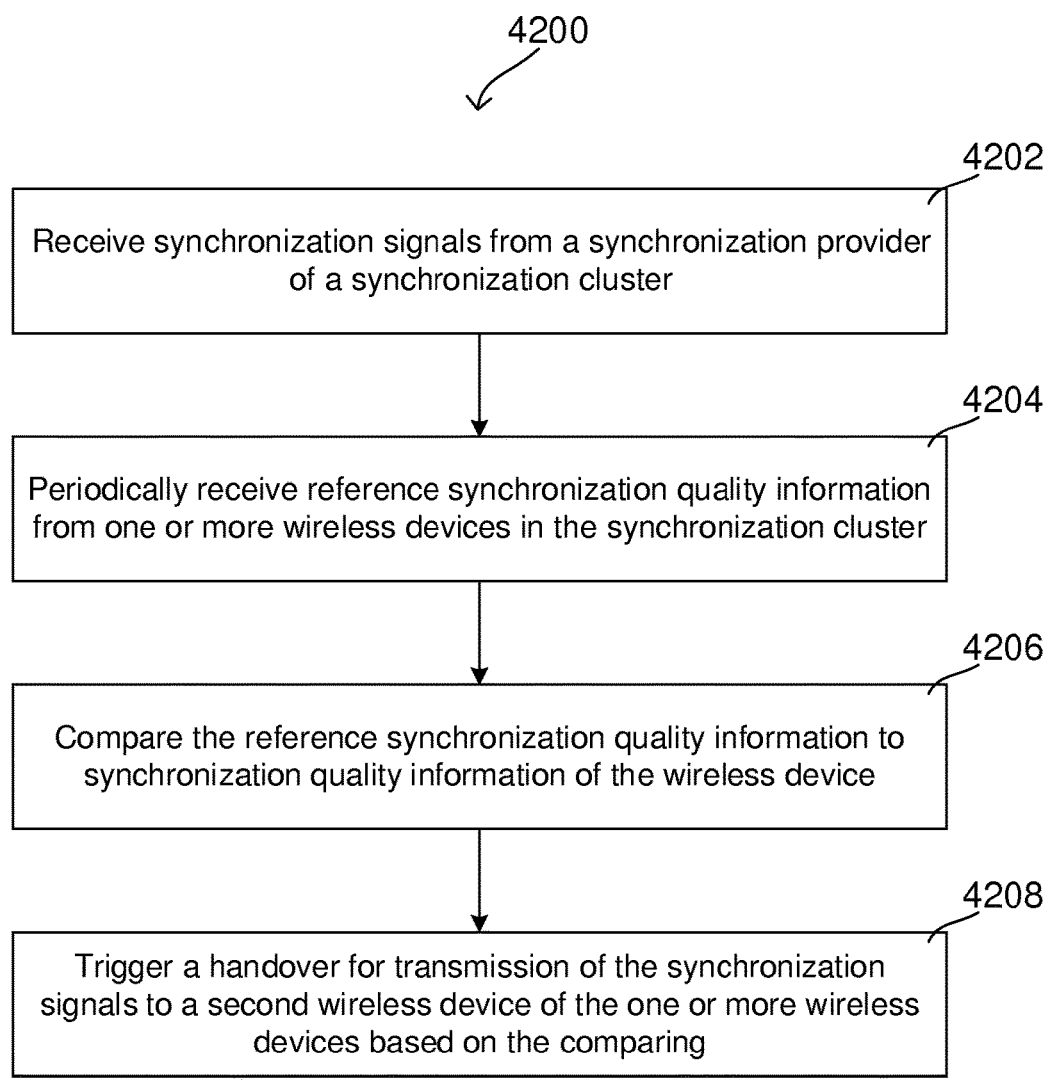

FIG. 42 shows exemplary method 4200 of performing wireless communications at a wireless device according to some aspects. As shown in FIG. 42, method 4200 includes receiving synchronization signals from a synchronization provider of a synchronization cluster (4202), periodically receiving reference synchronization quality information from one or more wireless devices in the synchronization cluster (4204), comparing the reference synchronization quality information to synchronization quality information of the wireless device (4206), and triggering a handover for transmission of the synchronization signals to a second wireless device of the one or more wireless devices based on the comparing (4208).

Figure 43:
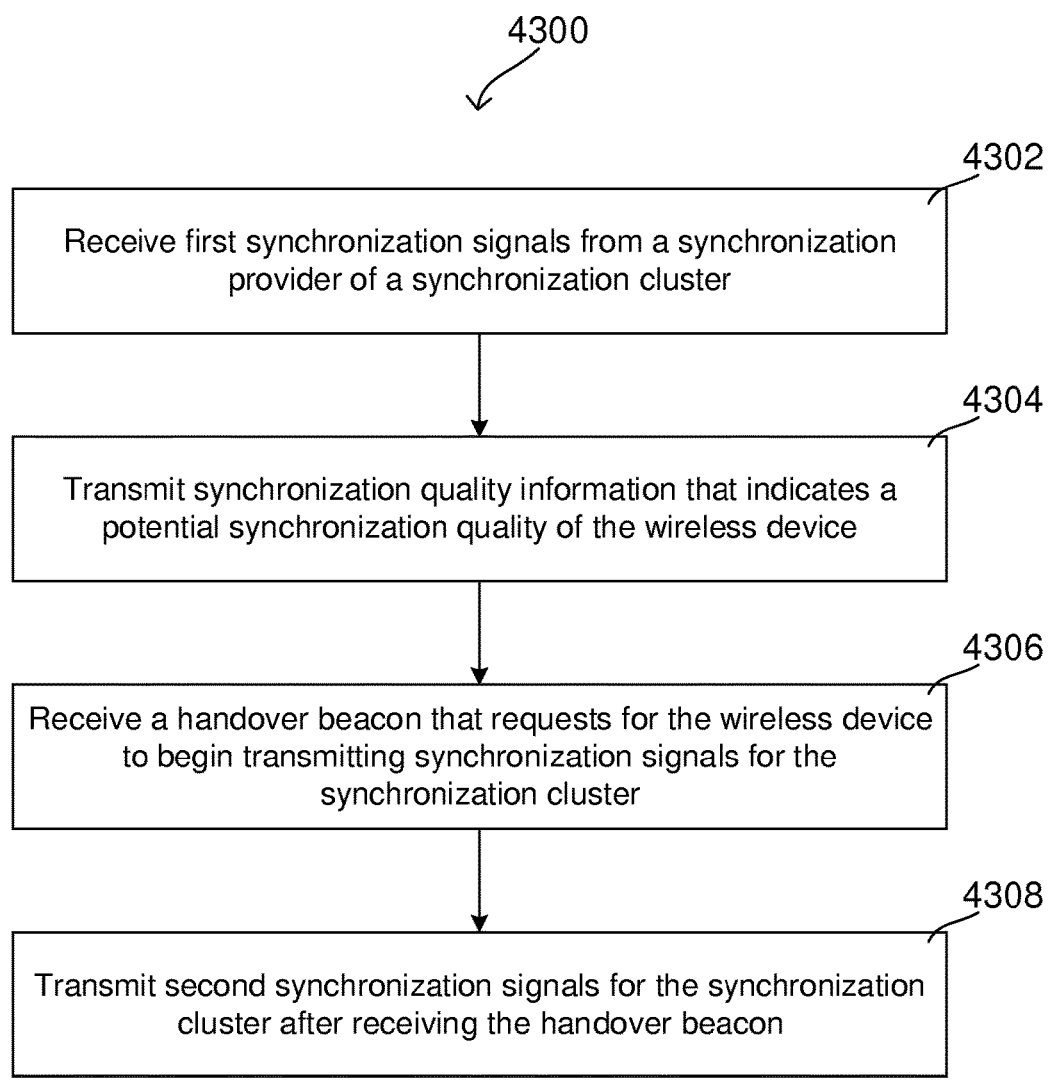

FIG. 43 shows exemplary method 4300 of performing wireless communications at a wireless device according to some aspects. As shown in FIG. 43, method 4300 includes receiving first synchronization signals from a synchronization provider of a synchronization cluster (4302), transmitting synchronization quality information that indicates a potential synchronization quality of the wireless device (4304), receiving a handover beacon that requests for the wireless device to begin transmitting synchronization signals for the synchronization cluster (4306), and transmitting second synchronization signals for the synchronization cluster after receiving the handover beacon (4308).

Some aspects of this disclosure provide a wireless device including a receiver configured to receive a first synchronization signal from a synchronization provider of a synchronization cluster; a sync controller configured to identify synchronization quality information that indicates a synchronization quality of the first synchronization signal, compare the synchronization quality information to reference synchronization quality information that indicates a potential synchronization quality of the wireless device, and to trigger, based on the comparing, a handover of a synchronization provider role from the synchronization provider to the wireless device; and a transmitter configured to transmit a second synchronization signal for the synchronization cluster after the handover.

Some aspects of this disclosure provide a wireless device including a transmitter configured to transmit synchronization signals for a synchronization cluster and to transmit synchronization quality information that indicates a synchronization quality of the synchronization signals, a receiver configured to receive a handover beacon from a second wireless device that requests the wireless device to suspend transmission of the synchronization signals, and a sync controller configured to suspend transmission of the synchronization signals based on the handover beacon.

Some aspects of this disclosure provide a wireless device including a transmitter configured to transmit synchronization signals for wireless devices of a synchronization cluster to use for synchronization, a receiver configured to receive, from one or more wireless devices of the synchronization cluster, reference synchronization quality information that indicates a potential synchronization quality of the one or more wireless devices, and a sync controller configured to compare the reference synchronization quality information to synchronization quality information of the wireless device, and to trigger a handover for transmission of the synchronization signals to a second wireless device of the one or more wireless devices based on the comparing.

Some aspects of this disclosure provide a wireless device including a receiver configured to receive synchronization signals from a synchronization provider of a synchronization cluster, and to periodically receive reference synchronization quality information from one or more wireless devices in the synchronization cluster, a sync controller configured to compare the reference synchronization quality information to synchronization quality information of the wireless device, and to trigger a handover for transmission of the synchronization signals to a second wireless device of the one or more wireless devices based on the comparing.

Some aspects of this disclosure provide a wireless device including a receiver configured to receive first synchronization signals from a synchronization provider of a synchronization cluster, and a transmitter configured to transmit synchronization quality information that indicates a potential synchronization quality of the wireless device, the receiver further configured to receive a handover beacon that requests for the wireless device to begin transmitting synchronization signals for the synchronization cluster, and the transmitter further configured to transmit second synchronization signals for the synchronization cluster after receiving the handover beacon.

Figure 44:
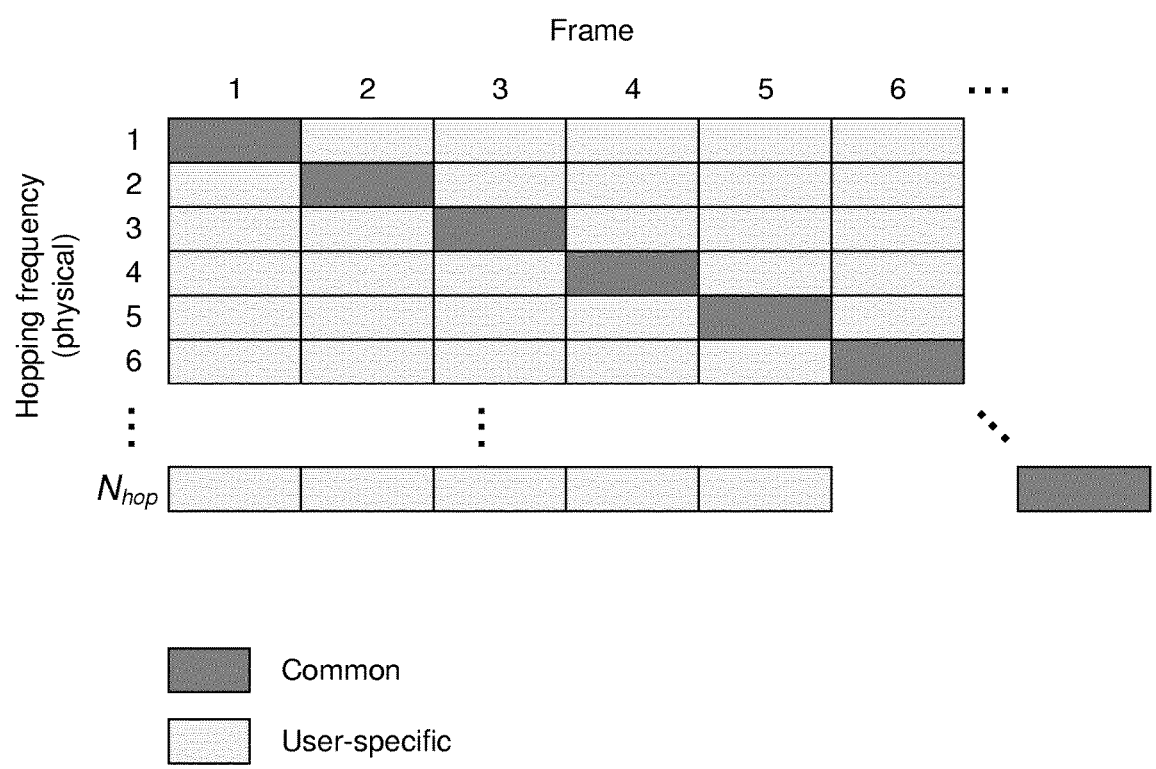
FIG. 44 shows an example of common hopping schemes and user-specific hopping schemes according to some aspects.

In some aspects, the wireless devices operating in a D2D network may use frequency hopping to communicate with each other. For example, the wireless devices may be configured to operate on a set of hopping frequencies that hops on a per-frame basis according to a hopping scheme. In some aspects, the wireless devices may use multiple hopping schemes simultaneously, such as a common hopping scheme and one or more user-specific hopping schemes. FIG. 44 shows an example of common and user-specific hopping schemes according to some aspects. As shown in FIG. 44, there may be a set of $N_{hop}$ hopping frequencies, where some hopping frequencies are be allocated to the common hopping scheme in certain frames and other hopping frequencies are allocated to user-specific hopping schemes. Accordingly, all wireless devices operating with the set of hopping frequencies may be able to use the common frequency (during each frame) simultaneously, such as to perform discovery, synchronization, and exchange control messages. Each wireless device may therefore be able to follow the common hopping scheme as it hops each frame and to transmit and receive information as appropriate on the assigned common frequency each frame. The example shown in FIG. 44 is a straightforward example where the common hopping scheme hops to the adjacent physical hopping frequency in each successive frame. More complex common hopping schemes may use a pseudorandom approach that maps the common frequency to a pseudorandom sequence of hopping frequencies over a sequence of frames.

Some or all of the remaining $N_{hop}$ hopping frequencies may then be allocated for user-specific hopping schemes. Pairs of wireless devices may use these user-specific hopping schemes to exchange communication data, such as where respective pairs use different user-specific hopping frequencies to transmit and receive with each other. The user-specific hopping schemes may be predefined, and pairs of wireless devices may therefore know in advance the sequence of hopping frequencies to follow according to a given user-specific hopping scheme. In some aspects, pairs of wireless devices may use a transmitter-specific hopping scheme as the user-specific hopping scheme (e.g., may select the user-specific hopping scheme based on a device ID of the transmitter).

When operating in a decentralized network (e.g., a D2D network), wireless devices may be responsible for scheduling and control signaling without the assistance of a centralized network entity. The wireless devices may therefore use a common hopping scheme to support a control channel. In some aspects, the wireless devices may also use the common hopping scheme for discovery and synchronization. For example, as previously described the wireless devices may operate on a slotted communication scheme that is aligned with a universal reference time, where either satellite-based or peer-based synchronization sources may provide synchronization signals for the wireless devices to use to align with the slotted communication scheme. As the synchronization channel is mapped to the common hopping scheme, wireless devices may tune to the common hopping scheme (e.g., to the assigned hopping frequency in a given frame) to listen for synchronization signals from a synchronization cluster. After establishing synchronization with a synchronization cluster, wireless devices may then use the discovery channel (also mapped to the common hopping scheme) to exchange discovery initiation and response messages with other wireless devices. Once wireless devices are synchronized and have discovered each other, the wireless devices can start to establish communication links between each other.

Various aspects of this disclosure relate to the establishment of communication links between devices using control channels on the common hopping scheme. As further described herein, various aspects may use the control channel to transmit scheduling requests and reference signals. For example, the control channel may be separated into a scheduling part mapped to the common hopping scheme and a sounding part mapped to a user-specific hopping scheme. A transmitting device with a scheduled transmission for a receiving device may therefore transmit a scheduling request to the target receiving device on the common frequency (scheduling part of the control channel) and then transmit a reference signal to the target receiving device on the user-specific frequency (sounding part of the control channel). Because the scheduling part is on the common frequency, the receiving device may be able to monitor the common frequency for scheduling request from all other wireless devices in the synchronization cluster. Furthermore, as the reference signal is on the user-specific frequency, the receiving device may perform channel estimation on the same frequency that the transmitting device will perform the transmission on, thus allowing for accurate estimation and link adaptation. In various additional aspects, wireless devices may also use discontinuous reception (DRX) schedules to configure the frames that wireless devices can transmit scheduling requests in, which can assist the receiving devices in identifying which wireless device is the transmitting device as well as help conserve battery power.

Figure 45:
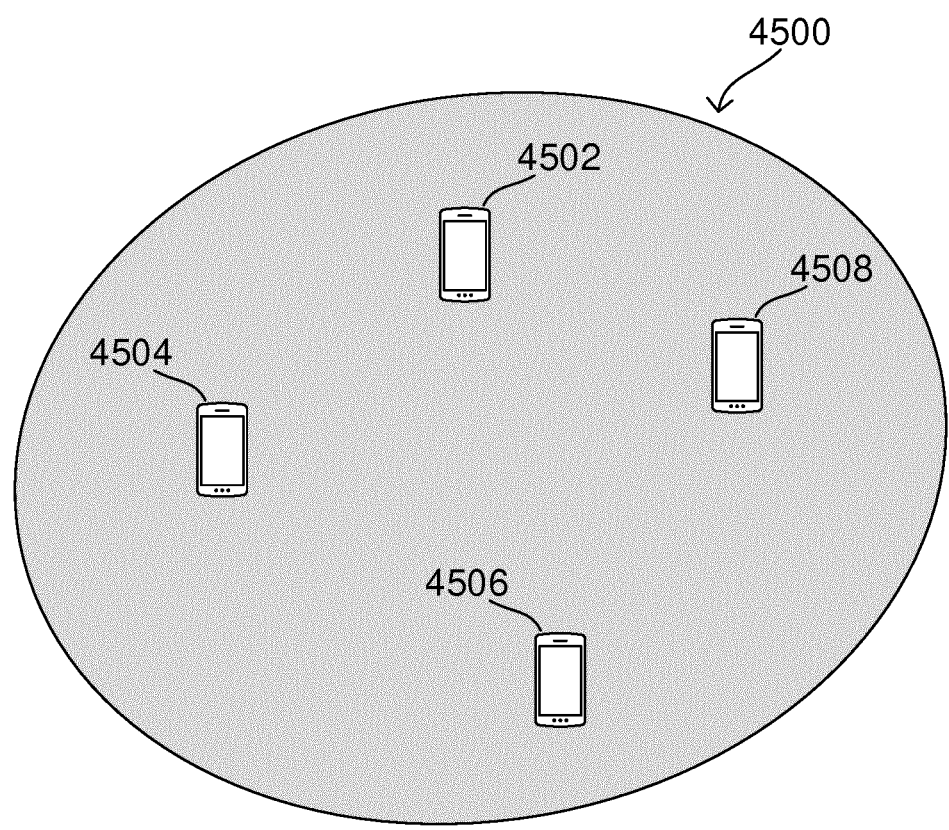
FIG. 45 shows an exemplary synchronization cluster according to some aspects.

FIG. 45 shows an exemplary network scenario according to some aspects, which the following description will reference to describe various aspects related to the control channel. As shown in FIG. 45, wireless devices 4502-4508 may form synchronization cluster 4500, where one of wireless devices 4502-4508 may act as the synchronization master and the others of wireless devices 4502-4508 may act as synchronization providers or users. Wireless devices 4502-4508 may therefore be synchronized with the same slotted communication schedule, and may maintain synchronization with each other by exchanging synchronization signals (e.g., using a synchronization channel mapped to the common hopping scheme). Wireless devices 4502-4508 may also discover each other, such as by exchanging discovery messages on a discovery channel mapped to the common hopping scheme.

Figure 46:
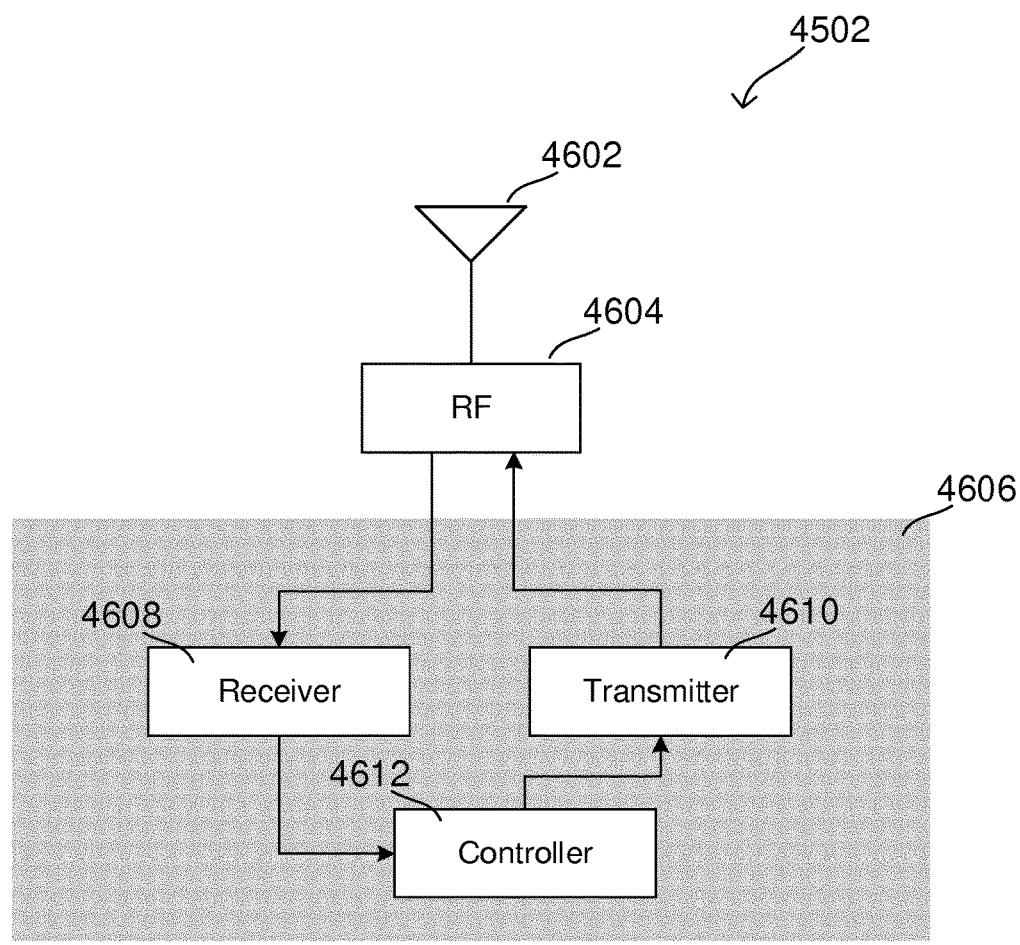
FIG. 46 shows an exemplary internal configuration of a wireless device for performing a data transmission according to some aspects.
Figure 47:
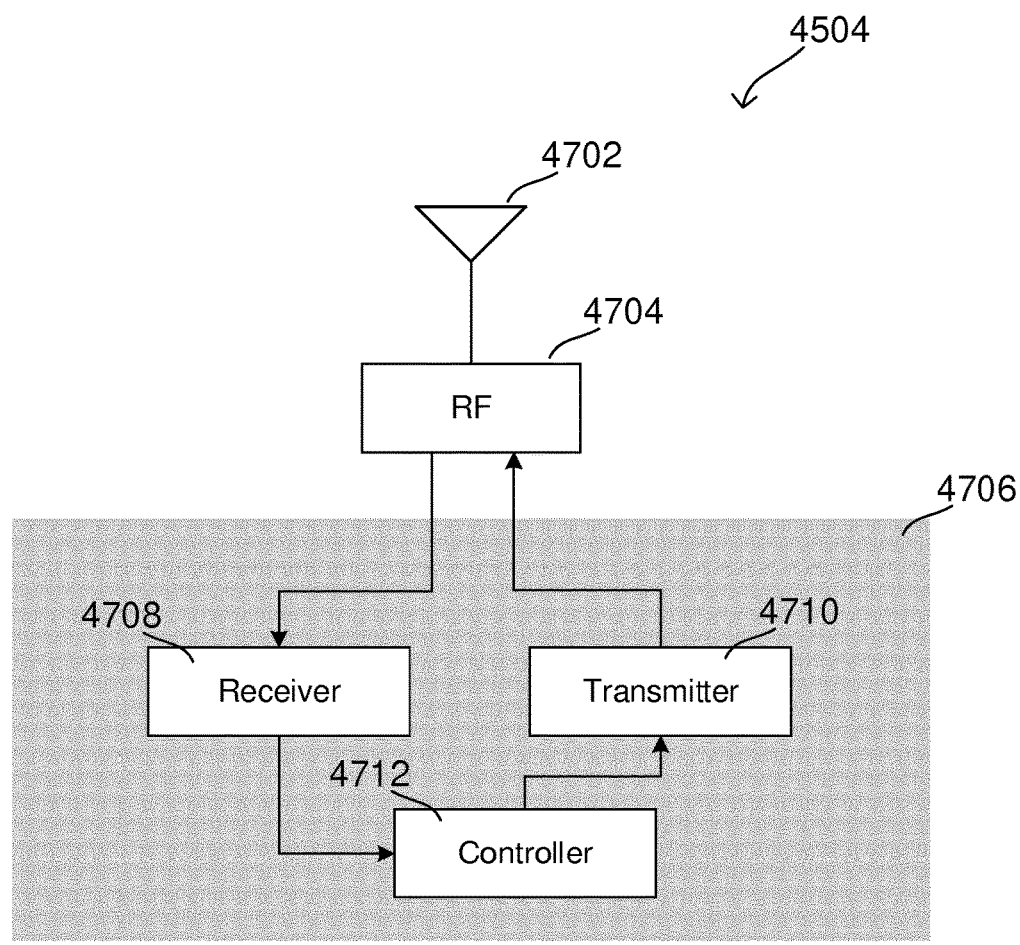
FIG. 47 shows an exemplary internal configuration of a wireless device for receiving a data transmission according to some aspects.

As wireless devices 4502-4508 have discovered each other, wireless devices 4502-4508 may be able to establish communication links and exchange data with each other. As previously indicated, in various aspects wireless devices 4502-4508 may use the control channel (partially mapped to both the common hopping scheme and a user-specific hopping scheme) to send scheduling requests and reference signals to facilitate data exchange. Accordingly, wireless devices 4502-4508 may be structurally configured to utilize the control channel in this manner. This structural configuration will first be introduced, followed by a procedural description of the control channel usage. FIGS. 46 and 47 show exemplary internal configurations of wireless devices 4502 and 4504 according to some aspects. The configurations shown in FIGS. 46 and 47 are focused on the control channel features of wireless devices 4502 and 4504 and therefore may not expressly depict other components of wireless devices 4502 and 4504 that are less directly related to control channel features. Accordingly, in various aspects wireless device 4502 and/or wireless device 4504 may include various other components. Furthermore, while the following description may focus on wireless device 4502 in a transmitting role (e.g., performing a data transmission to wireless device 4504) and wireless device 4504 in a receiving role (e.g., receiving a data transmission from wireless device 4502), in some aspects wireless device 4502 may also be configured with the structure and functionality of wireless device 4504 and/or wireless device 4504 may be configured with the structure and functionality of wireless device 4502.

Starting with FIG. 46, wireless device 4502 may include antenna system 4602, RF transceiver 4604, and baseband modem 4606. In some aspects, antenna system 4602, RF transceiver 4604, and baseband modem 4606 may be configured as described above for antenna system 202, RF transceiver 204, and baseband modem 206 of terminal device 102. Accordingly, wireless device 4502 may be configured to transmit and receive wireless signals via antenna system 4602 and RF transceiver 4604. In the transmit direction, RF transceiver 4604 may therefore modulate and transmit baseband samples (provided by baseband modem 4606) via antenna system 4602. In the receive direction, RF transceiver 4604 may also receive and demodulate radio signals via antenna system 4602 and provide the resulting baseband samples to baseband modem 4606.

FIG. 46 also depicts several internal components of baseband modem 4606, including receiver 4608, transmitter 4610, and controller 4612. In some aspects, baseband modem 4606 may include a digital signal processor and a protocol controller. Receiver 4608, transmitter 4610, and controller 4612 may therefore be subcomponents of the digital signal processor (e.g., physical layer components) and/or subcomponents of the protocol controller (e.g., protocol stack components). In some aspects, receiver 4608 may be the physical layer receive chain while transmitter 4610 may be the physical layer transmit chain. For example, receiver 4608 may include a demodulator, demapper (e.g., constellation demapper), de-interleaver, decoder, and/or descrambler. Receiver 4608 may receive wireless signals in the form of baseband samples via antenna system 4602 and RF transceiver 4604. Receiver 4608 may then sequentially process these baseband samples with the demodulator, demapper (e.g., constellation demapper), de-interleaver, decoder, and/or descrambler to produce a bitstream, which receiver 4608 may provide to controller 4612 (e.g., to protocol stack layers of controller 4612). Transmitter 4610 may include a scrambler, encoder, interleaver, mapper (e.g., constellation mapper), and/or a modulator, which may sequentially process a bitstream (e.g., provided by protocol stack layers of controller 4612) to produce baseband samples (e.g., complex IQ symbols). Transmitter 4610 may then transmit these baseband samples as wireless signals via RF transceiver 4604 and antenna system 4602. Controller 4612 may include one or more processors configured to execute the protocol stack layers as software. This may include generating messages for transmitter 4610 to transmit (e.g., messages including user or control data) and/or recovering messages from bitstreams provided by receiver 4608. Controller 4612 may also be configured to perform scheduler features, such as by identifying common and user-specific hopping frequencies for the current frame based on a common hopping scheme and various user-specific hopping schemes. Controller 4612 may indicate the common and user-specific hopping frequencies to RF transceiver 4604, receiver 4608, and transmitter 4610, which may then use the common and user-specific hopping frequencies to transmit and receive during the current frame. The detailed functionality of receiver 4608, transmitter 4610, and controller 4612 is further described below in FIG. 48.

As shown in FIG. 47, wireless device 4504 may include antenna system 4702, RF transceiver 4704, and baseband modem 4706. In some aspects, antenna system 4702, RF transceiver 4704, and baseband modem 4706 may be configured as described above for antenna system 202, RF transceiver 204, and baseband modem 206 of terminal device 102. Accordingly, wireless device 4504 may be configured to transmit and receive wireless signals via antenna system 4702 and RF transceiver 4704. In the transmit direction, RF transceiver 4704 may therefore modulate and transmit baseband samples (provided by baseband modem 4706) via antenna system 4702. In the receive direction, RF transceiver 4704 may also receive and demodulate radio signals via antenna system 4702 and provide the resulting baseband samples to baseband modem 4706.

FIG. 47 also depicts several internal components of baseband modem 4706, including receiver 4708, transmitter 4710, and controller 4712. In some aspects, baseband modem 4706 may include a digital signal processor and a protocol controller. Receiver 4708, transmitter 4710, and controller 4712 may therefore be subcomponents of the digital signal processor (e.g., physical layer components) and/or subcomponents of the protocol controller (e.g., protocol stack components). In some aspects, receiver 4708 may be the physical layer receive chain while transmitter 4710 may be the physical layer transmit chain. For example, receiver 4708 may include a demodulator, demapper (e.g., constellation demapper), de-interleaver, decoder, and/or descrambler. Receiver 4708 may receive wireless signals in the form of baseband samples via antenna system 4702 and RF transceiver 4704. Receiver 4708 may then sequentially process these baseband samples with the demodulator, demapper (e.g., constellation demapper), de-interleaver, decoder, and/or descrambler to produce a bitstream, which receiver 4708 may provide to controller 4712 (e.g., to protocol stack layers of controller 4712). Transmitter 4710 may include a scrambler, encoder, interleaver, mapper (e.g., constellation mapper), and/or a modulator, which may sequentially process a bitstream (e.g., provided by protocol stack layers of controller 4712) to produce baseband samples (e.g., complex IQ symbols). Transmitter 4710 may then transmit these baseband samples as wireless signals via RF transceiver 4704 and antenna system 4702. Controller 4712 may include one or more processors configured to execute the protocol stack layers as software. This may include generating messages for transmitter 4710 to transmit (e.g., messages including user or control data) and/or recovering messages from bitstreams provided by receiver 4708. Controller 4712 may also be configured to perform scheduler features, such as by identifying common and user-specific hopping frequencies for the current frame based on a common hopping scheme and various user-specific hopping schemes. Controller 4712 may indicate the common and user-specific hopping frequencies to RF transceiver 4704, receiver 4708, and transmitter 4710, which may then use the common and user-specific hopping frequencies to transmit and receive during the current frame. The detailed functionality of receiver 4708, transmitter 4710, and controller 4712 is further described below in FIG. 48.

Figure 48:
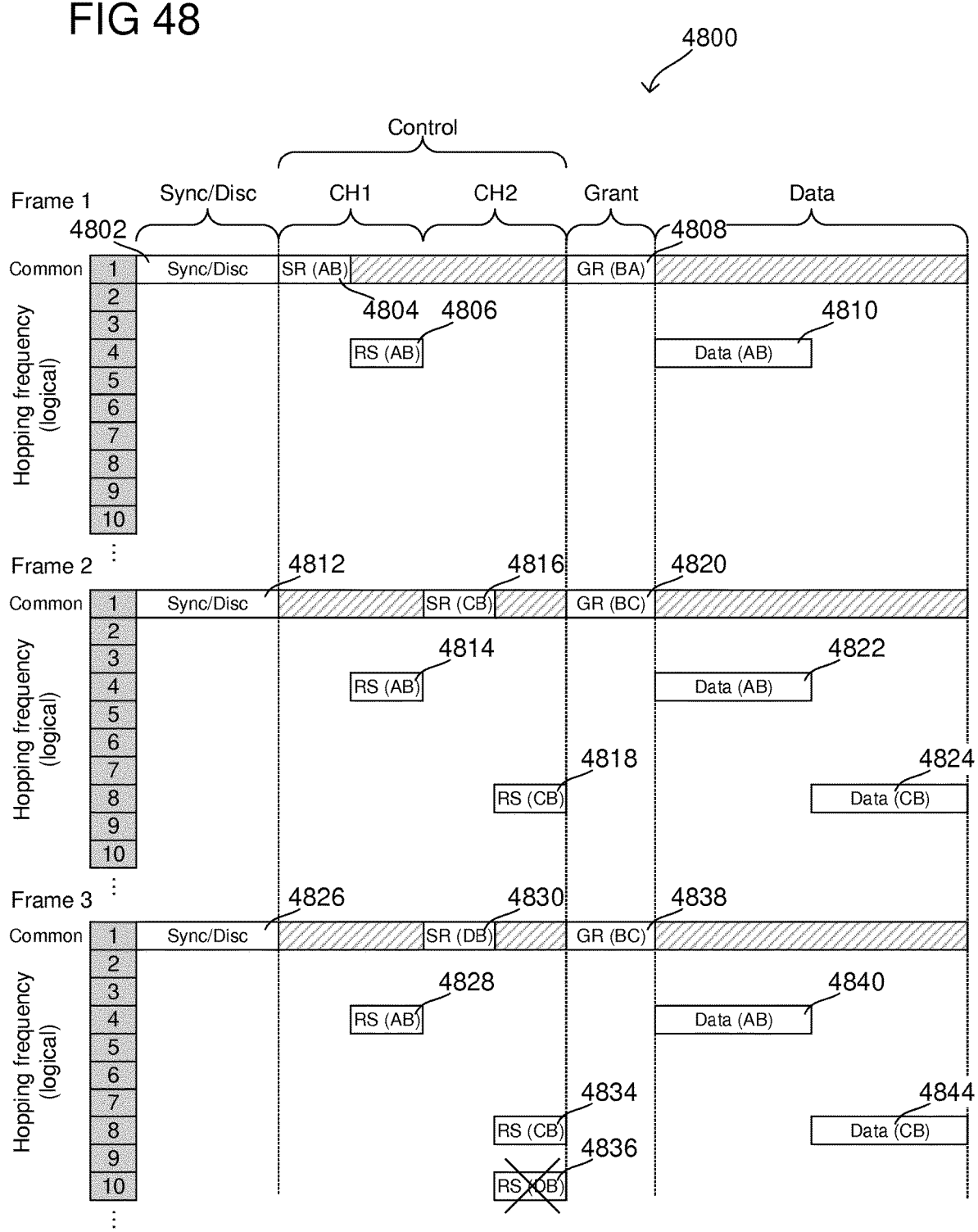
FIG. 48 shows an exemplary transmission schedule including a control channel according to some aspects.

FIG. 48 shows exemplary transmission schedule 4800, which the following description references to describe the control channel features according to various aspects. Transmission schedule 4800 in FIG. 48 is shown across three exemplary frames, which are each respectively composed of a plurality of slots. The number and length of the slots can be scaled to any number, and the various channels and transmissions can take up any number of slots.

As previously indicated, in some aspects wireless devices may use hopping schemes to control the frequencies on which transmissions are made. This can include a common hopping scheme that controls the frequency on which common transmissions (e.g., universal to all wireless devices, referred to as the common frequency) are made during each frame, where the common hopping scheme may hop to a new hopping frequency each frame (and thus provide a different common frequency each frame). Wireless devices may also use user-specific hopping schemes, such as where pairs of wireless devices may use one of a plurality of user-specific hopping schemes to exchange transmission with each other. Each user-specific hopping scheme may similarly hop to a new user-specific frequency each frame, and the pair of wireless devices may therefore switch to a new user-specific frequency each frame. Assuming the user-specific hopping schemes are orthogonal to each other (e.g., use a different user-specific frequency during each frame), each pair of wireless devices may transmit and receive on a different user-specific frequency during each frame.

As shown on the left side of FIG. 48, wireless devices 4502-4508 may use a set of hopping frequencies to support the common and user-specific hopping schemes. FIG. 48 shows a set of 10 hopping frequencies, although in some aspects the set of hopping frequencies can be larger or smaller. Furthermore, the frequency index (e.g., 1-10 in FIG. 48) denotes a logical frequency index for each frame, which is intended to simplify the explanation. For example, while the common frequency is identified as frequency index 1 in all three frames, the common frequency may hop between three separate physical frequencies in the three frames. For instance, the common frequency may be physical frequency 1 in the first frame, physical frequency 9 in the second frame, and physical frequency 5 in the third frame. Similarly, the user-specific frequency for wireless devices 4502 and 4508 is identified as frequency index 4 in all three frames, but may hop between, for example, physical frequency 4, 5, and 2. Likewise, while the user-specific frequency for wireless devices 4504 and 4506 is identified as frequency index 8, the user-specific hopping scheme may hop between physical frequencies 6, 7, and 3.

Furthermore, in the example of FIG. 48 the frames may be divided into different sections that carry different channels, each of which may include one or more slots. In particular, each frame may include a synchronization channel and discovery channel. In some aspects, the synchronization and discovery channels may be placed at the beginning of the frame. Wireless devices may use the synchronization and discovery channel to transmit and receive synchronization signals and discovery messages. As shown in FIG. 48, the synchronization and discovery channels may be mapped to the common hopping scheme and may therefore be carried by the common frequency in each frame.

In some aspects, each frame may also include a control channel. As further described herein, wireless devices may use the control channel to transmit scheduling requests and reference signals, which are then used to configure data transmissions. In the example of FIG. 48, part of the control channel is mapped to the common hopping scheme (e.g., for scheduling requests) and part of the control channel is mapped to user-specific hopping schemes (e.g., for reference signals). In some aspects, such as shown in FIG. 48, the control channel may be divided in time to include a first control channel (CH1) and a second control channel (CH2), which may enable a wireless device to receive scheduling requests and reference signals from multiple other wireless devices.

In some aspects, each frame may also include a grant channel, which wireless devices may use to respond to scheduling requests from other wireless devices. In the example of FIG. 48, the grant channel may be mapped to the common hopping scheme. In some aspects, the grant channel can also be partially or fully mapped to the user-specific frequency, such as where wireless devices initially use the common frequency and subsequently switch to the user-specific frequency once engaged in peer-to-peer communication.

In some aspects, each frame may also include a data channel, which wireless devices may use to transmit data transmissions to each other. The data channel may be mapped to the various user-specific hopping schemes, such as where wireless devices 4502 and 4504 may exchange data transmissions on their user-specific frequency in each frame, wireless devices 4504 and 4506 may exchange data transmissions on their user-specific frequency in each frame, and so forth. In the example of FIG. 48, the data channel may be divided in time into a first data channel and second data channel, which may enable a wireless device to receive data transmissions from two different wireless devices in the same frame (e.g., due to limitations which may prevent the receive chain from receiving on multiple user-specific frequencies simultaneously).

In the exemplary scenario of FIG. 48, wireless devices 4502, 4506, and 4508 may attempt to perform data transmissions to wireless device 4504. Starting with the first frame, transmission schedule 4800 may first have a section 4802 allocated for the synchronization and discovery channels. If applicable, wireless devices 4502-4508 may use section 4802 to exchange discovery messages (e.g., with other wireless devices) and to transmit or receive synchronization signals (e.g., according to their respective roles as synchronization masters, relays, or users). Wireless devices 4502-4508 may use these synchronization signals to align their local reference times (and consequently their frame and slot timings) with each other.

In the example of FIG. 48, wireless device 4502 (identified with identifier "A" in the messages of FIG. 48) may identify pending data scheduled for transmission to wireless device 4504 (identified with identifier "B"). For example, controller 4612 of wireless device 4502 may identify control or user data that wireless device 4502 is scheduled to send to wireless device 4504.

Controller 4612 then identify the common frequency for the current frame (the first frame of FIG. 48), such as by accessing a memory that stores the order of hopping frequencies for the common hopping scheme and determining which hopping frequency is assigned as the common frequency for the current frame (e.g., based on a system frame number of the current frame). Controller 4612 may then generate scheduling request 4804 ("SR AB," denoting that it is from point "A"—wireless device 4502—to device "B"—wireless device 4504), which may be a message that informs wireless device 4504 that wireless device 4502 is requesting to perform a data transmission in the data channels of one or more upcoming frames. In some aspects, scheduling request 4804 may identify wireless devices 4502 and 4504 (e.g., by device ID or link ID), specify the number of upcoming frames for the data transmission, and/or specify an amount of data scheduled for the data transmission. In some aspects, scheduling request 4804 may identify wireless device 4502 and/or 4504 via a hash value, such as where wireless device 4502 determines the hash value based on a link ID (unique to the pairing of wireless devices 4502 and 4504) and wireless device 4504 de-hashes the hash value to identify the link ID. By identifying the link ID, wireless device 4504 may identify that the scheduling request is from wireless device 452 and addressed to wireless device 4504. In some aspects where the scheduling request identifies the amount of data scheduled for the data transmission, the number of frames during which the scheduling request is active (e.g., during which wireless device 4502 is granted permission to transmit data to wireless device 4504) may depend on the subsequent grant, which (as described below) wireless device 4504 may determine based on link conditions estimated during sounding. Accordingly, while the amount of data may be predetermined, the data transmission may span a number of frames depending on link conditions and any necessary retransmissions.

Furthermore, in some aspects scheduling request 4804 may include a transmit power control indication that enables wireless device 4502 to adapt its transmit power while still enabling wireless device 4504 to estimate the channel from the subsequent sounding reference signal that is transmitted at the same power. Controller 4612 may then provide scheduling request 4804 to transmitter 4610, which may transmit scheduling request 4804 via RF transceiver 4604 and antenna system 4602.

In the example of FIG. 48, transmitter 4610 may transmit scheduling request 4804 in the first data channel (CH1). Furthermore, in some aspects the first data channel may be divided in time into a scheduling part and a sounding part. Transmitter 4610 may therefore transmit scheduling request 4804 in the scheduling part of the first data channel.

Wireless device 4504 may be configured to monitor the common frequency over time, such as by identifying the common frequency of the common hopping scheme for each frame and tuning to the common frequency. For example, controller 4712 of wireless device 4504 may identify the common frequency and instruct receiver 4708 and RF transceiver 4704 to tune to and receive signals on the common frequency. Receiver 4708 may then receive signals on the common frequency via RF transceiver 4704 and provide a resulting data stream (e.g., sample stream or bit stream) to controller 4712.

Accordingly, controller 4712 may detect scheduling request 4804 in the scheduling part of the first control channel on the common frequency. Controller 4712 may then identify that wireless device 4502 is attempting to perform a data transmission to wireless device 4504. As further described below, in some aspects controller 4712 may identify that wireless device 4502 is the transmitting device by decoding the scheduling request, while in other aspects controller 4712 may identify that wireless device 4502 is the transmitting device based on the frame and/or subcarrier on which receiver 4708 received scheduling request 4804.

After identifying wireless device 4502 as the transmitting device, controller 4712 may identify the user-specific frequency for wireless devices 4502 and 4504. For example, wireless devices 4502 and 4504 may be configured to select a certain user-specific hopping scheme, which can be done during discovery and/or be based on the device IDs of wireless devices 4502 and 4504. As each pair of wireless devices attempts to select a different one of the user-specific hopping schemes, the user-specific hopping scheme for wireless devices 4502 and 4504 may optimally be unique to wireless devices 4502 and 4504 (e.g., not selected by other pairs of wireless devices in the D2D network at the current time). In some aspects, the user-specific hopping schemes may be transmitter-specific hopping schemes. In other words, wireless devices 4502 and 4504 may use a hopping scheme selected based on the device ID of wireless device 4502, which is the transmitting device.

As controller 4712 has a priori knowledge of the user-specific hopping scheme, controller 4712 may identify the user-specific frequency for the current frame. Controller 4712 may then control RF transceiver 4704 and receiver 4704 to receive signals on the user-specific frequency during the sounding part of the first data channel.

Controller 4612 of wireless device 4502 may similarly use its a priori knowledge of the user-specific hopping scheme to identify the user-specific frequency for the current frame. Controller 4612 may then generate sounding reference signal 4806, which may be a reference signal of a predefined format known to wireless devices 4502 and 4504 (e.g., a predefined signal sequence). Transmitter 4610 may then transmit sounding reference signal 4806 via RF transceiver 4604 on the user-specific frequency during the sounding part of the first data channel.

Wireless device 4504 may then receive sounding reference signal 4806 on the user-specific frequency. Receiver 4608 may then perform channel estimation on sounding reference signal 4806 (e.g., by comparing the received signal sequence to the predefined signal sequence), and provide the resulting channel estimate to controller 4612.

The channel estimate may indicate radio conditions on the user-specific frequency, and may characterize the level of noise, interference, and/or other channel effects. Controller 4612 may then evaluate the channel estimate and select a transmit configuration for the upcoming data transmission by wireless device 4502. In some aspects, controller 4612 may select a modulation and coding scheme for wireless device 4502 to use to generate the data transmission, or may perform other link adaptation for the data transmission using the channel estimate.

Controller 4612 may then generate grant 4808 ("GR (BA)" to denote it is from device B to device A), which may indicate the transmit configuration. Controller 4612 may provide grant 4808 to transmitter 4610, which may transmit grant 4808 on the grant channel on the common frequency.

Wireless device 4502 may then receive grant 4808, which controller 4712 may process to determine the transmit configuration. Controller 4712 may then generate data transmission 4810 (including the pending data) according to the transmit configuration, such as according to the modulation and coding scheme. Controller 4712 may provide data transmission 4810 to transmitter 4710, which may transmit data transmission 4810 on the user-specific frequency on the data channel.

Wireless device 4504 may then receive data transmission 4810 on the user-specific frequency, such as where receiver 4710 receives data transmission 4810 via RF transceiver 4704 and antenna system 4702 and provides data transmission 4810 to controller 4712. Controller 4712 may then process data transmission 4810 according to its contents, e.g., by using the control or user data or by providing the data to higher protocol stack and/or application layers of wireless device 4504.

This control channel configuration may therefore enable wireless device 4504 to listen for scheduling requests on a single common frequency known in advance. Furthermore, after receiving a scheduling request wireless device 4504 may be able to tune to the user-specific frequency (on which the data transmission will occur) to receive a sounding reference signal. Because the sounding reference is on the same frequency that the data transmission will occur, wireless device 4504 may be able to obtain an accurate channel estimates on the same frequency as the data transmission.

Transmissions schedule 4800 may then progress to the second frame. As shown in FIG. 48, the second frame may also have section 4812 for the synchronization and discovery channels. In the example of FIG. 48, the pending data transmitted by wireless device 4502 may be too large for a data transmission in a single frame. Accordingly, wireless device 4502 may transmit another data transmission to wireless device 4504 in the second frame that includes more of the pending data. In some aspects, scheduling request 4804 may have specified the number of frames in advance in which wireless device 4502 would be transmitting the pending data to wireless device 4504, and grant 4808 may have confirmed this number of frames. Accordingly, grant 4808 may act as a grant for wireless device 4502 to perform data transmissions to wireless device 4504 over the number of frames. Wireless device 4502 may consequently not transmit another scheduling request in the second frame. Alternatively, in some aspects wireless device 4504 may continue to send grants to wireless device 4502 until wireless device 4502 indicates (e.g., via signaling in the payload of the data transmission) that the data transmission is finished. Accordingly, wireless device 4502 may similarly not transmit a subsequent scheduling request in the second frame, but may still transmit a sounding reference signal (as described immediately below). As wireless device 4504 has not received an indication from wireless device 4504 that the data transmission is over, wireless device 4504 may assume that the data transmission is still active and that wireless device 4502 will transmit another sounding reference signal. In some aspects, scheduling request 4804 may have specified an amount data scheduled for the data transmission. This may be a buffer status report that indicates to wireless device 4504 an initial reference as to how large the data transmission will be, and wireless device 4504 may use this information to, for example, provide a small and robust grant in scenarios where the data transmission is small.

As channel conditions may be dynamic, wireless device 4502 may transmit sounding reference signal 4814 on the user-specific frequency in the second frame, such as where controller 4612 identifies the user-specific frequency for the second frame (based on the user-specific hopping scheme for wireless devices 4502 and 4504, which may use a different user-specific frequency for the second frame from the first frame) and then provides sounding reference signal 4814 to transmitter 4610 for transmission. Wireless device 4504 may again receive sounding reference signal 4814 on the user-specific frequency and perform a channel estimate. Wireless device 4504 may then transmit a grant 4820 to wireless device 4502 which indicates the transmit configuration for the data transmission by wireless device 4502.

In the example of FIG. 48, wireless device 4506 (identified with identifier "C") may also have pending data to transmit to wireless device 4504. As shown in FIG. 48, wireless device 4506 may therefore transmit scheduling request 4816 ("SR (CB)") to wireless device 4504 on the common frequency for the second frame. Although not explicitly described here, wireless device 4506 may use the same procedure described immediately above for wireless device 4502 to transmit scheduling requests, sounding reference signals, and data transmissions. In the example of FIG. 48, wireless device 4506 may transmit scheduling request 4816 in the scheduling part of the second control channel.

As wireless device 4504 is monitoring the common frequency, wireless device 4504 may also identify scheduling request 4816. Wireless device 4504 may then identify that wireless device 4506 is the transmitting device of scheduling request 4816, and may then tune to the user-specific frequency assigned to wireless devices 4504 and 4506 in the second frame (which may be different from the user-specific frequency assigned to wireless devices 4502 and 4504 in the second frame). Wireless device 4506 may then transmit sounding reference signal 4818 in the sounding part of the second control channel. Wireless device 4504 may receive sounding reference signal 4818 on the user-specific frequency, perform a channel estimate, and respond with grant 4820 (which may be separate grants to wireless devices 4502 and 4506, although shown as a single grant in FIG. 48) to wireless device 4506 which indicates the transmit configuration for the data transmission from wireless device 4506. As shown in FIG. 48, wireless device 4506 may receive grant 4820 and then perform data transmission 4824 to wireless device 4504 on the user-specific hopping frequency in the second data channel. Wireless device 4502 may then also perform data transmission 4822 to wireless device 4504 on the user-specific frequency in the first data channel. Even in cases where wireless device 4504 is only configured to monitor one frequency at a time, the separation of the data channel into the first and second data channels may enable wireless device 4504 to receive both data transmissions.

Transmission schedule 4800 may then progress to the third frame. As shown in FIG. 48, the third frame may also have section 4826 carrying the synchronization and discovery channels. As previously described, wireless devices 4502 and 4506 may not transmit scheduling requests to wireless device 4504 in the third frame. Wireless devices 4502 and 4506 may again transmit sounding reference signals 4828 and 4834 to wireless device 4504 on their respective user-specific frequencies for the third frame.

As shown in FIG. 48, wireless device 4508 (identified with identifier "D") may also attempt to transmit pending data to wireless device 4504 in the third frame. For example, wireless device 4508 may transmit scheduling request 4830 to wireless device 4504 on the common frequency in the scheduling part of the second control channel. Wireless device 4504 may still receive scheduling request 4830 and identify wireless device 4508 as the transmitting device; however, because wireless device 4506 is already transmitting sounding reference signal 4834 during the sounding part of the second control channel, wireless device 4504 may only be able to receive sounding reference signal 4834 in the sounding part and may not be able to receive sounding reference signal 4836 from wireless device 4508 (e.g., where wireless device 4504 is configured to tune to a single frequency at a time). Wireless device 4504 may therefore ignore scheduling request 4830.

Wireless device 4504 may therefore not transmit any grant to wireless device 4508 in the third frame, and wireless device 4508 may consequently decide not to perform a data transmission in the third frame. In some aspects, wireless device 4508 may attempt to perform the data transmission in the next frame, namely by performing the same procedure of transmitting a scheduling request and sounding reference signal in subsequent frames until wireless device 4504 responds with a grant. As shown in FIG. 48, wireless device 4504 may transmit grants 4838 (e.g., separate grants, not shown separately in FIG. 48) to wireless devices 4502 and 4506 that indicates the transmit configuration for their respective data transmissions. Wireless devices 4502 and 4506 may then continue transmitting their respective pending data to wireless device 4504, specifically by performing data transmissions 4840 and 4842 on their respective user-specific frequencies in the first and second data channels of the third frame. While the example of FIG. 48 shows two control channels and two data channels (e.g., enabling wireless device 4504 to receive two data transmission in a frame), in other aspects the frame configuration may provide more or fewer control and data channels and therefore allow for wireless device 4504 to receive more or fewer data transmissions in a frame. In some aspects, controller 4712 of wireless device 4504 may remember that wireless device 4508 tried to initiate communication with wireless device 4504 with scheduling request 4830. Controller 4712 may then attempt to contact wireless device 4508 in a later frame when the control and data channels become free. In some aspects, controller 4712 may contact wireless device 4508 may attempting to establish its own communication session, such as by sending a scheduling request. In other aspects, controller 4712 may contact wireless device 4508 by transmitting a reconfiguration message, which may instruct wireless device 4508 to re-attempt to contact wireless device 4504 using a particular configuration (e.g., in a certain frame and/or using a certain control channel).

As previously indicated, wireless device 4504 may be configured to identify the transmitting device of received scheduling requests. Wireless device 4504 may then use the identity of the transmitting device to select the user-specific frequency to which to tune to receive the sounding reference signal and subsequent data transmission. In some aspects, wireless device 4504 may identify the transmitting device based on decoding received scheduling requests. For example, wireless devices may generate scheduling requests to include their device IDs as a field, where wireless device 4504 may decode the scheduling request and identify the device ID. In another example, wireless devices may communicate with each other using hashed message authentication codes, such as where each wireless device is preconfigured with one or more secret device IDs. Wireless devices may then generate hash values from message payloads based on their secret device ID, and may attach the hash value to the message payload to obtain the transmitted message. A wireless device that receives a message may therefore calculate candidate hash values based on all of the secret device IDs that it knows (e.g., stored in a trusted entity list) and determine whether any of the candidate hash values match the hash value attached to the message payload. If one of the candidate hash values matches the hash value, the wireless device may determine that the wireless device paired with the secret device ID that produced the candidate hash value was the transmitting device that generated the message. The wireless device can therefore identify that the message was transmitted by the transmitting device. In some aspects, this same use of hashing can be applied to decoding scheduling requests. For example, when controller 4712 wireless device 4504 receives a scheduling request, controller 4712 may identify a hash value attached to the payload of the scheduling request and determine whether any secret device ID in its trusted entity list can produce a candidate hash value matching the hash value in the scheduling request. If so, controller 4712 may identify the wireless device that is paired with this secret device ID as the transmitting device. Controller 4712 may therefore identify the user-specific hopping scheme assigned between wireless device 4504 and this transmitting device and use the user-specific hopping scheme to receive the subsequent sounding reference signal from the transmitting device.

Accordingly, in some aspects wireless device 4504 may be configured to use a full decoding approach to identify the transmitting device (e.g., by decoding the scheduling request to identify a device ID or by identifying the device ID with a hashing procedure). In other aspects, wireless devices 4502-4508 may be configured to use a discontinuous reception (DRX) scheme to help wireless device 4504 identify the transmitting device. For example, wireless devices 4502-

4508 may configure DRX patterns with each other, where certain wireless devices are limited to transmitting scheduling requests to other wireless devices in certain frames. A wireless device that receives a scheduling request in a given frame may therefore use the frame information to narrow down which wireless devices could have transmitted the scheduling request.

In one example, pairs of wireless devices may configure a DRX pattern to use when they discover each other. For instance, when wireless devices 4502 and 4504 perform discovery with each other, wireless device 4504 may decide that wireless device 4502 is limited to transmitting scheduling requests to wireless device 4504 only in the $k_{AB}$-th frame (the transmit frame) out of every K frames (e.g., a DRX period of K). In an example using a DRX period of K=8, wireless device 4502 may be restricted to only sending scheduling requests to wireless device 4504 during the $k_{AB}=3^{rd}$ frame of every set of 8 frames, such as in frames that have a system frame number (SFN) that fulfills the condition mod (SFN, 8)=3 (generalized as mod (SFN, K)=$k_{AB}$). This may define the DRX pattern, namely that wireless device 4502 can only transmit scheduling requests to wireless device 4504 in the assigned frame (and where the reverse direction from wireless device 4504 to wireless device 4502 may use a different DRX Pattern®. In some aspects, multiple frames out of the K frames may be assigned to a given wireless device as transmit frames of its DRX pattern. In aspects where the control channel includes multiple control channels, wireless devices 4502 and 4504 may also limit wireless device 4502 to transmitting scheduling requests in one of the control channels, e.g., the first control channel. This procedure may be handled by the respective controllers of wireless devices 4502 and 4504, which may decide on the DRX pattern. Wireless device 4502 may similarly restrict wireless device 4504 to transmitting scheduling requests to wireless device 4502 during certain frames, and wireless device 4504 may likewise restrict other wireless devices (e.g., wireless devices 4506 and 4508) to their own respective DRX patterns. Furthermore, wireless device 4504 may attempt to assign different discovered wireless devices to different DRX patterns, e.g., to have mutually orthogonal transmit frames. In other words, wireless device 4504 may select DRX patterns with different transmit frames for the respectively discovered devices.

In some aspects, wireless device 4504 may select an initial DRX pattern (e.g., an initial transmit frame or frames, depending on the specifics of the DRX pattern) based on a link ID between wireless devices 4502 and 4504. For example, during discovery wireless devices 4502 and 4504 may select a link ID that identifies this pairing of wireless devices (which may also, for example, determine the user-specific hopping scheme). Controller 4712 may then take certain bits of the link ID to select the control channel (e.g., first or second) and the transmit frames out of the DRX period based on other bits of the link ID. Controller 4612 of wireless device 4502 may then take the same bits to select the control channel and transmit frames. This may avoid extra signaling, as each wireless device may be able to determine the DRX pattern based on the link ID. In some aspects, this implicit configuration setup may also directly set up orthogonal (e.g., non-conflicting) DRX patterns for both directions, e.g., from wireless device 4502 to 4504 and from wireless device 4504 to 4502. For example, the transmit frame can be identical for the DRX patterns used by both devices but may use a different control channel (e.g., first vs. second control channel in the same transmit frame). Wireless devices 4502 and 4504 may therefore have the same transmit frames in the DRX period but use different control channels. In one example, the controller of the wireless device with the smaller device ID could pick a certain bit from the link ID and use this bit to select the control channel (e.g., first or second) for its DRX pattern. The controller of the wireless device with the larger device ID could then take the same bit from the link ID and invert it to select the control channel for its DRX pattern.

With reference to the example of FIG. 48, when wireless device 4502 has pending data to transmit to wireless device 4504, controller 4612 of wireless device 4502 may identify the next upcoming frame that is a transmit frame of the DRX pattern assigned to wireless device 4502 by wireless device 4504. This may be the first frame in FIG. 48. Controller 4612 may therefore trigger transmission of scheduling request 4804 in the transmit frame (the first frame).

Controller 4712 of wireless device 4504 may then receive scheduling request 4804 in the first frame, and may determine which wireless devices are assigned transmit frames (of their DRX patterns) of the first frame. In one example, wireless device 4502 may be the only wireless device assigned the first frame as a transmit frame. Controller 4712 may therefore be able to identify wireless device 4502 as the transmitting device based on the fact that scheduling request 4804 was transmitted in the first frame. Controller 4712 may then control receiver 4708 and RF transceiver 4704 to tune to the user-specific frequency for wireless devices 4502 and 4504 to receive sounding reference signal 4804 during the first frame (or, alternatively, may always monitor the sounding period of a configured DRX but discard the received sounding period if no scheduling request is decoded, such as where processing delays prevent wireless device 4504 from decoding the scheduling request until after the sounding period is over). In another example, there may be multiple wireless devices (including wireless device 4502) assigned the first frame as a transmit frame. Controller 4712 may still be able to limit the candidate transmitting devices to only those wireless devices that are assigned the first frame as a transmit frame, such as by attempting to de-hash scheduling request 4804 using only the secret device IDs of these candidate transmitting devices that are assigned the first frame as a transmit frame. Accordingly, instead of determining a candidate hash value for each secret device ID in the trusted entity list, controller 4712 may only determine candidate hash values for the secret device IDs of the candidate transmitting devices that are assigned the first frame as a transmit frame. This may reduce the decoding time and conserve power.

In some aspects, sounding reference signals may occur right after scheduling requests, and may therefore limit the amount of time that wireless device 4504 has to decode scheduling requests. DRX patterns may therefore enable wireless device 4504 to avoid the decoding process (e.g., if only one wireless device is assigned the first frame as a transmit frame) or to limit the complexity of the decoding process (e.g., if a limited number of wireless devices are assigned the first frame as a transmit frame). Additionally, there may be some frames that are not assigned to any wireless devices as a transmit frame. Controller 4712 of wireless device 4504 may therefore identify whether an upcoming frame is assigned to any wireless devices as a transmit frame and, if not, may deactivate receiver 4708, transmitter 4710, RF transceiver 4704 and/or antenna system 4702 for the upcoming frame (e.g., the entire frame, or for the portion of the frame other than the discovery and synchronization channel). The DRX patterns may therefore further contribute to power savings.

In some aspects, controller 4712 of wireless device 4504 may additionally or alternatively be configured to perform an early decode attempt on the scheduling request. For example, the scheduling request may be encoded in a robust manner (e.g., to achieve maximum range of the system). In one example, forward error correction redundancy bits may reduce the code rate below 0.5. In strong channel conditions, controller 4712 may be able to decode the scheduling request after only half of the correct bits are received. Accordingly, even if the sounding reference signal occurs right after the scheduling request, controller 4712 may be able to perform an early decode attempt, identify the transmitting device, and tune to the correct user-specific frequency to receive the sounding reference signal.

In some aspects using DRX patterns, wireless devices may also be configured to reconfigure DRX patterns, such as to avoid conflicts between multiple devices. For example, controller 4712 of wireless device 4504 may decide to reconfigure the DRX pattern for wireless device 4502 (e.g., select a different DRX pattern). In one example, controller 4712 may generate a DRX reconfiguration message that specifies the new DRX pattern for wireless device 4502. Transmitter 4710 of wireless device 4504 may then transmit the DRX reconfiguration message to wireless device 4502, such as in the control channel of the transmit frame assigned for wireless device 4504 to transmit to wireless device 4502. Controller 4612 of wireless device 4502 may then receive and decode the DRX reconfiguration message to identify the new DRX pattern assigned to wireless device 4502 for transmission to wireless device 4504. In some aspects, controller 4612 may then transmit a confirmation message to wireless device 4504 in the transmit frame of the new DRX pattern. This DRX reconfiguration procedure can be advantageous, for example, if wireless device 4504 discovers a new wireless device that has a DRX pattern (e.g., based on implicit DRX pattern selection from link ID) that conflicts with the DRX pattern already assigned to wireless device 4502. If so, wireless device 4504 may use the DRX reconfirmation procedure to select a new DRX pattern for the initial wireless device or the newly discovered wireless device. In other aspects where there are conflicts between transmit frames (e.g., where two wireless devices have DRX patterns with the same transmit frames), wireless device 4504 may not need to reconfigure either DRX pattern. For example, unless both wireless devices attempt to transmit at the same time (which could cause a collision) wireless device 4504 may still be able to receive scheduling requests on the control channel. While wireless device 4504 may not be able to immediately identify the transmitting device based on the current frame (as either device could have been the transmitting device), it may still be able to identify the transmitting device by decoding received scheduling requests.

In some aspects, wireless devices may also use single-tone multiplexing (e.g., on single subcarriers) for control channel transmissions on the common frequency. For example, the hopping frequencies may be configured as frequency subbands. In one example, each hopping frequency may be 180 kHz wide. As each hopping frequency is a subband, each hopping frequency may also be divided into a set of subcarriers. While a wireless device may not be able to receive multiple frequencies at one, a wireless device may be able to receive signals across the entire bandwidth of a hopping frequency, and may therefore be able to receive data on each individual subcarrier of a given hopping frequency. As each subcarrier may be able to support a single-tone transmission, this may offer greater freedom in picking subcarriers on the common frequency. For example, if a 180 kHz hopping frequency is divided into 48 single-tone subcarriers with a 3.75 kHz subcarrier spacing, transmitting devices may be able to select any of the 48 subcarriers to perform a transmission.

In some aspects, wireless devices may use such subcarrier-based common frequencies to support transmission of scheduling requests to multiple devices during a single control channel. For example, each hopping frequency may be composed of $N_{sc}$ subcarriers, which may mean that up to $N_{sc}$ transmissions (e.g., scheduling requests) can be made on the control channel at a time. Using wireless devices 4502 and 4504 as an example, wireless device 4502 may have pending data to transmit to wireless device 4504. Wireless device 4502 may then select one of the $N_{sc}$ subcarriers of the common frequency to transmit the scheduling request to wireless device 4504. In one example, controller 4612 of wireless device 4502 may select the subcarrier based on the device ID of wireless device 4504 (e.g., based on the device ID of the receiving device). This can be expressed as selecting the subcarrier as $\mathrm{mod}(userID, N_{sc})$. Wireless device 4502 may then transmit the scheduling request on this subcarrier.

As each wireless device may select the subcarrier in the same manner, wireless device 4504 may be configured to monitor only this subcarrier ($\mathrm{mod}(userID, N_{sc})$) on the common frequency during the control channel. Other wireless devices may similarly monitor their own respective subcarriers on the common frequency for scheduling requests addressed to them. If two other wireless devices attempt to send scheduling requests to wireless device 4504 in the same control channel, there may be a collision. However, this subcarrier-based common frequency can be combined with DRX patterns, which may reduce the likelihood that two or more wireless devices transmit scheduling requests to wireless device 4502 at the same time. Assigning one subcarrier to each wireless device may also avoid occasions where two unrelated devices cause a collision in between wireless device 4502 and 4504 (as the two unrelated devices will likely be using a different subcarrier for the receiving device).

Selecting a subcarrier spacing (and, by extension, the number of subcarriers $N_{sc}$ each hopping frequency is divided into) may be a tradeoff between interference and collision probability. For example, using a large subcarrier spacing (e.g., separating 180 kHz into $N_{sc}$=12 subcarriers) may yield a larger separation between subcarriers, which can suppress interference between transmissions on adjacent subcarriers (which are generally addressed to different wireless devices per their differing device IDs). However, this may mean a smaller number of subcarriers, which may increase the likelihood that two simultaneous transmissions to different devices will be mapped to the same subcarrier (e.g., by $\mathrm{mod}(userID, N_{sc})$). The collision probability may therefore be higher.

Various aspects above use a sounding reference signal to perform channel estimation. In other aspects, wireless devices may perform channel estimation on received scheduling requests. Although the scheduling request may be on a different frequency from the data transmission, these channel estimates can still be sufficiently accurate. In some cases, this can be advantageous when the scheduling request has a longer duration than the sounding reference signal, as the channel estimate may be based on a longer duration of time.

Various aspects of these control channel configurations can therefore provide a mechanism for wireless devices to monitor a single common frequency for scheduling requests while also being able to receive sounding reference signals on user-specific frequencies. This can yield efficient scheduling and operation at receiving devices, and enables the wireless devices to use frequency hopping schemes without unacceptably complicating the scheduling procedure. Furthermore, use of DRX patterns can lead to power savings and reduced decoding complexity, while subcarrier-based common frequencies can improve interference suppression without significant increases in collision probability.

Figure 49:
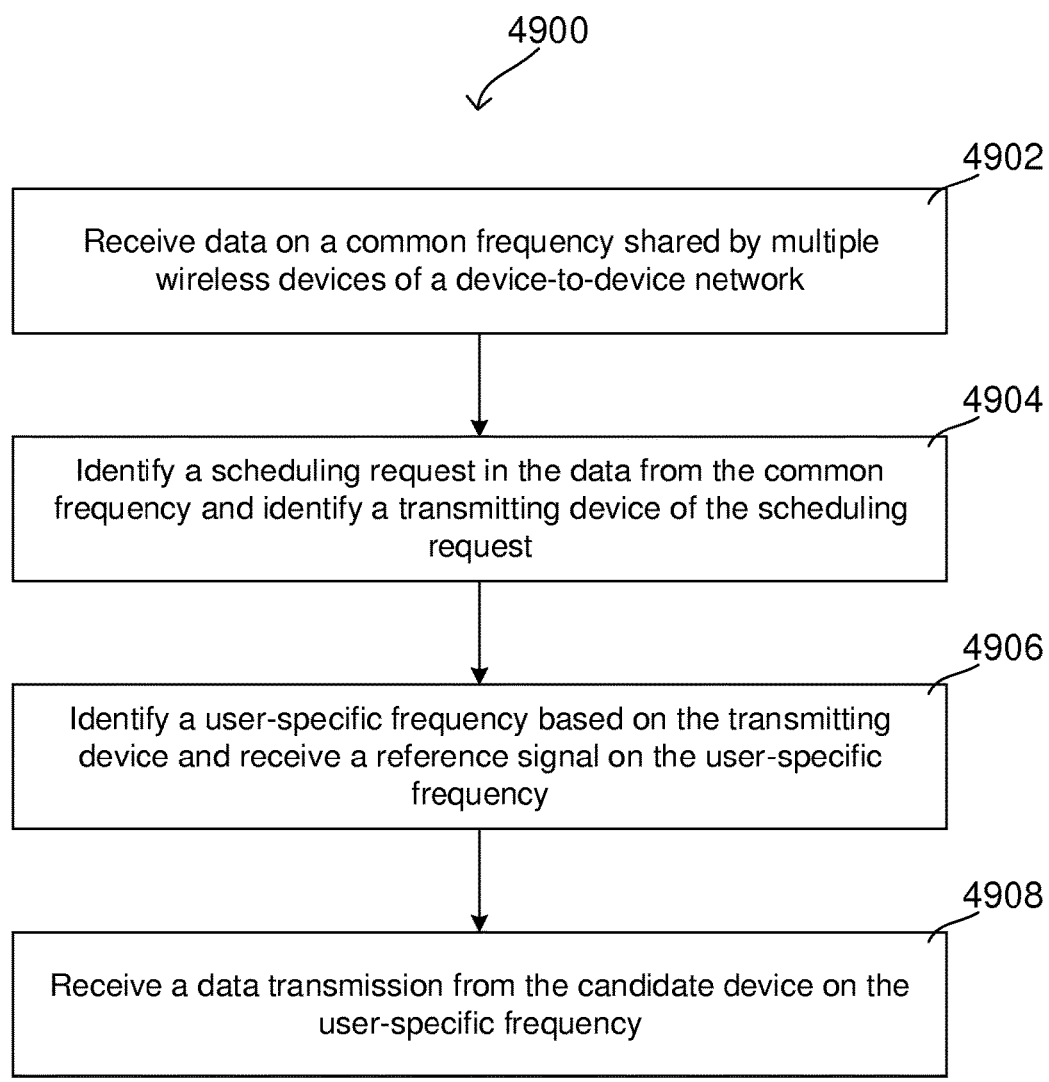
FIGS. 49 and 50 show exemplary methods of wireless communications related to control channel features according to some aspects.

FIG. 49 shows exemplary method 4900 of performing wireless communications at a wireless device according to some aspects. As shown in FIG. 49, method 4900 includes receiving data on a common frequency shared by multiple wireless devices of a device-to-device network (4902), identifying a scheduling request in the data from the common frequency and identifying a transmitting device of the scheduling request (4904), identifying a user-specific frequency based on the transmitting device and receiving a reference signal on the user-specific frequency (4906), and receiving a data transmission from the candidate device on the user-specific frequency (4908).

Figure 50:
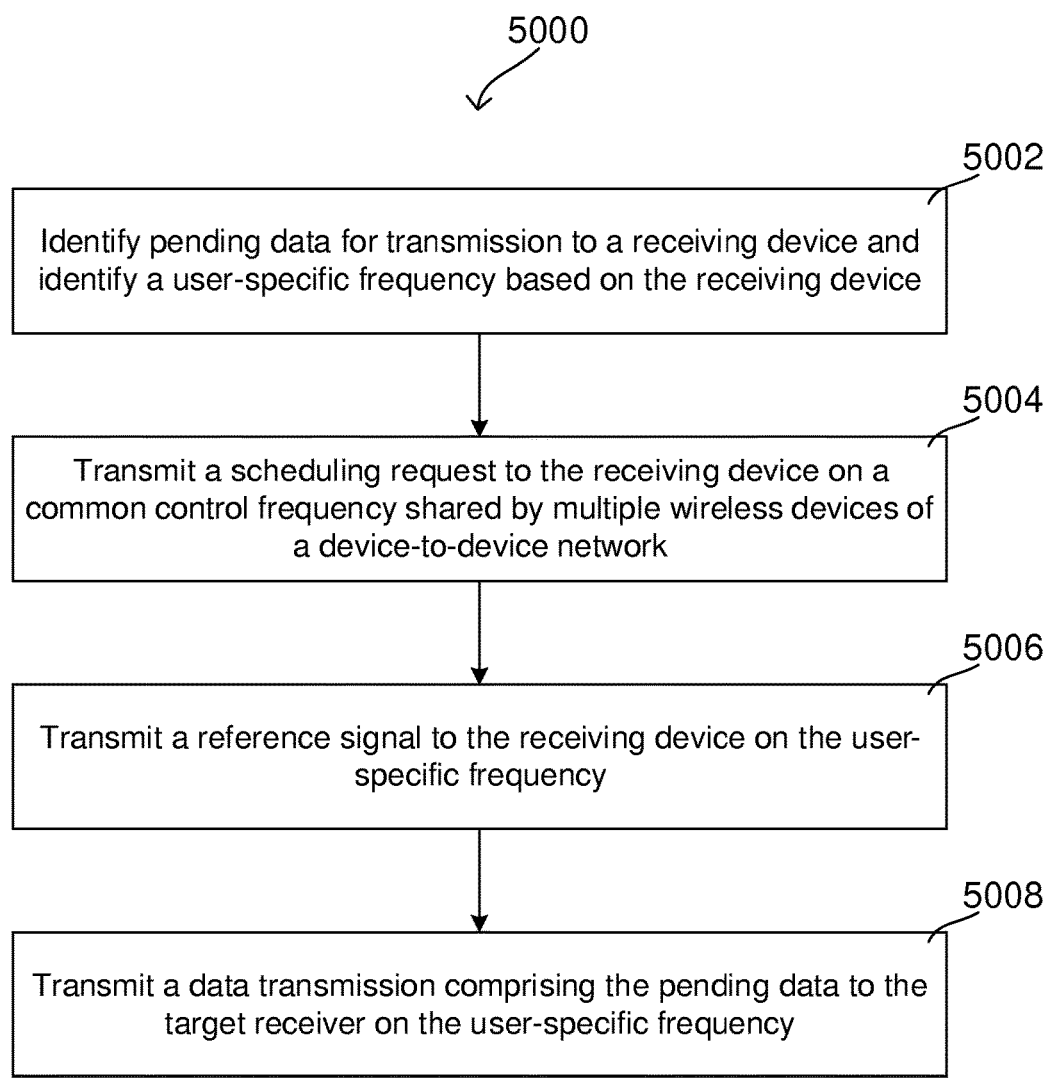

FIG. 50 shows exemplary method 5000 of performing wireless communications at a wireless device according to some aspects. As shown in FIG. 50, method 5000 includes identifying pending data for transmission to a receiving device and identifying a user-specific frequency based on the receiving device (5002), transmitting a scheduling request to the receiving device on a common control frequency shared by multiple wireless devices of a device-to-device network (5004), transmitting a reference signal to the receiving device on the user-specific frequency (5006), and transmitting a data transmission including the pending data to the target receiver on the user-specific frequency (5008).

Some aspects of this disclosure provide a wireless device (e.g., wireless device 4504) including a receiver (e.g., receiver 4708) configured to receive data on a common frequency shared by multiple wireless devices of a device-to-device network, and a controller (e.g., controller 4712) configured to identify a scheduling request in the data from the common frequency, identify a transmitting device of the scheduling request, and identify a user-specific frequency based on the transmitting device, the receiver further configured to receive a reference signal on the user-specific frequency and receive a data transmission from the candidate device on the user-specific frequency.

Some aspects of this disclosure provide a wireless device (e.g., wireless device 4502) including a controller (e.g., controller 4612) configured to identify pending data for transmission to a receiving device and to identify a user-specific frequency based on the receiving device; and a transmitter (e.g., transmitter 4610) configured to transmit a scheduling request to the receiving device on a common control frequency shared by multiple wireless devices of a device-to-device network, transmit a reference signal to the receiving device on the user-specific frequency, and to transmit a data transmission comprising the pending data to the target receiver on the user-specific frequency.

As previously described, in various aspects wireless devices may utilize satellite-based synchronization signals to align their local reference times with a universal reference time, and can in turn use the local reference time to maintain synchronization with a synchronization cluster of wireless devices. Furthermore, in some cases wireless devices may receive satellite-based synchronization signals directly from a satellite-based synchronization source, such as a navigational satellite (e.g., any type of GNSS satellite). By periodically receiving satellite-based synchronization signals from a navigational satellite, a wireless device may be able to determine its location and determine the universal reference time with a high degree of accuracy.

Using GPS satellites as an example, a wireless device may be able to determine its position with accuracy within tens of meters. As this position accuracy is a function of the propagation of RF signals at the speed of light, this accuracy in tens of meters is approximately equivalent to timing accuracy in the order of tens of nanoseconds. Other navigational satellites (e.g., Galileo, Beidou, etc.) may provide similarly high levels of positional and timing accuracy. However, while it may produce highly accurate results, receiving and processing navigational satellite signals may consume a high level of battery power, such as in the order of approximately tens of mA. This battery usage can be disadvantageous to wireless devices.

Accordingly, various aspects of this disclosure provide devices and techniques for maintaining accurate timing based on navigational satellite tracking and acquisition while limiting battery power usage. As further described below, wireless devices may use monitoring and compensation to keep timing accuracy within tolerable limits while reducing battery power expenditures. Wireless devices may therefore still be able to maintain timing accuracy sufficient for device-to-device communications without unnecessarily consuming high amounts of battery power.

Figure 51:
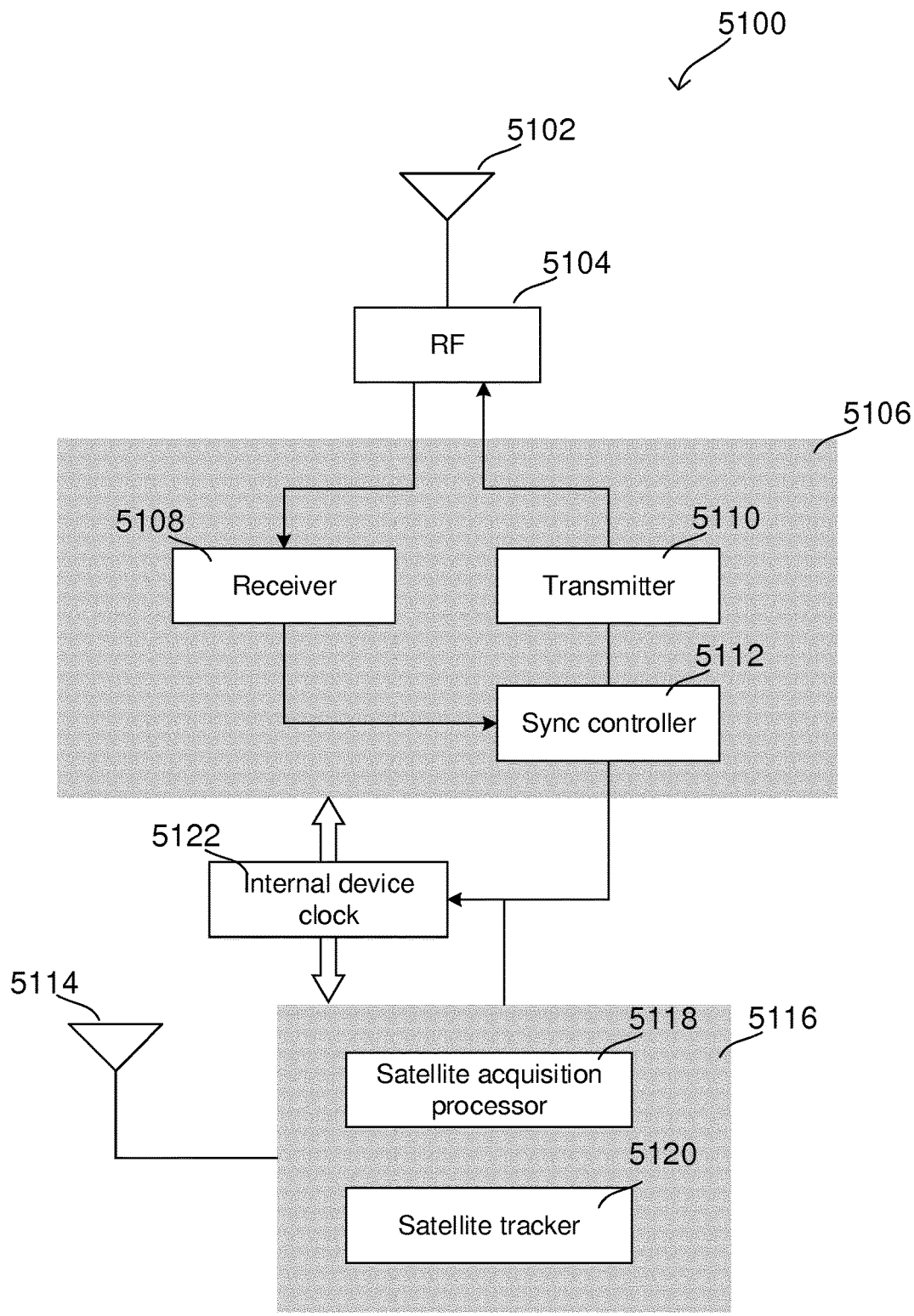
FIG. 51 shows an exemplary internal configuration of a wireless device for maintaining synchronization while conserving power according to some aspects.

FIG. 51 shows an exemplary internal configuration of wireless device 5100 according to some aspects. As shown in FIG. 51, wireless device 5100 may include antenna system 5102, RF transceiver 5104, and baseband modem 5106 including receiver 5108, transmitter 5110, and sync controller 5112. These internal components of wireless device 5100 may be configured as described above for wireless device 3204 in FIG. 33. For example, receiver 5108 may be the physical layer receive path and transmitter 5110 may be the physical layer transmit path. Sync controller 5112 may be configured to manage synchronization of wireless device 5100 with a synchronization cluster, such as by transmitting and receiving synchronization signals.

As shown in FIG. 51, wireless device 5100 may also include satellite antenna system 5114 (including one or more antennas configured to satellite signal reception), satellite receiver 5116, and internal device clock 5122 (which may be a component of wireless devices described above but may not be expressly shown in their corresponding figures). Internal device clock 5122 may be internal device clock that provides a local reference time for wireless device 5100. Internal device clock 5122 may also include a controller configured to control operation of the clock, monitor timing accuracy parameters, and trigger satellite tracking and reacquisition based on the timing accuracy parameters. These features are further described below regarding FIG. 52. Various other components, including baseband modem 5106 and satellite receiver 5116 may use this local reference time to control their operations according to a timing schedule. Internal device clock 5122 may include a local oscillator (e.g., a crystal oscillator), and may monitor the oscillations of the local oscillator to obtain a digital representation of time. This digital representation of time may be the local reference time (also referred to herein as the timing of internal device clock 5122).

As previously described for satellite receiver 3316 of wireless device 3204 in FIG. 33, satellite receiver 5116 may be configured to receive satellite-based synchronization signals from navigational satellites and to process the satellite-based synchronization signals to identify the universal reference time (e.g., approximately, with some inherent inaccuracy). Satellite receiver 5116 may also be configured to process the satellite-based synchronization signals to determine the position of wireless device 5100. As shown in FIG. 51, satellite receiver 5116 may include both satellite acquisition processor 5118 and satellite tracker 5120. Satellite acquisition processor 5118 may be a processor configured to perform acquisition on a navigational satellite system to determine the location of wireless device 5100 and to determine the universal reference time. For example, satellite acquisition processor 5118 may be configured to receive (via satellite antenna system 5114) synchronization signals from at least four navigational satellites and to solve for the position of wireless device 5100 (e.g., X, Y, and Z coordinates in three-dimensional space) and to solve for the universal reference time based on the at least four synchronization signals (which in some aspects may be more than four to increase accuracy). This can be an acquisition procedure including, for example, identifying the navigational satellites detectable by satellite acquisition processor 5118, estimating the Doppler shift of each detectable navigational satellite, searching for synchronization signals from the detectable navigational satellites based on the estimated Doppler shift (e.g., across code delay and frequency), detecting synchronization signals from the detectable navigation satellites (e.g., based on a local copy of the synchronization signal) and determining their code delays and carrier frequencies, and solving for the position of wireless device 5100 and the universal reference time based on the detected synchronization signals. As previously indicated, this positional and timing determination can be highly accurate. In some aspects, some or all of satellite acquisition processor 5118 may be supported by an application processor of wireless device 5100 (e.g., satellite acquisition processor 5118 may be part of the application processor). In some aspects, satellite acquisition processor 5118 may be configured to perform the acquisition (e.g., determining code delays and carrier frequencies of signals received from satellites) and position determination (e.g., using the code delays and carrier frequencies to solve for the position of wireless device 5100) separately, e.g., as two separate processes. Accordingly, while shown as a single component in FIG. 51, in some aspects satellite acquisition processor 5118 may include a first processor configured to perform acquisition (e.g., an acquisition processor) and a second processor configured to perform position determination (e.g., a position processor) using the satellites acquired in the accusation process. References herein to satellite acquisition processor 5118 may therefore include aspects using a single processor to perform both acquisition and position determination and aspects using separate processors to perform acquisition and position determination. Furthermore, in some aspects the acquisition processor and/or the position processor may be combined with satellite tracker 5120.

The satellite acquisition and position determination by satellite acquisition processor 5118 may therefore serve to obtain full accuracy positional and timing information (e.g., GPS acquisition). Once satellite acquisition processor 5118 acquires the navigational satellite system and determines the position of wireless device 5100 (e.g., obtains timing of the detected navigational satellite system, which all of the navigational satellites in the system may be aligned with), satellite receiver 5116 may be configured to perform satellite tracking. Satellite tracker 5120 may be configured to perform this satellite tracking. For example, satellite tracker 5120 may use the universal reference time identified by satellite acquisition processor 5118 during acquisition to track subsequent satellite-based synchronization signals that satellite antenna system 5114 receives from the navigational satellite system (e.g., tracking the code delay and carrier frequency of the synchronization signals). As satellite acquisition processor 5118 has already initially identified the code delay and carrier frequency, satellite tracker 5120 may "track" the code delay and carrier frequency of the received satellite-based synchronization satellite signals over time, such as by compensating for Doppler effects caused by motion of wireless device 5100 relative to the navigational satellites. Satellite tracker 5120 may therefore be configured to update the universal reference over time based on this tracking (as the received satellite-based synchronization signals are aligned with the universal reference time of the navigational satellite system). In some aspects, satellite tracker 5120 may be a low-power or reduced-complexity processor. As the tracking loop may be less complex than the satellite acquisition and position determination, satellite tracker 5120 may in some aspects be configured with a simpler design (e.g., supporting fewer millions of instructions per second (MIPS)) than satellite acquisition processor 5118.

Due to its complexity, the satellite acquisition and position determination performed by satellite acquisition processor 5118 may consume more power than the tracking performed by satellite tracker 5120. However, satellite receiver 5116 may not be able to rely on the tracking indefinitely, as satellite tracker 5120 may eventually lose track of the satellite-based synchronization signals (e.g., no longer be able to detect them or no longer able to detect them with sufficient accuracy to update the position or timing information). Accordingly, satellite acquisition processor 5118 may perform another acquisition procedure to re-acquire the navigational satellite system. Satellite tracker 5120 may then start tracking the navigational satellite system using the code delay and carrier frequency obtained in the reacquisition.

As shown in FIG. 51, sync controller 5112 and satellite receiver 5116 may interface with internal device clock 5122. In some aspects, sync controller 5112 and/or satellite receiver 5116 may be configured to indicate the universal reference time (e.g., derived from synchronization signals from a synchronization cluster or directly from satellite-based synchronization signals) to internal device clock 5122, which may then update the local reference time to be aligned with the universal reference time.

While the acquisition procedure may obtain the universal reference time with high accuracy, in some aspects this full accuracy level may be unnecessary for the device-to-device communications of wireless device 5100. For example, while GPS acquisition may provide the universal reference time with nanosecond-order accuracy, in some cases wireless device 5100 may only require a timing accuracy in the order of microseconds (e.g., $10^{-9}$ vs $10^{-6}$). Wireless device 5100 may therefore be configured to relax its satellite-based timing accuracy while still monitoring the timing accuracy to attempt to keep it within tolerable limits. As relaxed timing accuracy may save power, wireless device 5100 may therefore be able to reduce battery power expenditures while still maintaining timing accuracy sufficient for device-to-device communications.

Figure 52:
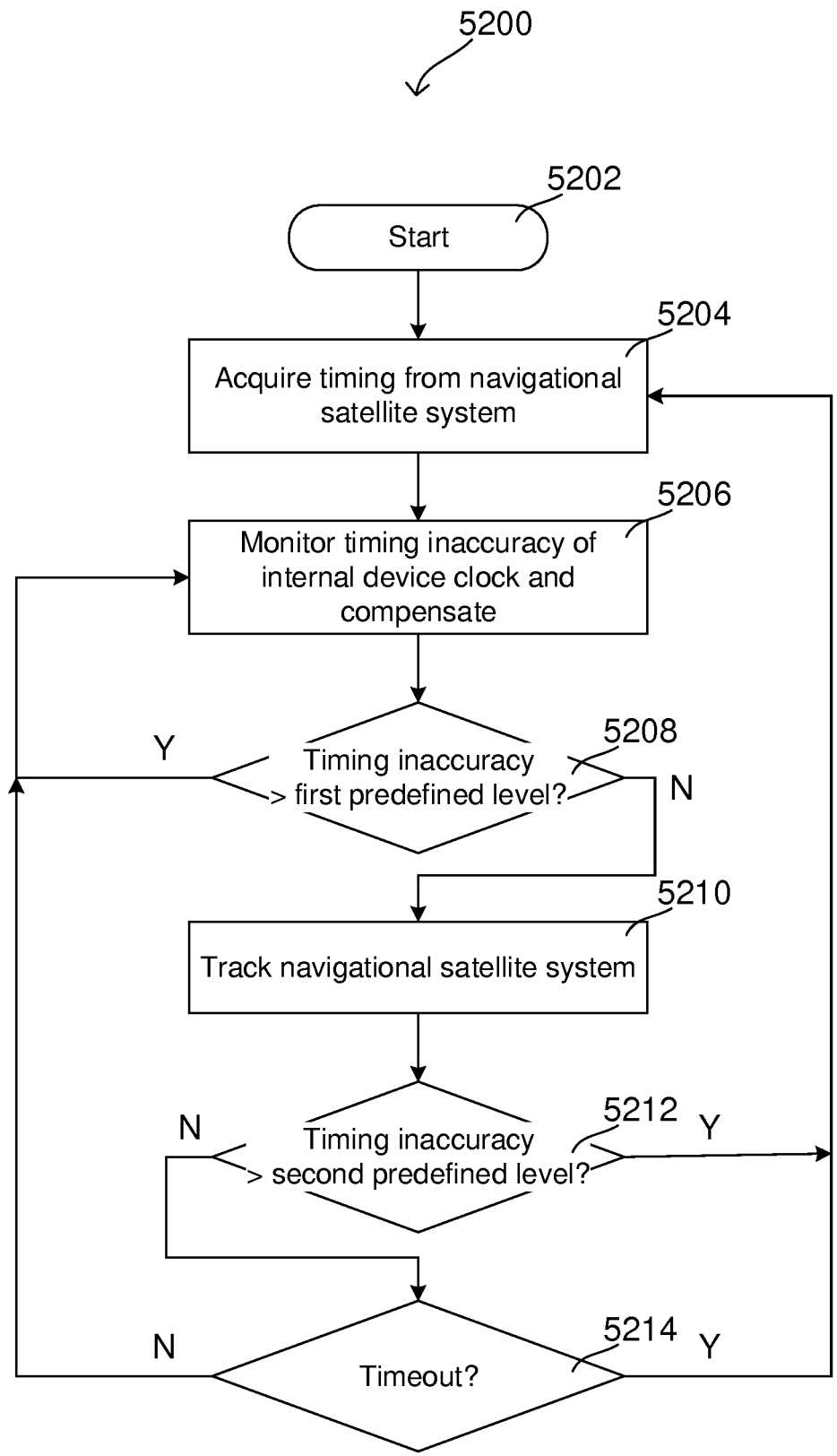
FIG. 52 shows an exemplary method of maintaining synchronization while limiting power usage according to some aspects.

FIG. 52 shows exemplary flow chart 5200 according to some aspects. Wireless device 5100 may use the procedure of flow chart 5200 to maintain time synchronization while limiting power usage. As shown in FIG. 52, after starting the procedure in stage 5202 wireless device 5100 may acquire timing from a navigational satellite system in stage 5204.

For example, satellite acquisition processor 5118 may receive and process synchronization signals from a plurality of navigational satellites (received via satellite antenna system 5114) and solve for the position of wireless device 5100 and the universal reference time of the navigational satellite system. In some aspects, this universal reference time may be the timing of an atomic clock that is shared between all navigational satellites of the navigational satellite system. The navigational satellites may be orbiting and provide a time basis for devices (e.g., those equipped with compatible satellite receivers) to measure signal propagation times from the navigational satellites to the devices. As previously indicated, satellite acquisition processor 5118 may use synchronization signals from at least four navigational satellites (e.g., acquire at least four navigational satellites) to determine the position and universal reference time. In some aspects, satellite acquisition processor 5118 may check whether the accuracy of the universal reference time is greater than a threshold. For example, some acquisition and position determination procedures may be more accurate than others (e.g., if using more navigational satellites, or using navigational satellites with strong signals). Satellite acquisition processor 5118 may therefore estimate the accuracy and compare it to a threshold. If the accuracy is less than the threshold, satellite acquisition processor 5118 may repeat the acquisition procedure of stage 5204, and may attempt to acquire more navigational satellites (which may increase the accuracy). Satellite acquisition processor 5118 may continue reacquiring (e.g., periodically) the navigational satellite system in stage 5204 until the accuracy is greater than the threshold.

After acquiring the timing via acquisition with sufficient accuracy, satellite acquisition processor 5118 may provide the universal reference time to internal device clock 5122. Internal device clock 5122 may then align the local reference time based on the universal reference time, e.g., may align the local reference time with the universal reference time. At this point, the local reference time may be highly accurate (e.g., in the order of tens of nanosecond accuracy from the universal reference time).

Starting from stage 5206, internal device clock 5122 may begin running locally starting from the universal reference time. Accordingly, internal device clock 5122 may observe the oscillations of the local oscillator and update the local reference time (e.g., the digital representation of time) based on the observed oscillations. However, the local oscillator may not be fully accurate, and the local reference time may drift relative to the universal reference time as time passes. In other words, while the local reference time may initially be aligned with the universal reference time, it may gradually drift away from the universal reference time over time (without additional satellite tracking). For example, in many cases local oscillators may be affected by temperature. For example, the crystal used for the local oscillator may oscillate at different frequencies depending on the temperature of the local oscillator. Temperature changes may therefore introduce a certain error (e.g., in parts per million (ppm)) that impact the oscillation frequency. As there is error in the oscillation frequency, the local reference time produced by internal device clock 5122 may similarly yield an error. This temperature-dependent error can therefore be a significant contributor to the drift of the local reference time.

In some aspects, satellite acquisition processor 5118 may enter a sleep state after performing acquisition in stage 5204, and may remain in the sleep state until another acquisition is triggered. This may therefore enable wireless device 5100 to conserve power. For example, in some aspects satellite acquisition processor 5118 may be part of the application processor (e.g., a satellite acquisition driver or software that executes the acquisition procedure and solution for the position and timing). Deactivating execution of the corresponding software may enable considerable power savings, thus extending the battery life of wireless device 5100.

Accordingly, as satellite acquisition processor 5118 may be deactivated, internal device clock 5122 may run locally without further alignment to the universal reference time (until the next acquisition or tracking from satellite receiver 5116). As internal device clock 5122 is running freely, it may accumulate drift over time. Consequently, as shown in FIG. 52 internal device clock 5122 may be configured to monitor the timing inaccuracy of the local reference time (as the local oscillator is running) in stage 5206. For example, internal device clock 5122 may be configured with a temperature vs. drift curve (e.g., an "S-curve"), into which internal device clock 5122 can input the current temperature and obtain an estimated drift as an output of the curve. This temperature vs. drift curve may be predefined (e.g., based on offline testing of the local oscillator at different temperatures). Furthermore, in some aspects internal device clock 5122 may be configured to update the temperature vs. drift curve over time, such as by comparing the estimated drift to the actual drift once another update to the universal reference time is obtained via reacquisition. In various aspects, internal device clock 5122 may be configured to obtain temperature measurements over time (e.g., via a temperature sensor) and to update the estimated drift based on inputting the temperature measurement to the temperature vs. drift curve. In some aspects, internal device clock 5122 may update the estimated drift over time using an integration or accumulation procedure, such as where the time spent at a given temperature affects the estimated drift (e.g., where the local oscillator running at a given temperature would produce drift dependent on both the temperature and the amount of time spent at the temperature).

As this estimated drift is an estimation, there may be some uncertainty in its accuracy. For example, as the temperature vs. drift curve is imperfect, the estimated drifts produced as output may inherently have some drift uncertainty. In some aspects, internal device clock 5122 may quantitatively characterize this drift uncertainty in the form of a parameter, which internal device clock 5122 may update and monitor over time. For example, if a series of successive temperature readings are approximately equal, this may lead to a lower drift uncertainty, as it is less likely that a sequence of closely spaced temperature readings are all inaccurate. Conversely, if the temperature readings have a high variance in short succession, it may be unlikely that the temperature readings are accurate. Consequently, internal device clock 5122 may increase the drift uncertainty. In some aspects, internal device clock 5122 may increase the drift uncertainty as more updates are made to the estimated drift based on the temperature vs. drift curve (e.g., due to the inherent uncertainty in the temperature vs. drift curve). Additionally, certain sections of the temperature vs. drift curve may have lower confidence (e.g., near the edges), and estimated drift updates based on these sections may contribute to increases in the drift uncertainty. In various cases, internal device clock 5122 may be configured to update and monitor the drift uncertainty over time, where the drift uncertainty quantifies the confidence in the accuracy of the estimated drift.

As indicated in FIG. 52, internal device clock 5122 may be configured to compensate its timing (the local reference time) based on the estimated drift over time. In other words, while the local oscillator runs and internal device clock 5122 produces the local reference time, internal device clock 5122 may compensate the local reference time based on the estimated drift of the local oscillator. As previously indicated, the temperature vs. drift curve may provide estimate drift amounts (e.g., in ppm), which quantify the approximate error in the local oscillator. Internal device clock 5122 may therefore be configured to compensate the local reference time based on the estimated drift. In some aspects, internal device clock 5122 may be configured to periodically compensate the local reference time (e.g., according to a fixed period) or may be configured to compensate the local reference time when the estimated drift exceeds a predefined threshold. This compensation may help internal device clock 5122 maintain an accurate local reference time even when the temperature introduces error into the local oscillator. When internal device clock 5122 compensates for the estimated drift, internal device clock 5122 may reduce the estimated drift (as it has been compensated). However, as the estimated drift is an approximation, internal device clock 5122 may increase the drift uncertainty when compensations are made (as the estimated drift may have been inaccurate). Internal device clock 5122 may therefore continue to let the local oscillator run while compensating for the estimated drift and monitoring the estimated drift and drift uncertainty. Compensation of the local reference time may help wireless device 5100 to continue device-to-device communications. As further detailed below, satellite tracker 5120 may use the local reference time when satellite tracking is triggered in stage 5210, and may therefore use the local reference time to time its tracking loops. Accordingly, the temperature-dependent drift compensation performed by internal device clock 5122 may provide more accurate timing, which satellite tracker 5120 may then use to perform more accurate tracking loops.

The estimated drift and drift uncertainty may characterize the timing inaccuracy of the internal device clock, such as where the estimated drift gives the approximate drift relative to the universal reference time and the drift uncertainty gives the confidence in this estimated drift. When these parameters are higher, the timing inaccuracy is likewise higher. As shown in FIG. 52, internal device clock 5122 may determine whether the timing inaccuracy (represented by the estimated drift and drift uncertainty) is greater than a first predefined level in stage 5208. For example, internal device clock 5122 may compare the estimated drift and/or drift uncertainty to a first drift threshold and/or a first uncertainty threshold, respectively, in stage 5208. If the estimated drift and/or drift uncertainty is greater than their respective first thresholds (e.g., if the timing inaccuracy is greater than a first predefined level, where the first predefined level is defined by the first thresholds), this may mean that the local reference time is insufficiently accurate. For example, as previously indicated, some device-to-device communication systems may rely on timing accuracy in the range of microseconds. The first drift and/or uncertainty thresholds may therefore be predefined thresholds in the range of microseconds, and may be selected based on tolerable limits of drift and drift uncertainty for the device-to-device communication system used by wireless device 5100. Accordingly, if the estimated drift exceeds the first drift threshold or the drift uncertainty exceeds the first uncertainty threshold, the local reference time may be too inaccurate (e.g., if the timing inaccuracy is greater than a first predefined level) to support device-to-device communications.

As shown in FIG. 52, if the estimated drift and/or drift uncertainty are less than their respective thresholds (e.g., if the timing inaccuracy is less than the first predefined level), internal device clock 5122 may continue monitoring the estimated drift and drift uncertainty and compensating for the estimated drift in stage 5206. As long as the timing inaccuracy remains less than the first predefined level, internal device clock 5122 may continue to use the local oscillator for the local reference time (e.g., without satellite tracking or acquisition). This may conserve power, as wireless device 5100 may use only local time tracking without having to activate satellite acquisition processor 5118 or satellite tracker 5120.

In another example, the first drift threshold and first uncertainty threshold may be tuned to tolerable limits of satellite tracking (e.g., as opposed to the tolerable limits of device-to-device communications). For instance, as previously discussed wireless devices may be able to perform an initial acquisition of a navigational satellite system and subsequently perform tracking on the navigational satellite system, where the tracking uses the initial acquisition as an anchor and continues to "track" the navigational satellites over time. As long as the timing used for the tracking remains within tolerable tracking limits, a wireless device may be able to remain locked to the navigational satellites and continue to update its position and the universal reference time. Accordingly, if the local reference time remains accurate (e.g., estimated drift and drift uncertainty within tolerable tracking limits, i.e., the timing inaccuracy less than the first predefined level), satellite tracker 5120 may still be able to track the navigational satellite system using the universal reference time provided by satellite acquisition processor 5118 from acquisition. In such cases the first drift threshold and the first uncertainty threshold may be selected based on the tolerable tracking limits. By comparing the estimated drift and/or the drift uncertainty to the first drift and drift uncertainty thresholds in stage 5208, internal device clock 5122 may determine whether the local reference time is accurate enough to continue tracking. If the local reference time is accurate enough to resume tracking (e.g., if the estimated drift and drift uncertainty are less than their respective first thresholds), wireless device 5100 may return to stage 5206 to continue to monitoring and compensating. However, if the timing inaccuracy is greater than the first predefined level, this may mean that wireless device 5100 is in danger of losing its ability to track the navigational satellite system. Wireless device 5100 may therefore need to trigger tracking soon, as waiting too long may prevent resumption of tracking and require reacquisition.

The thresholds used for triggering reacquisition can therefore be based on the tolerable limits of device-to-device communications or the tolerable limits of satellite tracking. In either case, if internal device clock 5122 determines that the inaccuracy of the local reference time is less than a first predefined level (e.g., if the estimated drift and/or drift uncertainty are less than their respective first thresholds), wireless device 5100 may continue monitoring and compensating in stage 5206. However, if the timing inaccuracy is greater than the first predefined level (e.g., if the estimated drift and/or timing uncertainties are greater than their respective thresholds), wireless device 5100 may trigger tracking of the navigational satellite system. As shown in FIG. 52, satellite tracker 5120 may track the navigational satellite system in stage 5210. For example, as previously indicated satellite tracker 5120 may use the local reference time from internal device clock 5122 (which may have been compensated for estimated drift as part of stage 5206) to time its tracking of satellite-based synchronization signals from the navigational satellite system. This procedure is known as a tracking loop, where satellite tracker 5120 may use the previous detection timing of the synchronization signals to detect the next synchronization signals transmitted by the navigational satellite system. This can include using the code delay and carrier frequency from acquisition and compensating for Doppler effects to continue receiving the satellite-based synchronization signals. As the navigational satellites transmit these synchronization signals with tight periodicity, satellite tracker 5120 may continue to "track" their arrival. Satellite tracker 5120 may obtain updated values of the universal reference time based on the detected timing of the synchronization signals in the tracking loop. Furthermore, in some aspects satellite tracker 5120 may enter a sleep state between tracking loops, and may therefore conserve power by only performing tracking when triggered (e.g., when the timing inaccuracy is greater than the first predefined level).

After performing a tracking loop, satellite tracker 5120 may provide an updated value of the universal reference time to internal device clock 5122. Internal device clock 5122 may compensate the local reference time based on the updated value of the universal reference time obtained by satellite tracker 5120, such as by aligning the local reference time to the updated value of the universal reference time. Because satellite tracking is considered higher accuracy than compensating based on drift, updating the local reference time to the universal reference time from the tracking loop may re-set the local reference time to a high-accuracy value. Accordingly, internal device clock 5122 may update the estimated drift and drift uncertainty after aligning the local reference time with the updated value of the universal reference time from the tracking loop.

In some aspects, satellite tracker 5120 may also monitor the tracking uncertainty of the updated values of the universal reference time. For example, motion by wireless device 5100 and by the navigational satellites may produce Doppler effects. As the tracking loop depends on receiving the satellite signals at certain frequencies, these Doppler effects may negatively impact the accuracy of the tracking loop. When there is considerable device or satellite movement, the updated values of the universal reference time produced by the tracking loop may not be accurate. Satellite tracker 5120 may therefore quantify this inaccuracy as a tracking uncertainty, which may have a greater value when satellite tracker 5120 detects larger relative motion between wireless device 5100 and the navigational satellites. In some aspects, satellite tracker 5120 may estimate the Doppler shift (e.g., based on the received synchronization signals) and determine the tracking uncertainty based on the Doppler shift. Satellite tracker 5120 may provide this tracking uncertainty to internal device clock 5122.

Wireless device 5100 may therefore have several parameters related to the timing inaccuracy, including the estimated drift, drift uncertainty, and tracking uncertainty. When these timing accuracy parameters are low, wireless device 5100 may have higher confidence that the local reference time is within the tolerable limits for device-to-device communication. However, if these timing accuracy parameters grow too large, wireless device 5100 may not have sufficiently accurate timing to perform device-to-device communications.

Accordingly, as shown in FIG. 52 internal device clock 5122 may compare these timing accuracy parameters to estimated drift, drift uncertainty, and/or tracking uncertainty thresholds in stage 5212, such as to check whether the timing inaccuracy is greater than a second predefined level. For example, internal device clock 5122 may compare the estimated drift to a second drift threshold (higher than the first drift threshold), compare the drift uncertainty to a second drift uncertainty threshold (higher than the first drift uncertainty threshold), and/or compare the tracking uncertainty to a tracking uncertainty threshold. As the second drift and drift uncertainty thresholds may be higher than the first estimated drift and drift uncertainty thresholds from stage 5208, the second predefined level may be higher than the first predefined level. If the timing inaccuracy is less than the second predefined level, wireless device 5100 may be able to continue using the local oscillator and tracking loops, and may proceed to stage 5214 to check for a timeout. However, if the timing inaccuracy is greater than the second predefined level (e.g., the estimated drift, drift uncertainty, and/or tracking uncertainty is greater than their respective thresholds), internal device clock 5122 may trigger reacquisition in stage 5204.

For example, if the timing accuracy parameters are all below their respective thresholds (e.g., the timing inaccuracy is less than the second predefined level), internal device clock 5122 may proceed to stage 5214. However, if some or all of the timing accuracy parameters are above their respective thresholds (e.g., the timing inaccuracy is greater than the second predefined level), internal device clock 5122 may trigger reacquisition in stage 5204, such as where satellite acquisition processor 5118 enters an active state and performs another acquisition on the navigational satellite system. For example, internal device clock 5122 may trigger reacquisition if the estimated drift is greater than the second drift threshold, if the drift uncertainty is greater than the second drift uncertainty threshold, and/or if the tracking uncertainty is greater than the tracking uncertainty threshold. This second drift threshold, second drift uncertainty threshold, and tracking uncertainty threshold may define the second predefined level, or in other words, may signify whether the timing inaccuracy is greater than or less than the second predefined level.

If internal device clock 5122 determines that the timing accuracy parameters are within tolerable limits (timing accuracy within the second predefined level), internal device clock 5214 may proceed to stage 5214. In stage 5214, internal device clock 5122 may determine whether a timeout has occurred. For example, internal device clock 5122 may be configured to periodically trigger reacquisition (e.g., regardless of the timing accuracy parameters). For example, internal device clock 5122 may be configured to trigger a reacquisition every 15 or 20 minutes. As the reacquisition timeout is infrequent, there may not be a considerable power penalty. Internal device clock 5122 may therefore determine in stage 5214 whether the reacquisition timeout occurs, and if so may trigger a reacquisition in stage 5204. If not, internal device clock 5122 may not trigger a reacquisition and satellite tracker 5120 may be configured to continue to perform tracking in stage 5120.

By executing flow chart 5200, wireless device 5100 may be able to maintain sufficient timing accuracy (e.g., within the tolerable limits of device-to-device communications) while managing power consumption. In particular, as satellite reacquisition processor 5118 may only perform reacquisition at infrequent intervals (e.g., when the timing inaccuracy exceeds the second predefined level), wireless device 5100 may reduce power expenditures. Wireless device 5100 may similarly reduce power expenditure because satellite tracker 5120 may only perform tracking when the timing inaccuracy exceeds the first predefined level. Furthermore, because device-to-device communications may rely on less accurate time (e.g., in the order of microseconds) compared to the timing accuracy provided by satellite acquisition, wireless device 5100 may still be able to support device-to-device communications even with infrequent satellite reacquisition. Moreover, as the timing accuracy is tracked over time, wireless device 5100 may still trigger satellite acquisition when needed and may therefore avoid unacceptable timing inaccuracy.

Figure 53:
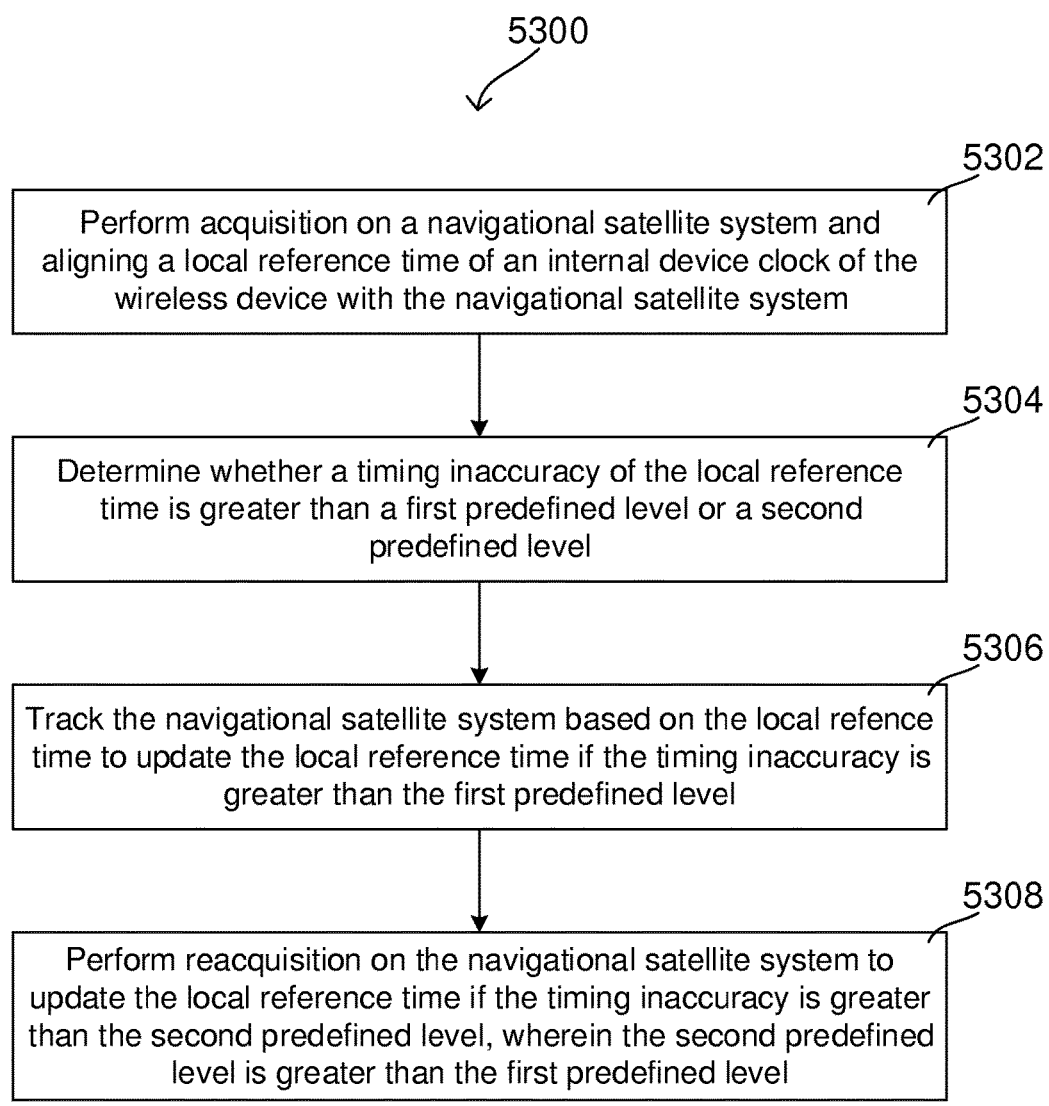
FIG. 53 shows an exemplary method of performing synchronization at a wireless device according to some aspects.

FIG. 53 shows exemplary method 5300 of performing synchronization at a wireless device. As shown in FIG. 53, method 5300 performing acquisition on a navigational satellite system and aligning a local reference time of an internal device clock of the wireless device with the navigational satellite system (5302), determining whether a timing inaccuracy of the local reference time is greater than a first predefined level or a second predefined level (5304), tracking the navigational satellite system based on the local refence time to update the local reference time if the timing inaccuracy is greater than the first predefined level (5306), and performing reacquisition on the navigational satellite system to update the local reference time if the timing inaccuracy is greater than the second predefined level, wherein the second predefined level is greater than the first predefined level (5308).

Some aspects of this disclosure provide a wireless device (e.g., wireless device 5100) including a satellite acquisition processor (e.g., satellite acquisition processor 5118) configured to perform acquisition on a navigational satellite system, an internal device clock (e.g., internal device clock 5122) configured to align a local reference time with the navigational satellite system based on the acquisition and to determine whether a timing inaccuracy of the local reference time is greater than a first predefined level or a second predefined level, and a satellite tracker (e.g., satellite tracker 5120) configured to track the navigational satellite system based on the local refence time to obtain an updated value for the local reference time if the timing inaccuracy is greater than the first predefined level, wherein the satellite acquisition processor is configured to perform reacquisition on the navigational satellite system to obtain an updated value for the local reference time if the timing inaccuracy is greater than the second predefined level, wherein the second predefined level is greater than the first predefined level.

In the context of 3GPP wireless communication standards including GSM, UTMS, LTE, CDMA, etc., RAN5 and RAN4 provide the specification for conformance testing at the radio interface for the terminal device (i.e. user equipment, UE) and the RF aspects. Equipment vendors develop the test equipment and conformance test cases certified by the Global Certification Forum (GCF) and/or the Personal Communications Service (PCS) Type Certification Review Board (PTCRB) as part of the industry standard conformance acceptance testing.

However, for any type of non-3GPP compliant devices and systems, there is no commercial test equipment available than can be used to build conformance test environments to perform compliance testing according to tailored system-specific designs and requirements.

According to some aspects, a flexible test environment is introduced to cover conformance testing aspects of radio transmission and reception characteristics, physical channel demodulation performance, and protocol signaling procedures of proprietary and/or non-3GPP compliant systems. In this sense, the methods and devices provided herein provide for dynamic and adaptable implementations in order to conform to a wide range of test cases for any type of system.

According to some aspects, methods and devices are configured with an interoperable test system for verification and conformance testing of a wireless communications system. This wireless communications system may be, for example, proprietary and non-3GPP compliant. The test system utilizes a terminal device's multi-core architecture to support self-generated test vectors. In some aspects, the generation of physical reference channels and the building of multiple frame structures is performed to generate waveforms (e.g. IQ samples) for uplink (UL) transmission. These waveforms may be fed back to the receiver of the terminal device so that a specially configured in-device signal analyzer may perform receive (Rx) characteristics measurements.

In this manner, the disclosure herein creates a conformance environment ensuring the implementation of all types of wireless radio systems, including those that may be non-3GPP compliant. The high quality of proprietary systems conformance compliance testing is crucial to the launch of products to the market. Currently, there are no commercial test equipment and/or test setups available to meet specific needs. Furthermore, it is especially important to create such a test environment which can diagnose issues observed during system level feature verifications, RF key performance indicator (KPI), LAB KPI, and field testing.

Figure 54:
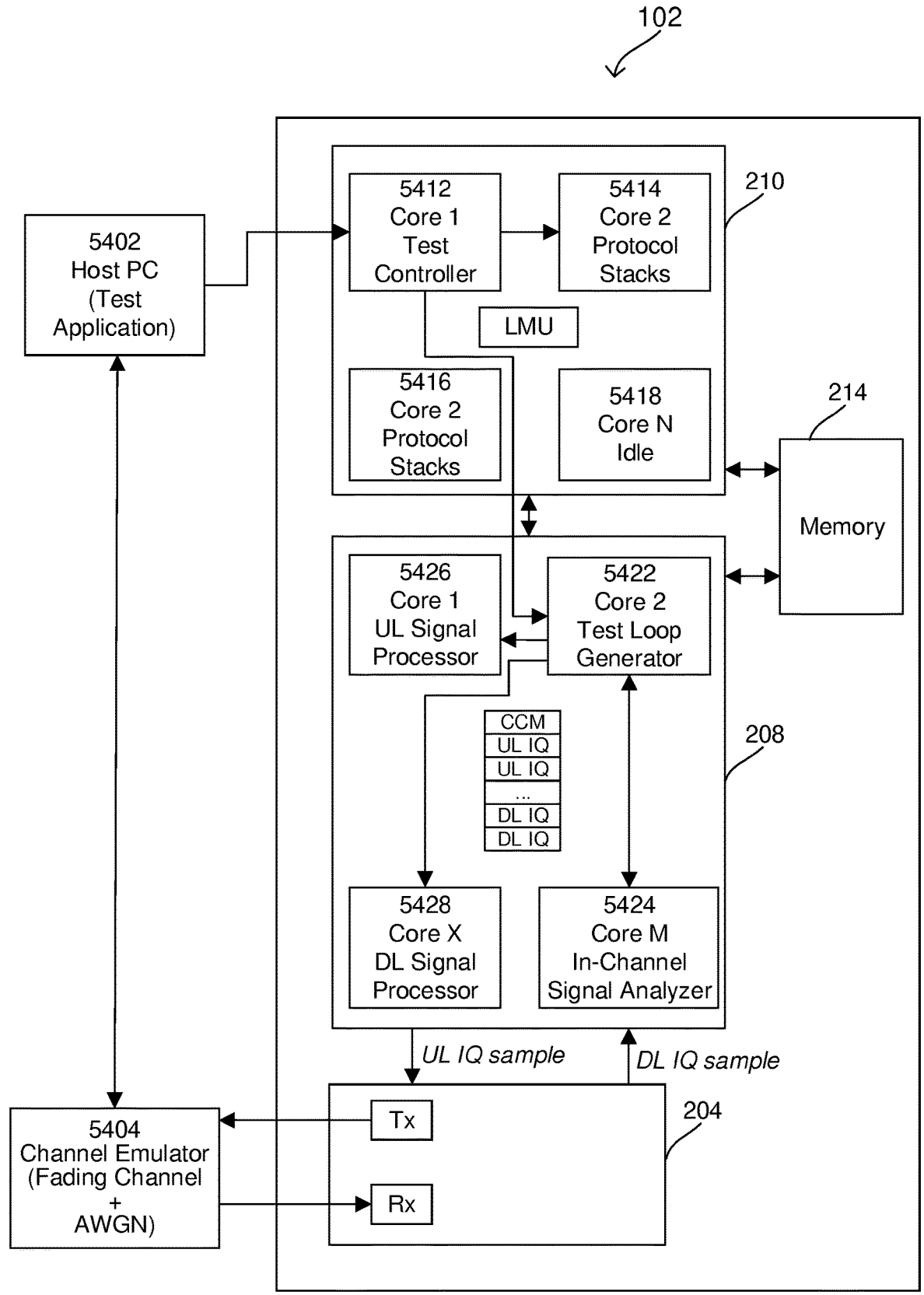
FIG. 54 shows a system block diagram according to some aspects.

FIG. 54 shows a system block diagram 5400 according to some aspects. It is appreciated that system block diagram 5400 is exemplary in nature and may therefore be simplified for purposes of this explanation.

The terminal device 102 under test, i.e. device under test (DUT), includes a multi-core central processing unit, e.g. protocol processor 210; a multi-core DSP processing unit, e.g. DSP 208; an RF sub-system, e.g. RF transceiver 204; memory storage, e.g. memory 214; and other components which are omitted for purposes of simplicity. The test system shown in FIG. 54 utilizes the terminal device's 102 powerful, multi-core architecture which supports a rich library of DSP functions, such as FFT functions, inverse FFT (iFFT) functions, finite impulse response (FIR) functions, infinite impulse response (IIR) functions, matrix and vector math functions, etc.

The test application may runs on an external computer such as Host PC 5402 providing the pre-defined test control commands which may be specifically designed by the test user. These test control commands are designed to configure the terminal device 102 to be run under different test modes.

Test controller 5412 may be configured as a core in the protocol processor 210 and/or software module running on one of the protocol processor 210 cores. It receives the test control commands and configures other components of the terminal device 102, e.g. Core 2-Protocol Stacks 5414 relevant to the test control commands and Test Loop Generator 5422, to execute test sequences according to the received test control commands. The radio access technology (RAT) components which are not intended for use in the test may be deactivated by the test controller 5412, e.g. idle Core X 5416 and idle Core N 5418. Processor 210 may further be configured with a local memory unit (LMU).

Test loop generator 5422 may be configured as a core in the DSP 208 and/or software module running on one of the DSP 208 cores. It receives configuration messages from test controller 5412 and prepares pre-defined physical channel parameters for different measurement purposes, e.g. according to the test commands. Test loop generator 5422 may command the uplink (UL) signal processing unit(s) 5426 to generate the reference measurement channels including frame structures in order to generate waveforms, i.e. IQ samples, for UL transmission. The self-generated UL IQ samples may be stored in an internal core cluster memory (CCM) or they be offloaded to an external memory, e.g.

memory 214, which may include, for example, double date rate (DDR) memory. The UL IQ samples may be stored for later use by the In-Channel Signal Analyzer 5424 as a reference input.

In-Channel Signal Analyzer 5424 may be configured as a core in the DSP 208 and/or software module running on one of the DSP 208 cores. Since terminal device 102 is configured under the special test mode by test controller 5412 some of the DSP 208 cores may be idle and the In-Channel Signal Analyzer 5424 may be configured to utilize the multi-core DSP architecture's complex transform functions, matrix and vector math functions, interpolation and filter functions to perform various measurements of the reception and transmission characteristics such as error vector magnitude (EVM), adjacent channel leakage ratio (ACLR), out-of-band emission (OOB), frequency error, peak and root mean square (RMS) received signal strength indication (RSSI), signal-to-noise ratio (SNR), block error rates (BERs), etc., of the physical channels.

The self-generated uplink signals, e.g. the UL IQ samples, are modulated and up-converted by the RF transceiver 204. The RF signal may then be fed into a channel emulator 5404, wherein the Host PC 5402 may select different fading profiles defined by standards body. IN addition, additive white Gaussian noise (AWGN) may be injected by the channel emulator 5404 for signal analysis under different SNR conditions. The modified RF signal is then fed back into the RF transceiver's 204 Rx chain.

After down-conversion and demodulation of the received modified RF signal, the digital downlink (DL) IQ sample may be transferred to the DSP 208, e.g. the CCM. The test loop generator 5422 may then instruct the In-Channel Signal Analyzer 5424 to perform the aforementioned measurement tasks. The results of the measurements may be compared with a target value defined by an internal specification and/or the previously stored IQ samples, and in addition, the raw data may be sent back to the Host PC 5402 for visualized presentation.

Figure 55:
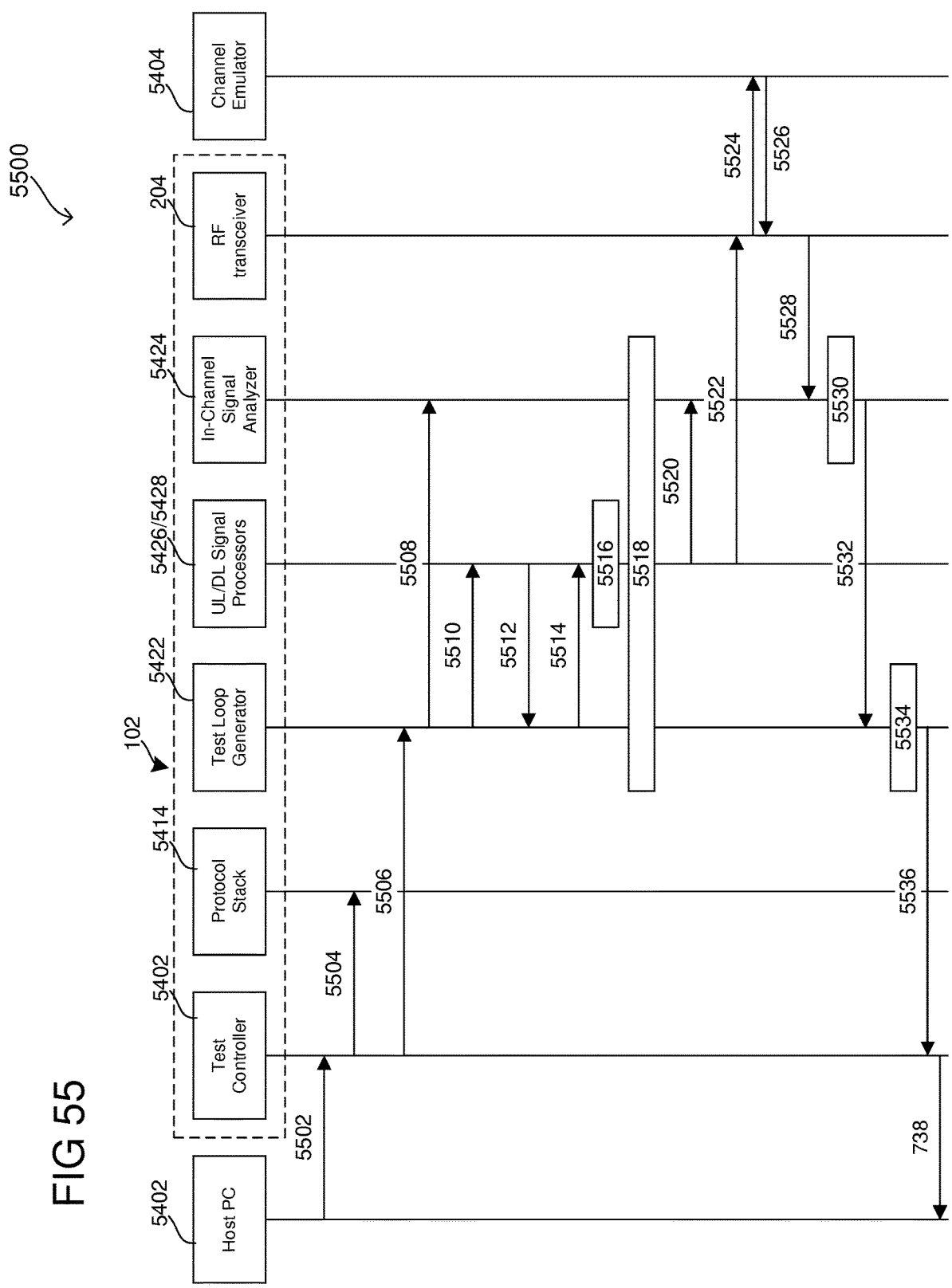
FIG. 55 shows a message sequence chart for device testing according to some aspects.

FIG. 55 shows a message sequence chart (MSC) 5500 to perform measurements according to some aspects. It is appreciated that MSC 5500 is exemplary in nature and may therefore be simplified for purposes of this explanation.

In 5502, the Host PC 5402 sends the test application with the test control commands to the Test Controller 5412 of the terminal device 102. The test application may include a "start_test_mode" message including information to a particular RAT to be tested, e.g. RAT "A"; a test mode type, e.g. test_mode; measurements to be performed, e.g. measurement_type; and/or modulation schemes to implement, e.g. modulation X.

In 5504, the Test Controller 5412 instructs the Protocol Stack 5414 to deactivate the RAT(s) which will not be subject to the test measurements, e.g. RAT "B" and RAT "C".

In 5506, the Test Controller 5412 sends a configuration message to the Test Loop Generator 5422 for the test sequences. This may include the measurements to be performed, e.g. measurement_type; and/or modulation schemes to implement, e.g. modulation X.

In 5508, the Test Loop Generator 5422 sends a message to the In-Channel Signal Analyzer 5424 to commence signal analysis, e.g. start_sig_analysis, which may include the measurement types.

In 5510, the Test Loop Generator 5422 sends a request for test mode activation on the UL/DL Signal Processors 5426/5428, e.g. activate_tm_req, and in 5512, the UL/DL Signal Processors 5426/5428 response with a confirmation that the test sequences are ready for generation, e.g. activate_tm_cnf.

In 5514, the Test Loop Generator 5422 sends a request to generate the UL signal (the UL IQ samples) to the UL/DL Signal Processors 5426/5428, e.g. generate_ul_sig_req. This request may include information for a pre-defined channel as outlined in the test control command and include a frame format, e.g. frame_format; number of frames, e.g. number_of_frames; resource allocation, e.g. resource_allocation; modulation, e.g. modulation X; and/or a channel power, e.g. channel_power. For example, for a data communication channel's, such as the Physical Downlink Shared Channel (PDSCH), multi-tone frame format, the Tx power may be set to 26 dBm, and for the single tone frame, the Tx power may be set to 30 dBm. These cases may be provided to achieve maximum coupling loss. It is appreciated that these are non-limiting examples and other parameters may be set depending on the use case scenarios provided by the test sequences.

In 5516, the UL/DL Signal Processors 5426/5428 performs the channel coding and necessary physical layer processing according to the received request, and generates the UL digital IQ samples, which may be stored in 5518, e.g. the UL IQ samples may be stored in CCM of DSP 208.

In 5520, UL IQ sample information, e.g. IQ info, is transmitted to the In-Channel Signal Analyzer 5424 and may include the stored UL IQ memory address.

In 5522, the UL IQ samples are transferred to the RF transceiver 204 for up-conversion and modulation in order to transmit the signal 5524 to the channel emulator 5404. After applying the chosen fading profile and/or AWGN to the signal, the channel emulator 5404 feeds the signal back 5526 to the RF transceiver 204.

After down-converting and demodulating the signal, the RF transceiver 204 forwards the received DL IQ samples in 5528 to the In-Channel Signal Analyzer 5424.

Figure 56:
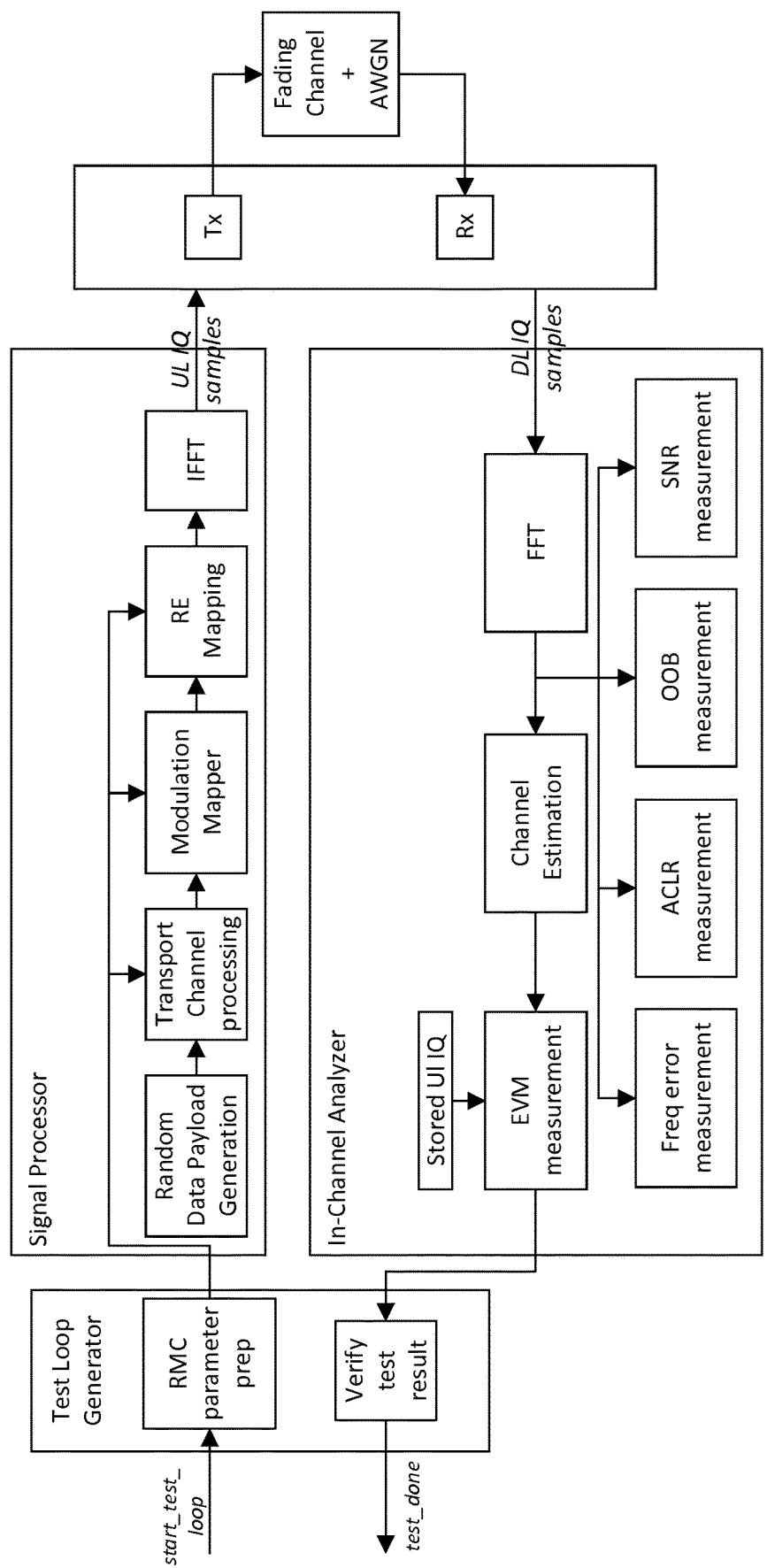
FIG. 56 shows a high level ODFM-based implementation block diagram according to some aspects.

In 5530, the in-channel signal analysis for the given measurements type(s) is performed on the DL IQ samples. This may include, for example, the In-Channel Signal Analyzer 5424 performing Error Magnitude Vector (EVM), frequency error measurement, Adjacent Carrier Leakage Ratio (ACLR), Out of Band (OOB) spurious, and/or Signal Noise Ratio (SNR) analysis. FIG. 56 includes a block diagram highlighting these measurement examples.

Once the signal analysis is complete, In-Channel Signal Analyzer 5424 forwards 5532 the signal analysis results to the Test Loop Generator 5422.

In 5534, the results may be compared to the target value and/or the UL IQ samples that were stored as described in 5518. This may include comparing to the target values specified by the design specification. For example, the EVM measurement results may be compared to the target designed by the specification, e.g. 17.5% at QPSK 15 kHz and 12 subcarriers; 12.5% at 16QAM, etc. The ACLR measurement results may be compared, for example, to a target such as 40 dBc in a 3.75 kHz SC-channel at 7.5 kHz offset.

In 5536, the Test Loop Generator 5422 indicates to the Test Controller 5412 that the test is done. This may include providing verdict results, test results, and/or raw data.

In 5538, the Test Controller 5412 provides the Host PC 5402 with the data output resulting from running the test measurements. This may include test result vectors that the Host PC 5402 may further analyze and/or display in a visualized presentation.

FIG. 56 shows a high level ODFM-based implementation block diagram 5600 according to some aspects. Block diagram 5600 provides a detailed visual explanation and message flow in parallel with the disclosure provided with respect to FIGS. 54 and 55 above. It is appreciated that block diagram 5600 is exemplary in nature and therefore may be simplified to be consistent with the disclosure of FIGS. 54 and 55.

Upon receiving a start_test_loop message from the Test Controller, the Test Loop Generator may perform Reference Measured Channel (RMC) preparation and instruct the signal processor to perform the necessary transport channel processing, modulation mapping, and resource element (RE) mapping. The signal processor may also generate a random data for the payload to be used in the UL IQ samples.

After receiving the signal from the Channel Emulator and down-converting and demodulating the signal to DL IQ samples, the In-Channel Analyzer may perform one or more of a frequency error measurement, ACLR measurement, OOB measurement, and/or SNR measurement. The In-Channel Analyzer may also perform a channel estimation prior to performing an EVM measurement and the results may be compared to the stored UL IQ samples. At least one of the aforementioned measurement results may then be provided to the Test Loop Generator to provide to the Test Controller.

Figure 57:
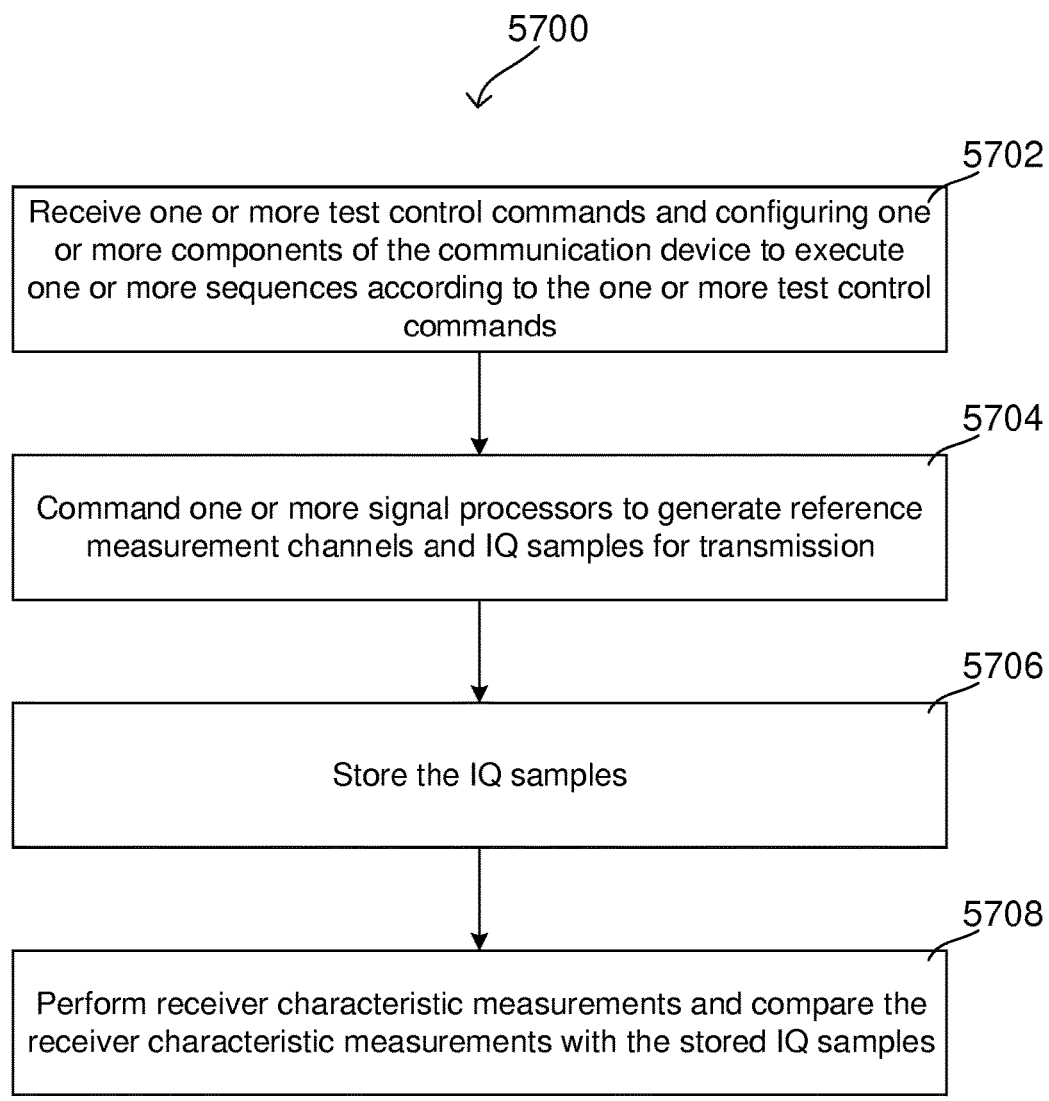
FIG. 57 shows a flowchart according to some aspects.

FIG. 57 shows a flowchart 5700 describing a method for a terminal device to conduct conformance testing according to some aspects. It is appreciated that flowchart 5700 is exemplary in nature and simplified for purposes of this explanation.

In stage 5702, the terminal device receives one or more test control commands and configures one or more components of the communication device to execute one or more sequences according to the one or more test control commands.

In stage 5704, the terminal device commands one or more signal processors to generate reference measurement channels and IQ samples for transmission.

In stage 5706, the terminal device stores the IQ samples.

In stage 5708, the terminal device performs receiver characteristic measurements and compares the receiver characteristic measurements with the stored IQ samples.

With reference to FIG. 3, wireless devices may take the role of synchronization masters that may broadcast synchronization signals that synchronization relays and synchronization slaves may use to synchronize with the synchronization master. The synchronization masters may in turn be synchronized with a satellite-based or internal synchronization source. The synchronization master role may be assigned to one or more wireless devices (synchronization master candidates) in a synchronization master selection phase before a synchronization master handover or when initial D2D communication between wireless devices is initiated, i.e. during synchronization phase 402 in FIG. 4.

Figure 58:
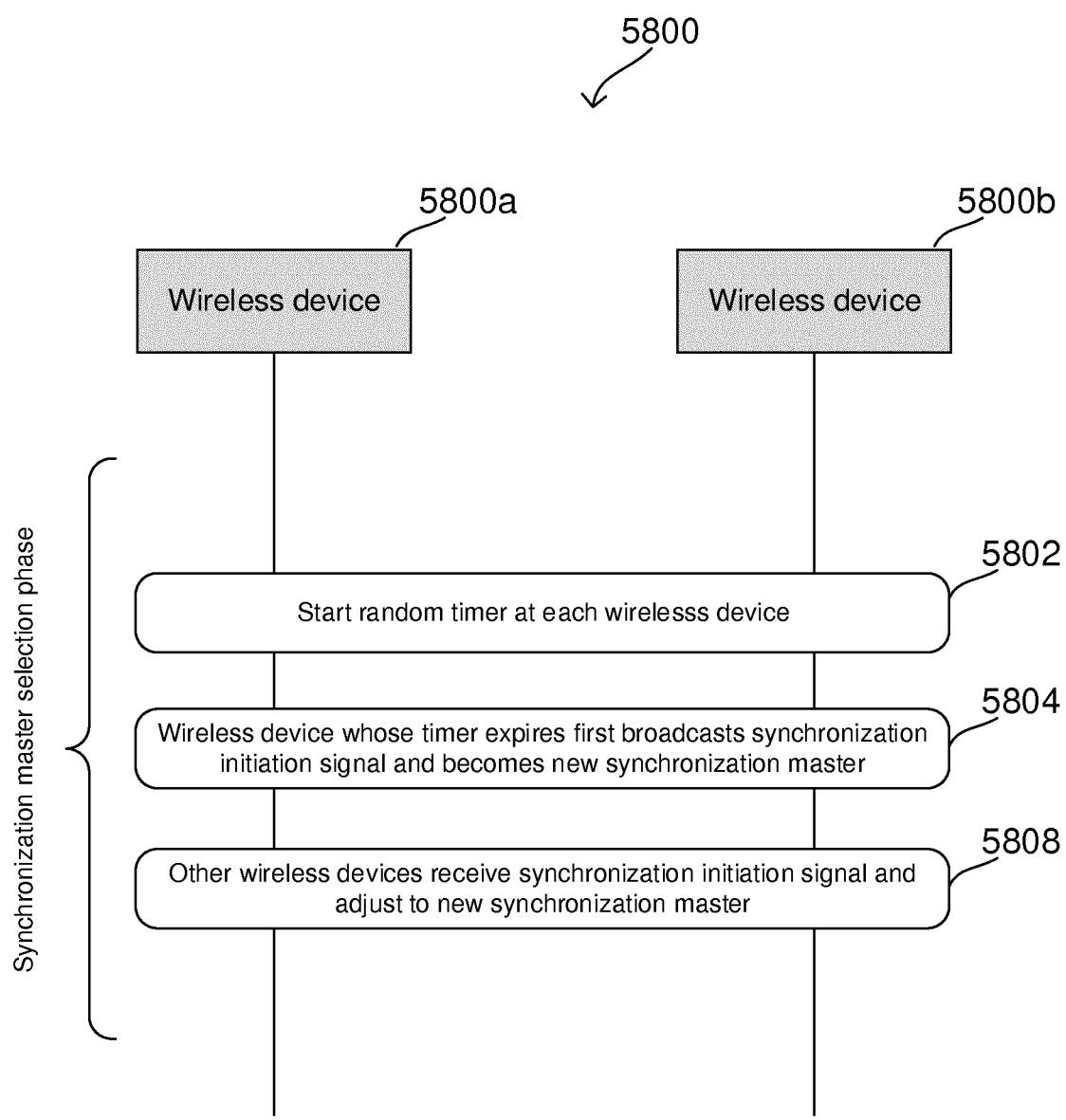
FIG. 58 shows an exemplary event sequence chart illustrating synchronization master selection based on random selection periods according to some aspects.

FIG. 58 shows exemplary event sequence chart 5800 illustrating synchronization master selection exemplarily illustrating only wireless devices 5800a and 5800b representative for a potentially larger group of wireless devices. As shown, at stage 5802, a random timer is started at each wireless device participating in synchronization master selection ("synchronization master candidates" in the following) to start a corresponding selection period of random timing. When a first one of the random timers has expired, the corresponding wireless device (e.g. wireless device 5800a) broadcasts a synchronization initiation signal at stage 5804. The synchronization initiation signal may be a first one of synchronization signals periodically transmitted by wireless device 5800a as synchronization master and/or may be a signal including information identifying wireless device 5800a as new synchronization master. The remaining devices (e.g. wireless device 5800b), the timers of which may still be active, receive the broadcasted synchronization initiation signal and adjust to the device broadcasting said synchronization initiation signal (e.g. wireless device 5800a) as new synchronization master at stage 5806. Adjusting to said new synchronization master may involve stopping respective active random timers and an adjustment of internal processing at each device to timing in accordance with synchronization signals of the new synchronization master.

Figure 59:
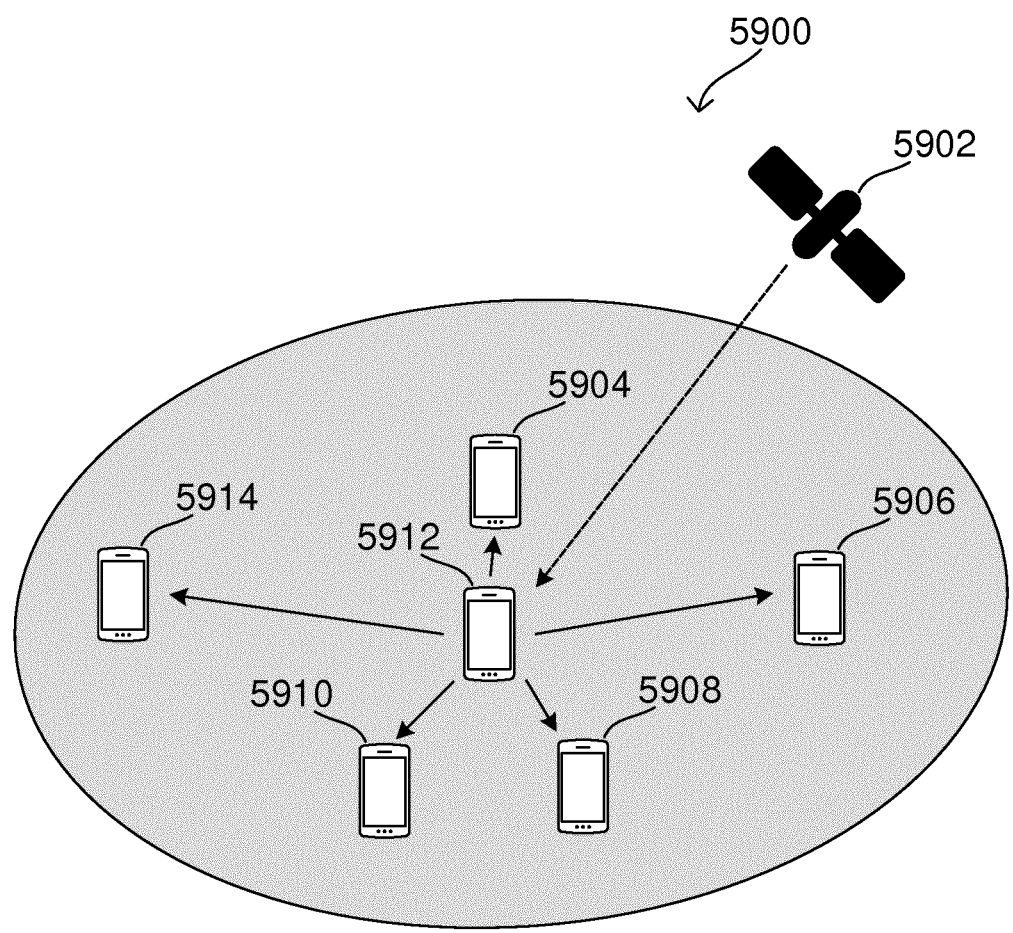
FIG. 59 shows a group of wireless devices forming a synchronization cluster according to some aspects.

FIG. 59 shows a group of wireless devices 5904, 5906, 5908, 5910, 5912, 5914, wherein in certain aspects each wireless device is configured for device-to-device (D2D) communication with the other devices. In certain aspects, the group of wireless devices 5904, 5906, 5908, 5910, 5912, 5914 forms a synchronization cluster 5900 where wireless device 5912 assumes a synchronization master role. As indicated by the dashed arrow between the satellite-based synchronization source 5902, synchronization cluster 5900 may be a satellite-based synchronization cluster synchronized via wireless device 5912 with satellite-based synchronization source 5902 or a peer-based synchronization cluster synchronized to an internal synchronization source (e.g. internal device clock based on UTC) of wireless device 5912. Thus, wireless device 5912 broadcasts periodic synchronization signals used by each of the further wireless devices 5904, 5906, 5908, 5910, 5914. In certain aspects, any one of the wireless devices 5904, 5906, 5908, 5910, 5914 may act to relay the synchronization signal to any one of wireless devices 5904, 5906, 5908, 5910, 5914 or to a further wireless device not illustrated. Synchronization cluster 5900 may perform synchronization master selection based on random timers in accordance with the sequence event chart 5800 of FIG. 58 such that each of the further wireless devices 5906, 5908, 5910, 5904, 5914 may become a next synchronization master. However, in case that for example wireless device 5906 located at an edge of synchronization cluster 5900 becomes a synchronization master, broadcast of synchronization signals e.g. to wireless device 5914 located at an opposing edge of the synchronization cluster 5900 may become instable for example when distance between the wireless devices 5906 and 5914 increases or due to channel fluctuations. Selecting a wireless device at an edge of a synchronization cluster may thus not always be optimal in terms of synchronization master reliability. In turn, selection of a wireless device as next synchronization master located at a cluster edge may nevertheless be feasible if a corresponding wireless device is capable of transmitting periodic synchronization signals at sufficiently high transmission power. At the same time, stabilizing a broadcast of synchronization signals e.g. from wireless device 5906 to wireless device 5914 by increasing transmission power at the wireless device 5906 may cause issues in terms of power consumption and battery state at wireless device 5906. Thus, as periodic broadcast of synchronization signals consumes energy and thus battery power, selection of a new synchronization master of low battery state may also be non-optimal.

Various aspects of this disclosure relate to synchronization master selection techniques that can alleviate such issues. As further described herein, in accordance with various aspects of the present disclosure, synchronization master selection may take into account selection information, e.g. selection factors evaluated and weighted at or for each individual wireless device. In accordance with one aspect of the present disclosure, at least one of the selection factors may be employed for adjusting a duration of a selection period after which a wireless device for which a selection period has been adjusted to be shortest transmits a synchronization initiation signal and thus becomes a new synchronization master. In an alternative aspect in accordance with the present disclosure, selection information may be transmitted from at least one synchronization master candidate to another wireless device, in certain aspects to the current synchronization master, which decides on a new synchronization master based on the received selection information. In this way, various aspects of the present disclosure may ensure a synchronization master selection balancing for example reliability of a synchronization signal provided to relay and slave wireless devices and power consumption within the synchronization cluster.

In accordance with various aspects of the present disclosure, selection factors may be included in categories, such as for example a Quality-of-Service (QoS)-category, a communication-stability-category, or a power-consumption-and-balancing-category. Further selection factors may in further aspects be included in different categories.

In various aspects, the QoS-factor-category may for example include selection factors in relation to type and quality of a synchronization source, such as a satellite-based (e.g. GNSS based) synchronization source or a non-satellite-based synchronization source, at each wireless device. For example, a selection factor $f_1$ included in this group may relate to the synchronization source type (satellite-based synchronization source (GNSS) vs. non-satellite-based synchronization source) at each wireless device. A weighting factor $w_1$ may be employed corresponding to $f_1$, the weighting factor $w_1$ being indicative of a relative importance of this selection factor in relation to different selection factors. A value of $f_1$ may be employed at each synchronization master candidate for evaluating $f_1$ in accordance with a particular synchronization source available for each synchronization master candidate. In accordance with certain aspects, weight values may be common across wireless devices within a synchronization cluster (e.g. may be preset at each wireless device), while in accordance with various aspects, selection factors may be specific for a wireless device.

For example, if in a given scenario importance of $f_1$ as compared to other selection factors may be average, a value of 5 out of a range of 1 to 10 may be assigned to the weighting factor $w_1$ corresponding to $f_1$. If in this scenario, accuracy of the synchronization source is evaluated and the particular wireless device (e.g. wireless device 312 in FIG. 3) may be capable of using a satellite-based synchronization source (with higher accuracy as compared to e.g. an internal clock), a higher value of the selection factor $f_1$ may be employed, e.g. a value of 10 out of a range from 0 to 10 as compared to a wireless device not capable of using a satellite-based synchronization source. A low value of e.g. 1 may be employed as the value of the selection factor $f_1$ for a wireless device not capable of using a satellite-based synchronization source (e.g. wireless device 322 in FIG. 3).

As will be described below, in accordance with various aspects of the present disclosure, the weighted selection factors may be used e.g. at each wireless device for setting a selection period of a synchronization master selection phase. In certain aspects, the selection period, which may be set using a back-off timer at each participating wireless device, is a period for selecting one wireless device of a group of wireless devices (e.g. wireless devices 5904, 5906, 5908, 5910, 5912, 5914 in FIG. 59) to become a synchronization master device for broadcasting periodic synchronization signals to be received by the group of wireless devices. For example, instead of using a random timer at each wireless device, a base duration of a selection period may be predefined. Based thereon, a higher valued weighted selection factor (e.g. a higher value of $w_1 f_1$) may decrease said base duration, while a lower valued weighting factor (e.g. a lower value of $w_1 f_1$) may increase said base duration. Similarly, respective durations of the selection timer (back-off timer) and/or period may be predefined for respective values of $w_1 f_1$. Further, in various aspects of this disclosure, respective values of weighted selection factors may be transmitted from each synchronization master candidate to a certain wireless device, in various aspects to the current synchronization master, and may be processed by this device, e.g. by the current synchronization master, to select a new synchronization master based on weighted factors received from wireless devices participating at synchronization master selection within the synchronization cluster.

Referring back to the selection factor categories, a further selection factor $f_2$ in the QoS-factor-category may in certain aspects relate to a quality of the synchronization source such as e.g. achievable time accuracy of an internal clock and/or a satellite visibility/reception strength. A weight $w_2$ can be assigned to selection factor $f_2$ indicating its relative importance as compared to different selection factors. For a given synchronization master candidate, a respective value can then be employed for $f_2$, where a large value may be indicative of a high quality of the synchronization source (e.g. good satellite reception in an outdoors situation), while a smaller value may be indicative of a low quality of the synchronization source (e.g. poor satellite reception in an indoors situation).

In various aspects, the communication-stability-category may include selection factors relating to an impact of a synchronization master handover on current communications ongoing within the synchronization cluster. An example of a selection factor included in this category may in certain aspects be a selection factor $f_3$ corresponding to a relative distance between a synchronization master candidate and the current synchronization master. A weight $w_3$ may be assigned to selection factor $f_3$ indicating its relative importance to different selection factors, while a value employed for $f_3$ may represent a magnitude of the relative distance for a certain synchronization master candidate.

A relative distance between the current synchronization master (e.g. wireless device 5912 in FIG. 59) and a synchronization master candidate (e.g. wireless devices 5904, 5906, 5908, 5910, 5914 in FIG. 59) may in various aspects be determined based on received signal strength of received synchronization signals. Thereby, in certain aspects, the relative distance may be determined at each synchronization master candidate based on the received signal power of a received synchronization signal and the transmitted synchronization signal power at the synchronization master. In certain aspects, the transmitted synchronization signal power at the synchronization master may be a predefined value or may be communicated (e.g. broadcasted) by the synchronization master to the synchronization master candidates. The determined relative distance may in certain aspects be used at each synchronization master candidate for evaluation of the corresponding weighted factor $w_3 f_3$ or may be transmitted to the current synchronization master to determine the weighted factor $w_3 f_3$.

In addition or alternatively, a relative distance between the current synchronization master and a synchronization master candidate may in various aspects be determined based on satellite positioning signals received at the synchronization master and a synchronization master candidate. For example, in certain aspects, the synchronization master may broadcast its satellite-based location which can be compared by each of the synchronization master candidates to an own satellite-based location. Further, in certain aspects, satellite-based locations of the synchronization master candidates may be transmitted to the current synchronization master to be compared to the synchronization master satellite position at the synchronization master.

With further reference to FIG. 59, a relative distance between wireless device 5912 assuming the role of the current synchronization master and the wireless device 5904 is smaller than the relative distance between wireless devices 5912 and 5906. As a consequence, as wireless device 5904 is in close proximity to wireless device 5912, an average distance between wireless 5912 (the current synchronization master) and all other wireless devices of synchronization cluster 5900 is closer to the average distance between communication device 5904 (in close proximity) and all communication devices of cluster 5900 than to the average distance between communication device 5906 (far away) and all communication devices of cluster 5900. Handing over the synchronization master role from wireless device 5912 to wireless device 5904 may in the shown exemplary case thus be advantageous in terms of overall communication stability and synchronization master reliability within the cluster 5900 as it can be assumed that the communication device 5904 in close proximity may broadcast a synchronization signal receivable at all wireless devices of cluster 5900 with similar reception quality as in the case of a synchronization signal broadcasted by the current synchronization master 5912. Thus, in certain aspects, for a given weight value $w_3$ assigned to $f_3$ (the weight $w_3$ indicating the relative importance between $f_3$ and different selection factors), a larger value may be employed for $f_3$ for a synchronization master candidate closer to the current synchronization master as compared to a synchronization master candidate farther away from the current synchronization master.

However, in various aspects it may still be feasible and sometimes even desirable (e.g. if communication device 5904 is low on battery power) to nevertheless hand over the synchronization master role to wireless device 5906 (farther away), if for example allowed by the capability of wireless device 5906 to transmit synchronization signals with transmission power sufficiently high to reliably reach all wireless devices within synchronization cluster 5900. Thus, in various aspects, the communication-stability-category may further include selection factor $f_4$ indicative of a transmission power capability of a synchronization master candidate to broadcast synchronization signals. A weighting factor $w_4$ may be assigned to the selection factor $f_4$ to indicate its relative importance as compared to different selection factors, e.g. to the selection factor $f_3$ in the same category, while a value may be employed for $f_4$ to evaluate this factor for a certain synchronization master candidate. For example, a lower value of $f_4$ may be employed for a synchronization master candidate with small or low capability to transmit a synchronization signal at large transmission power and/or with a low battery level.

In various aspects, the power-consumption-and-balancing-category may include selection factors indicative of power consumed by the synchronization mechanism and included for balancing power consumption within the synchronization cluster. For example, a selection factor $f_5$ may be included in this category corresponding to a respective battery level of synchronization master candidates. A weighting factor $w_5$ may be assigned to this selection factor $f_5$ to indicate its relative importance in comparison with further selection factors, while a value may be employed for $f_5$ to represent the actual battery level of a given synchronization master candidate. For example, the value employed for $f_5$ may be smaller in case of a low battery level of a given synchronization master candidate and may be larger in case of a high battery level of a given synchronization master candidate.

In various aspects, a further selection factor $f_6$ included in this category may correspond to power consumption caused by the type of synchronization source type. For example, reception of a timing reference from a satellite-based synchronization source (GNSS) may consume more power at a synchronization master as compared to reception of a timing reference from a non-satellite-based synchronization source e.g. an internal synchronization source, such as an internal device clock e.g., based on UTC. Thus, a weighting factor $w_6$ may be assigned to $f_6$ to indicate its relative importance as compared to different selection factors, while a value may be employed for $f_6$ to indicate the synchronization source that a certain synchronization master candidate is capable of using. For example, in certain aspects, a lower value may be employed for $f_6$ in case of a synchronization master candidate likely to use a satellite-based synchronization source (higher power consumption expected) as in case of a synchronization master candidate likely to use a non-satellite-based synchronization source (lower power consumption expected). In this way, in certain aspects it may be possible to balance relative importance of accuracy of a timing reference against its cost of potentially higher power consumption at a synchronization master by appropriately employing values for selection factors $f_1$ and $f_6$ and by appropriately weighting the same using weighting factors $w_1$ and $w_6$.

Thus, each selection factor may in various aspects be assigned a weight, indicating its relative importance with respect to the other selection factors. A value may be employed for each selection factor for the individual wireless device under evaluation. Without limitation, this is exemplarily illustrated for selection factor $f_3$. For example, and without restriction, values for weight $w_3$ may range from 0.1 to 1, 1 indicating a high importance of selection factor $f_3$ and 0.1 indicating a low importance. In a certain scenario, weight $w_3$ assigned to selection factor $f_3$ may take a value of 0.5 which would correspond to an average importance of selection factor $f_3$ as compared to the further selection factors. In order to prefer selection of a synchronization master candidate in close proximity to the current synchronization master over a synchronization master candidate located farther away from the current synchronization master, a higher value may be employed for selection factor $f_3$ for a synchronization master candidate in close proximity, while a lower value may be employed for selection factor $f_3$ for a synchronization master candidate farther away from the current synchronization master. For example, if possible values employed for selection factor $f_3$ may range from 1 to 10, a corresponding weighted factor $w_3 f_3$ for a candidate in close proximity may be 5 ($f_3=10$, $w_3=0.5$), while a corresponding weighted factor $w_3 f_3$ for a candidate far away may be 0.5 ($f_3=1$, $w_3=0.5$).

In various aspects of the present disclosure, selection factors as exemplarily discussed above may each be weighted in accordance with its relative importance as compared to other selection factors, while a value may be employed for each selection factor for a certain synchronization master candidate. Weighted selection factors for a certain wireless device j (synchronization master candidate j) may be combined to derive a score $s_j$ (selection value) for each synchronization master candidate. In certain aspects, a resulting score value $s_j$ may be obtained for the synchronization master candidate j by combining the individually weighted selection factors using equation (1).

$$s_j = \sum_{i=1}^{N} w_i f_i, \quad (1)$$

where $f_i$ is the i-th selection factor, $w_i$ is the corresponding weight and N is the total number of factors.

As mentioned above, in accordance with one aspect of the present disclosure, selection information may be employed for adjusting a duration of a selection period (or a corresponding back-off timer) after which a wireless device for which a selection period has been adjusted to be shortest transmits a synchronization initiation signal and thus becomes a new synchronization master. In accordance with various aspects of this disclosure, selection information may correspond to at least one selection factor $f_{ij}$ for synchronization master candidate j, to at least one weighted selection factor $w_{ij}f_{ij}$ for synchronization master candidate j, and/or to at least one score value $s_j$ for synchronization master candidate j.

For example, each of wireless devices 5904, 5906, 5908, 5910, 5912, 5914 shown in FIG. 59 may in accordance with various aspects be configured to determine selection information by evaluating and weighting at least one selection factor for itself and by evaluating a resulting score value by combining the weighted selection factors using equation (1) above. Each of these devices may be configured to adjust a selection period based on the selection information and employ the resulting adjusted selection period instead of the above described selection period of random timing. For example, in various aspects, in case of a larger score value $s_j$, a predefined base duration of the selection period may be shortened, while in case of a smaller score value $s_j$, the predefined base duration of the selection period may remain unchanged or may be increased. Then, similar as in the case of the above described selection period of random timing, when a first timer corresponding to the shortest adjusted selection period has expired, the corresponding wireless device broadcasts a synchronization initiation signal. In other words, a transmitter of each of the wireless devices 5904, 5906, 5908, 5910, 5912, 5914 (e.g. wireless device 5904) may in certain aspects be configured to transmit a synchronization signal after the selection period has expired if a corresponding receiver has not received a synchronization initiation signal from any other of the wireless devices (e.g. wireless devices 5906, 5908, 5910, 5912, 5914) during the selection period. The other devices, the timers of which may still be active receive the broadcasted synchronization initiation signal and adjust to the device broadcasting said synchronization initiation signal (e.g. wireless device 5904) as new synchronization master.

In an alternative approach for performing synchronization master selection in accordance with various aspects of the present disclosure, selection information may be transmitted from at least one synchronization master candidate (e.g. from wireless devices 5904, 5906, 5908, 5910, 5914) to another wireless device, in certain aspects e.g. to the current synchronization master (e.g. wireless device 5912), which may be configured to process the selection information to select a wireless device (e.g. one of wireless devices 5904, 5906, 5908, 5910, 5912, 5914) to become a new synchronization master, i.e. for transmitting synchronization signals. In accordance with various aspects of this disclosure, selection information may correspond to at least one selection factor $f_{ij}$ for synchronization master candidate j, to at least one weighted selection factor $w_{ij}f_{ij}$ for synchronization master candidate j, and/or to a score value $s_j$ for synchronization master candidate j.

The wireless device, e.g. the current synchronization master 5912, may in certain aspects be configured to notify the selected wireless device (e.g. wireless device 5904) to start transmitting synchronization signals. It may in certain aspects be possible that the current synchronization master itself (i.e. wireless device 5912) itself is selected, i.e. that no handover is performed, if indicated by the selection information.

Figure 60:
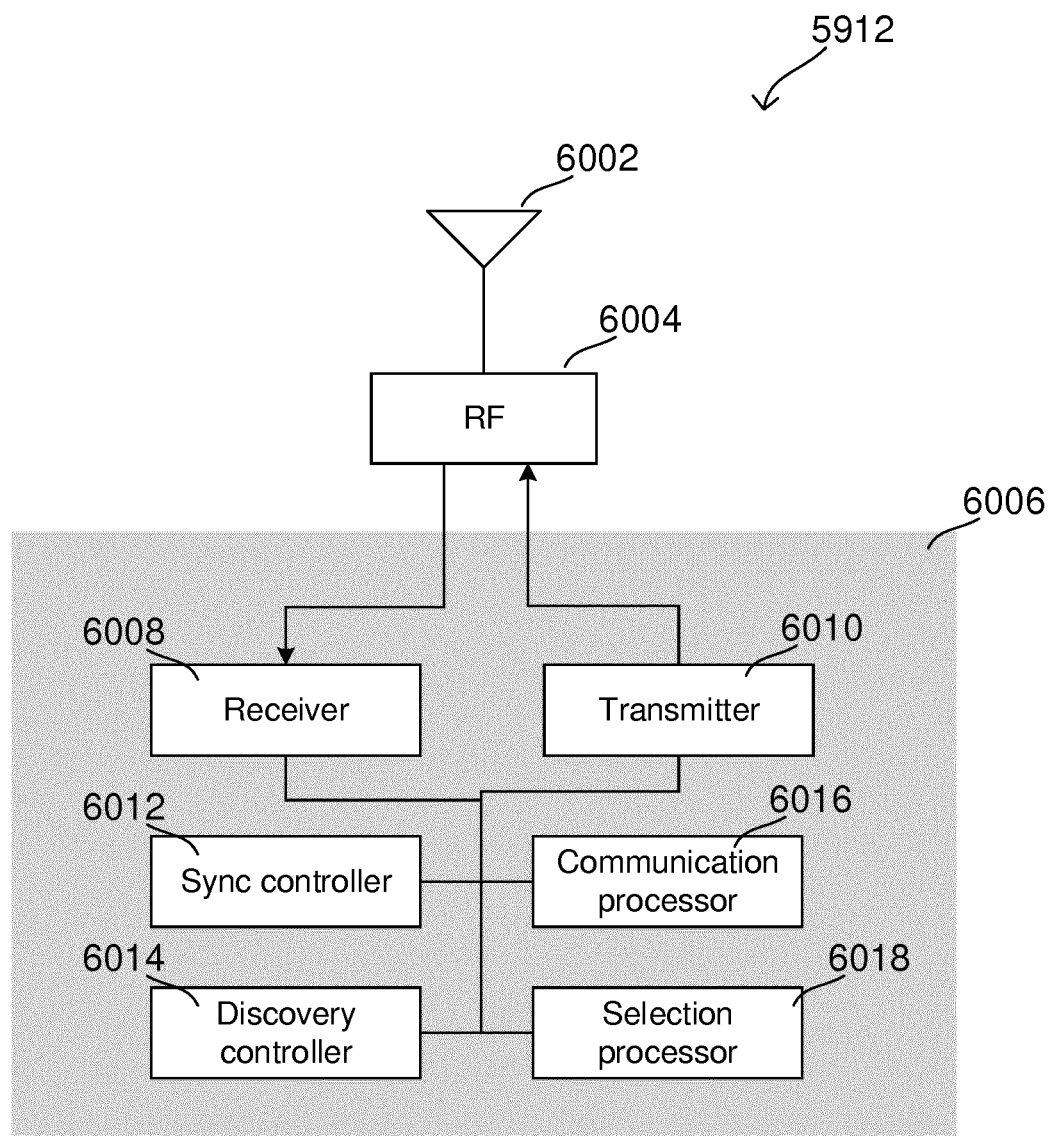
FIG. 60 shows an exemplary structural configuration of a wireless device according to some aspects.

In various aspects, for example wireless device 5912 may be structurally configured to participate in synchronization master selection procedures in accordance with aspects of the present disclosure. The structural configurations of wireless device 5912 will first be introduced exemplarily for any one of the wireless devices 5904, 5906, 5908, 5910, 5912 and 5914 shown in FIG. 59, followed by a detailed description of respective synchronization master selection procedures. FIG. 60 shows an exemplary structural configuration of wireless device 5912. The structural configuration shown in FIG. 60 is focused on the synchronization master selection features of wireless device 5912 and therefore may not expressly depict other components that are less directly related to these features.

Starting first with FIG. 60, wireless device 5912 may include antenna system 6002, RF transceiver 6004, and baseband modem 6006. In some aspects, antenna system 6002, RF transceiver 6004, and baseband modem 6006 may be configured as described above for antenna system 202, RF transceiver 204, and baseband modem 206 of terminal device 102. Accordingly, wireless device 5912 may be configured to transmit and receive wireless signals via antenna system 6002 and RF transceiver 6004. In the transmit direction, RF transceiver 6004 may therefore modulate and transmit baseband samples (provided by baseband modem 6006) via antenna system 6002. In the receive direction, RF transceiver 6004 may also receive and demodulate radio signals via antenna system 6002 and provide the resulting baseband samples to baseband modem 6006.

FIG. 60 also depicts several internal components of baseband modem 6006, including receiver 6008, transmitter 6010, sync controller 6012, discovery controller 6014, communication processor 6016 and selection processor 6018. In some aspects, baseband modem 6006 may include a digital signal processor and a protocol controller. Receiver 6008, transmitter 6010, sync controller 6012, discovery controller 6014, communication processor 6016 and selection processor 6018 may therefore be subcomponents of the digital signal processor (e.g., physical layer components) and/or subcomponents of the protocol controller (e.g., protocol stack components). In some aspects, receiver 6008 may be the physical layer receive chain, transmitter 6010 may be the physical layer transmit chain, and sync controller 6012, discovery controller 6014, communication processor 6016 and selection processor 6018 may be processors that form part of the protocol stack layers of wireless device 5912. For example, receiver 6008 may include a demodulator, demapper (e.g., constellation demapper), de-interleaver, decoder, and/or descrambler. Receiver 6008 may receive wireless signals in the form of baseband samples via antenna system 6002 and RF transceiver 6004. Receiver 6008 may then sequentially process these baseband samples with the demodulator, demapper (e.g., constellation demapper), de-interleaver, decoder, and/or descrambler to produce a bitstream, which receiver 6008 may provide to sync controller 6012, discovery controller 6014, communication processor 6016 and/or selection processor 6018 (e.g., to the protocol stack layers). Transmitter 6010 may include a scrambler, encoder, interleaver, mapper (e.g., constellation mapper), and/or a modulator, which may sequentially process a bitstream (e.g., provided by protocol stack layers of sync controller 6012, discovery controller 6014, communication processor 6016 and selection processor 6018) to produce baseband samples (e.g., complex IQ symbols). Transmitter 6010 may then transmit these baseband samples as wireless signals via RF transceiver 6004 and antenna system 6002. Sync controller 6012 may be a processor configured to execute instructions that define the synchronization operations of wireless device 5912, including the transmission and reception of synchronization signal as well as obtaining and maintaining synchronization over time. Sync controller 6012 may provide control signals to receiver 6008, transmitter 6010, and RF transceiver 6004 that control receiver 6008, transmitter 6010, and RF transceiver 6004 to transmit and receive with the correct time and frequency references. In some aspects, sync controller 6012 may also include physical layer components, such as detection circuits or processors configured to detect synchronization signals in sample streams provided by receiver 6008. Discovery controller 6014 may be a processor configured to execute instructions that define the discovery operations of wireless device 5912, including transmission, reception, and processing of discovery messages. Communication processor 6016 may be a processor configured to execute other control- and user-plane operations of the protocol stack layers. This may include generating messages for transmitter 6010 to transmit (e.g., messages including user or control data) and/or recovering messages from bitstreams provided by receiver 6008. Selection processor 6018 may be configured to process at least one selection value to set a duration of a selection period. While sync controller 6012, discovery controller 6014, communication processor 6016 and selection processor 6018 are shown separately in FIG. 60, in some aspects sync controller 6012, discovery controller 6014, communication processor 6016 and selection processor 6018 may structurally be a single processor configured to perform the respective operations of sync controller 6012, discovery controller 6014, communication processor 6016 and selection processor 6018. The detailed functionality of receiver 6008, transmitter 6010, sync controller 6012, discovery controller 6014, communication processor 6016 and selection processor 6018 is further described below with reference to FIGS. 61 and 62.

Figure 61:
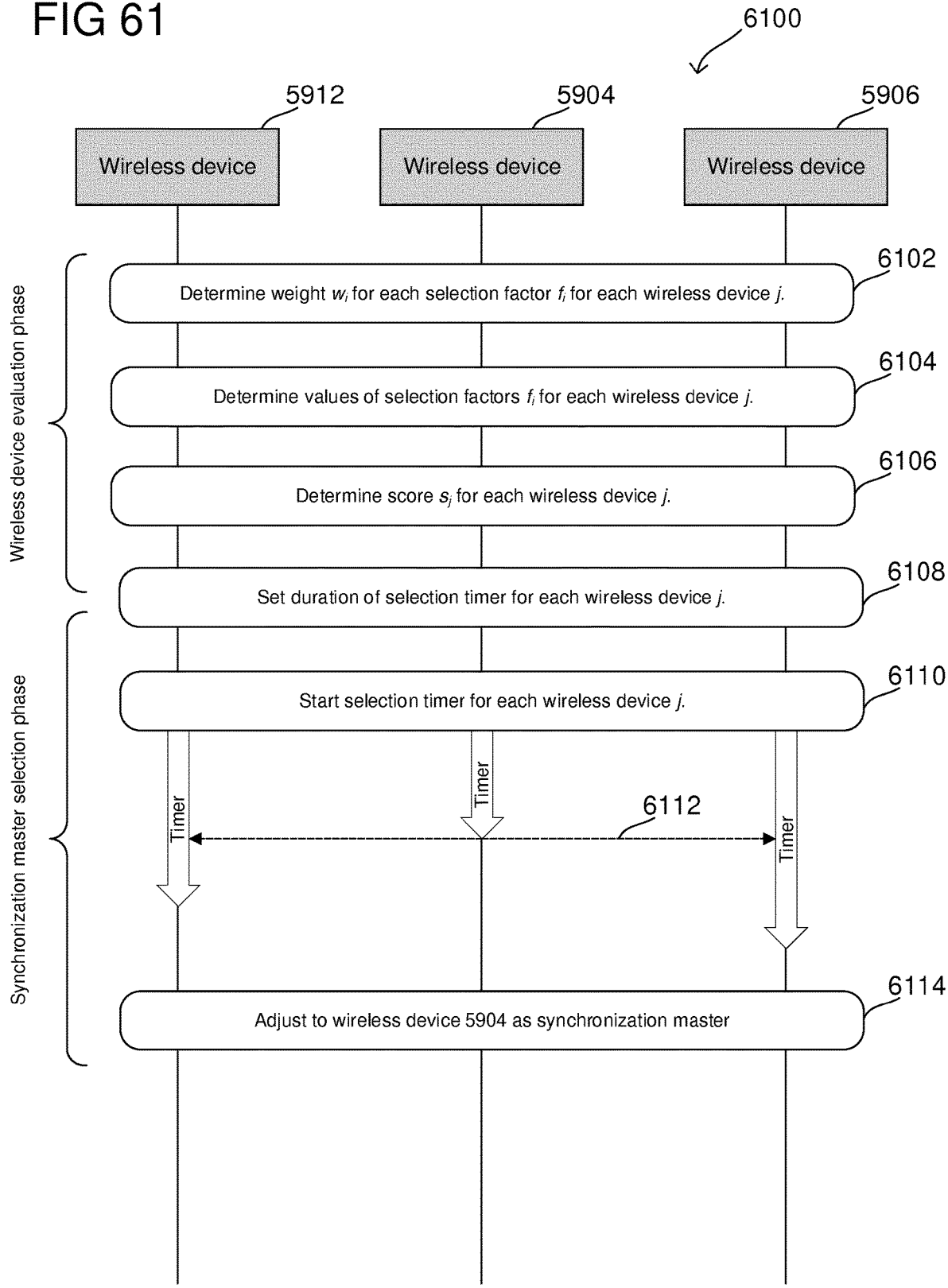
FIG. 61 shows an exemplary event and message sequence chart illustrating synchronization master selection according to some aspects.

FIG. 61 shows exemplary event and message sequence chart 6100 according to some aspects. As shown in FIG. 61, message sequence chart 6100 may involve wireless devices 5904, 5906, and 5912 from FIG. 59 which in the exemplarily illustrated case participate at synchronization master selection. FIG. 61 exemplarily illustrates synchronization master selection for these devices, while more or all of wireless devices depicted in FIG. 59 may participate at synchronization master selection. For different synchronization clusters or for groups of wireless devices intending to set up D2D communication, all wireless devices or sub-groups of the wireless devices may participate in synchronization master selection (e.g. at stage 402 of FIG. 4).

As previously described for FIG. 59, wireless device 5912 may be a current synchronization master for synchronization cluster 5900, and may therefore periodically broadcast synchronization signals. The sequence of events depicted in chart 6100 may in this case correspond to a synchronization master handover from wireless device 5912 to wireless device 5904 as an example of a synchronization master selection in accordance with certain aspects of this disclosure. Alternatively, the sequence of events depicted in chart 6100 may correspond to an initial synchronization master selection phase when e.g. D2D communication is initially set up within the group of wireless devices 5904, 5906, 5908, 5910, 5912, 5914 e.g. before initial discovery messages are exchanged between these wireless devices (e.g. during a stage corresponding to stage 402 of FIG. 4). Selection of wireless device 5904 in such initial case may be a further example of a synchronization master selection in accordance with certain aspects of this disclosure.

FIG. 61 shows a wireless device evaluation phase (stages 6102 to 6106 or to 6108) which may or may not include stage 6108. In accordance with certain aspects, the wireless device evaluation phase may be performed by selection processor 6018 of wireless device 5912 (and/or any one of wireless devices 5904, 5906, 5908, 5910, 5914 shown in FIG. 59). The wireless device evaluation phase may be performed individually at each of the wireless devices 5904, 5906, 5912 during respective time periods, or may be performed time-wise in parallel after a certain trigger event. For example, a trigger event may be a message broadcasted by the current synchronization master (wireless device 5912) or by a different wireless device. For example, a wireless device in a current synchronization cluster 5900 may broadcast such trigger message (e.g. wireless device 5904) or a wireless device intending to enter synchronization cluster 5900. In addition or alternatively, wireless devices 5904, 5906, 5912 may periodically perform the wireless device evaluation phase based on a predefined periodicity.

FIG. 61 further shows a synchronization master selection phase (stage 6108 or 6110 to stage 6114) performed in synchrony by wireless devices 5904, 5906, 5912. In accordance with certain aspects, the synchronization master selection phase may be performed by selection processor 6018 of wireless device 5912 (and/or any one of wireless devices 5904, 5906, 5908, 5910, 5914 shown in FIG. 59). The synchronization master selection phase (and in particular start of the selection timer at stage 6110) may be triggered by a dedicated trigger event or may be performed periodically by the wireless devices 5904, 5906, 5912. For example, a wireless device in a current synchronization cluster 5900 may broadcast such trigger message (e.g. wireless device 5904) or a wireless device intending to enter synchronization cluster 5900.

For example, in certain aspects, the synchronization master selection phase or the wireless device evaluation phase and the synchronization master selection phase may be triggered (e.g. one trigger event for one or both phases) by a message broadcasted by the current synchronization master (e.g. wireless device 5912) in case that a battery level of the current synchronization master falls below a predefined threshold.

In addition or alternatively, in certain aspects, one or both of these phases may be triggered by such message in case that the current synchronization master moves to an edge of the current synchronization cluster 5900. For example, a trigger message may be broadcasted by the current synchronization master if an average distance between the current synchronization master (e.g. wireless device 5912) and other wireless devices of the synchronization cluster 5900 (e.g. wireless devices 5904, 5906, 5908, 5910, 5914) exceeds a predefined threshold. The average distance between the current synchronization master (e.g. wireless device 5912 in FIG. 59) and the synchronization master candidates (e.g. wireless devices 5904, 5906, 5908, 5910, 5914 in FIG. 59) may in various aspects be determined based on received signal strength of received synchronization signals at the synchronization master candidates and transmitted as feedback back to the current synchronization master. Thereby, in certain aspects, the average distance may be determined at each synchronization master candidate based on the received signal power of a received synchronization signal and a transmitted synchronization signal power at the synchronization master. In certain aspects, the transmitted synchronization signal power at the synchronization master may be a predefined value or may be communicated (e.g. broadcasted) by the synchronization master to the synchronization master candidates.

In addition or alternatively, an average distance between the current synchronization master and the synchronization master candidates may in various aspects be determined based on satellite positioning signals received at the synchronization master and the synchronization master candidates. For example, in certain aspects, the synchronization master candidates may transmit their respective satellite-based locations to the current synchronization master candidate which can be compared by the synchronization master to its own satellite-based location.

In addition or alternatively, in certain aspects, a trigger message may be broadcasted by the current synchronization master if a received signal strength of a satellite-based synchronization source 5902 falls below a predefined threshold. In addition or alternatively, in certain aspects, a trigger message may be broadcasted by any of the other wireless devices of the synchronization cluster 5900 (e.g. wireless devices 5904, 5906, 5908, 5910, 5914) if received signal strength of a synchronization signal received from the current synchronization master falls below a predefined threshold. In addition or alternatively, in certain aspects, the synchronization master selection phase or the wireless device evaluation phase and the synchronization master selection phase may be started at all of the wireless devices participating at synchronization master selection after a predetermined time after the current synchronization master was selected (e.g. after the synchronization initiation signal was broadcasted by the current synchronization master to the other wireless devices of the synchronization cluster 5900).

In certain aspects, in case of synchronization master selection at an initial phase at set up of D2D communication within a group of wireless devices (e.g. wireless devices 5904, 5906, 5908, 5910, 5912, 5914 not yet forming synchronization cluster 5900) e.g. at a stage corresponding to stage 402 of FIG. 4, the wireless device evaluation phase and the synchronization master selection phase may be initiated e.g. after the wireless devices within the group have received a signal broadcasted from one of the wireless devices.

With reference to FIG. 61, in accordance with various aspects, wireless devices 5904, 5906, 5912 may determine selection information at stages 6102 to 6106. In accordance with various aspects, selection information may correspond to or include at least one selection factor $f_{ij}$ for wireless device j, may correspond to or include at least one weighted selection factor $w_{ij}f_{ij}$ for wireless device j, and/or may correspond to or include a score value $s_j$ determined by and/or for wireless device j using equation (1) above. As mentioned above, stages 6102 to 6108 may be performed at individual points in time for each wireless device or may be performed in synchrony between the wireless devices.

At stage 6102, each wireless device may determine a weight factor $w_i$ for each of selection factors $f_1$ to $f_6$ discussed above while use of only some of selection factors $f_1$ to $f_6$ discussed above or of further selection factors is possible at each of the wireless devices 5904, 5906, 5912. As explained, each weight factor is assigned to a corresponding selection factor to reflect the relative importance of this selection factor in relation to the different selection factors. Having determined the weight factors $w_i$ for each selection factor at each of the wireless devices at stage 6102, each of the wireless devices employs values for each selection factor $f_i$ in accordance with the respective wireless device situation at stage 6104. For example, a small value may be employed for $f_3$ by wireless device 5906 (reflecting a large relative distance between the current synchronization master 5912 and wireless device 5906 being a synchronization master candidate). Accordingly, a larger value may be employed for $f_3$ by wireless device 5904 as wireless device 5904 is closer to the current synchronization master 5912. Having thus employed values for the selection factors at stage 6104, each wireless device j may calculate a corresponding score value $s_j$ for example using equation (1) above at stage 6106. It should be noted that in particular the order of stages 6102 and 6104 may be reversed.

At stage 6108, the wireless devices 5904, 5906, 5912 set a duration of a selection timer for each of the wireless devices. For example, a predefined base duration of a selection timer may be adjusted in accordance with the respective score value $s_j$ by and/or for each of the wireless devices 5904, 5906, 5912. For example, a wireless device having evaluated a larger score value may shorten the predefined base duration while a wireless device having evaluated a smaller score value may increase or not amend the predefined base duration. For example, exemplarily based only on the selection factor $f_3$, wireless device 5904 may evaluate a larger score value as compared to wireless device 5906 such that a corresponding adjustment of the predefined initial duration of the selection timer may yield a selection timer duration which is shorter for wireless device 5904 as a selection timer duration for wireless device 5906.

With further reference to FIG. 61, as mentioned above, at least the synchronization master selection phase (stages 6110 to 6114) is performed in synchrony by all wireless devices participating at synchronization master selection. The synchronization master selection phase (stages 6110 to 6114) may be initiated by a trigger event as discussed above or may be performed periodically by the participating wireless devices. As illustrated in FIG. 61, wireless devices 5904, 5906, 5912 may start their respective selection timers at stage 6110. Illustratively exemplified, lengths of respective arrows labeled "timer" in FIG. 61 indicate the respectively adjusted duration of the respective selection periods at each of the wireless devices 5904, 5906, 5912. In the illustrated example, a duration of the selection period of wireless device 5904 is shortest (as indicated by the shortest timer arrow in the figure) such that wireless device 5904 transmits (e.g. broadcasts) a synchronization initiation signal at stage 6112 while selection timers may still be active for wireless devices 5912 and 5906.

In various aspects of the present disclosure, a synchronization initiation signal may be a first one of synchronization signals periodically transmitted by wireless device 5904 as new synchronization master. In addition or alternatively, in certain aspects, the synchronization initiation signal may include information identifying wireless device 5904 as new synchronization master.

As illustrated in FIG. 61, wireless devices 5906 and 5912 receive the synchronization initiation signal at stage 6112 while their respective selection timers are still active. Having received the synchronization initiation signal from wireless device 5904, wireless devices 5906 and 5912 may adjust to wireless device 5904 as new synchronization master at stage 6114, after their respective timers have expired or after actively stopping the respective timers. In other words, at stage 6114 wireless devices 5906 and 5912 start adjusting processing in accordance with a timing based on synchronization signals periodically received from wireless device 5904.

Figure 62:
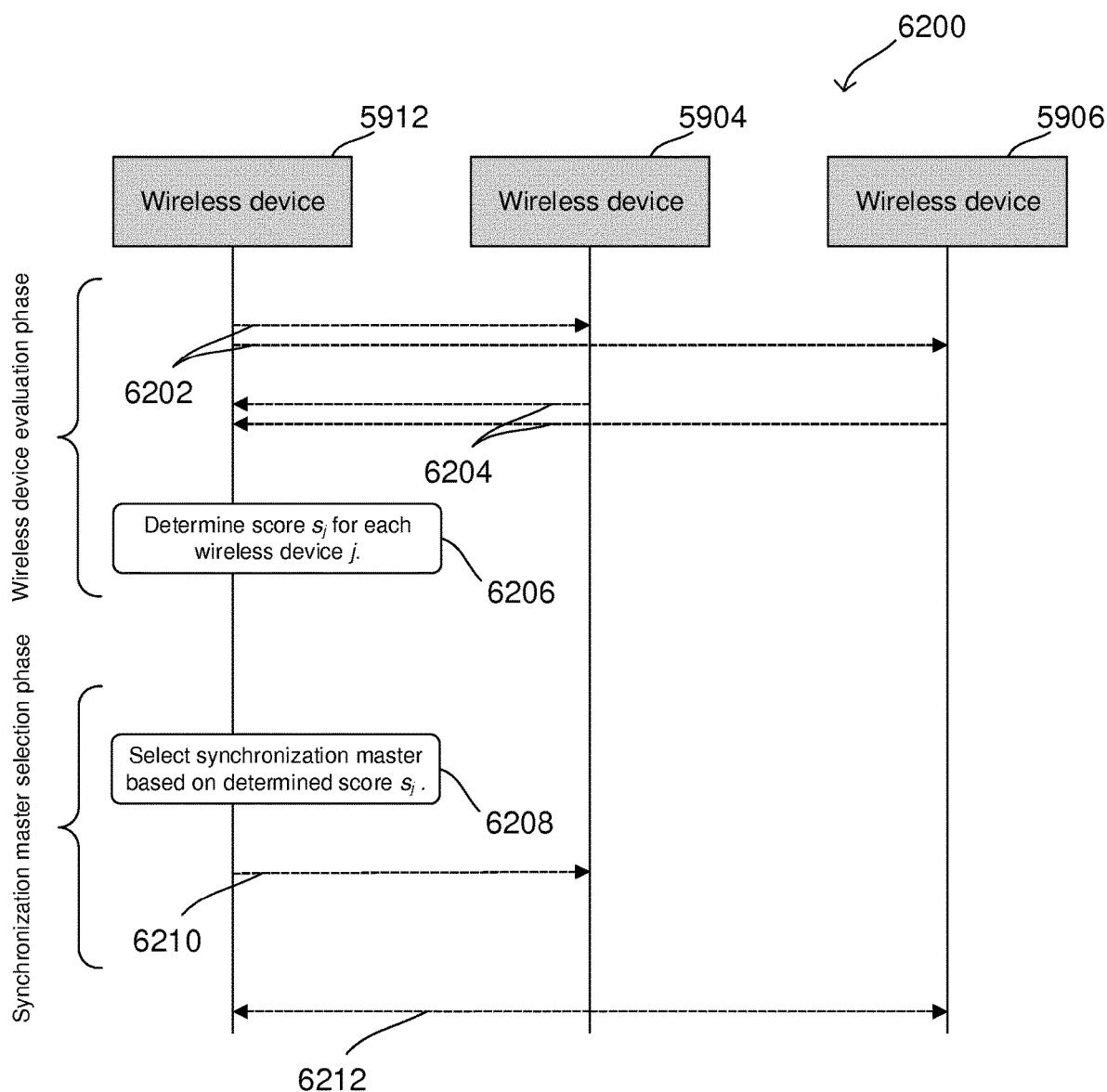
FIG. 62 shows an exemplary event and message sequence chart illustrating alternative synchronization master selection according to some aspects.
Figure 63:
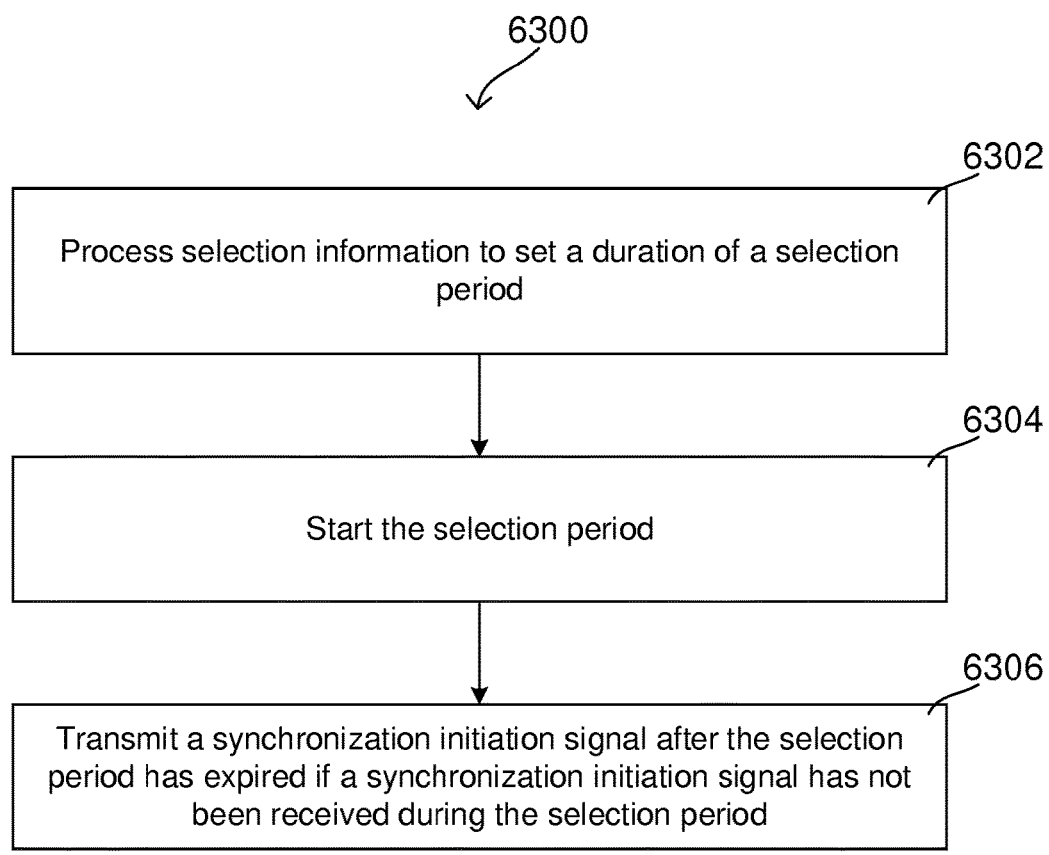
FIGS. 63 and 64 show exemplary communication methods according to some aspects.

FIG. 62 shows a synchronization master selection alternative 6200 to the synchronization master selection of FIG. 61 in accordance with various aspects of the present disclosure. While synchronization master selection in accordance with FIG. 61 may rely on an evaluation of a score value $s_j$ by selection processor 6018 of each wireless device participating in synchronization master selection, and on an adjustment of a selection timer based on the evaluated score value $s_j$ by selection processor 6018 of each participating wireless device, synchronization master selection in accordance with FIG. 62 may in various aspects rely on reception of selection information (e.g. selection factors $f_{ij}$ or score values $s_j$ for each synchronization master candidate j) at the current synchronization master (e.g. wireless device 5912) and on a selection of the new synchronization master by the current synchronization master based on the received selection information for each synchronization master candidate, and on notifying the new synchronization master (e.g. wireless device 5904) of its synchronization master role by the current synchronization master (e.g. wireless device 5912).

As shown in FIG. 62, synchronization master selection in accordance with FIG. 62 includes a wireless device evaluation phase (stages 6202 to 6206) and a synchronization master selection phase (stages 6208 and 6210). The wireless device evaluation phase and the synchronization master selection phase may be performed by the selection processor 6018 of a current synchronization master, e.g. of wireless device 5912 of FIG. 60. Synchronization master selection in accordance with FIG. 62 may be initiated when the current synchronization master, e.g. wireless device 5912, transmits (e.g. broadcasts) a message to synchronization master candidates (e.g. wireless devices 5904 and 5906 representative of all wireless devices participating at synchronization master selection, e.g. wireless devices 5904, 5906, 5908, 5910, 5914 in FIG. 59) requesting transmission of selection information from the synchronization master candidates to the current synchronization master at stage 6202. In accordance with certain aspects, the synchronization master (e.g. wireless device 5912) may decide to transmit said message e.g. in case a battery level of the synchronization master falls below a predetermined threshold. Alternatively or in addition, in certain aspects, the synchronization master (e.g. wireless device 5912) may decide to transmit said message e.g. in case that the current synchronization master moves to an edge of the current synchronization cluster 5900. For example, said message may be transmitted by the current synchronization master to the synchronization master candidates if an average distance between the current synchronization master (e.g. wireless device 5912) and synchronization master candidates (e.g. wireless devices 5904, 5906, 5908, 5910, 5914) exceeds a predefined threshold. The average distance may in certain aspects be determined by selection processor 6018 of the current synchronization master (e.g. wireless device 5912) based on positions of the synchronization master candidates determined by the synchronization master candidates using a satellite positioning system and transmitted to the synchronization master. In addition or alternatively, the average distance may in certain aspects be determined by selection processor 6018 (e.g. wireless device 5912) based on positions of the synchronization master candidates determined based on measurements of signal strength between current synchronization master (e.g. wireless device 5912) and synchronization master candidates (e.g. wireless devices 5904, 5906). In the latter case, a received signal strength of a synchronization signal received at the synchronization master candidates may be transmitted as feedback information to the synchronization master.

In addition or alternatively, in certain aspects, said message may be transmitted by the current synchronization master if a received signal strength of a satellite-based synchronization source 5902 falls below a predefined threshold. In addition or alternatively, in certain aspects, said message may be caused to be transmitted by the synchronization master by a message transmitted by any one of the synchronization master candidates (e.g. wireless devices 5904, 5906) to the synchronization master if a received signal strength of a synchronization signal received at the one synchronization master candidate falls below a predefined threshold. In addition or alternatively, in certain aspects, said message may be transmitted by the current synchronization master after a predetermined time after the current synchronization master was selected (e.g. after the synchronization initiation signal broadcasted by the current synchronization master to the other wireless devices of the synchronization cluster 5900).

With reference to FIG. 62, in accordance with various aspects, wireless devices 5904, 5906 answer to the message received from wireless device 5912 by transmitting selection information at stage 6204. In accordance with various aspects, selection information may correspond to at least one selection factor $f_{ij}$ received by wireless device 5912 from wireless device j (e.g. wireless device 5904 or wireless device 5906) or to a score value $s_j$ received by wireless device 5912 from wireless device j (e.g. wireless device 5904 or wireless device 5906). Based on the received selection information, wireless device 5912 determines a score $s_j$ for each synchronization master candidate (e.g. wireless devices 5904, 5906) at stage 6206.

For example, wireless devices 5904, 5906 may transmit at least one selection factor in accordance with the situation of wireless device 5904, 5906 to wireless device 5912 and selection processor 6018 of wireless device 5912 may then determine a corresponding score value $s_1$ for each wireless device 5904, 5906, e.g. using equation (1) above. Alternatively, each wireless device 5904, 5906 may evaluate a score value based on respective selection factors and weights using respective selection processors 6018, and may transmit a respective score value to wireless device 5912 at stage 6204. Here, in accordance with certain aspects, weight values may be common across wireless devices within a synchronization cluster (e.g. may be preset at each wireless device of the synchronization cluster, and/or at the synchronization master, e.g. at wireless device 5912), while in accordance with various aspects, selection factors may be specific for a wireless device. Based on the selection information, the synchronization master (e.g. wireless device 5912) may then determine the score values for each synchronization master candidate at stage 6206 and may select a new synchronization master from the synchronization master candidates based on the respective determined scores at stage 6208. At stage 6210, the current synchronization master (e.g. wireless device 5912) transmits a message to the selected wireless device (e.g. wireless device 5904), i.e. the wireless device having the highest score value notifying the selected wireless device of its role as synchronization master. Accordingly, the newly selected synchronization master (e.g. wireless device 5904) then broadcasts the synchronization initiation signal at stage 6212.

Figure 64:
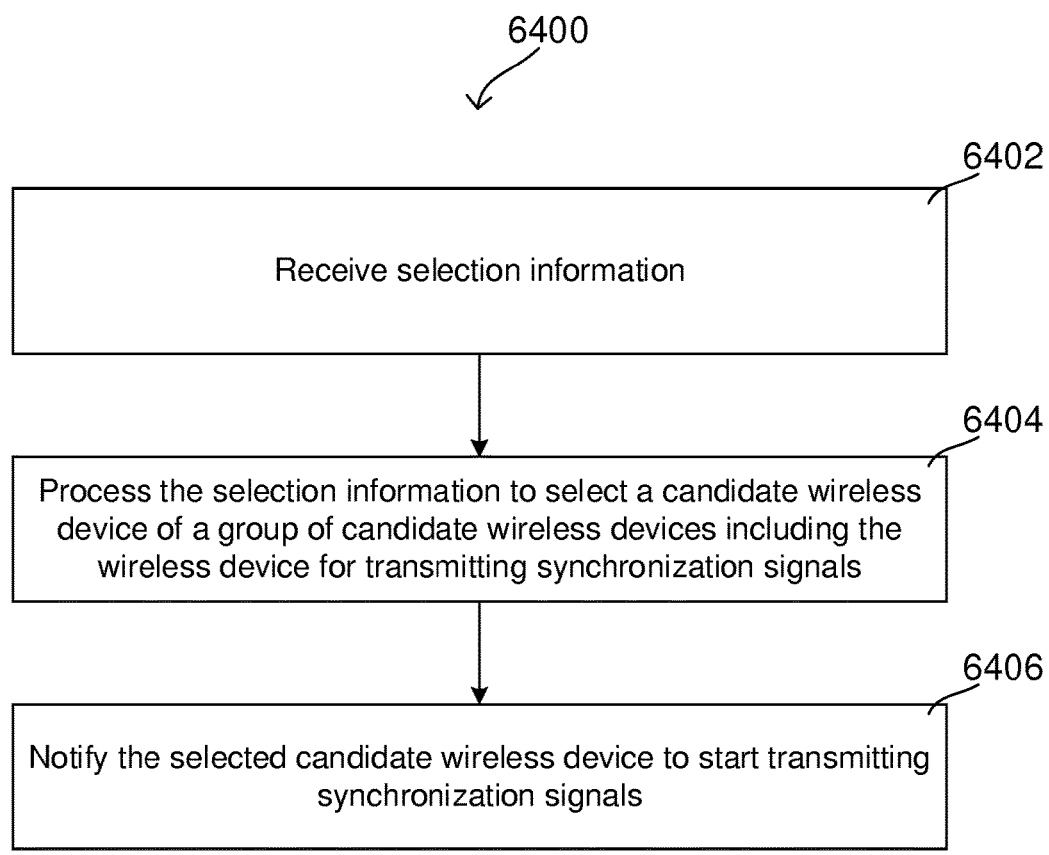

FIG. 64 shows exemplary communication method 6400 for a wireless device according to some aspects. As shown in FIG. 64, method 6400 includes processing selection information to set a duration of a selection period (6402), starting the selection period (6404), and transmitting a synchronization initiation signal after the selection period has expired if a synchronization initiation signal has not been received during the selection period (6406).

FIG. 65 shows exemplary communication method 6500 for a wireless device according to some aspects. As shown in FIG. 65, method 6500 includes receiving selection information (6502), processing the selection information to select a candidate wireless device of a group of candidate wireless devices including the wireless device for transmitting synchronization signals (6504), and notifying the selected candidate wireless device to start transmitting synchronization signals (6506).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

Example 1 is a method of performing wireless communications at a wireless device, the method including maintaining synchronization with a synchronization cluster based on a main synchronization signal from the synchronization cluster, determining whether a triggering condition is met for broadcasting a supporting synchronization signal, and if the triggering condition is met, broadcasting the supporting synchronization signal and receiving a response signal from a second wireless device that is synchronized with the supporting synchronization signal.

In Example 2, the subject matter of Example 1 can optionally further include receiving the main synchronization signal from the synchronization cluster with a first broadcast period, wherein broadcasting the supporting synchronization signal includes broadcasting the supporting synchronization signal with a second broadcast period that is greater than the first broadcast period.

In Example 3, the subject matter of Example 1 can optionally include wherein the main synchronization signal is scheduled for broadcast in each frame of a communication schedule of the synchronization cluster, and wherein broadcasting the supporting synchronization signal includes periodically broadcasting the supporting synchronization signal.

In Example 4, the subject matter of any one of Examples 1 to 3 can optionally include wherein the supporting synchronization signal is allocated time and frequency resources that overlap with time and frequency resources allocated for the main synchronization signal.

In Example 5, the subject matter of any one of Examples 1 to 4 can optionally include wherein the triggering condition is user input that requests broadcast of the supporting synchronization signal.

In Example 6, the subject matter of any one of Examples 1 to 4 can optionally include wherein determining whether the triggering condition is met includes measuring a received signal power of the main synchronization signal, comparing the received signal power to a predefined signal power threshold, and determining that the triggering condition is met if the received signal power is less than the predefined signal power threshold.

In Example 7, the subject matter of any one of Examples 1 to 4 can optionally include wherein the triggering condition is based on whether the wireless device is at an edge of the coverage area of the synchronization cluster.

In Example 8, the subject matter of any one of Examples 1 to 4 can optionally include wherein the triggering condition is based on whether the wireless device is in an idle communication state.

In Example 9, the subject matter of any one of Examples 1 to 8 can optionally include wherein the response signal is a discovery initiation message, the method further including transmitting a discovery response message to the second wireless device, and exchanging communication data with the second wireless device.

In Example 10, the subject matter of any one of Examples 1 to 8 can optionally further include receiving signaling from the second wireless device that requests for the wireless device to broadcast main synchronization signals for the synchronization cluster, the method further including broadcasting a main synchronization signal for the synchronization cluster.

In Example 11, the subject matter of any one of Examples 1 to 8 can optionally include wherein broadcasting the supporting synchronization signal includes broadcasting the supporting synchronization signal with a first broadcast period, the method further including after receiving the response signal, transmitting the supporting synchronization signal with a second broadcast period less than the first broadcast period.

In Example 12, the subject matter of any one of Examples 1 to 11 can optionally include wherein broadcasting the supporting synchronization signal includes broadcasting the supporting synchronization signal with a first broadcast period, the method further including after receiving the response signal, transmitting an additional synchronization signal with a second broadcast period less than the first broadcast period.

In Example 13, the subject matter of any one of Examples 1 to 12 can optionally include wherein the supporting synchronization signal is synchronized with the synchronization cluster.

Example 14 is a method of performing wireless communications at a wireless device, the method including monitoring a received signal for main synchronization signals and supporting synchronization signals, detecting a supporting synchronization signal from a second wireless device that is synchronized with a synchronization cluster, establishing synchronization with the second wireless device based on the supporting synchronization signal, and transmitting a response signal to the second wireless device based on the synchronization.

In Example 15, the subject matter of Example 14 can optionally include wherein monitoring the received signal for the main synchronization signals includes monitoring for the main synchronization signals while the wireless device is not synchronized with any synchronization cluster.

In Example 16, the subject matter of Example 14 can optionally include wherein monitoring the received signal for the main synchronization signals includes repeatedly receiving main synchronization signals from a third wireless device in a second synchronization cluster, and maintaining synchronization with the second synchronization cluster based on the main synchronization signals from the third wireless device.

In Example 17, the subject matter of Example 14 can optionally include wherein monitoring the received signal for the supporting synchronization signal includes monitoring for the supporting synchronization signal using a universal reference time.

In Example 18, the subject matter of Example 14 can optionally include wherein monitoring the received signal for the supporting synchronization signal includes identifying, based on a universal reference time, a search window in the received signal, and searching for the supporting synchronization signal in the received signal based on the search window.

In Example 19, the subject matter of Example 18 can optionally include wherein identifying, based on the universal reference time, the search window in the received signal includes identifying time locations in the universal reference time that are allocated for the supporting synchronization signal, and selecting the search windows based on the time locations.

In Example 20, the subject matter of Example 19 can optionally include wherein the time locations are time locations of frames that are allocated for the supporting synchronization signal.

In Example 21, the subject matter of Example 18 or 19 can optionally include where in the universal reference time is coordinated universal time (UTC) or global positioning system (GPS) time.

In Example 22, the subject matter of any one of Examples 14 to 21 can optionally include wherein establishing synchronization with the second wireless device based on the supporting synchronization signal includes determining, based on a time when the supporting synchronization signal is received, a time reference that is synchronized with the second wireless device.

In Example 23, the subject matter of Example 22 can optionally include wherein transmitting the response signal based on the synchronization signal includes transmitting the response signal using the time reference.

In Example 24, the subject matter of any one of Examples 14 to 22 can optionally include wherein the response signal is a discovery initiation message, the method further including receiving a discovery response message from the second wireless device.

In Example 25, the subject matter of Example 24 can optionally further include after receiving the discovery response message, exchanging communication data with the second wireless device.

In Example 26, the subject matter of any one of Examples 14 to 25 can optionally further include transmitting signaling to the second wireless device that requests the second wireless device to begin broadcasting main synchronization signals for the synchronization cluster.

In Example 27, the subject matter of Example 26 can optionally further include receiving a main synchronization signal from the second wireless device and using the main synchronization signal to establish synchronization with the synchronization cluster.

In Example 28, the subject matter of any one of Examples 14 to 27 can optionally further include maintaining synchronization with the second wireless device by periodically detecting supporting synchronization signals from the second wireless device in the received signal.

Example 29 is a wireless device including a sync controller configured to maintain synchronization with a synchronization cluster based on a main synchronization signal from the synchronization cluster, and to determine whether a triggering condition is met for broadcasting a supporting synchronization signal, a transmitter configured to, if the triggering condition is met, broadcast the supporting synchronization signal, and a receiver configured to, if the triggering condition is met, receive a response signal from a second wireless device that is synchronized with the supporting synchronization signal.

In Example 30, the subject matter of Example 29 can optionally include wherein the transmitter is configured to broadcast the supporting synchronization signal via a radio frequency transceiver and one or more antennas, and wherein the receiver is configured to receive the response signal via the radio frequency transceiver and the one or more antennas.

In Example 31, the subject matter of Example 30 can optionally further include the radio frequency transceiver and the one or more antennas.

In Example 32, the subject matter of any one of Examples 29 to 31 can optionally include wherein the receiver is further configured to receive the main synchronization signal from the synchronization cluster with a first broadcast period, and wherein the transmitter is configured to broadcast the supporting synchronization signal with a second broadcast period that is greater than the first broadcast period.

In Example 33, the subject matter of any one of Examples 29 to 31 can optionally include wherein the main synchronization signal is scheduled for broadcast in each frame of a communication schedule of the synchronization cluster, and wherein the transmitter is configured to periodically broadcast the supporting synchronization signal.

In Example 34, the subject matter of any one of Examples 29 to 33 can optionally include wherein the supporting synchronization signal is allocated time and frequency resources that overlap with time and frequency resources allocated for the main synchronization signal.

In Example 35, the subject matter of any one of Examples 29 to 34 can optionally include wherein the triggering condition is user input that requests broadcast of the supporting synchronization signal.

In Example 36, the subject matter of any one of Examples 29 to 35 can optionally include wherein the sync controller is configured to determine whether the triggering condition is met by measuring a received signal power of the main synchronization signal, comparing the received signal power to a predefined signal power threshold, and determining that the triggering condition is met if the received signal power is less than the predefined signal power threshold.

In Example 37, the subject matter of any one of Examples 29 to 35 can optionally include wherein the triggering condition is based on whether the wireless device is at an edge of the coverage area of the synchronization cluster.

In Example 38, the subject matter of any one of Examples 29 to 35 can optionally include wherein the triggering condition is based on whether the wireless device is in an idle communication state.

In Example 39, the subject matter of any one of Examples 29 to 38 can optionally include wherein the response signal is a discovery initiation message, the transmitter further configured to transmit a discovery response message to the second wireless device, the wireless device further including a communication processor configured to exchange communication data with the second wireless device.

In Example 40, the subject matter of any one of Examples 29 to 38 can optionally include wherein the receiver is further configured to receive signaling from the second wireless device that requests for the wireless device to broadcast main synchronization signals for the synchronization cluster, the transmitter further configured to broadcast a main synchronization signal for the synchronization cluster.

In Example 41, the subject matter of any one of Examples 29 to 38 can optionally include wherein the transmitter is configured to broadcast the supporting synchronization signal with a first broadcast period, and further configured to after receiving the response signal, transmit the supporting synchronization signal with a second broadcast period less than the first broadcast period.

In Example 42, the subject matter of any one of Examples 29 to 41 can optionally include wherein the transmitter is configured to broadcast the supporting synchronization signal with a first broadcast period, and further configured to after receiving the response signal, transmit an additional synchronization signal with a second broadcast period less than the first broadcast period.

In Example 43, the subject matter of any one of Examples 29 to 42 can optionally include wherein the supporting synchronization signal is synchronized with the synchronization cluster.

Example 44 is a wireless device including a sync controller configured to monitor a received signal for main synchronization signals and supporting synchronization signals, detect a supporting synchronization signal from a second wireless device that is synchronized with a synchronization cluster, and establish synchronization with the second wireless device based on the supporting synchronization signal, and a transmitter configured to transmit a response signal to the second wireless device based on the synchronization.

In Example 45, the subject matter of Example 44 can optionally include wherein the transmitter is configured to transmit the response signal by transmitting the response signal via a radio frequency transceiver and one or more antennas.

In Example 46, the subject matter of Example 45 can optionally further include the radio frequency transceiver and the one or more antennas.

In Example 47, the subject matter of any one of Examples 44 to 46 can optionally further include a receiver configured to receive the received signal and provide the received signal to the sync controller for the monitoring.

In Example 48, the subject matter of any one of Examples 44 to 47 can optionally include wherein the sync controller is configured to monitor the received signal for the main synchronization signals while not being synchronized with any synchronization cluster.

In Example 49, the subject matter of any one of Examples 44 to 47 can optionally further include a receiver configured to repeatedly receive main synchronization signals from a third wireless device in a second synchronization cluster, and wherein the sync controller is configured to monitor for the main synchronization signals by maintaining synchronization with the second synchronization cluster based on the main synchronization signals from the third wireless device.

In Example 50, the subject matter of any one of Examples 44 to 47 can optionally include wherein the sync controller is configured to monitor the received signal for the supporting synchronization signal by monitoring for the supporting synchronization signal using a universal reference time.

In Example 51, the subject matter of any one of Examples 44 to 47 can optionally include wherein the sync controller is configured to monitor the received signal for the supporting synchronization signal by identifying, based on a universal reference time, a search window in the received signal, and searching for the supporting synchronization signal in the received signal based on the search window.

In Example 52, the subject matter of Example 51 can optionally include wherein the sync controller is configured to identify the search window in the received signal by identifying time locations in the universal reference time that are allocated for the supporting synchronization signal, and selecting the search windows based on the time locations.

In Example 53, the subject matter of Example 52 can optionally include wherein the time locations are time locations of frames that are allocated for the supporting synchronization signal.

In Example 54, the subject matter of Example 52 or 53 can optionally include wherein the universal reference time is coordinated universal time (UTC) or global positioning system (GPS) time.

In Example 55, the subject matter of any one of Examples 44 to 54 can optionally include wherein the sync controller is configured to establish synchronization with the second wireless device based on the supporting synchronization signal by determining, based on a time when the supporting synchronization signal is received, a time reference that is synchronized with the second wireless device.

In Example 56, the subject matter of Example 55 can optionally include wherein the transmitter is configured to transmit the response signal based on the synchronization by using the time reference.

In Example 57, the subject matter of any one of Examples 44 to 55 can optionally include wherein the response signal is a discovery initiation message, the wireless device further including a receiver configured to receive a discovery response message from the second wireless device.

In Example 58, the subject matter of Example 57 can optionally further include a communication processor configured to exchange communication data with the second wireless device after the receiver receives the discovery response message.

In Example 59, the subject matter of any one of Examples 44 to 55 can optionally include wherein the transmitter is further configured to transmit signaling to the second wireless device that requests the second wireless device to begin broadcasting main synchronization signals for the synchronization cluster.

In Example 60, the subject matter of Example 59 can optionally further include a receiver configured to receive a main synchronization signal from the second wireless device, and wherein the sync controller is configured to use the main synchronization signal to establish synchronization with the synchronization cluster.

In Example 61, the subject matter of any one of Examples 44 to 60 can optionally include wherein the sync controller is configured to configured to maintain synchronization with the second wireless device by periodically detecting supporting synchronization signals from the second wireless device in the received signal.

Example 62 is a method of performing wireless communications at a wireless device, the method including monitoring a received signal for main synchronization signals while in an unsynchronized state, determining that a triggering condition is met for broadcasting a supporting synchronization signal, receiving a response signal from a second wireless device in a synchronization cluster, and establishing synchronization with the synchronization cluster.

In Example 63, the subject matter of Example 62 can optionally include wherein the triggering condition is user input that requests broadcast of the supporting synchronization signal.

In Example 64, the subject matter of Example 62 can optionally include wherein determining whether the triggering condition is met includes measuring a received signal power of the main synchronization signal, comparing the received signal power to a predefined signal power threshold, and determining that the triggering condition is met if the received signal power is less than the predefined signal power threshold.

In Example 65, the subject matter of Example 62 can optionally include wherein the triggering condition is based on whether the wireless device is in an idle communication state.

In Example 66, the subject matter of any one of Examples 62 to 65 can optionally include wherein the response signal is a discovery initiation message, the method further including transmitting a discovery response message to the second wireless device, and exchanging communication data with the second wireless device.

In Example 67, the subject matter of any one of Examples 62 to 65 can optionally include the method further including transmitting signaling that requests for the second wireless device to broadcast main synchronization signals for the synchronization cluster, and maintaining synchronization with the synchronization cluster by periodically detecting broadcasting main synchronization signals from the second wireless device.

Example 68 is a method of performing wireless communications at a wireless device, the method including receiving main synchronization signals from a synchronization cluster to maintain synchronization with a synchronization cluster, detecting a supporting synchronization signal from a second wireless device that is not synchronized with the synchronization cluster, establishing synchronization with the second wireless device based on the supporting synchronization signal, and transmitting a response signal to the second wireless device based on the synchronization.

In Example 69, the subject matter of Example 68 can optionally include wherein establishing synchronization with the second wireless device includes determining, based on a time when the supporting synchronization signal is received, a time reference that is synchronized with the wireless device.

In Example 70, the subject matter of Example 68 can optionally include 69, wherein the response signal is a discovery initiation message.

In Example 71, the subject matter of Example 70 can optionally further include receiving a discovery response message from the second wireless device, and exchanging communication data with the second wireless device.

In Example 72, the subject matter of any one of Examples 68 to 71 can optionally further include requesting, from the synchronization cluster, permission to broadcast main synchronization signals for the synchronization cluster, and broadcasting a main synchronization signal for the synchronization cluster.

Example 73 is a wireless device including a sync controller configured to monitor a received signal for main synchronization signals while in an unsynchronized state, determine that a triggering condition is met for broadcasting a supporting synchronization signal, a transmitter configured to broadcast the supporting synchronization signal, and a receiver configured to receive a response signal from a second wireless device in a synchronization cluster, the sync controller further configured to establish synchronization with the synchronization cluster.

In Example 74, the subject matter of Example 73 can optionally include wherein the transmitter is configured to broadcast the supporting synchronization signal via a radio frequency transceiver and one or more antennas, and wherein the receiver is configured to receive the response signal via the radio frequency transceiver and the one or more antennas.

In Example 75, the subject matter of Example 74 can optionally further include the radio frequency transceiver and the one or more antennas.

In Example 76, the subject matter of any one of Examples 73 to 75 can optionally include wherein the triggering condition is user input that requests broadcast of the supporting synchronization signal.

In Example 77, the subject matter of any one of Examples 73 to 75 can optionally include wherein the sync controller is configured to determine whether the triggering condition is met by measuring a received signal power of the main synchronization signal, comparing the received signal power to a predefined signal power threshold, and determining that the triggering condition is met if the received signal power is less than the predefined signal power threshold.

In Example 78, the subject matter of any one of Examples 73 to 75 can optionally include wherein the triggering condition is based on whether the wireless device is in an idle communication state.

In Example 79, the subject matter of any one of Examples 73 to 78 can optionally include wherein the response signal is a discovery initiation message, the transmitter further configured to transmit a discovery response message with the second wireless device, the wireless device further including a communication processor configured to exchange communication data with the second wireless device.

In Example 80, the subject matter of any one of Examples 73 to 78 can optionally include wherein the transmitter is further configured to transmit signaling that requests for the second wireless device to broadcast main synchronization signals for the synchronization cluster, the sync controller further configured to maintain synchronization with the synchronization cluster by periodically detecting broadcasting main synchronization signals from the second wireless device.

Example 81 is a wireless device including a receiver configured to receive main synchronization signals from a synchronization cluster to maintain synchronization with the synchronization cluster, a sync controller configured to detect a supporting synchronization signal from a second wireless device that is not synchronized with the synchronization cluster, and to establish synchronization with the second wireless device based on the supporting synchronization signal, and a transmitter configured to transmit a response signal to the second wireless device based on the synchronization.

In Example 82, the subject matter of Example 81 can optionally include wherein the receiver is configured to receive the main synchronization signals via a radio frequency transceiver and one or more antennas, and wherein the transmitter is configured to transmit the response signal via the radio frequency transceiver and the one or more antennas.

In Example 83, the subject matter of Example 82 can optionally further include the radio frequency transceiver and the one or more antennas.

In Example 84, the subject matter of any one of Examples 81 to 83 can optionally include wherein the sync controller is configured to establish synchronization with the second wireless device by determining, based on a time when the supporting synchronization signal is received, a time reference that is synchronized with the wireless device.

In Example 85, the subject matter of any one of Examples 80 to 83 can optionally include wherein the response signal is a discovery initiation message.

In Example 86, the subject matter of Example 85 can optionally include wherein the receiver is further configured to receive a discovery response message from the second wireless device, the wireless device further including a communication processor configured to exchange communication data with the second wireless device.

In Example 87, the subject matter of any one of Examples 80 to 86 can optionally include wherein the sync controller is further configured to request, from the synchronization cluster, permission to broadcast main synchronization signals for the synchronization cluster, the transmitter further configured to broadcast a main synchronization signal for the synchronization cluster.

Example 88 is a wireless device including means for maintaining synchronization with a synchronization cluster based on a main synchronization signal from the synchronization cluster, means for determining whether a triggering condition is met for broadcasting a supporting synchronization signal, and means for, if the triggering condition is met, broadcasting the supporting synchronization signal and receiving a response signal from a second wireless device that is synchronized with the supporting synchronization signal.

Example 89 is a wireless device including means for monitoring a received signal for main synchronization signals and supporting synchronization signals, means for detecting a supporting synchronization signal from a second wireless device that is synchronized with a synchronization cluster, means for establishing synchronization with the second wireless device based on the supporting synchronization signal, and means for transmitting a response signal to the second wireless device based on the synchronization.

Example 90 is a wireless device including means for monitoring a received signal for main synchronization signals while in an unsynchronized state, means for determining that a triggering condition is met for broadcasting a supporting synchronization signal, and means for receiving a response signal from a second wireless device in a synchronization cluster, and means for establishing synchronization with the synchronization cluster.

Example 91 is a wireless device including means for receiving main synchronization signals from a synchronization cluster to maintain synchronization with a synchronization cluster, means for detecting a supporting synchronization signal from a second wireless device that is not synchronized with the synchronization cluster, means for establishing synchronization with the second wireless device based on the supporting synchronization signal, and means for transmitting a response signal to the second wireless device based on the synchronization.

Example 92 is a wireless device including one or more processors and a memory storing instructions that, when executed by the one or more processors, cause the wireless device to perform the method of any one of Examples 1 to 28 or 62 to 72.

Example 93 is a non-transitory computer readable medium storing instructions that, when executed by one or more processors of a wireless device, cause the wireless device to perform the method of any one of Examples 1 to 28 or 62 to 72.

Example 94 is a method of performing wireless communications at a wireless device, the method including retrieving, from a memory, a synchronization signal including a plurality of slots that are respectively modified by different slot-specific codes, identifying a first frame scheduled for synchronization signal broadcast, and transmitting the synchronization signal in the first frame.

In Example 95, the subject matter of Example 94 can optionally include wherein transmitting the synchronization signal includes transmitting the synchronization signal via a radio frequency transceiver and one or more antennas.

In Example 96, the subject matter of Example 94 or 95 can optionally include wherein each of the plurality of slots includes a plurality of symbol periods, where each of the plurality of symbol periods is weighted according to a different weight of the respective slot-specific cover code.

In Example 97, the subject matter of Example 96 can optionally include wherein the symbols in the plurality of symbol periods are distributed across a plurality of subcarriers.

In Example 98, the subject matter of Example 96 can optionally include wherein the symbols in the plurality of symbol periods are based on a Zadoff-Chu sequence.

In Example 99, the subject matter of any one of Examples 94 to 98 can optionally include wherein the slot-specific codes are mutually orthogonal.

In Example 100, the subject matter of any one of Examples 94 to 99 can optionally include wherein a first slot of the plurality of slots includes a plurality of symbol periods, wherein a first symbol period of the plurality of symbol periods includes a plurality of symbols, distributed across a plurality of subcarriers, that are weighted by a first weight of the respective slot-specific code for the first slot.

In Example 101, the subject matter of any one of Examples 94 to 99 can optionally include wherein a first slot of the plurality of slots includes a plurality of symbol periods, wherein each symbol period of the plurality of symbol periods includes a plurality of symbols, distributed across a plurality of subcarriers, that are weighted by a respective weight of the respective slot-specific code for the first slot.

In Example 102, the subject matter of any one of Examples 94 to 101 can optionally include wherein the slot-specific codes are each respectively defined by a different plurality of weights.

In Example 103, the subject matter of any one of Examples 94 to 99 can optionally include wherein the respective cover codes are given by the rows of the matrix $$\begin{pmatrix} -1 & 1 & -1 & 1 & -1 & -1 & 1 & 1 & 1 & -1 & 1 & 1 \\ 1 & 1 & -1 & 1 & 1 & 1 & -1 & -1 & 1 & -1 & 1 & -1 \\ 1 & 1 & -1 & 1 & 1 & -1 & -1 & 1 & -1 & 1 & -1 & 1 \\ 1 & 1 & -1 & -1 & -1 & 1 & 1 & -1 & 1 & 1 & -1 & 1 \\ 1 & 1 & 1 & -1 & -1 & 1 & -1 & 1 & -1 & -1 & 1 & 1 \\ 1 & -1 & 1 & 1 & -1 & -1 & -1 & -1 & 1 & 1 & 1 & 1 \\ -1 & -1 & -1 & -1 & 1 & 1 & -1 & 1 & 1 & 1 & 1 & 1 \\ 1 & -1 & -1 & 1 & -1 & 1 & 1 & 1 & -1 & 1 & 1 & -1 \\ -1 & 1 & 1 & 1 & 1 & 1 & 1 & -1 & -1 & 1 & 1 & 1 \end{pmatrix}$$

Example 104 is a wireless device including a synchronization signal memory configured to store a synchronization signal including a plurality of slots that are respectively modified by different slot-specific codes, a timing controller configured to identify a first frame scheduled for synchronization signal broadcast, and a transmitter configured to transmit the synchronization signal in the first frame.

In Example 105, the subject matter of Example 104 can optionally include wherein the transmitter is configured to transmit the synchronization signal via a radio frequency transceiver and one or more antennas.

In Example 106, the subject matter of Example 105 can optionally further include the radio frequency transceiver and the one or more antennas.

In Example 107, the subject matter of any one of Examples 104 to 106 can optionally include wherein each of the plurality of slots includes a plurality of symbol periods, where each of the plurality of symbol periods is weighted according to a different weight of the respective slot-specific cover code.

In Example 108, the subject matter of Example 107 can optionally include wherein the symbols in the plurality of symbol periods are distributed across a plurality of subcarriers.

In Example 109, the subject matter of Example 107 can optionally include wherein the symbols in the plurality of symbol periods are based on a Zadoff-Chu sequence.

In Example 110, the subject matter of any one of Examples 104 to 109 can optionally include wherein the slot-specific codes are mutually orthogonal.

In Example 111, the subject matter of any one of Examples 104 to 110 can optionally include wherein a first slot of the plurality of slots includes a plurality of symbol periods, wherein each symbol period of the plurality of symbol periods includes a plurality of symbols, distributed across a plurality of subcarriers, that are weighted by a respective weight of the respective slot-specific code for the first slot.

In Example 112, the subject matter of any one of Examples 104 to 110 can optionally include wherein a first slot of the plurality of slots includes a plurality of symbol periods, wherein a first symbol period of the plurality of symbol periods includes a plurality of symbols, distributed across a plurality of subcarriers, that are weighted by a first weight of the respective slot-specific code for the first slot.

In Example 113, the subject matter of any one of Examples 104 to 112 can optionally include wherein the slot-specific codes are each respectively defined by a different plurality of weights.

In Example 114, the subject matter of any one of Examples 104 to 109 can optionally include wherein the respective cover codes are given by the rows of the matrix $$\begin{pmatrix} -1 & 1 & -1 & 1 & -1 & -1 & 1 & 1 & 1 & -1 & 1 & 1 \\ 1 & 1 & -1 & 1 & 1 & 1 & -1 & -1 & 1 & -1 & 1 & -1 \\ 1 & 1 & -1 & 1 & 1 & -1 & -1 & 1 & -1 & 1 & -1 & 1 \\ 1 & 1 & -1 & -1 & -1 & 1 & 1 & -1 & 1 & 1 & -1 & 1 \\ 1 & 1 & 1 & -1 & -1 & 1 & -1 & 1 & -1 & -1 & 1 & 1 \\ 1 & -1 & 1 & 1 & -1 & -1 & -1 & -1 & 1 & 1 & 1 & 1 \\ -1 & -1 & -1 & -1 & 1 & 1 & -1 & 1 & 1 & 1 & 1 & 1 \\ 1 & -1 & -1 & 1 & -1 & 1 & 1 & 1 & -1 & 1 & 1 & -1 \\ -1 & 1 & 1 & 1 & 1 & 1 & 1 & -1 & -1 & 1 & 1 & 1 \end{pmatrix}$$

Example 115 is a method of performing wireless communications at a wireless device, the method including generating a sample stream based on a received signal, determining a cross-correlation vector between the sample stream and a local copy of a synchronization signal, wherein the local copy of the synchronization signal includes a plurality of slots that are respectively modified by different slot-specific codes, identifying a sample of the sample stream based on the cross-correlation vector, and transmitting or receiving using the sample as a time reference for synchronization.

In Example 116, the subject matter of Example 115 can optionally further include receiving the received signal via one or more antennas and a radio frequency transceiver.

In Example 117, the subject matter of Example 115 can optionally include wherein each of the plurality of slots includes a plurality of symbol periods, where each of the plurality of symbol periods is weighted according to a different weight of the respective slot-specific cover code.

In Example 118, the subject matter of Example 117 can optionally include wherein the symbols in the plurality of symbol periods are distributed across a plurality of subcarriers.

In Example 119, the subject matter of any one of Examples 115 to 118 can optionally include wherein the slot-specific codes are mutually orthogonal.

In Example 120, the subject matter of any one of Examples 115 to 119 can optionally include wherein a first slot of the plurality of slots includes a plurality of symbol periods, wherein a first symbol period of the plurality of symbol periods includes a plurality of symbols, distributed across a plurality of subcarriers, that are weighted by a first weight of the respective slot-specific code for the first slot.

In Example 121, the subject matter of any one of Examples 115 to 120 can optionally further include retrieving the local copy of the synchronization signal from the memory.

In Example 122, the subject matter of any one of Examples 115 to 121 can optionally further include identifying an estimated start time of a synchronization signal in the sample stream and identifying a search window around the estimated start time, wherein identifying the sample of the sample stream corresponding to the maximum value of the cross-correlation vector includes identifying the sample based on the search window.

In Example 123, the subject matter of Example 122 can optionally include wherein the search window includes multiple slots around the estimated start time and wherein the cross-correlation vector includes the same number of slots as the search window, and wherein determining the cross-correlation vector includes determining a first intermediate result for a sample position of a first slot of the cross-correlation vector based on a first plurality of samples of the sample stream, and determining a second intermediate result for a sample position of a second slot of the cross-correlation vector based on the first intermediate result.

In Example 124, the subject matter of Example 123 can optionally include wherein determining the second intermediate result for the sample position of the second slot of the cross-correlation vector based on the first intermediate result includes modifying the first intermediate result based on the slot-specific codes to obtain the second intermediate result.

In Example 125, the subject matter of Example 123 can optionally include wherein the first plurality of samples correspond to a first symbol of the first slot and the second plurality of samples correspond to a first symbol of the second slot, and wherein determining the second intermediate result for the sample position of the second slot of the cross-correlation vector based on the first intermediate result includes modifying the first intermediate result based on a first weight of the slot-specific codes that is assigned to the first symbol of the slot and a second weight of the slot-specific codes that is assigned to the first symbol of the second slot, and obtaining the second intermediate result from the modifying.

In Example 126, the subject matter of Example 123 can optionally include wherein the first plurality of samples correspond to a first symbol of the first slot and the second plurality of samples correspond to a first symbol of the second slot, and wherein determining the second intermediate result for the sample position of the second slot of the cross-correlation vector based on the first intermediate result includes modifying the first intermediate result based on a sign difference between weights assigned to the first symbol of the first slot and the first symbol of the second slot by the slot-specific codes.

In Example 127, the subject matter of any one of Examples 115 to 122 can optionally include wherein determining the cross-correlation vector includes determining a first intermediate result for a sample position of the cross-correlation vector based on a first plurality of samples of the sample stream, and determining a second intermediate result for the sample position of the cross-correlation vector based on a second plurality of samples of the sample stream, and determining a final result for the sample position of the cross-correlation vector based on the first intermediate result and the second intermediate result.

In Example 128, the subject matter of Example 127 can optionally include wherein determining the first intermediate result includes determining the first intermediate result before the second plurality of samples are generated from the received signal.

In Example 129, the subject matter of any one of Examples 115 to 128 can optionally include wherein transmitting or receiving using the sample as a time reference for synchronization includes using the sample as a frame start time for a slotted communication schedule that includes frames that each include a plurality of slots.

In Example 130, the subject matter of Example 129 can optionally include wherein the number of slots in the frames of the slotted communication schedule is the same as the number of slots of the synchronization signal.

Example 131 is a wireless device including a receiver configured to generate a sample stream based on a received signal, a correlator configured to determine a cross-correlation vector between the sample stream and a local copy of a synchronization signal, wherein the local copy of the synchronization signal includes a plurality of slots that are respectively modified by different slot-specific codes, and a detector configured to identify a sample of the sample stream based on the cross-correlation vector, the receiver further configured to use the sample as a time reference for synchronization.

In Example 132, the subject matter of Example 131 can optionally include wherein the receiver is further configured to receive the received signal via one or more antennas and a radio frequency transceiver.

In Example 133, the subject matter of Example 132 can optionally further include the one or more antennas and the radio frequency transceiver.

In Example 134, the subject matter of any one of Examples 131 to 133 can optionally include wherein each of the plurality of slots includes a plurality of symbol periods, where each of the plurality of symbol periods is weighted according to a different weight of the respective slot-specific cover code.

In Example 135, the subject matter of Example 134 can optionally include wherein the symbols in the plurality of symbol periods are distributed across a plurality of subcarriers.

In Example 136, the subject matter of any one of Examples 131 to 135 can optionally include wherein the slot-specific codes are mutually orthogonal.

In Example 137, the subject matter of any one of Examples 131 to 136 can optionally include wherein a first slot of the plurality of slots includes a plurality of symbol periods, wherein a first symbol period of the plurality of symbol periods includes a plurality of symbols, distributed across a plurality of subcarriers, that are weighted by a first weight of the respective slot-specific code for the first slot.

In Example 138, the subject matter of any one of Examples 131 to 137 can optionally further include a synchronization signal memory configured to store the local copy of the synchronization signal.

In Example 139, the subject matter of any one of Examples 131 to 138 can optionally further include a timing controller configured to identify an estimated start time of a synchronization signal in the sample stream and identify a search window around the estimated start time, wherein the detector is configured to identify the sample of the sample stream corresponding to the maximum value of the cross-correlation vector by identifying the sample based on the search window.

In Example 140, the subject matter of Example 139 can optionally include wherein the search window includes multiple slots around the estimated start time and wherein the cross-correlation vector includes the same number of slots as the search window, and wherein the correlator is configured to determine the cross-correlation vector by determining a first intermediate result for a sample position of a first slot of the cross-correlation vector based on a first plurality of samples of the sample stream, and determining a second intermediate result for a sample position of a second slot of the cross-correlation vector based on the first intermediate result.

In Example 141, the subject matter of Example 140 can optionally include wherein the correlator is configured to determine the second intermediate result for the sample position of the second slot of the cross-correlation vector based on the first intermediate result by modifying the first intermediate result based on the slot-specific codes to obtain the second intermediate result.

In Example 142, the subject matter of Example 140 can optionally include wherein the first plurality of samples correspond to a first symbol of the first slot and the second plurality of samples correspond to a first symbol of the second slot, and wherein the correlator is configured to determine the second intermediate result for the sample position of the second slot of the cross-correlation vector based on the first intermediate result by modifying the first intermediate result based on a first weight of the slot-specific codes that is assigned to the first symbol of the slot and a second weight of the slot-specific codes that is assigned to the first symbol of the second slot, and obtaining the second intermediate result from the modifying.

In Example 143, the subject matter of Example 140 can optionally include wherein the first plurality of samples correspond to a first symbol of the first slot and the second plurality of samples correspond to a first symbol of the second slot, and wherein the correlator is configured to determine the second intermediate result for the sample position of the second slot of the cross-correlation vector based on the first intermediate result by modifying the first intermediate result based on a sign difference between weights assigned to the first symbol of the first slot and the first symbol of the second slot by the slot-specific codes.

In Example 144, the subject matter of any one of Examples 131 to 143 can optionally include wherein the correlator is configured to determine the cross-correlation vector by determining a first intermediate result for a sample position of the cross-correlation vector based on a first plurality of samples of the sample stream, and determining a second intermediate result for the sample position of the cross-correlation vector based on a second plurality of samples of the sample stream, and determining a final result for the sample position of the cross-correlation vector based on the first intermediate result and the second intermediate result.

In Example 145, the subject matter of Example 144 can optionally include wherein determining the first intermediate result includes determining the first intermediate result before the second plurality of samples are generated from the received signal.

In Example 146, the subject matter of any one of Examples 131 to 145 can optionally include wherein the receiver is configured to receive using the sample as a time reference for synchronization by using the sample as a frame start time for a slotted communication schedule that includes frames that each include a plurality of slots.

In Example 147, the subject matter of Example 146 can optionally include wherein the number of slots in the frames of the slotted communication schedule is the same as the number of slots of the synchronization signal.

Example 148 is a wireless device including means for retrieving, from a memory, a synchronization signal including a plurality of slots that are respectively modified by different slot-specific codes, means for identifying a first frame scheduled for synchronization signal broadcast, and means for transmitting the synchronization signal in the first frame.

Example 149 is a wireless device including means for generating a sample stream based on a received signal, means for determining a cross-correlation vector between the sample stream and a local copy of a synchronization signal, wherein the local copy of the synchronization signal includes a plurality of slots that are respectively modified by different slot-specific codes, means for identifying a sample of the sample stream based on the cross-correlation vector, and means for transmitting or receiving using the sample as a time reference for synchronization.

Example 150 is a wireless device including one or more processors and a memory storing instructions that, when executed by the one or more processors, cause the wireless device to perform the method of any one of Examples 94 to 103 or 115 to 130.

Example 151 is a non-transitory computer readable medium storing instructions that, when executed by one or more processors of a wireless device, cause the wireless device to perform the method of any one of Examples 94 to 103 or 115 to 130.

Example 152 is a method of performing communications at a wireless device, the method including repeatedly transmitting synchronization signals for a synchronization cluster including multiple synchronization tiers of wireless devices, detecting a condition that indicates that the repeated transmitting of the synchronization signals will be interrupted, transmitting a beacon that indicates a synchronization tier of the wireless device, and performing a handover of the transmission of synchronization signals to a second wireless device.

In Example 153, the subject matter of Example 152 can optionally further include repeatedly receiving second synchronization signals from a synchronization provider, wherein repeatedly transmitting the synchronization signals includes repeatedly transmitting the synchronization signals in a synchronized manner with the second synchronization signals.

In Example 154, the subject matter of Example 153 can optionally include wherein the synchronization provider is a third wireless device in a different synchronization tier of the synchronization cluster from the wireless device.

In Example 155, the subject matter of Example 153 can optionally include wherein the synchronization provider is a satellite.

In Example 156, the subject matter of any one of Examples 153 to 155 can optionally include wherein detecting the condition that indicates that the repeated transmitting of the synchronization signals will be interrupted includes determining that the second synchronization signals are no longer detectable, or determining that a signal strength of the second synchronization signals is less than a signal strength threshold.

In Example 157, the subject matter of any one of Examples 152 to 155 can optionally include wherein detecting the condition that indicates that the repeated transmitting of the synchronization signals will be interrupted includes determining that a battery power of the wireless device is less than a battery power threshold.

In Example 158, the subject matter of any one of Examples 152 to 155 can optionally include wherein detecting the condition that indicates that the repeated transmitting of the synchronization signals will be interrupted includes identifying an incoming call for the wireless device.

In Example 159, the subject matter of any one of Examples 152 to 158 can optionally further include generating the beacon with a field that indicates the synchronization tier of the wireless device.

In Example 160, the subject matter of Example 159 can optionally further include generating the beacon with a second field that indicates whether the wireless device is synchronized with a satellite-based synchronization source or with a peer-based synchronization source.

In Example 161, the subject matter of any one of Examples 152 to 160 can optionally further include suspending transmission of the synchronization signals after performing the handover.

In Example 162, the subject matter of any one of Examples 152 to 161 can optionally include wherein the synchronization signals have a predefined format that indicates the synchronization tier of the wireless device.

In Example 163, the subject matter of any one of Examples 152 to 162 can optionally include wherein the second wireless device is in a synchronization tier that has the same or fewer relay hops between the synchronization tier and a synchronization source of the synchronization cluster than the synchronization tier of the second wireless device.

In Example 164, the subject matter of any one of Examples 152 to 163 can optionally include wherein the multiple synchronization tiers of the synchronization cluster have different numbers of relay hops between the synchronization tier and a synchronization source of the synchronization cluster.

In Example 165, the subject matter of any one of Examples 152 to 164 can optionally include wherein transmitting the beacon includes identifying a time slot scheduled for beacon transmissions, and transmitting the beacon in the time slot.

In Example 166, the subject matter of any one of Examples 152 to 165 can optionally include wherein performing handover of the transmission of synchronization signals to a second wireless device includes identifying a time slot to suspend transmission of the synchronization signals, and suspending transmission of the synchronization signals after the time slot.

Example 167 is a wireless device including a transmitter configured to transmit synchronization signals for a synchronization cluster including multiple synchronization tiers of wireless devices, and a sync controller configured to detect a condition that indicates that the transmitting of the synchronization signals will be interrupted, the transmitter further configured to transmit a beacon that indicates a synchronization tier of the wireless device, and the sync controller configured to perform a handover of the transmitting of synchronization signals to a second wireless device.

In Example 168, the subject matter of Example 167 can optionally include wherein the transmitter is configured to transmit the synchronization signals and transmit the beacon via a radio frequency transceiver and one or more antennas.

In Example 169, the subject matter of Example 168 can optionally further include the radio frequency transceiver and the one or more antennas.

In Example 170, the subject matter of any one of Examples 167 to 169 can optionally further include a receiver configured to repeatedly receive second synchronization signals from a third wireless device in a different synchronization tier of the synchronization cluster from the wireless device.

In Example 171, the subject matter of any one of Examples 167 to 169 can optionally further include a satellite receiver configured to repeatedly receive second synchronization signals from a satellite.

In Example 172, the subject matter of Example 170 or 171 can optionally include wherein transmitting the synchronization signals for the synchronization cluster includes transmitting the synchronization signals in a synchronized manner with the second synchronization signals.

In Example 173, the subject matter of any one of Examples 170 to 172 can optionally include wherein the sync controller is configured to detect the condition that indicates that the repeated transmitting of the synchronization signals will be interrupted by determining that the second synchronization signals are no longer detectable, or determining that a signal strength of the second synchronization signals is less than a signal strength threshold.

In Example 174, the subject matter of any one of Examples 167 to 173 can optionally include wherein the sync controller is configured to detect the condition that indicates that the repeated transmitting of the synchronization signals will be interrupted by determining that a battery power of the wireless device is less than a battery power threshold.

In Example 175, the subject matter of any one of Examples 167 to 174 can optionally include wherein the sync controller is configured to detect the condition that indicates that the repeated transmitting of the synchronization signals will be interrupted by identifying an incoming call for the wireless device.

In Example 176, the subject matter of any one of Examples 167 to 175 can optionally include wherein the sync controller is further configured to generate the beacon with a field that indicates the synchronization tier of the wireless device.

In Example 177, the subject matter of Example 176 can optionally include wherein the sync controller is further configured to generate the beacon with a second field that indicates whether the wireless device is synchronized with a satellite-based synchronization source or with a peer-based synchronization source.

In Example 178, the subject matter of any one of Examples 167 to 177 can optionally include wherein the sync controller is configured to suspend transmission of the synchronization signals after performing the handover.

In Example 179, the subject matter of any one of Examples 167 to 178 can optionally include wherein the synchronization signals have a predefined format that indicates the synchronization tier of the wireless device.

In Example 180, the subject matter of any one of Examples 167 to 179 can optionally include wherein the second wireless device is in a synchronization tier that has the same or fewer relay hops between the synchronization tier and a synchronization source of the synchronization cluster than the synchronization tier of the second wireless device.

In Example 181, the subject matter of any one of Examples 167 to 180 can optionally include wherein the multiple synchronization tiers of the synchronization cluster have different numbers of relay hops between the synchronization tier and a synchronization source of the synchronization cluster.

In Example 182, the subject matter of any one of Examples 167 to 181 can optionally include wherein the sync controller is further configured to identify a time slot scheduled for beacon transmissions, and wherein the transmitter is configured to transmit the beacon in the time slot.

In Example 183, the subject matter of any one of Examples 167 to 181 can optionally include wherein the sync controller is configured to perform handover of the transmission of synchronization signals to a second wireless device by identifying a time slot to suspend transmission of the synchronization signals, and suspending transmission of the synchronization signals after the time slot.

Example 184 is a method of performing wireless communications at a wireless device, the method including receiving first synchronization signals that are synchronized with a synchronization source of a synchronization cluster, detecting a beacon from a second wireless device of the synchronization cluster, wherein the synchronization cluster includes multiple synchronization tiers of wireless devices and wherein the beacon indicates a synchronization tier of the second wireless device, determining, based on the synchronization tier, that the wireless device is eligible to provide synchronization signals for the second wireless device or to take over transmission of synchronization signals from the second wireless device, and transmitting second synchronization signals synchronized with the synchronization source.

In Example 185, the subject matter of Example 184 can optionally include wherein determining that the wireless device is eligible to provide synchronization signals for the second wireless device includes determining that the wireless device is in a synchronization tier that has fewer relay hops between the synchronization tier and the synchronization source than the synchronization tier of the second wireless device.

In Example 186, the subject matter of Example 184 can optionally include wherein determining that the wireless device is eligible to take over transmission of the synchronization signals from the second wireless device includes determining that the wireless device is in a synchronization tier that has the same or fewer relay hops between the synchronization tier and the synchronization source than the synchronization tier of the second wireless device.

In Example 187, the subject matter of Example 184 can optionally include wherein the synchronization source is a satellite and wherein receiving the first synchronization signals includes receiving the synchronization signals directly from the satellite.

In Example 188, the subject matter of any one of Examples 184 to 187 can optionally include wherein receiving the first synchronization signals includes receiving the first synchronization signals from a third wireless device in the synchronization cluster.

In Example 189, the subject matter of Example 188 can optionally include wherein the third wireless device is in a synchronization tier that has fewer relay hops between the synchronization tier and the synchronization source than the synchronization tier of the wireless device.

In Example 190, the subject matter of any one of Examples 184 to 189 can optionally include wherein the second synchronization signals have a predefined format that indicates the synchronization tier of the wireless device.

In Example 191, the subject matter of any one of Examples 184 to 189 can optionally include wherein transmitting the second synchronization signal synchronized with the synchronization source includes determining a timing of the first synchronization signals, and transmitting the second synchronization signals based on the timing.

In Example 192, the subject matter of any one of Examples 184 to 191 can optionally include wherein the multiple synchronization tiers of the synchronization cluster have different numbers of relay hops between the synchronization tier and a synchronization source of the synchronization cluster.

In Example 193, the subject matter of any one of Examples 184 to 192 can optionally include wherein detecting the beacon includes monitoring a time slot scheduled for beacon transmissions and detecting the beacon in the time slot.

Example 194 is a wireless device including a receiver configured to receive synchronization signals that are synchronized with a synchronization source of a synchronization cluster, a sync controller configured to detect a beacon from a second wireless device of the synchronization cluster, wherein the synchronization cluster includes multiple synchronization tiers of wireless devices and wherein the beacon indicates a synchronization tier of the second wireless device, and to determine, based on the synchronization tier, that the wireless device is eligible to provide synchronization signals for the second wireless device or to take over transmission of synchronization signals from the second wireless device, and a transmitter configured to transmit second synchronization signals synchronized with the synchronization source.

In Example 195, the subject matter of Example 194 can optionally include wherein the transmitter is configured to transmit the second synchronization signals via a radio frequency transceiver and one or more antennas.

In Example 196, the subject matter of Example 195 can optionally further include the radio frequency transceiver and the one or more antennas.

In Example 197, the subject matter of any one of Examples one of Examples can optionally include to 196, wherein the sync controller is configured to determine that the wireless device is eligible to provide synchronization signals for the second wireless device by determining that the wireless device is in a synchronization tier that has fewer relay hops between the synchronization tier and the synchronization source than the synchronization tier of the second wireless device.

In Example 198, the subject matter of any one of Examples 194 to 196 can optionally include wherein the sync controller is configured to determine that the wireless device is eligible to provide synchronization signals for the second wireless device by determining that the wireless device is in a synchronization tier that has the same or fewer relay hops between the synchronization tier and the synchronization source than the synchronization tier of the second wireless device.

In Example 199, the subject matter of any one of Examples 194 to 198 can optionally include wherein the receiver is a satellite receiver and the synchronization source is a satellite, wherein the receiver is configured to receive the first synchronization signals directly from the satellite.

In Example 200, the subject matter of any one of Examples 194 to 199 can optionally include wherein the receiver is configured to receive the first synchronization signals from a third wireless device in the synchronization cluster.

In Example 201, the subject matter of Example 200 can optionally include wherein the third wireless device is in a synchronization tier that has fewer relay hops between the synchronization tier and the synchronization source than the synchronization tier of the wireless device.

In Example 202, the subject matter of any one of Examples 194 to 201 can optionally include wherein the second synchronization signals have a predefined format that indicates the synchronization tier of the wireless device.

In Example 203, the subject matter of any one of Examples 194 to 202 can optionally include wherein the sync controller is configured to determine a timing of the first synchronization signals, and control the transmitter to transmit the second synchronization signals based on the timing.

In Example 204, the subject matter of any one of Examples 194 to 203 can optionally include wherein the multiple synchronization tiers of the synchronization cluster have different numbers of relay hops between the synchronization tier and a synchronization source of the synchronization cluster.

In Example 205, the subject matter of any one of Examples 194 to 204 can optionally include wherein the sync controller is configured to detect the beacon by monitoring a time slot scheduled for beacon transmissions and detecting the beacon in the time slot.

Example 206 is a method of performing wireless communications at a wireless device, the method including receiving first synchronization signals from a first synchronization provider of a synchronization cluster, wherein the synchronization cluster includes multiple synchronization tiers of wireless devices, determining that the first synchronization signals from the synchronization cluster are interrupted, transmitting a beacon that indicates a synchronization tier of the wireless device in the synchronization cluster, and receiving second synchronization signals from a second synchronization provider of the synchronization cluster.

In Example 207, the subject matter of Example 206 can optionally include wherein the first synchronization provider is in a synchronization tier that has less relay hops between the synchronization tier and a synchronization source of the synchronization cluster than a synchronization tier of the wireless device.

In Example 208, the subject matter of Example 206 or 207 can optionally include wherein the second synchronization provider is in a synchronization tier that has less relay hops between the synchronization tier and a synchronization source of the synchronization cluster than a synchronization tier of the wireless device.

In Example 209, the subject matter of any one of Examples 206 to 208 can optionally further include generating the beacon with a field that specifies the synchronization tier of the wireless device or that specifies a synchronization tier of the first synchronization provider.

In Example 210, the subject matter of Example 209 can optionally further include generating the beacon with a second field that specifies whether the first synchronization signals are synchronized with a satellite-based synchronization source or with a peer-based synchronization source.

In Example 211, the subject matter of any one of Examples 206 to 210 can optionally include wherein transmitting the beacon includes identifying a time slot scheduled for beacon transmissions, and transmitting the beacon in the time slot.

In Example 212, the subject matter of any one of Examples 206 to 211 can optionally include wherein determining that the first synchronization signals from the synchronization cluster are interrupted includes determining that the first synchronization signals from the synchronization cluster are not detectable or have a signal strength less than a signal strength threshold.

Example 213 is a wireless device including a receiver configured to receive first synchronization signals from a first synchronization provider of a synchronization cluster, wherein the synchronization cluster includes multiple synchronization tiers of wireless devices, a sync controller configured to determine that the first synchronization signals from the synchronization cluster are interrupted, and a transmitter configured to transmit a beacon that indicates a synchronization tier of the wireless device in the synchronization cluster, the receiver further configured to receive second synchronization signals from a second synchronization provider of the synchronization cluster.

In Example 214, the subject matter of Example 213 can optionally include wherein the receiver is configured to receive the first synchronization signals and the second synchronization signals via a radio frequency transceiver and one or more antennas, and wherein the transmitter is configured to transmit the beacon via the radio frequency transceiver and the one or more antennas.

In Example 215, the subject matter of Example 214 can optionally further include the radio frequency transceiver and the one or more antennas.

In Example 216, the subject matter of any one of Examples 213 to 215 can optionally include wherein the first synchronization provider is in a synchronization tier that has less relay hops between the synchronization tier and a synchronization source of the synchronization cluster than a synchronization tier of the wireless device.

In Example 217, the subject matter of any one of Examples 213 to 216 can optionally include wherein the second synchronization provider is in a synchronization tier that has less relay hops between the synchronization tier and a synchronization source of the synchronization cluster than a synchronization tier of the wireless device.

In Example 218, the subject matter of any one of Examples 213 to 217 can optionally include wherein the sync controller is configured to generate the beacon with a field that specifies the synchronization tier of the wireless device or that specifies a synchronization tier of the first synchronization provider.

In Example 219, the subject matter of Example 218 can optionally include wherein the sync controller is configured to generate the beacon with a second field that specifies whether the first synchronization signals are synchronized with a satellite-based synchronization source or with a peer-based synchronization source.

In Example 220, the subject matter of any one of Examples 213 to 219 can optionally include wherein the sync controller is further configured to identify a time slot scheduled for beacon transmissions, and to control the transmitter to transmit the beacon in the time slot.

In Example 221, the subject matter of any one of Examples 213 to 220 can optionally include wherein the sync controller is configured to determine that the first synchronization signals from the synchronization cluster are interrupted by determining that the first synchronization signals from the synchronization cluster are not detectable or have a signal strength less than a signal strength threshold.

Example 222 is a wireless device including means for repeatedly transmitting synchronization signals for a synchronization cluster including multiple synchronization tiers of wireless devices, means for detecting a condition that indicates that the repeated transmitting of the synchronization signals will be interrupted, means for transmitting a beacon that indicates a synchronization tier of the wireless device, and means for performing a handover of the transmission of synchronization signals to a second wireless device.

Example 223 is a wireless device including means for receiving first synchronization signals that are synchronized with a synchronization source of a synchronization cluster, means for detecting a beacon from a second wireless device of the synchronization cluster, wherein the synchronization cluster includes multiple synchronization tiers of wireless devices and wherein the beacon indicates a synchronization tier of the second wireless device, means for determining, based on the synchronization tier, that the wireless device is eligible to provide synchronization signals for the second wireless device or to take over transmission of synchronization signals from the second wireless device, and means for transmitting second synchronization signals synchronized with the synchronization source.

Example 224 is a wireless device including means for receiving first synchronization signals from a first synchronization provider of a synchronization cluster, wherein the synchronization cluster includes multiple synchronization tiers of wireless devices, means for determining that the first synchronization signals from the synchronization cluster are interrupted, means for transmitting a beacon that indicates a synchronization tier of the wireless device in the synchronization cluster, and means for receiving second synchronization signals from a second synchronization provider of the synchronization cluster.

Example 225 is a wireless device including one or more processors, and a memory storing instructions that, when executed by the one or more processors, causes the wireless device to perform the method of any one of Examples 152 to 165, 184 to 193, or 206 to 212.

Example 226 is a non-transitory computer readable medium storing instructions that, when executed by one or more processors of a wireless device, cause the wireless device to perform the method of any one of Examples 152 to 165, 184 to 193, or 206 to 212.

Example 227 is a method of performing wireless communications at a wireless device, the method including receiving, from a synchronization provider of a synchronization cluster, first synchronization signals and synchronization quality information that indicates a synchronization quality of the first synchronization signals, comparing the synchronization quality information to reference synchronization quality information that indicates a potential synchronization quality of the wireless device, triggering, based on the comparing, a handover of a synchronization provider role from the synchronization provider to the wireless device, and transmitting second synchronization signals for the synchronization cluster after the handover.

In Example 228, the subject matter of Example 227 can optionally include wherein receiving the first synchronization signals and the synchronization quality information includes receiving the first synchronization signals and the synchronization quality information via a radio frequency transceiver and one or more antennas, and wherein transmitting the second synchronization signals includes transmitting the second synchronization signals via the radio frequency transceiver and the one or more antennas.

In Example 229, the subject matter of Example 227 or 228 can optionally include wherein the synchronization quality information includes a satellite link signal strength of the synchronization provider, a local oscillator accuracy of the synchronization provider, a peer link signal strength of the synchronization provider, or a remaining battery power level of the synchronization provider.

In Example 230, the subject matter of any one of Examples 227 to 229 can optionally include wherein receiving the synchronization quality information includes receiving the synchronization quality information as a payload of the first synchronization signals.

In Example 231, the subject matter of any one of Examples 227 to 229 can optionally include wherein receiving the synchronization quality information includes receiving the synchronization quality information in a synchronization quality message separate from the first synchronization signals.

In Example 232, the subject matter of any one of Examples 227 to 231 can optionally include wherein transmitting the second synchronization signals for the synchronization cluster after the handover includes receiving third synchronization signals from a satellite-based synchronization source and transmitting the second synchronization signals in a synchronized manner with the third synchronization signals.

In Example 233, the subject matter of any one of Examples 227 to 232 can optionally include wherein comparing the synchronization quality information to the reference synchronization quality information includes weighting one or more first parameters of the synchronization quality information according to different weights to obtain a first weighted output, weighting one or more second parameters of the reference synchronization quality information according to the different weights to obtain a second weighted output, and comparing the first weighted output to the second weighted output.

In Example 234, the subject matter of Example 233 can optionally include wherein the different weights are based on the relative priorities of the one or more first parameters and the one or more second parameters.

In Example 235, the subject matter of any one of Examples 227 to 232 can optionally include wherein comparing the synchronization quality information to the reference synchronization quality information includes comparing one or more first parameters of the synchronization quality information to one or more second parameters of the reference synchronization quality information.

In Example 236, the subject matter of any one of Examples 227 to 235 can optionally include wherein triggering the handover of the synchronization provider role includes transmitting a handover beacon that requests for the synchronization provider to suspend operation as the synchronization provider.

Example 237 is a method of performing wireless communications at a wireless device, the method including transmitting synchronization signals for a synchronization cluster and transmitting synchronization quality information that indicates a synchronization quality of the synchronization signals, receiving a handover beacon from a second wireless device that requests the wireless device to suspend transmission of the synchronization signals, and suspending transmission of the synchronization signals based on the handover beacon.

In Example 238, the subject matter of Example 237 can optionally include wherein transmitting the synchronization signals and the synchronization quality information includes transmitting the synchronization signals and the synchronization quality information via a radio frequency transceiver and one or more antennas, and wherein receiving the handover beacon includes receiving the handover beacon via the radio frequency transceiver and the one or more antennas.

In Example 239, the subject matter of Example 237 or 238 can optionally include wherein the synchronization quality information includes a satellite link signal strength, the method further including receiving satellite-based synchronization signals from a satellite-based synchronization source and performing a signal strength measurement on the satellite-based synchronization signal to obtain the satellite link signal strength.

In Example 240, the subject matter of any one of Examples 237 to 239 can optionally include wherein the synchronization quality information includes a local oscillator accuracy, the method further including determining the local oscillator accuracy based on a local oscillator of the wireless device.

In Example 241, the subject matter of any one of Examples 237 to 240 can optionally include wherein the synchronization quality information includes a peer link signal strength between the wireless device and a second wireless device, the method further including performing a signal strength measurement on a signal received from the second wireless device to obtain the peer link signal strength.

In Example 242, the subject matter of any one of Examples 237 to 241 can optionally include wherein the synchronization quality information includes a remaining battery power level, the method further including obtaining the remaining battery power level from an application processor of the wireless device.

In Example 243, the subject matter of any one of Examples 237 to 242 can optionally include wherein transmitting the synchronization signals and transmitting the synchronization quality information includes transmitting the synchronization quality information as a payload of at least one of the synchronization signals.

In Example 244, the subject matter of any one of Examples 237 to 242 can optionally include wherein transmitting the synchronization signals and transmitting the synchronization quality information includes transmitting the synchronization quality information in a synchronization quality message separate from the synchronization signals.

Example 245 is a method of performing wireless communications at a wireless device, the method including transmitting synchronization signals for wireless devices of a synchronization cluster to use for synchronization, receiving, from one or more wireless devices of the synchronization cluster, reference synchronization quality information that indicates a potential synchronization quality of the one or more wireless devices, comparing the reference synchronization quality information to synchronization quality information of the wireless device, and triggering a handover for transmission of the synchronization signals to a second wireless device of the one or more wireless devices based on the comparing.

In Example 246, the subject matter of Example 245 can optionally include wherein transmitting the synchronization signals includes transmitting the synchronization signals via a radio frequency transceiver and one or more antennas, and wherein receiving the reference synchronization quality information includes receiving the reference synchronization quality information via the radio frequency transceiver and the one or more antennas.

In Example 247, the subject matter of Example 245 or 246 can optionally include wherein the reference synchronization quality information for the second wireless device includes a satellite link signal strength of the second wireless device, a local oscillator accuracy of the second wireless device, a peer link signal strength of the second wireless device, or a remaining battery power level of the second wireless device.

In Example 248, the subject matter of any one of Examples 245 to 247 can optionally include wherein the synchronization quality information includes a satellite link signal strength of the wireless device, a local oscillator accuracy of the wireless device, a peer link signal strength of the wireless device, or a remaining battery power level of the wireless device.

In Example 249, the subject matter of any one of Examples 245 to 247 can optionally include wherein the synchronization quality information includes a satellite link signal strength, the method further including receiving satellite-based synchronization signals from a satellite-based synchronization source and performing a signal strength measurement on the satellite-based synchronization signal to obtain the satellite link signal strength.

In Example 250, the subject matter of any one of Examples 245 to 249 can optionally include wherein the synchronization quality information includes a local oscillator accuracy, the method further including determining the local oscillator accuracy based on a local oscillator of the wireless device.

In Example 251, the subject matter of any one of Examples 245 to 250 can optionally include wherein the synchronization quality information includes a peer link signal strength between the wireless device and a second wireless device, the method further including performing a signal strength measurement on a signal received from the second wireless device to obtain the peer link signal strength.

In Example 252, the subject matter of any one of Examples 245 to 251 can optionally include wherein the synchronization quality information includes a remaining battery power level, the method further including obtaining the remaining battery power level from an application processor of the wireless device.

In Example 253, the subject matter of any one of Examples 245 to 252 can optionally include wherein triggering the handover includes transmitting a handover beacon that requests for the second wireless device to take over transmission of the synchronization signals.

In Example 254, the subject matter of any one of Examples 245 to 253 can optionally include wherein comparing the reference synchronization quality information to the synchronization quality information includes comparing one or more first parameters of the reference synchronization quality information to one or more second parameters of the synchronization quality information.

In Example 255, the subject matter of any one of Examples 245 to 253 can optionally include wherein comparing the reference synchronization quality information for the second wireless device to the synchronization quality information includes weighting one or more first parameters of the synchronization quality information according to different weights to obtain a first weighted output, weighting one or more second parameters of the reference synchronization quality information for the second wireless device according to the different weights to obtain a second weighted output, and comparing the first weighted output to the second weighted output.

In Example 256, the subject matter of Example 255 can optionally further include determining that the second weighted output is greater than the first weighted output.

In Example 257, the subject matter of Example 255 can optionally include wherein the different weights are based on the relative priorities of the one or more first parameters and the one or more second parameters.

In Example 258, the subject matter of any one of Examples 245 to 254 can optionally include wherein comparing the reference synchronization quality information to the synchronization quality information includes determining a respective weighted output for each of the one or more wireless devices based on the reference synchronization quality information and predefined weights for different parameters of the reference synchronization signal information, determining a weighted output for the wireless device based on the synchronization quality information and the predefined weights, and determining that the respective weighted output for the second wireless device is higher than the weighted output and the respective weighted outputs for the other wireless devices of the one or more wireless devices.

In Example 259, the subject matter of any one of Examples 245 to 258 can optionally further include before receiving the reference synchronization quality information, transmitting a synchronization quality information request that requests reference synchronization quality information from wireless devices.

In Example 260, the subject matter of any one of Examples 245 to 259 can optionally further include periodically transmitting synchronization quality information for the wireless device in a synchronization quality information report.

In Example 261, the subject matter of any one of Examples 245 to 260 can optionally further include periodically receiving synchronization quality information reports, wherein some of the reference synchronization quality information is included in at least one of the synchronization quality information reports.

Example 262 is a method of performing wireless communications at a wireless device, the method including receiving synchronization signals from a synchronization provider of a synchronization cluster, periodically receiving reference synchronization quality information from one or more wireless devices in the synchronization cluster, comparing the reference synchronization quality information to synchronization quality information of the wireless device, and triggering a handover for transmission of the synchronization signals to a second wireless device of the one or more wireless devices based on the comparing.

In Example 263, the subject matter of Example 262 can optionally include wherein receiving the synchronization signals and the reference synchronization quality information includes receiving the synchronization signals and the reference synchronization quality information via a radio frequency transceiver and the one or more antennas.

In Example 264, the subject matter of any one of Examples, wherein the can optionally include synchronization quality information for the second wireless device includes a satellite link signal strength of the second wireless device, a local oscillator accuracy of the second wireless device, a peer link signal strength of the second wireless device, or a remaining battery power level of the second wireless device.

In Example 265, the subject matter of any one of Examples 262 to 264 can optionally include wherein the synchronization quality information includes a satellite link signal strength of the wireless device, a local oscillator accuracy of the wireless device, a peer link signal strength of the wireless device, or a remaining battery power level of the wireless device.

In Example 266, the subject matter of any one of Examples 262 to 265 can optionally include wherein the synchronization quality information includes a satellite link signal strength, the method further including receiving satellite-based synchronization signals from a satellite-based synchronization source and performing a signal strength measurement on the satellite-based synchronization signal to obtain the satellite link signal strength.

In Example 267, the subject matter of any one of Examples 262 to 266 can optionally include wherein the synchronization quality information includes a local oscillator accuracy, the method further including determining the local oscillator accuracy based on a local oscillator of the wireless device.

In Example 268, the subject matter of any one of Examples 262 to 267 can optionally include wherein the synchronization quality information includes a peer link signal strength between the wireless device and a second wireless device, the method further including performing a signal strength measurement on a signal received from the second wireless device to obtain the peer link signal strength.

In Example 269, the subject matter of any one of Examples 262 to 268 can optionally include wherein the synchronization quality information includes a remaining battery power level, the method further including obtaining the remaining battery power level from an application processor of the wireless device.

In Example 270, the subject matter of any one of Examples 262 to 269 can optionally include wherein triggering the handover includes transmitting a handover beacon that requests for the second wireless device to take over transmission of the synchronization signals.

In Example 271, the subject matter of any one of Examples 262 to 270 can optionally include wherein comparing the reference synchronization quality information to the synchronization quality information includes comparing one or more first parameters of the reference synchronization quality information to one or more second parameters of the synchronization quality information.

In Example 272, the subject matter of any one of Examples 262 to 270 can optionally include wherein comparing the reference synchronization quality information for the second wireless device to the synchronization quality information includes weighting one or more first parameters of the synchronization quality information according to different weights to obtain a first weighted output, weighting one or more second parameters of the reference synchronization quality information for the second wireless device according to the different weights to obtain a second weighted output, and comparing the first weighted output to the second weighted output.

In Example 273, the subject matter of Example 272 can optionally further include determining that the second weighted output is greater than the first weighted output.

In Example 274, the subject matter of Example 272 can optionally include wherein the different weights are based on the relative priorities of the one or more first parameters and the one or more second parameters.

In Example 275, the subject matter of any one of Examples 262 to 271 can optionally include wherein comparing the reference synchronization quality information to the synchronization quality information includes determining a respective weighted output for each of the one or more wireless devices based on the reference synchronization quality information and predefined weights for different parameters of the reference synchronization signal information, determining a weighted output for the wireless device based on the synchronization quality information and the predefined weights, and determining that the respective weighted output for the second wireless device is higher than the weighted output and the respective weighted outputs for the other wireless devices of the one or more wireless devices.

In Example 276, the subject matter of any one of Examples 262 to 275 can optionally further include periodically transmitting synchronization quality information for the wireless device in a synchronization quality information report.

In Example 277, the subject matter of any one of Examples 262 to 276 can optionally include wherein the synchronization provider is one of the one or more wireless devices.

Example 278 is a method of performing wireless communications at a wireless device, the method including receiving first synchronization signals from a synchronization provider of a synchronization cluster, transmitting synchronization quality information that indicates a potential synchronization quality of the wireless device, receiving a handover beacon that requests for the wireless device to begin transmitting synchronization signals for the synchronization cluster, and transmitting second synchronization signals for the synchronization cluster after receiving the handover beacon.

In Example 279, the subject matter of Example 278 can optionally include wherein receiving the first synchronization signals and the handover beacon includes receiving the first synchronization signals and the handover beacon via a radio frequency transceiver and one or more antennas, and wherein transmitting the synchronization quality information and the second synchronization signals includes transmitting the synchronization quality information and the second synchronization signals via the radio frequency transceiver and the one or more antennas.

In Example 280, the subject matter of Example 278 or 279 can optionally further include receiving a synchronization quality information request before transmitting the synchronization quality information.

In Example 281, the subject matter of Example 280 can optionally include wherein receiving a synchronization quality information request includes receiving the synchronization quality information request from the synchronization provider.

In Example 282, the subject matter of any one of Examples 278 to 281 can optionally further include periodically transmitting synchronization quality reports, wherein at least one of the synchronization quality reports includes the synchronization quality information.

In Example 283, the subject matter of any one of Examples 278 to 282 can optionally include wherein the synchronization quality information includes a satellite link signal strength of the wireless device, a local oscillator accuracy of the wireless device, a peer link signal strength of the wireless device, or a remaining battery power level of the wireless device.

In Example 284, the subject matter of any one of Examples 278 to 283 can optionally include wherein the synchronization quality information includes a satellite link signal strength, the method further including receiving satellite-based synchronization signals from a satellite-based synchronization source and performing a signal strength measurement on the satellite-based synchronization signal to obtain the satellite link signal strength.

In Example 285, the subject matter of any one of Examples 278 to 284 can optionally include wherein the synchronization quality information includes a local oscillator accuracy, the method further including determining the local oscillator accuracy based on a local oscillator of the wireless device.

In Example 286, the subject matter of any one of Examples 278 to 285 can optionally include wherein the synchronization quality information includes a peer link signal strength between the wireless device and a second wireless device, the method further including performing a signal strength measurement on a signal received from the second wireless device to obtain the peer link signal strength.

In Example 287, the subject matter of any one of Examples 278 to 286 can optionally include wherein the synchronization quality information includes a remaining battery power level, the method further including obtaining the remaining battery power level from an application processor of the wireless device.

Example 288 is a wireless device including a receiver configured to receive, from a synchronization provider of a synchronization cluster, first synchronization signals and synchronization quality information that indicates a synchronization quality of the first synchronization signals, a sync controller configured to compare the synchronization quality information to reference synchronization quality information that indicates a potential synchronization quality of the wireless device, and to trigger, based on the comparing, a handover of a synchronization provider role from the synchronization provider to the wireless device, and a transmitter configured to transmit second synchronization signals for the synchronization cluster after the handover.

In Example 289, the subject matter of Example 288 can optionally include wherein the receiver is a receive path of a baseband modem of the wireless device and is configured to receive the first synchronization signals and the synchronization quality information via a radio frequency transceiver and one or more antennas, and wherein the transmitter is a transmit path of the baseband modem and is configured to transmit the second synchronization signals via the radio frequency transceiver and the one or more antennas.

In Example 290, the subject matter of Example 289 can optionally further include the radio frequency transceiver and the one or more antennas.

In Example 291, the subject matter of any one of Examples 288 to 290 can optionally include wherein the synchronization quality information includes a satellite link signal strength of the synchronization provider, a local oscillator accuracy of the synchronization provider, a peer link signal strength of the synchronization provider, or a remaining battery power level of the synchronization provider.

In Example 292, the subject matter of any one of Examples 288 to 291 can optionally include wherein the receiver is configured to receive the synchronization quality information as a payload of the first synchronization signals.

In Example 293, the subject matter of any one of Examples 288 to 292 can optionally include wherein the receiver is configured to receive the synchronization quality information in a synchronization quality message separate from the first synchronization signals.

In Example 294, the subject matter of any one of Examples 288 to 293 can optionally further include a satellite receiver configured to receive third synchronization signals from a satellite-based synchronization source, wherein the transmitter is configured to transmit the second synchronization signals in a synchronized manner with the third synchronization signals.

In Example 295, the subject matter of any one of Examples 288 to 294 can optionally include wherein the sync controller is configured to compare the synchronization quality information to the reference synchronization quality information by weighting one or more first parameters of the synchronization quality information according to different weights to obtain a first weighted output, weighting one or more second parameters of the reference synchronization quality information according to the different weights to obtain a second weighted output, and comparing the first weighted output to the second weighted output.

In Example 296, the subject matter of Example 295 can optionally include wherein the different weights are based on the relative priorities of the one or more first parameters and the one or more second parameters.

In Example 297, the subject matter of any one of Examples 288 to 294 can optionally include wherein the sync controller is configured to compare the synchronization quality information to the reference synchronization quality information by comparing one or more first parameters of the synchronization quality information to one or more second parameters of the reference synchronization quality information.

In Example 298, the subject matter of any one of Examples 288 to 297 can optionally include wherein the sync controller is configured to trigger the handover of the synchronization provider role by generating a handover beacon that requests for the synchronization provider to suspend operation as the synchronization provider, and providing the handover beacon to the transmitter for transmission.

In Example 299, the subject matter of Example 298 can optionally include wherein the transmitter is configured to transmit the handover beacon.

Example 300 is a wireless device including a transmitter configured to transmit synchronization signals for a synchronization cluster and to transmit synchronization quality information that indicates a synchronization quality of the synchronization signals, a receiver configured to receive a handover beacon from a second wireless device that requests the wireless device to suspend transmission of the synchronization signals, and a sync controller configured to suspend transmission of the synchronization signals based on the handover beacon.

In Example 301, the subject matter of Example 300 can optionally include wherein the transmitter is a transmit path of a baseband modem of the wireless device and is configured to transmit the synchronization signals and the synchronization quality information via a radio frequency transceiver and one or more antennas, and wherein the receiver is a receive path of the baseband modem and is configured to receive the handover beacon via the radio frequency transceiver and the one or more antennas.

In Example 302, the subject matter of Example 301 can optionally further include the radio frequency transceiver and the one or more antennas.

In Example 303, the subject matter of any one of Examples 300 to 302 can optionally include wherein the synchronization quality information includes a satellite link signal strength, the wireless device further including a satellite receiver configured to receive satellite-based synchronization signals from a satellite-based synchronization source, and to perform a signal strength measurement on the satellite-based synchronization signal to obtain the satellite link signal strength.

In Example 304, the subject matter of any one of Examples 300 to 303 can optionally include wherein the synchronization quality information includes a local oscillator accuracy, and wherein the sync controller is further configured to determine the local oscillator accuracy based on a local oscillator of the wireless device.

In Example 305, the subject matter of any one of Examples 300 to 304 can optionally include wherein the synchronization quality information includes a peer link signal strength between the wireless device and a second wireless device, wherein the receiver is further configured to perform a signal strength measurement on a signal received from the second wireless device to obtain the peer link signal strength.

In Example 306, the subject matter of any one of Examples 300 to 305 can optionally include wherein the synchronization quality information includes a remaining battery power level, wherein the sync controller is configured to obtain the remaining battery power level from an application processor of the wireless device.

In Example 307, the subject matter of any one of Examples 300 to 306 can optionally include wherein the transmitter is configured to transmit the synchronization quality information as a payload of at least one of the synchronization signals.

In Example 308, the subject matter of any one of Examples 300 to 306 can optionally include wherein the transmitter is configured to transmit the synchronization quality information in a synchronization quality message separate from the synchronization signals.

Example 309 is a wireless device including a transmitter configured to transmit synchronization signals for wireless devices of a synchronization cluster to use for synchronization, a receiver configured to receive, from one or more wireless devices of the synchronization cluster, reference synchronization quality information that indicates a potential synchronization quality of the one or more wireless devices, and a sync controller configured to compare the reference synchronization quality information to synchronization quality information of the wireless device, and to trigger a handover for transmission of the synchronization signals to a second wireless device of the one or more wireless devices based on the comparing.

In Example 310, the subject matter of Example 309 can optionally include wherein the transmitter is a transmit path of a baseband modem of the wireless device and is configured to transmit the synchronization signals via a radio frequency transceiver and one or more antennas, and wherein the receiver is a receive path of the baseband modem and is configured to receive the reference synchronization quality information via the radio frequency transceiver and the one or more antennas.

In Example 311, the subject matter of Example 310 can optionally further include the radio frequency transceiver and the one or more antennas.

In Example 312, the subject matter of Example 309 or 310 can optionally include wherein the reference synchronization quality information for the second wireless device includes a satellite link signal strength of the second wireless device, a local oscillator accuracy of the second wireless device, a peer link signal strength of the second wireless device, or a remaining battery power level of the second wireless device.

In Example 313, the subject matter of any one of Examples 309 to 312 can optionally include wherein the synchronization quality information includes a satellite link signal strength of the wireless device, a local oscillator accuracy of the wireless device, a peer link signal strength of the wireless device, or a remaining battery power level of the wireless device.

In Example 314, the subject matter of any one of Examples 309 to 312 can optionally include wherein the synchronization quality information includes a satellite link signal strength, the wireless device further including a satellite receiver configured to receive satellite-based synchronization signals from a satellite-based synchronization source and to perform a signal strength measurement on the satellite-based synchronization signal to obtain the satellite link signal strength.

In Example 315, the subject matter of any one of Examples 309 to 314 can optionally include wherein the synchronization quality information includes a local oscillator accuracy, the sync controller further configured to determine the local oscillator accuracy based on a local oscillator of the wireless device.

In Example 316, the subject matter of any one of Examples 309 to 315 can optionally include wherein the synchronization quality information includes a peer link signal strength between the wireless device and a second wireless device, the receiver further configured to perform a signal strength measurement on a signal received from the second wireless device to obtain the peer link signal strength.

In Example 317, the subject matter of any one of Examples 309 to 316 can optionally include wherein the synchronization quality information includes a remaining battery power level, wherein the sync controller is configured to obtain the remaining battery power level from an application processor of the wireless device.

In Example 318, the subject matter of any one of Examples 309 to 317 can optionally include wherein the sync controller is configured to trigger the handover beacon by generating a handover beacon that requests for the second wireless device to take over transmission of the synchronization signals, and providing the handover beacon to the transmitter for transmission.

In Example 319, the subject matter of Example 318 can optionally include wherein the transmitter is further configured to transmit the handover beacon.

In Example 320, the subject matter of any one of Examples 309 to 319 can optionally include wherein the sync controller is configured to compare the reference synchronization quality information to the synchronization quality information by comparing one or more first parameters of the reference synchronization quality information to one or more second parameters of the synchronization quality information.

In Example 321, the subject matter of any one of Examples 309 to 319 can optionally include wherein the sync controller is configured to compare the reference synchronization quality information for the second wireless device to the synchronization quality information by weighting one or more first parameters of the synchronization quality information according to different weights to obtain a first weighted output, weighting one or more second parameters of the reference synchronization quality information for the second wireless device according to the different weights to obtain a second weighted output, and comparing the first weighted output to the second weighted output.

In Example 322, the subject matter of Example 321 can optionally include wherein the sync controller is further configured to determine that the second weighted output is greater than the first weighted output.

In Example 323, the subject matter of Example 321 can optionally include wherein the different weights are based on the relative priorities of the one or more first parameters and the one or more second parameters.

In Example 324, the subject matter of any one of Examples 309 to 319 can optionally include wherein the sync controller is configured to compare the reference synchronization quality information to the synchronization quality information by determining a respective weighted output for each of the one or more wireless devices based on the reference synchronization quality information and predefined weights for different parameters of the reference synchronization signal information, determining a weighted output for the wireless device based on the synchronization quality information and the predefined weights, and determining that the respective weighted output for the second wireless device is higher than the weighted output and the respective weighted outputs for the other wireless devices of the one or more wireless devices.

In Example 325, the subject matter of any one of Examples 309 to 324 can optionally include wherein the transmitter is further configured to, before the receiver receives the reference synchronization quality information, transmit a synchronization quality information request that requests reference synchronization quality information from wireless devices.

In Example 326, the subject matter of any one of Examples 309 to 325 can optionally include wherein the transmitter is further configured to periodically transmit synchronization quality information for the wireless device in a synchronization quality information report.

In Example 327, the subject matter of any one of Examples 309 to 326 can optionally include wherein the receiver is configured to periodically receive synchronization quality information reports, wherein some of the reference synchronization quality information is included in at least one of the synchronization quality information reports.

Example 328 is a wireless device including a receiver configured to receive synchronization signals from a synchronization provider of a synchronization cluster, and to periodically receive reference synchronization quality information from one or more wireless devices in the synchronization cluster, a sync controller configured to compare the reference synchronization quality information to synchronization quality information of the wireless device, and to trigger a handover for transmission of the synchronization signals to a second wireless device of the one or more wireless devices based on the comparing.

In Example 329, the subject matter of Example 328 can optionally include wherein the receiver is a receive path of a baseband modem of the wireless device and is configured to receive the synchronization signals and the reference synchronization quality information via a radio frequency transceiver and one or more antennas.

In Example 330, the subject matter of Example 329 can optionally further include the radio frequency transceiver and the one or more antennas.

In Example 331, the subject matter of any one of Examples 328 to 330 can optionally include wherein the reference synchronization quality information for the second wireless device includes a satellite link signal strength of the second wireless device, a local oscillator accuracy of the second wireless device, a peer link signal strength of the second wireless device, or a remaining battery power level of the second wireless device.

In Example 332, the subject matter of any one of Examples 328 to 331 can optionally include wherein the synchronization quality information includes a satellite link signal strength of the wireless device, a local oscillator accuracy of the wireless device, a peer link signal strength of the wireless device, or a remaining battery power level of the wireless device.

In Example 333, the subject matter of any one of Examples 328 to 332 can optionally include wherein the synchronization quality information includes a satellite link signal strength, the wireless device further including a satellite receiver configured to receive satellite-based synchronization signals from a satellite-based synchronization source and to perform a signal strength measurement on the satellite-based synchronization signal to obtain the satellite link signal strength.

In Example 334, the subject matter of any one of Examples 328 to 333 can optionally include wherein the synchronization quality information includes a local oscillator accuracy, the sync controller further configured to determine the local oscillator accuracy based on a local oscillator of the wireless device.

In Example 335, the subject matter of any one of Examples 328 to 334 can optionally include wherein the synchronization quality information includes a peer link signal strength between the wireless device and a second wireless device, the receiver further configured to perform a signal strength measurement on a signal received from the second wireless device to obtain the peer link signal strength.

In Example 336, the subject matter of any one of Examples 328 to 335 can optionally include wherein the synchronization quality information includes a remaining battery power level, the sync controller further configured to obtain the remaining battery power level from an application processor of the wireless device.

In Example 337, the subject matter of any one of Examples 328 to 336 can optionally further include a transmitter, wherein the sync controller is configured to trigger the handover by generating a handover beacon that requests for the second wireless device to take over transmission of the synchronization signals, and providing the handover beacon to the transmitter for transmission.

In Example 338, the subject matter of Example 337 can optionally include wherein the transmitter is configured to transmit the handover beacon.

In Example 339, the subject matter of any one of Examples 328 to 338 can optionally include wherein the sync controller is configured to compare the reference synchronization quality information to the synchronization quality information by comparing one or more first parameters of the reference synchronization quality information to one or more second parameters of the synchronization quality information.

In Example 340, the subject matter of any one of Examples 328 to 338 can optionally include wherein the sync controller is configured to compare the reference synchronization quality information to the synchronization quality information by weighting one or more first parameters of the synchronization quality information according to different weights to obtain a first weighted output, weighting one or more second parameters of the reference synchronization quality information for the second wireless device according to the different weights to obtain a second weighted output, and comparing the first weighted output to the second weighted output.

In Example 341, the subject matter of Example 340 can optionally include wherein the sync controller is further configured to determine that the second weighted output is greater than the first weighted output.

In Example 342, the subject matter of Example 340 can optionally include wherein the different weights are based on the relative priorities of the one or more first parameters and the one or more second parameters.

In Example 343, the subject matter of any one of Examples 328 to 340 can optionally include wherein the sync controller is configured to compare the reference synchronization quality information to the synchronization quality information by determining a respective weighted output for each of the one or more wireless devices based on the reference synchronization quality information and predefined weights for different parameters of the reference synchronization signal information, determining a weighted output for the wireless device based on the synchronization quality information and the predefined weights, and determining that the respective weighted output for the second wireless device is higher than the weighted output and the respective weighted outputs for the other wireless devices of the one or more wireless devices.

In Example 344, the subject matter of any one of Examples 328 to 343 can optionally further include a transmitter configured to periodically transmit synchronization quality information for the wireless device in a synchronization quality information report.

In Example 345, the subject matter of any one of Examples 328 to 344 can optionally include wherein the synchronization provider is one of the one or more wireless devices.

Example 346 is a wireless device including a receiver configured to receive first synchronization signals from a synchronization provider of a synchronization cluster, and a transmitter configured to transmit synchronization quality information that indicates a potential synchronization quality of the wireless device, the receiver further configured to receive a handover beacon that requests for the wireless device to begin transmitting synchronization signals for the synchronization cluster, and the transmitter further configured to transmit second synchronization signals for the synchronization cluster after receiving the handover beacon.

In Example 347, the subject matter of Example 346 can optionally include wherein the receiver is a receive path of a baseband modem of the wireless device and is configured to receive the first synchronization signals and the handover beacon via a radio frequency transceiver and one or more antennas, and wherein the transmitter is a transmit path of the baseband modem and is configured to transmit the synchronization quality information and the second synchronization signals via the radio frequency transceiver and the one or more antennas.

In Example 348, the subject matter of Example 347 can optionally further include the radio frequency transceiver and the one or more antennas.

In Example 349, the subject matter of any one of Examples 346 to 348 can optionally include wherein the receiver is configured to receive a synchronization quality information request before the transmitter transmits the synchronization quality information.

In Example 350, the subject matter of Example 349 can optionally include wherein the receiver is configured to receive the synchronization quality information request from the synchronization provider.

In Example 351, the subject matter of any one of Examples 346 to 348 can optionally include wherein the transmitter is further configured to periodically transmit synchronization quality reports, wherein at least one of the synchronization quality reports includes the synchronization quality information.

In Example 352, the subject matter of any one of Examples 346 to 351 can optionally include wherein the synchronization quality information includes a satellite link signal strength of the wireless device, a local oscillator accuracy of the wireless device, a peer link signal strength of the wireless device, or a remaining battery power level of the wireless device.

In Example 353, the subject matter of any one of Examples 346 to 352 can optionally include wherein the synchronization quality information includes a satellite link signal strength, the wireless device further including a satellite receiver configured to receive satellite-based synchronization signals from a satellite-based synchronization source and perform a signal strength measurement on the satellite-based synchronization signal to obtain the satellite link signal strength.

In Example 354, the subject matter of any one of Examples 346 to 353 can optionally include wherein the synchronization quality information includes a local oscillator accuracy, the sync controller further configured to determine the local oscillator accuracy based on a local oscillator of the wireless device.

In Example 355, the subject matter of any one of Examples 346 to 354 can optionally include wherein the synchronization quality information includes a peer link signal strength between the wireless device and a second wireless device, the receiver further configured to perform a signal strength measurement on a signal received from the second wireless device to obtain the peer link signal strength.

In Example 356, the subject matter of any one of Examples 346 to 355 can optionally include wherein the synchronization quality information includes a remaining battery power level, the sync controller further configured to obtain the remaining battery power level from an application processor of the wireless device.

Example 357 is a wireless device including means for receiving, from a synchronization provider of a synchronization cluster, first synchronization signals and synchronization quality information that indicates a synchronization quality of the first synchronization signals, means for comparing the synchronization quality information to reference synchronization quality information that indicates a potential synchronization quality of the wireless device, means for triggering, based on the comparing, a handover of a synchronization provider role from the synchronization provider to the wireless device, and means for transmitting second synchronization signals for the synchronization cluster after the handover.

Example 358 is a wireless device including means for transmitting synchronization signals for a synchronization cluster and transmitting synchronization quality information that indicates a synchronization quality of the synchronization signals, means for receiving a handover beacon from a second wireless device that requests the wireless device to suspend transmission of the synchronization signals, and means for suspending transmission of the synchronization signals based on the handover beacon.

Example 359 is a wireless device including means for transmitting synchronization signals for wireless devices of a synchronization cluster to use for synchronization, means for receiving, from one or more wireless devices of the synchronization cluster, reference synchronization quality information that indicates a potential synchronization quality of the one or more wireless devices, means for comparing the reference synchronization quality information to synchronization quality information of the wireless device, and means for triggering a handover for transmission of the synchronization signals to a second wireless device of the one or more wireless devices based on the comparing.

Example 360 is a wireless device including means for receiving synchronization signals from a synchronization provider of a synchronization cluster, means for periodically receiving reference synchronization quality information from one or more wireless devices in the synchronization cluster, means for comparing the reference synchronization quality information to synchronization quality information of the wireless device, and means for triggering a handover for transmission of the synchronization signals to a second wireless device of the one or more wireless devices based on the comparing.

Example 361 is a wireless device including means for receiving first synchronization signals from a synchronization provider of a synchronization cluster, means for transmitting synchronization quality information that indicates a potential synchronization quality of the wireless device, means for receiving a handover beacon that requests for the wireless device to begin transmitting synchronization signals for the synchronization cluster, and means for transmitting second synchronization signals for the synchronization cluster after receiving the handover beacon.

Example 362 is a non-transitory computer readable medium storing instructions that, when executed by one or more processors of a wireless device, cause the wireless device to perform the method of any one of Examples 227 to 287.

Example 363 is a wireless device including one or more processors, and a memory storing instructions that, when executed by the one or more processors, cause the wireless device to perform the method of any one of Examples 227 to 287.

Example 364 is a method of performing wireless communications at a wireless device, the method including receiving data on a common frequency shared by multiple wireless devices of a device-to-device network, identifying a scheduling request in the data from the common frequency and identifying a transmitting device of the scheduling request, identifying a user-specific frequency based on the transmitting device and receiving a reference signal on the user-specific frequency, and receiving a data transmission from the transmitting device on the user-specific frequency.

In Example 365, the subject matter of Example 364 can optionally include wherein receiving the data on the common frequency and receiving the data transmission on the user-specific frequency includes receiving the data and the data transmission via a radio frequency transceiver and one or more antennas.

In Example 366, the subject matter of any one of Examples 364 or 365 can optionally include wherein the scheduling request, the reference signal, and the data transmission are in a first frame of a communication schedule, and wherein the common frequency is a first hopping frequency of a common hopping scheme assigned to the first frame and the user-specific frequency is a third hopping frequency of a user-specific hopping scheme assigned to the first frame.

In Example 366, the subject matter of Example 366 can optionally include wherein the common hopping scheme assigns different hopping frequencies to different frames and wherein the user-specific hopping scheme assigns different hopping frequencies to different frames.

In Example 368, the subject matter of any one of Examples 364 to 366 can optionally include wherein identifying the user-specific frequency based on the transmitting device includes identifying a user-specific hopping scheme for frequency hopping that is assigned to the transmitting device, identifying a current frame during which the scheduling request is received, and identifying, as the user-specific hopping frequency, a hopping frequency of the user-specific hopping scheme assigned for the current frame.

In Example 369, the subject matter of any one of Examples 364 to 368 can optionally include wherein identifying the scheduling request includes identifying the scheduling request in a scheduling part of a control channel mapped to the common frequency and wherein receiving the reference signal on the user-specific frequency includes receiving the reference signal in a sounding part of the control channel mapped to the user-specific frequency.

In Example 370, the subject matter of any one of Examples 364 to 369 can optionally include wherein the common frequency is common to the plurality of wireless devices, and wherein the user-specific frequency is specific to the transmitting device.

In Example 371, the subject matter of any one of Examples 364 to 370 can optionally include wherein identifying the transmitting device of the scheduling request includes identifying a current frame during which the scheduling request is received, and identifying the transmitting device based on the current frame and a discontinuous reception schedule assigned to the transmitting device.

In Example 372, the subject matter of Example 371 can optionally include wherein the discontinuous reception schedule assigned to the transmitting device has a transmit frame that matches the current frame, the transmit frame being a frame where the transmitting device is permitted to transmit scheduling requests to the wireless device.

In Example 373, the subject matter of Example 372 can optionally further include before receiving the data on the common frequency, determining respective discontinuous reception schedules for a plurality of wireless devices that are discovered by the wireless device, the transmitting device being one of the plurality of wireless devices.

In Example 374, the subject matter of Example 373 can optionally include wherein determining the discontinuous reception schedule for the transmitting device includes selecting a discontinuous reception schedule for the transmitting device based on a link ID between the wireless device and the transmitting device.

In Example 375, the subject matter of Example 374 can optionally further include selecting a second discontinuous reception schedule for the transmitting device based on a scheduling conflict between the discontinuous reception schedule and a third discontinuous reception schedule for a second transmitting device, and transmitting signaling to the transmitting device that indicates the second discontinuous reception schedule.

In Example 376, the subject matter of any one of Examples 364 to 374 can optionally include wherein identifying the transmitting device of the scheduling request includes identifying the transmitting device of the scheduling request before the entire scheduling request is received.

In Example 377, the subject matter of any one of Examples 364 to 376 can optionally further include performing a channel estimate based on the reference signal, determining a transmit configuration for the transmitting device, and transmitting a grant to the transmitting device that authorizes the data transmission and indicates the transmit configuration.

In Example 378, the subject matter of any one of Examples 364 to 377 can optionally include wherein the common frequency is a frequency subband including a plurality of subcarriers, the method further including identifying a subcarrier of the plurality of subcarriers based on a device ID of the wireless device, wherein receiving the data on the common frequency includes receiving the data on the subcarrier.

Example 379 is a method of performing wireless communications at a wireless device, the method including identifying pending data for transmission to a receiving device and identifying a user-specific frequency based on the receiving device, transmitting a scheduling request to the receiving device on a common control frequency shared by multiple wireless devices of a device-to-device network, transmitting a reference signal to the receiving device on the user-specific frequency, and transmitting a data transmission including the pending data to the target receiver on the user-specific frequency.

In Example 380, the subject matter of Example 379 can optionally include wherein transmitting the scheduling request, the reference signal, and the data signal includes transmitting the scheduling request, the reference signal, and the data signal a radio frequency transceiver and one or more antennas.

In Example 381, the subject matter of Example 379 or 380 can optionally include wherein identifying the user-specific frequency includes identifying a user-specific hopping sequence assigned to the receiving device, identifying a current frame of a communication schedule, and identifying, as the user-specific frequency, a hopping frequency assigned by the user-specific hopping sequence to the current frame.

In Example 382, the subject matter of any one of Examples 379 to 381 can optionally include wherein the scheduling request, the reference signal, and the data transmission are in a first frame of a communication schedule, and wherein the common frequency is a first hopping frequency of a common hopping scheme assigned to the first frame and the user-specific frequency is a third hopping frequency of a user-specific hopping scheme assigned to the first frame.

In Example 383, the subject matter of Example 382 can optionally include wherein the common hopping scheme assigns different hopping frequencies to different frames and wherein the user-specific hopping scheme assigns different hopping frequencies to different frames.

In Example 384, the subject matter of any one of Examples 379 to 383 can optionally include wherein transmitting the scheduling request includes transmitting the scheduling request in a scheduling part of a control channel mapped to the common frequency and wherein transmitting the reference signal includes transmitting the reference signal in a sounding part of the control channel mapped to the user-specific frequency.

In Example 385, the subject matter of any one of Examples 379 to 384 can optionally include wherein the common frequency is common to the plurality of wireless devices, and wherein the user-specific frequency is specific to the transmitting device.

In Example 386, the subject matter of any one of Examples 379 to 385 can optionally include wherein transmitting the scheduling request includes identifying a discontinuous reception schedule assigned to the wireless device that defines a transmit frame during which the wireless device is permitted to transmit scheduling requests to the receiving device, and transmitting the scheduling request to the receiving device in the transmit frame.

In Example 387, the subject matter of Example 386 can optionally further include before transmitting the scheduling request to the receiving device, selecting the discontinuous reception schedule based on a link ID between the wireless device and the receiving device.

In Example 388, the subject matter of any one of Examples 379 to 387 can optionally further include after transmitting the reference signal, receiving a grant from the receiving device that authorizes the data transmission and indicates a transmit configuration.

In Example 389, the subject matter of Example 388 can optionally further include generating the data transmission from the pending data based on the transmit configuration.

In Example 390, the subject matter of any one of Examples 379 to 389 can optionally include wherein the common frequency is a frequency subband including a plurality of subcarriers, the method further including identifying a subcarrier of the plurality of subcarriers based on a device ID of the receiving device, wherein transmitting the scheduling request on the common frequency includes transmitting the scheduling request on the subcarrier.

Example 391 is a wireless device including a receiver configured to receive data on a common frequency shared by multiple wireless devices of a device-to-device network, and a controller configured to identify a scheduling request in the data from the common frequency, identify a transmitting device of the scheduling request, and identify a user-specific frequency based on the transmitting device, the receiver further configured to receive a reference signal on the user-specific frequency and receive a data transmission from the transmitting device on the user-specific frequency.

In Example 392, the subject matter of Example 391 can optionally include wherein the receiver is a receive path of a baseband modem of the wireless device, and wherein the receiver is configured to receive the data on the common frequency and receive the data transmission on the user-specific frequency by receiving the data and the data transmission via a radio frequency transceiver and one or more antennas.

In Example 393, the subject matter of Example 392 can optionally further include the radio frequency transceiver and the one or more antennas.

In Example 394, the subject matter of any one of Examples 391 to 393 can optionally include wherein the scheduling request, the reference signal, and the data transmission are in a first frame of a communication schedule, and wherein the common frequency is a first hopping frequency of a common hopping scheme assigned to the first frame and the user-specific frequency is a third hopping frequency of a user-specific hopping scheme assigned to the first frame.

In Example 395, the subject matter of Example 394 can optionally include wherein the common hopping scheme assigns different hopping frequencies to different frames and wherein the user-specific hopping scheme assigns different hopping frequencies to different frames.

In Example 396, the subject matter of any one of Examples 391 to 395 can optionally include wherein the controller is configured to identify the user-specific frequency based on the transmitting device by identifying a user-specific hopping scheme for frequency hopping that is assigned to the transmitting device, identifying a current frame during which the scheduling request is received, and identifying, as the user-specific hopping frequency, a hopping frequency of the user-specific hopping scheme assigned for the current frame.

In Example 397, the subject matter of any one of Examples 391 to 396 can optionally include wherein the controller is configured to identify the scheduling request by identifying the scheduling request in a scheduling part of a control channel mapped to the common frequency, and wherein the receiver is configured to receive the reference signal on the user-specific frequency by receiving the reference signal in a sounding part of the control channel mapped to the user-specific frequency.

In Example 398, the subject matter of any one of Examples 391 to 397 can optionally include wherein the common frequency is common to the plurality of wireless devices, and wherein the user-specific frequency is specific to the transmitting device.

In Example 399, the subject matter of any one of Examples 391 to 398 can optionally include wherein the controller is configured to identify the transmitting device of the scheduling request by identifying a current frame during which the scheduling request is received, and identifying the transmitting device based on the current frame and a discontinuous reception schedule assigned to the transmitting device.

In Example 400, the subject matter of Example 399 can optionally include wherein the discontinuous reception schedule assigned to the transmitting device has a transmit frame that matches the current frame, the transmit frame being a frame where the transmitting device is permitted to transmit scheduling requests to the wireless device.

In Example 401, the subject matter of Example 400 can optionally include wherein the controller is further configured to, before the receiver receives the data on the common frequency, determine respective discontinuous reception schedules for a plurality of wireless devices that are discovered by the wireless device, the transmitting device being one of the plurality of wireless devices.

In Example 402, the subject matter of Example 401 can optionally include wherein the controller is configured to determine the discontinuous reception schedule for the transmitting device by selecting a discontinuous reception schedule for the transmitting device based on a link ID between the wireless device and the transmitting device.

In Example 403, the subject matter of Example 402 can optionally include wherein the controller is further configured to select a second discontinuous reception schedule for the transmitting device based on a scheduling conflict between the discontinuous reception schedule and a third discontinuous reception schedule for a second transmitting device, and transmit signaling to the transmitting device that indicates the second discontinuous reception schedule.

In Example 404, the subject matter of any one of Examples 391 to 402 can optionally include wherein the controller is configured to identify the transmitting device of the scheduling request before the entire scheduling request is received by the receiver.

In Example 405, the subject matter of any one of Examples 391 to 404 can optionally include wherein the receiver is further configured to perform a channel estimate based on the reference signal, and wherein the controller is further configured to determine a transmit configuration for the transmitting device, and to transmit a grant to the transmitting device that authorizes the data transmission and indicate the transmit configuration.

In Example 406, the subject matter of any one of Examples 391 to 405 can optionally include wherein the common frequency is a frequency subband including a plurality of subcarriers, the controller further configured to identify a subcarrier of the plurality of subcarriers based on a device ID of the wireless device, and wherein the receiver is configured to receive the data on the common frequency by receiving the data on the subcarrier.

Example 407 is a wireless device including a controller configured to identify pending data for transmission to a receiving device and to identify a user-specific frequency based on the receiving device, and a transmitter configured to transmit a scheduling request to the receiving device on a common control frequency shared by multiple wireless devices of a device-to-device network, transmit a reference signal to the receiving device on the user-specific frequency, and to transmit a data transmission including the pending data to the target receiver on the user-specific frequency.

In Example 408, the subject matter of Example 407 can optionally include wherein the transmitter is a transmit path of a baseband modem of the wireless device, and wherein the transmitter is configured to transmit the scheduling request, the reference signal, and the data transmission via a radio frequency transceiver and one or more antennas.

In Example 409, the subject matter of Example 408 can optionally further include the radio frequency transceiver and the one or more antennas.

In Example 410, the subject matter of any one of Examples 407 to 409 can optionally include wherein the controller is configured to identify the user-specific frequency by identifying a user-specific hopping sequence assigned to the receiving device, identifying a current frame of a communication schedule, and identifying, as the user-specific frequency, a hopping frequency assigned by the user-specific hopping sequence to the current frame.

In Example 411, the subject matter of any one of Examples 407 to 410 can optionally include wherein the scheduling request, the reference signal, and the data transmission are in a first frame of a communication schedule, and wherein the common frequency is a first hopping frequency of a common hopping scheme assigned to the first frame and the user-specific frequency is a third hopping frequency of a user-specific hopping scheme assigned to the first frame.

In Example 412, the subject matter of Example 411 can optionally include wherein the common hopping scheme assigns different hopping frequencies to different frames and wherein the user-specific hopping scheme assigns different hopping frequencies to different frames.

In Example 413, the subject matter of any one of Examples 407 to 412 can optionally include wherein the transmitter is configured to transmit the scheduling request in a scheduling part of a control channel mapped to the common frequency and configured to transmit the reference signal in a sounding part of the control channel mapped to the user-specific frequency.

In Example 414, the subject matter of any one of Examples 407 to 413 can optionally include wherein the common frequency is common to the plurality of wireless devices, and wherein the user-specific frequency is specific to the transmitting device.

In Example 415, the subject matter of any one of Examples 407 to 414 can optionally include wherein the controller is further configured to identify a discontinuous reception schedule assigned to the wireless device that defines a transmit frame during which the wireless device is permitted to transmit scheduling requests to the receiving device, and wherein the transmitter is configured to transmit the scheduling request to the receiving device in the transmit frame.

In Example 416, the subject matter of Example 415 can optionally include wherein the controller is further configured to, before the transmitter transmits the scheduling request, select the discontinuous reception schedule based on a link ID between the wireless device and the receiving device.

In Example 417, the subject matter of any one of Examples 407 to 416 can optionally further include a receiver configured to, after the transmitter transmits the reference signal, receive a grant from the receiving device that authorizes the data transmission and indicates a transmit configuration.

In Example 418, the subject matter of Example 417 can optionally include wherein the controller is further configured generate the data transmission from the pending data based on the transmit configuration.

In Example 419, the subject matter of any one of Examples 407 to 418 can optionally include wherein the common frequency is a frequency subband including a plurality of subcarriers, the controller further configured to identify a subcarrier of the plurality of subcarriers based on a device ID of the receiving device, and wherein the transmitter is configured to transmit the scheduling request on the subcarrier.

Example 420 is a wireless device including means for receiving data on a common frequency shared by multiple wireless devices of a device-to-device network, means for identifying a scheduling request in the data from the common frequency and identifying a transmitting device of the scheduling request, means for identifying a user-specific frequency based on the transmitting device and receiving a reference signal on the user-specific frequency, and means for receiving a data transmission from the transmitting device on the user-specific frequency.

Example 421 is a wireless device including means for identifying pending data for transmission to a receiving device and identifying a user-specific frequency based on the receiving device, means for transmitting a scheduling request to the receiving device on a common control frequency shared by multiple wireless devices of a device-to-device network, means for transmitting a reference signal to the receiving device on the user-specific frequency, and means for transmitting a data transmission including the pending data to the target receiver on the user-specific frequency.

Example 422 is a non-transitory computer readable medium storing instructions that, when executed by one or more processors of a wireless device, cause the wireless device to perform the method of any one of Examples 364 to 390.

Example 423 is a wireless device including one or more processors, and a memory storing instructions that, when executed by one or more processors of a wireless device, cause the wireless device to perform the method of any one of Examples 364 to 390.

Example 424 is a method of performing synchronization at a wireless device, the method including performing acquisition on a navigational satellite system and aligning a local reference time of an internal device clock of the wireless device with the navigational satellite system, determining whether a timing inaccuracy of the local reference time is greater than a first predefined level or a second predefined level, tracking the navigational satellite system based on the local refence time to update the local reference time if the timing inaccuracy is greater than the first predefined level, and performing reacquisition on the navigational satellite system to update the local reference time if the timing inaccuracy is greater than the second predefined level, wherein the second predefined level is greater than the first predefined level In Example 425, the subject matter of Example 424 can optionally include wherein performing the acquisition on the navigational satellite system includes receiving synchronization signals from a plurality of navigational satellites, determining a position of the wireless device based on the synchronization signals, and determining a universal reference time of the navigation satellite system based on the synchronization signals.

In Example 426, the subject matter of Example 425 can optionally include wherein aligning the local reference time of the internal device clock with the navigational satellite system includes aligning the local reference time with the universal reference time.

In Example 427, the subject matter of any one of Examples 424 to 426 can optionally further include compensating the local reference time based on the timing inaccuracy.

In Example 428, the subject matter of any one of Examples 424 to 427 can optionally include wherein the timing inaccuracy is represented by an estimated drift, the method further including determining the estimated drift based on a temperature and a temperature vs. drift curve for a local oscillator of the internal device clock.

In Example 429, the subject matter of Example 428 can optionally further include compensating the local reference time to counteract the estimated drift.

In Example 430, the subject matter of any one of Examples 424 to 429 can optionally include wherein the local reference time is based on a local oscillator of the internal device clock.

In Example 431, the subject matter of any one of Examples 424 to 430 can optionally include wherein tracking the navigational satellite system based on the local reference time to update the local reference time includes receiving synchronization signals from the navigational satellite system based on the local reference time, determining an updated value of a universal reference time of the navigational satellite system, and aligning the local reference time with the updated value of the universal reference time.

In Example 432, the subject matter of Example 431 can optionally include wherein the synchronization signals are periodic and wherein receiving the synchronization signals includes using the local reference time to approximate when the synchronization signals occur in time.

In Example 433, the subject matter of any one of Examples 424 to 432 can optionally include wherein determining whether the timing inaccuracy of the local reference time is greater than the first predefined level or the second predefined level includes comparing an estimated drift of the internal device clock to a first drift threshold and a second drift threshold, wherein tracking the navigational satellite system includes tracking the navigational satellite system if the estimated drift is greater than the first drift threshold, and wherein performing reacquisition on the navigational satellite system includes performing reacquisition if the estimated drift is greater than the second drift threshold.

In Example 434, the subject matter of Example 433 can optionally include wherein determining whether the timing inaccuracy of the local reference time is greater than the first predefined level or the second predefined level includes comparing a drift uncertainty of the estimated drift to a first drift uncertainty threshold and a second drift uncertainty threshold, wherein tracking the navigational satellite system includes tracking the navigational satellite system if the drift uncertainty is greater than the first drift uncertainty threshold, and wherein performing reacquisition on the navigational satellite system includes performing reacquisition if the drift uncertainty is greater than the second drift uncertainty threshold.

In Example 435, the subject matter of any one of Examples 424 to 434 can optionally include wherein determining whether the timing inaccuracy of the local reference time is greater than the first predefined level or the second predefined level includes comparing a tracking uncertainty to a tracking uncertainty threshold, the tracking uncertainty representing a confidence in an accuracy of the tracking, and wherein performing reacquisition on the navigational satellite system includes performing reacquisition if the tracking uncertainty is greater than the tracking uncertainty threshold.

In Example 436, the subject matter of any one of Examples 1 to 435 can optionally include wherein performing the acquisition on the navigational satellite system uses a greater amount of power than the tracking on the navigational satellite system.

In Example 437, the subject matter of any one of Examples 424 to 436 can optionally further include deactivating one or more components of the wireless device that perform the acquisition during an interval of time between the acquisition and the reacquisition.

In Example 438, the subject matter of any one of Examples 424 to 437 can optionally include where in the navigational satellite system is a Global Navigational Satellite System (GNSS).

In Example 439, the subject matter of any one of Examples 424 to 438 can optionally include wherein the timing inaccuracy is represented by one or more timing accuracy parameters that quantify an accuracy of the local reference time.

In Example 440, the subject matter of Example 439 can optionally include wherein determining whether the timing inaccuracy of the local reference time is greater than a first predefined level or a second predefined level includes comparing the one or more timing accuracy parameters to a first set of thresholds that represent the first predefined level, and comparing the one or more timing accuracy parameters to a second set of thresholds that represent the second predefined level.

Example 441 is a wireless device including a satellite acquisition processor configured to perform acquisition on a navigational satellite system, an internal device clock configured to align a local reference time with the navigational satellite system based on the acquisition and to determine whether a timing inaccuracy of the local reference time is greater than a first predefined level or a second predefined level, and a satellite tracker configured to track the navigational satellite system based on the local refence time to obtain an updated value for the local reference time if the timing inaccuracy is greater than the first predefined level, wherein the satellite acquisition processor is configured to perform reacquisition on the navigational satellite system to obtain an updated value for the local reference time if the timing inaccuracy is greater than the second predefined level, wherein the second predefined level is greater than the first predefined level.

In Example 442, the subject matter of Example 441 can optionally further include one or more satellite antennas, wherein the satellite acquisition processor and the satellite tracker are configured to receive synchronization signals from the navigational satellite system via the one or more satellite antennas.

In Example 443, the subject matter of Example 441 or 442 can optionally include wherein the satellite acquisition processor is configured to perform the acquisition on the navigational satellite system by receiving synchronization signals from a plurality of navigational satellites, determining a position of the wireless device based on the synchronization signals, and determining a universal reference time of the navigation satellite system based on the synchronization signals.

In Example 444, the subject matter of Example 443 can optionally include wherein the internal device clock is configured to align the local reference time with the universal reference time.

In Example 445, the subject matter of any one of Examples 441 to 444 can optionally include wherein the internal device clock is configured to compensate the local reference time based on the timing inaccuracy.

In Example 446, the subject matter of any one of Examples 441 to 445 can optionally include wherein the timing inaccuracy is represented by an estimated drift, and wherein the internal device clock is further configured to determine the estimated drift based on a temperature and a temperature vs. drift curve for a local oscillator of the internal device clock.

In Example 447, the subject matter of Example 446 can optionally include wherein the internal device clock is configured to compensate the local reference time to counteract the estimated drift.

In Example 448, the subject matter of any one of Examples 441 to 447 can optionally include wherein the local reference time is based on a local oscillator of the internal device clock.

In Example 449, the subject matter of any one of Examples 441 to 448 can optionally include wherein the satellite tracker is configured to track the navigational satellite system based on the local reference time to update the local reference time by receiving synchronization signals from the navigational satellite system based on the local reference time, and determining an updated value of a universal reference time of the navigational satellite system, wherein the internal device clock is configured to align the local reference time with the updated value of the universal reference time.

In Example 450, the subject matter of Example 449 can optionally include wherein the synchronization signals are periodic and wherein the satellite tracker is configured to use the local reference time to approximate when the synchronization signals occur in time.

In Example 451, the subject matter of any one of Examples 441 to 450 can optionally include wherein the internal device clock is configured to determine whether the timing inaccuracy of the local reference time is greater than the first predefined level or the second predefined level by comparing an estimated drift of the internal device clock to a first drift threshold and a second drift threshold, wherein the satellite tracker is configured to track the navigational satellite system if the estimated drift is greater than the first drift threshold, and wherein the acquisition processor is configured to perform reacquisition if the estimated drift is greater than the second drift threshold.

In Example 452, the subject matter of Example 451 can optionally include wherein the internal device clock is configured to determine whether the timing inaccuracy of the local reference time is greater than the first predefined level or the second predefined level by comparing a drift uncertainty of the estimated drift to a first drift uncertainty threshold and a second drift uncertainty threshold, wherein the satellite tracker is configured to track the navigational satellite system if the drift uncertainty is greater than the first drift uncertainty threshold, and wherein the acquisition processor is configured to perform reacquisition if the drift uncertainty is greater than the second drift uncertainty threshold.

In Example 453, the subject matter of any one of Examples 441 to 452 can optionally include wherein the internal device clock is configured to determine whether the timing inaccuracy of the local reference time is greater than the first predefined level or the second predefined level by comparing a tracking uncertainty to a tracking uncertainty threshold, the tracking uncertainty representing a confidence in an accuracy of the tracking, and wherein the acquisition processor is configured to perform reacquisition if the tracking uncertainty is greater than the tracking uncertainty threshold.

In Example 454, the subject matter of any one of Examples 441 to 453 can optionally include wherein the satellite acquisition processor uses a greater amount of power to perform the acquisition than an amount of power used by the satellite tracker to track the navigational satellite system.

In Example 455, the subject matter of any one of Examples 441 to 454 can optionally include wherein the satellite acquisition processor is configured to deactivate during an interval of time between the acquisition and the reacquisition.

In Example 456, the subject matter of any one of Examples 441 to 455 can optionally include where in the navigational satellite system is a Global Navigational Satellite System (GNSS).

In Example 457, the subject matter of any one of Examples 441 to 456 can optionally include wherein the timing inaccuracy is represented by one or more timing accuracy parameters that quantify an accuracy of the local reference time.

In Example 458, the subject matter of Example 457 can optionally include wherein the internal device clock is configured to determine whether the timing inaccuracy of the local reference time is greater than a first predefined level or a second predefined level by comparing the one or more timing accuracy parameters to a first set of thresholds that represent the first predefined level, and comparing the one or more timing accuracy parameters to a second set of thresholds that represent the second predefined level.

Example 459 is a wireless device including a satellite acquisition processor configured to perform acquisition on a navigational satellite system, an internal device clock configured to align a local reference time with the navigational satellite system based on the acquisition and to determine whether a timing inaccuracy of the local reference time is greater than a first predefined level or a second predefined level, a satellite tracker configured to track the navigational satellite system based on the local refence time to obtain an updated value for the local reference time if the timing inaccuracy is greater than the first predefined level, wherein the satellite acquisition processor is configured to perform reacquisition on the navigational satellite system to obtain an updated value for the local reference time if the timing inaccuracy is greater than the second predefined level, wherein the second predefined level is greater than the first predefined level, and a baseband modem configured to transmit and receive signaling with a second wireless device based on the local reference time.

In Example 460, the subject matter of Example 459 can optionally include wherein the baseband modem is configured to align a transmit frame or a receive frame of a slotted communication schedule based on the local reference time.

In Example 461, the subject matter of Example 459 or 460 can optionally further include one or more satellite antennas, wherein the satellite acquisition processor and the satellite tracker are configured to receive synchronization signals from the navigational satellite system via the one or more satellite antennas.

In Example 462, the subject matter of any one of Examples 459 to 461 can optionally include wherein the satellite acquisition processor is configured to perform the acquisition on the navigational satellite system by receiving synchronization signals from a plurality of navigational satellites, determining a position of the wireless device based on the synchronization signals, and determining a universal reference time of the navigation satellite system based on the synchronization signals.

In Example 463, the subject matter of Example 462 can optionally include wherein the internal device clock is configured to align the local reference time with the universal reference time.

In Example 464, the subject matter of any one of Examples 459 to 463 can optionally include wherein the internal device clock is configured to compensate the local reference time based on the timing inaccuracy.

In Example 465, the subject matter of any one of Examples 459 to 464 can optionally include wherein the timing inaccuracy is represented by an estimated drift, and wherein the internal device clock is further configured to determine the estimated drift based on a temperature and a temperature vs. drift curve for a local oscillator of the internal device clock.

In Example 466, the subject matter of Example 465 can optionally include wherein the internal device clock is configured to compensate the local reference time to counteract the estimated drift.

In Example 467, the subject matter of any one of Examples 459 to 466 can optionally include wherein the local reference time is based on a local oscillator of the internal device clock.

In Example 468, the subject matter of any one of Examples 459 to 467 can optionally include wherein the satellite tracker is configured to track the navigational satellite system based on the local reference time to update the local reference time by receiving synchronization signals from the navigational satellite system based on the local reference time, and determining an updated value of a universal reference time of the navigational satellite system, wherein the internal device clock is configured to align the local reference time with the updated value of the universal reference time.

In Example 469, the subject matter of Example 468 can optionally include wherein the synchronization signals are periodic and wherein the satellite tracker is configured to use the local reference time to approximate when the synchronization signals occur in time.

In Example 470, the subject matter of any one of Examples 459 to 469 can optionally include wherein the internal device clock is configured to determine whether the timing inaccuracy of the local reference time is greater than the first predefined level or the second predefined level by comparing an estimated drift of the internal device clock to a first drift threshold and a second drift threshold, wherein the satellite tracker is configured to track the navigational satellite system if the estimated drift is greater than the first drift threshold, and wherein the acquisition processor is configured to perform reacquisition if the estimated drift is greater than the second drift threshold.

In Example 471, the subject matter of Example 470 can optionally include wherein the internal device clock is configured to determine whether the timing inaccuracy of the local reference time is greater than the first predefined level or the second predefined level by comparing a drift uncertainty of the estimated drift to a first drift uncertainty threshold and a second drift uncertainty threshold, wherein the satellite tracker is configured to track the navigational satellite system if the drift uncertainty is greater than the first drift uncertainty threshold, and wherein the acquisition processor is configured to perform reacquisition if the drift uncertainty is greater than the second drift uncertainty threshold.

In Example 472, the subject matter of any one of Examples 459 to 471 can optionally include wherein the internal device clock is configured to determine whether the timing inaccuracy of the local reference time is greater than the first predefined level or the second predefined level by comparing a tracking uncertainty to a tracking uncertainty threshold, the tracking uncertainty representing a confidence in an accuracy of the tracking, and wherein the acquisition processor is configured to perform reacquisition if the tracking uncertainty is greater than the tracking uncertainty threshold.

In Example 473, the subject matter of any one of Examples 459 to 472 can optionally include wherein the satellite acquisition processor uses a greater amount of power to perform the acquisition than an amount of power used by the satellite tracker to track the navigational satellite system.

In Example 474, the subject matter of any one of Examples 459 to 473 can optionally include wherein the satellite acquisition processor is configured to deactivate during an interval of time between the acquisition and the reacquisition.

In Example 475, the subject matter of any one of Examples 459 to 474 can optionally include where in the navigational satellite system is a Global Navigational Satellite System (GNSS).

In Example 476, the subject matter of any one of Examples 459 to 475 can optionally include wherein the timing inaccuracy is represented by one or more timing accuracy parameters that quantify an accuracy of the local reference time.

In Example 477, the subject matter of Example 476 can optionally include wherein the internal device clock is configured to determine whether the timing inaccuracy of the local reference time is greater than a first predefined level or a second predefined level by comparing the one or more timing accuracy parameters to a first set of thresholds that represent the first predefined level, and comparing the one or more timing accuracy parameters to a second set of thresholds that represent the second predefined level.

Example 478 is a wireless device including means for performing acquisition on a navigational satellite system and aligning a local reference time of an internal device clock of the wireless device with the navigational satellite system, means for determining whether a timing inaccuracy of the local reference time is greater than a first predefined level or a second predefined level, means for tracking the navigational satellite system based on the local refence time to update the local reference time if the timing inaccuracy is greater than the first predefined level, and means for performing reacquisition on the navigational satellite system to update the local reference time if the timing inaccuracy is greater than the second predefined level, wherein the second predefined level is greater than the first predefined level.

Example 479 is a non-transitory computer readable medium storing instructions that, when executed by one or more processors of a wireless device, cause the wireless device to perform the method of any one of Examples 424 to 440.

Example 480 is a wireless device including one or more processors, and a memory storing instructions that, when executed by the one or more processors, cause the wireless device to perform the method of any one of Examples 424 to 440.

Example 481 is a communication device including a test controller configured to receive one or more test control commands and configure one or more other components of the communication device to execute one or more sequences according to the one or more test control commands, a test loop generator configured to receive instructions from the test controller and command one or more signal processors to generate reference measurement channels and IQ samples for transmission, wherein the test loop generator is further configured to store the IQ samples, and an in-channel signal analyzer configured to perform received characteristic measurements and compare the received characteristic measurements with the stored IQ samples.

In Example 482, the subject matter of Example 481 can optionally include wherein test controller is located in a central processing unit (CPU) of the communication device.

In Example 483, the subject matter of any one of Examples 481-482 can optionally include wherein the test controller is configured to receive the one or more test control commands from an external device.

In Example 484, the subject matter of Example 483 can optionally include wherein the external device is a computer with a test application including the one or more test control commands.

In Example 485, the subject matter of any one of Examples 481-484 can optionally include wherein the one or more other components includes a protocol stack module.

In Example 486, the subject matter of any one of Examples 481-485 can optionally include wherein the test controller is configured to deactivate one or more radio access technology (RAT) components which are not required to execute the one or more sequences.

In Example 487, the subject matter of any one of Examples 481-486 can optionally include wherein the test loop generator is located in a baseband processor of the communication device.

In Example 488, the subject matter of any one of Examples 481-487 can optionally include wherein the test loop generator is configured to receive configuration messages including the instructions from the test controller.

In Example 489, the subject matter of any one of Examples 481-488 can optionally include wherein the test loop generator is configured to prepare pre-defined physical channel parameters.

In Example 490, the subject matter of Example 488 can optionally include wherein the pre-defined physical channel parameters are prepared for to generate the reference measurement channels.

In Example 491, the subject matter of any one of Examples 489-490 can optionally include wherein the test loop generator is configured to build multiple frame structures according to the pre-defined physical channel parameters.

In Example 492, the subject matter of any one of Examples 481-491 can optionally include wherein the IQ samples are stored in an internal core cluster memory of the baseband processor of the communication device.

In Example 493, the subject matter of any one of Examples 481-491 can optionally include wherein the IQ samples are stored in a memory external to a baseband processor of the communication device.

In Example 494, the subject matter of any one of Examples 481-493 can optionally include wherein the in-channel signal analyzer is located on a baseband processor of the communication device.

In Example 495, the subject matter of any one of Examples 481-494 can optionally include wherein the in-channel signal analyzer is configured to utilize one or more of the idle components of the baseband processor corresponding to the one or more deactivated RAT components which are not required to execute the one or more sequences.

In Example 496, the subject matter of any one of Examples 481-495 can optionally include wherein the in-channel signal analyzer is configured to utilize at least one of a complex transform function, a fast matrix function, a vector math function, an interpolation function, or a filter function supported by the baseband processor.

In Example 497, the subject matter of any one of Examples 481-496 can optionally include wherein the in-channel signal analyzer is configured to perform received measurement characteristics.

In Example 498, the subject matter of any one of Examples 481-497 can optionally include wherein the in-channel signal analyzer is configured to perform transmitted measurement characteristics.

In Example 499, the subject matter of Example 498 can optionally include wherein the transmitted measurement characteristics includes one or more of an error vector magnitude, an adjacent channel leakage ratio, an out-of-band emission, a frequency error, a peak and root mean square received signal strength indication, a signal-to-noise ratio, and a block error rate of the physical channels.

In Example 500, the subject matter of any one of Examples 481-499 can optionally be further configured to modulate and up-convert the IQ samples.

In Example 501, the subject matter of Example 500 can optionally include wherein the IQ samples are modulated and up-converted with a radio frequency (RF) transceiver.

In Example 502, the subject matter of Example 501 can optionally include wherein the RF transceiver is configured to transmit the modulated and up-converted IQ samples to a channel emulator.

In Example 503, the subject matter of Example 502 can optionally include wherein the channel emulator implements one or more of a different fading profile and/or a noise signal.

In Example 504, the subject matter of Example 503 can optionally include wherein the RF transceiver is configured to receive an output from the channel emulator.

In Example 505, the subject matter of Example 504 can optionally include wherein the RF transceiver is configured to down-convert and demodulate the output received from the channel emulator.

In Example 506, the subject matter of Example 505 can optionally include wherein the in-channel signal analyzer is configured to compare the down-converted and demodulated output is to the stored IQ samples.

In Example 507, the subject matter of any one of Examples 505-506 can optionally include wherein the in-channel signal analyzer is configured to compare the down-converted and demodulated output to one or more target values.

In Example 508, the subject matter of any one of Examples 506-507 can optionally include wherein the in-channel signal analyzer is configured to transmit results of the comparison to an external device via the RF transceiver.

In Example 509, the subject matter of any one of Examples 481-508 can optionally include wherein the received characteristic measurements include key performance indicators.

In Example 510, the subject matter of any one of Examples 481-509 can optionally include wherein the transmitted characteristic measurements include key performance indicators.

Example 511 is a method for a communication device to conduct a conformance test, the method including receiving one or more test control commands and configuring one or more components of the communication device to execute one or more sequences according to the one or more test control commands, commanding one or more signal processors to generate reference measurement channels and IQ samples for transmission, storing the IQ samples, and performing received characteristic measurements and comparing the received characteristic measurements with the stored IQ samples.

In Example 512, the subject matter of Example 511 can optionally further include receiving the one or more test control commands from an external device.

In Example 513, the subject matter of Example 512 can optionally include wherein the external device is a computer with a test application including the one or more test control commands.

In Example 514, the subject matter of any one of Examples 511-513 can optionally include wherein the one or more other components includes a protocol stack module.

In Example 515, the subject matter of any one of Examples 511-514 can optionally further include deactivating one or more radio access technology (RAT) components which are not required to execute the one or more sequences.

In Example 516, the subject matter of any one of Examples 511-515 can optionally further include preparing pre-defined physical channel parameters.

In Example 517, the subject matter of Example 516 can optionally include wherein the pre-defined physical channel parameters are prepared based on the one or more test control commands.

In Example 518, the subject matter of any one of Examples 511-517 can optionally further include generating the reference measurement channels based on the pre-defined physical channel parameters.

In Example 519, the subject matter of any one of Examples 511-518 can optionally further include building multiple frame structures according to the pre-defined physical channel parameters.

In Example 520, the subject matter of any one of Examples 511-519 can optionally further include storing the IQ samples in an internal core cluster memory of the baseband processor of the communication device.

In Example 521, the subject matter of any one of Examples 511-519 can optionally further include storing the IQ samples in a memory external to a baseband processor of the communication device.

In Example 522, the subject matter of any one of Examples 511-521 can optionally further include utilizing one or more of the idle components of the baseband processor corresponding to the one or more deactivated RAT components which are not required to execute the one or more sequences.

In Example 523, the subject matter of any one of Examples 511-522 can optionally further include utilizing at least one of a complex transform function, a fast matrix function, a vector math function, an interpolation function, or a filter function supported by the baseband processor.

In Example 524, the subject matter of any one of Examples 511-523 can optionally further include performing received measurement characteristics.

In Example 525, the subject matter of any one of Examples 511-524 can optionally further include performing transmitted measurement characteristics.

In Example 526, the subject matter of Example 525 can optionally include wherein the transmitted measurement characteristics includes one or more of an error vector magnitude, an adjacent channel leakage ratio, an out-of-band emission, a frequency error, a peak and root mean square received signal strength indication, a signal-to-noise ratio, and a block error rate of the physical channels.

In Example 527, the subject matter of any one of Examples 511-526 can optionally further include modulating and up-converting the IQ samples.

In Example 528, the subject matter of Example 527 can optionally include wherein the IQ samples are modulated and up-converted with a radio frequency (RF) transceiver.

In Example 529, the subject matter of any one of Examples 527-528 can optionally further include transmitting the modulated and up-converted IQ samples to a channel emulator.

In Example 530, the subject matter of Example 529 can optionally include wherein the channel emulator implements one or more of a different fading profile and/or a noise signal.

In Example 531, the subject matter of Example 530 can optionally further include receiving an output from the channel emulator.

In Example 532, the subject matter of Example 531 can optionally further include down-converting and demodulating the output received from the channel emulator.

In Example 533, the subject matter of Example 532 can optionally further include comparing the down-converted and demodulated output to the stored IQ samples.

In Example 534, the subject matter of any one of Examples 532-533 can optionally further include comparing the down-converted and demodulated output to one or more target values.

In Example 535, the subject matter of any one of Examples 533-534 can optionally further include transmitting results of the comparison to an external device via the RF transceiver.

In Example 536, the subject matter of any one of Examples 511-535 can optionally include wherein the received characteristic measurements include key performance indicators.

In Example 537, the subject matter of any one of Examples 511-536 can optionally include wherein the transmitted characteristic measurements include key performance indicators.

Example 538 is a communication device including one or more processors configured to receive one or more test control commands and configure one or more other components of the communication device to execute one or more sequences according to the one or more test control commands, command one or more signal processors to generate reference measurement channels and IQ samples for transmission, wherein the test loop generator is further configured to store the IQ samples, and perform received characteristic measurements and compare the received characteristic measurements with the stored IQ samples.

Example 539 is a communication device including means to receive one or more test control commands and configure one or more other components of the communication device to execute one or more sequences according to the one or more test control commands, means to command one or more signal processors to generate reference measurement channels and IQ samples for transmission, wherein the test loop generator is further configured to store the IQ samples, and means to perform received characteristic measurements and compare the received characteristic measurements with the stored IQ samples.

Example 540 is one or more non-transitory computer-readable media storing instructions thereon that, when executed by at least one processor of a communication device, direct the communication device to perform a method or realize a device of any one of Examples 511-537.

A wireless device including a selection processor configured to process selection information to set a duration of a selection period and to start the selection period, a receiver configured to receive a synchronization initiation signal, and a transmitter configured to transmit a synchronization initiation signal after the selection period has expired if the receiver has not received a synchronization initiation signal during the selection period.

In Example 542, the subject matter of Example 541 can optionally include wherein the selection information corresponds to at least one selection factor for the wireless device and/or to at least one weighted selection factor for the wireless device, and/or to a score value derived by combining the selection factors and/or the weighted selection factors.

In Example 542, the subject matter of Example 542 can optionally include wherein the at least one selection factor relates to a type of a source for time synchronization that the wireless device is capable of using.

In Example 544, the subject matter of Example 542 can optionally include wherein the type of the source for time synchronization indicates the source to be either a satellite-based synchronization source or an internal clock of the wireless device, and wherein a value is employed for at least one selection factor for the wireless device depending on the type of the source.

In Example 545, the subject matter of any one of Examples 542 to 544 can optionally include wherein the at least one selection factor is indicative of a quality of a source for time synchronization that the wireless device is capable of using.

In Example 546, the subject matter of Example 545 can optionally include wherein the source for time synchronization is a satellite-based synchronization source and the quality of the source for time synchronization corresponds to reception quality of a signal from the satellite-based synchronization source at the wireless device.

In Example 547, the subject matter of Example 545 can optionally include wherein the source for time synchronization is an internal clock of the wireless device and the quality of the source for time synchronization corresponds to an accuracy of the internal clock.

In Example 548, the subject matter of any one of Examples 542 to 547 can optionally include wherein the at least one selection factor is indicative of a distance between the wireless device and a master wireless device from which the wireless device has received synchronization signals and wherein a value is employed for the at least one selection factor depending on a magnitude of the relative distance.

In Example 549, the subject matter of any one of Examples 542 to 548 can optionally include wherein the at least one selection factor is indicative of a transmission power capability of the wireless device for transmitting periodic synchronization signals.

In Example 550, the subject matter of any one of Examples 542 to 549 can optionally include wherein the at least one selection factor is indicative of a battery level of the wireless device.

In Example 551, the subject matter of any one of Examples 542 to 550 optionally include wherein a weight value is assigned to the at least one selection factor to yield a weighted selection factor, the weight value being indicative of a relative importance between the at least one selection factor compared to at least one further selection factor.

In Example 552, the subject matter of any one of Examples 541 to 551 can optionally include wherein the wireless device is configured for Device-to-Device (D2D) communication.

In Example 553, the subject matter of any one of Examples 541 to 552 can optionally include wherein the selection period is a selection period for selecting one of a group of candidate wireless devices including the wireless device to become a synchronization master device for broadcasting periodic synchronization signals.

In Example 554, the subject matter of any one of Examples 541 to 553 can optionally include wherein the receiver is configured to receive a synchronization initiation signal from a further wireless device during the selection period.

In Example 555, the subject matter of Example 554 can optionally include wherein the selection processor is configured to adjust to the further wireless device as source of periodic synchronization signals if the receiver receives a synchronization initiation signal during the selection period.

In Example 556, the subject matter of any one of Examples 541 to 555 can optionally include wherein the transmitter is configured not to transmit a synchronization initiation signal if the receiver receives a synchronization initiation signal during the selection period.

In Example 557, the subject matter of any one of Examples 541 to 556 can optionally include wherein the selection processor is configured to end the selection period when the receiver receives a synchronization initiation signal during the selection period.

In Example 558, the subject matter of any one of Examples 541 to 557 can optionally include wherein the selection processor is configured to start the selection period after the receiver has received a message from a further wireless device for starting the selection period.

In Example 559, the subject matter of any one of Examples 541 to 558 can optionally include wherein the receiver is configured to receive a periodic synchronization signal and wherein the transmitter is configured to broadcast a message for starting the selection period if a received strength of the periodic synchronization signal is below a predefined threshold.

In Example 560, the subject matter of Example 559 can optionally include wherein the selection processor is configured to start the selection period after the transmitter has broadcasted the message for initiating the selection period.

In Example 561, the subject matter of any one of Examples 541 to 560 can optionally include wherein the wireless device is configured for Device-to-Device (D2D) communication and is a synchronization slave device, the transmitter being configured to receive periodic synchronization signals.

Example 562 is a wireless device including a receiver configured to receive selection information, a selection processor configured to process the selection information to select a candidate wireless device of a group of candidate wireless devices including the wireless device for transmitting synchronization signals, and a transmitter configured to notify the selected candidate wireless device to start transmitting synchronization signals.

In Example 563, the subject matter of Example 562 can optionally include wherein the receiver is configured to receive the selection information from at least one candidate wireless device of the group of candidate wireless devices and wherein the selection information corresponds to at least one selection factor for the at least one candidate wireless device and/or to at least one weighted selection factor for the at least one candidate wireless device, and/or to a score value derived by combining the selection factors and/or the weighted selection factors.

In Example 564, the subject matter of Example 563 can optionally include wherein the at least one selection factor relates to a type of a source for time synchronization that the at least one candidate wireless device is capable of using.

In Example 565, the subject matter of Example 564 can optionally include wherein the type of the source for time synchronization indicates the source to be either a satellite-based synchronization source or an internal clock of the at least one candidate wireless device, and wherein a value is employed for the at least one selection factor for the at least one candidate wireless device depending on the type of the source.

In Example 566, the subject matter of any one of Examples 563 to 565 can optionally include wherein the at least one selection factor is indicative of a quality of a source for time synchronization that the at least one candidate wireless device is capable of using.

In Example 567, the subject matter of Example 566 can optionally include wherein the source for time synchronization is a satellite-based synchronization source and the quality of the source for time synchronization corresponds to reception quality of a signal from the satellite-based synchronization source at the at least one candidate wireless device.

In Example 568, the subject matter of Example 566 can optionally include synchronization is an internal clock of the at least one candidate wireless device and the quality of the source for time synchronization corresponds to an accuracy of the internal clock.

In Example 569, the subject matter of any one of Examples 563 to 568 can optionally include wherein the at least one selection factor is indicative of a distance between the wireless device and the at least one candidate wireless device and wherein a value is employed for the at least one selection factor depending on the magnitude of the relative distance.

In Example 570, the subject matter of any one of Examples 563 to 569 can optionally include wherein the at least one selection factor is indicative of a transmission power capability of the at least one candidate wireless device for transmitting periodic synchronization signals.

In Example 571, the subject matter of any one of Examples 563 to 570 can optionally include wherein the at least one selection factor is indicative of a battery level of the at least one candidate wireless device.

In Example 572, the subject matter of any one of Examples 562 to 571 can optionally include wherein the selection processor is configured to select a candidate wireless device for transmitting synchronization signals when the selection information indicates that a relative distance between the candidate wireless device is smaller than a relative distance between the wireless device and any other candidate device included in the group of candidate devices.

In Example 573, the subject matter of any one of Examples 562 to 572 can optionally include wherein the selection processor is configured to select a candidate wireless device for transmitting synchronization signals when the selection information indicates that a battery level of the candidate wireless device is larger than a battery level of any other candidate device included in the group of candidate devices including the wireless device.

In Example 574, the subject matter of any one of Examples 562 to 573 can optionally include wherein the selection processor is configured to select a candidate wireless device for transmitting synchronization signals when the selection information indicates that a transmission power capability of the at least one candidate wireless device for transmitting periodic synchronization signals is larger than a corresponding transmission power capability of any other candidate device included in the group of candidate devices including the wireless device.

In Example 575, the subject matter of any one of Examples 563 to 574 can optionally include wherein a weight value is assigned to the at least one selection factor to yield a weighted selection factor, the weight value being indicative of a relative importance between the at least one selection factor compared to at least one further selection factor.

In Example 576, the subject matter of any one of Examples 562 to 575 can optionally include wherein the wireless device is configured for Device-to-Device (D2D) communication.

In Example 577, the subject matter of any one of Examples 562 to 576 can optionally include wherein the transmitter is configured to transmit a message to at least one candidate wireless device requesting transmission of the selection information to the wireless device.

In Example 578, the subject matter of Example 577 can optionally include wherein the transmitter is configured to transmit the message when a battery level of the wireless device falls below a predefined threshold.

In Example 579, the subject matter of any one of Examples 577 or 578 can optionally include wherein the transmitter is configured to transmit the message when an average distance between the wireless device and at least one candidate wireless device exceeds a predefined threshold.

In Example 580, the subject matter of any one of Examples 577 to 579 can optionally include wherein the transmitter is configured to transmit the message when an average distance between the wireless device and each further candidate wireless device included in the group of candidate wireless devices exceeds a predefined threshold.

In Example 581, the subject matter of any one of Examples 562 to 580 can optionally include wherein the group of candidate wireless devices including the wireless device forms a synchronization cluster, where each wireless device is configured for Device-to-Device (D2D) communication, and wherein the wireless device assumes the role of a synchronization master device with its transmitter configured to broadcast periodic synchronization signals.

Example 582 is a communication method for a wireless device including processing selection information to set a duration of a selection period, starting the selection period, transmitting a synchronization initiation signal after the selection period has expired if a synchronization initiation signal has not been received during the selection period.

In Example 583, the subject matter of Example 582 can optionally include wherein the selection information corresponds to at least one selection factor for the wireless device and/or to at least one weighted selection factor weighted for the wireless device, and/or to a score value derived by combining the selection factors and/or the weighted selection factors.

In Example 584, the subject matter of Example 583 can optionally include wherein the at least one selection factor relates to a type of a source for time synchronization that the wireless device is capable of using.

In Example 585, the subject matter of Example 584 can optionally include wherein the type of the source for time synchronization indicates the source to be either a satellite-based synchronization source or an internal clock of the wireless device, the method comprising employing a value for the at least one selection factor for the wireless device depending on the type of the source.

In Example 586, the subject matter of any one of Examples 583 to 585 can optionally include wherein the at least one selection factor is indicative of a quality of a source for time synchronization that the wireless device is capable of using.

In Example 587, the subject matter of Example 586 can optionally include wherein the source for time synchronization is a satellite-based synchronization source and the quality of the source for time synchronization corresponds to reception quality of a signal from the satellite-based synchronization source at the wireless device.

In Example 588, the subject matter of Example 586 can optionally include wherein the source for time synchronization is an internal clock of the wireless device and the quality of the source for time synchronization corresponds to an accuracy of the internal clock.

In Example 589, the subject matter of any one of Examples 583 to 588 can optionally include wherein the at least one selection factor is indicative of a distance between the wireless device and a master wireless device from which the wireless device has received synchronization signals, the method comprising employing a value for the at least one selection factor depending on a magnitude of the relative distance.

In Example 590, the subject matter of any one of Examples 583 to 589 can optionally include wherein the at least one selection factor is indicative of a transmission power capability of the wireless device for transmitting periodic synchronization signals.

In Example 591, the subject matter of any one of Examples 583 to 590 can optionally include wherein the at least one selection factor is indicative of a battery level of the wireless device.

In Example 592, the subject matter of any one of Examples 583 to 591 can optionally include wherein a weight value is assigned to the at least one selection factor to yield a weighted selection factor, the weight value being indicative of a relative importance between the at least one selection factor compared to at least one further selection factor.

In Example 593, the subject matter of any one of Examples 582 to 592 can optionally include wherein the wireless device is configured for Device-to-Device (D2D) communication.

In Example 594, the subject matter of any one of Examples 582 to 593 can optionally include wherein the selection period is a selection period for selecting one of a group of candidate wireless devices including the wireless device to become a synchronization master device for broadcasting periodic synchronization signals.

In Example 595, the subject matter of any one of Examples 582 to 594 can optionally further include receiving a synchronization initiation signal from a further wireless device during the selection period.

In Example 596, the subject matter of Example 595 can optionally further include adjusting to the further wireless device as source of periodic synchronization signals after receiving the synchronization initiation signal during the selection period.

In Example 597, the subject matter of any one of Examples 595 to 596 can optionally further include ending the selection period when the synchronization initiation signal is received during the selection period.

In Example 598, the subject matter of any one of Examples 582 to 597 can optionally further include starting the selection period after the receiver has received a message from a further wireless device for starting the selection period.

In Example 599, the subject matter of any one of Examples 582 to 598 can optionally further include receiving a periodic synchronization signal before starting the selection period, and broadcasting a message for starting the selection period if a received strength of the periodic synchronization signal is below a predefined threshold.

In Example 600, the subject matter of Example 599 can optionally further include starting the selection period after the transmitter has broadcasted the message for initiating the selection period.

In Example 601, the subject matter of any one of Examples 582 to 600 can optionally include wherein the wireless device is configured for Device-to-Device (D2D) communication and is a synchronization slave device.

Example 602 is a communication method for a wireless device including receiving selection information, processing the selection information to select a candidate wireless device of a group of candidate wireless devices including the wireless device for transmitting synchronization signals, and notifying the selected candidate wireless device to start transmitting synchronization signals.

In Example 603, the subject matter of Example 602 can optionally include further comprising receiving the selection information from at least one candidate wireless device of the group of candidate wireless devices; wherein the selection information corresponds to at least one selection factor for the at least one candidate wireless device and/or to at least one weighted selection factor for the at least one candidate wireless device, and/or to a score value derived by combining the selection factors and/or the weighted selection factors.

In Example 604, the subject matter of Example 603 can optionally include wherein the at least one selection factor relates to a type of a source for time synchronization that the at least one candidate wireless device is capable of using.

In Example 605, the subject matter of Example 604 can optionally include wherein the type of the source for time synchronization indicates the source to be either a satellite-based synchronization source or an internal clock of the at least one candidate wireless device, the method further comprising employing a value for the at least one selection factor for the at least one candidate wireless device depending on the type of the source.

In Example 606, the subject matter of any one of Examples 603 to 605 can optionally include wherein the at least one selection factor is indicative of a quality of a source for time synchronization that the at least one candidate wireless device is capable of using.

In Example 607, the subject matter of Example 606 can optionally include wherein the source for time synchronization is a satellite-based synchronization source and the quality of the source for time synchronization corresponds to reception quality of a signal from the satellite-based synchronization source at the at least one candidate wireless device.

In Example 608, the subject matter of Example 606 can optionally include wherein the source for time synchronization is an internal clock of the at least one candidate wireless device and the quality of the source for time synchronization corresponds to an accuracy of the internal clock.

In Example 609, the subject matter of any one of Examples 603 to 608 66 can optionally include wherein the at least one selection factor is indicative of a distance between the wireless device and the at least one candidate wireless device; the method further comprising employing a value for the at least one selection factor depending on the magnitude of the relative distance.

In Example 610, the subject matter of any one of Examples 603 to 609 can optionally include wherein the at least one selection factor is indicative of a transmission power capability of the at least one candidate wireless device for transmitting periodic synchronization signals.

In Example 611, the subject matter of any one of Examples 603 to 610 can optionally include wherein the at least one selection factor is indicative of a battery level of the at least one candidate wireless device.

In Example 612, the subject matter of any one of Examples 602 to 611 can optionally further include selecting a candidate wireless device for transmitting synchronization signals when the selection information indicates that a relative distance between the candidate wireless device is smaller than a relative distance between the wireless device and any other candidate device included in the group of candidate devices.

In Example 613, the subject matter of any one of Examples 602 to 612 can optionally further include selecting a candidate wireless device for transmitting synchronization signals when the selection information indicates that a battery level of the candidate wireless device is larger than a battery level of any other candidate device included in the group of candidate devices including the wireless device.

In Example 614, the subject matter of any one of Examples 602 to 613 can optionally further include selecting a candidate wireless device for transmitting synchronization signals when the selection information indicates that a transmission power capability of the at least one candidate wireless device for transmitting periodic synchronization signals is larger than a corresponding transmission power capability of any other candidate device included in the group of candidate devices including the wireless device.

In Example 615, the subject matter of any one of Examples 603 to 614 can optionally include wherein a weight value is assigned to the at least one selection factor to yield a weighted selection factor, the weight value being indicative of a relative importance between the at least one selection factor compared to at least one further selection factor.

In Example 616, the subject matter of any one of Examples 602 to 615 can optionally include wherein the wireless device is configured for Device-to-Device (D2D) communication.

In Example 617, the subject matter of any one of Examples 602 to 616 can optionally further include transmitting a message to at least one candidate wireless device requesting transmission of the selection information to the wireless device.

In Example 618, the subject matter of Example 617 can optionally further include transmitting the message when a battery level of the wireless device falls below a predefined threshold.

In Example 619, the subject matter of Example one of Examples can optionally include or 618, further including transmitting the message when an average distance between the wireless device and at least one candidate wireless device exceeds a predefined threshold.

In Example 620, the subject matter of any one of Examples 617 to 619 can optionally further include transmitting the message when an average distance between the wireless device and each further candidate wireless device included in the group of candidate wireless devices exceeds a predefined threshold.

In Example 621, the subject matter of any one of Examples 602 to 620 can optionally include wherein the group of candidate wireless devices including the wireless device forms a synchronization cluster, where each wireless device is configured for Device-to-Device (D2D) communication, the method including broadcasting periodic synchronization signals by the wireless device before receiving the selection information.

Example 622 is a wireless device including one or more processors, and a memory storing instructions that when executed by the one or more processors cause the one or more processors to perform the method of any one of Examples 582 to 601.

Example 623 is a wireless device including one or more processors, and a memory storing instructions that when executed by the one or more processors cause the one or more processors to perform the method of any one of Examples 602 to 621.

Example 624 is a non-transitory computer readable medium storing instructions that, when executed by one or more processors of a wireless device, cause the wireless device to perform the method of any one of Examples 582 to 621.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless device comprising:
    a selection processor configured to process selection information to set a duration of a selection period and to start the selection period;
    a receiver configured to receive a synchronization initiation signal; and
    a transmitter configured to transmit a synchronization initiation signal after the selection period has expired if the receiver has not received a synchronization initiation signal during the selection period;
    wherein the selection information corresponds to at least one selection factor for the wireless device and/or to at least one selection factor weighted for the wireless device; and
    wherein the at least one selection factor relates to a type of a source for time synchronization that the wireless device is capable of using; or wherein the at least one selection factor is indicative of a quality of a source for time synchronization that the wireless device is capable of using; or wherein the at least one selection factor is indicative of a distance between the wireless device and a master wireless device from which the wireless device has received synchronization signals and wherein a value is employed for the at least one selection factor depending on a magnitude of the relative distance; or wherein the at least one selection factor is indicative of a transmission power capability of the wireless device for transmitting periodic synchronization signals; or wherein the at least one selection factor is indicative of a battery level of the wireless device.

2. The wireless device according to claim 1, wherein the type of the source for time synchronization indicates the source to be either a satellite-based synchronization source or an internal clock of the wireless device, and wherein the at least one selection factor is weighted for the wireless device depending on the type of the source.

3. The wireless device of claim 1, wherein the source for time synchronization is a satellite-based synchronization source and the quality of the source for time synchronization corresponds to reception quality of a signal from the satellite-based synchronization source at the wireless device.

4. The wireless device of claim 1, wherein the source for time synchronization is an internal clock of the wireless device and the quality of the source for time synchronization corresponds to an accuracy of the internal clock.

5. The wireless device of claim 1, wherein a weight value is assigned to the at least one selection factor to yield a weighted selection factor, the weight value being indicative of a relative importance between the at least one selection factor compared to at least one further selection factor.

6. The wireless device of claim 1, wherein the selection period is a selection period for selecting one of a group of candidate wireless devices including the wireless device to become a synchronization master device for broadcasting periodic synchronization signals.

7. The wireless device of claim 1, wherein the receiver is configured to receive a synchronization initiation signal from a further wireless device during the selection period.

8. The wireless device of claim 7, wherein the selection processor is configured to adjust to the further wireless device as source of periodic synchronization signals if the receiver receives a synchronization initiation signal during the selection period.

9. The wireless device of claim 1, wherein the transmitter is configured not to transmit a synchronization initiation signal if the receiver receives a synchronization initiation signal during the selection period.

10. The wireless device of claim 1, wherein the selection processor is configured to end the selection period when the receiver receives a synchronization initiation signal during the selection period.

11. The wireless device of claim 1, wherein the selection processor is configured to start the selection period after the receiver has received a message from a further wireless device for starting the selection period.

12. The wireless device of claim 1, wherein the receiver is configured to receive a periodic synchronization signal and wherein the transmitter is configured to broadcast a message for starting the selection period if a received strength of the periodic synchronization signal is below a predefined threshold.

13. The wireless device of claim 12, wherein the selection processor is configured to start the selection period after the transmitter has broadcasted the message for initiating the selection period.

14. A wireless device comprising:
a selection processor configured to set a duration of a selection period based on process selection information and to start the selection period;
a receiver configured to receive a synchronization initiation signal; and
a transmitter configured to transmit a synchronization initiation signal after the selection period has expired if the receiver has not received a synchronization initiation signal during the selection period;
wherein the synchronization initiation signal is an indication that wireless device is a synchronization master and that one or more other devices should synchronize to the wireless device for device to device communications;
wherein the selection information corresponds to at least one selection factor for the wireless device and/or to at least one selection factor weighted for the wireless device; and
wherein the at least one selection factor relates to a type of a source for time synchronization that the wireless device is capable of using or wherein the at least one selection factor is indicative of a distance between the wireless device and a master wireless device from which the wireless device has received synchronization signals and wherein a value is employed for the at least one selection factor depending on a magnitude of the relative distance.

* * * * *